(12) United States Patent
Hwang et al.

(10) Patent No.: US 11,878,711 B2
(45) Date of Patent: Jan. 23, 2024

(54) METHOD OF SHARING AND USING SENSOR DATA

(71) Applicant: SOS Lab Co., Ltd, Gwangju (KR)

(72) Inventors: Sung Ui Hwang, Gwangju (KR); Jun Hwan Jang, Seongnam-si (KR); Yong Yi Lee, Seongnam-si (KR)

(73) Assignee: SOS LAB Co., Ltd., Gwangju (KR)

( * ) Notice: Subject to any disclaimer, the term of this patent is extended or adjusted under 35 U.S.C. 154(b) by 81 days.

(21) Appl. No.: 17/118,413

(22) Filed: Dec. 10, 2020

(65) Prior Publication Data

US 2021/0403025 A1 Dec. 30, 2021

Related U.S. Application Data

(60) Provisional application No. 63/044,756, filed on Jun. 26, 2020.

(30) Foreign Application Priority Data

Sep. 3, 2020 (KR) .............................. 2020-0112084
Sep. 3, 2020 (KR) .............................. 2020-0112085
Sep. 3, 2020 (KR) .............................. 2020-0112086

(51) Int. Cl.
*B60W 60/00* (2020.01)
*H04W 4/40* (2018.01)
(Continued)

(52) U.S. Cl.
CPC ....... *B60W 60/001* (2020.02); *G06F 21/6254* (2013.01); *G06F 21/6263* (2013.01);
(Continued)

(58) Field of Classification Search
CPC .............. B60W 60/001; G06F 21/6254; G06F 21/6263; G06V 20/56; G06V 10/25;
(Continued)

(56) References Cited

U.S. PATENT DOCUMENTS 10,395,530 B2 * 8/2019 Parundekar .......... G08G 1/0141
10,994,727 B1 * 5/2021 Kumar ............... G06Q 30/0213
(Continued)

FOREIGN PATENT DOCUMENTS

| KR | 10-2017-0103132 A | 9/2017 |
| KR | 10-2018-0051225 A | 5/2018 |
| KR | 10-2019-0095592 A | 8/2019 |

OTHER PUBLICATIONS

PCT International Search Report and Written Opinion, PCT Application No. PCT/KR2020/016132, dated Mar. 5, 2021, 20 pages.
(Continued)

*Primary Examiner* — Rami Khatib
(74) *Attorney, Agent, or Firm* — Knobbe Martens Olson & Bear LLP

(57) ABSTRACT

Sharing sensor data between a first device and a second device comprising obtaining a set of point data from at least one of sensors located in the first device, determining a property data of the subset of point data based on the subset of point data, generating a first sharing data for sharing with the second device based on the property data, transmitting the sharing data to the second device, identifying an occurrence of an event at a first time point, and generating a second sharing data different from the first sharing data. A content of the second sharing data includes at least a portion of the set of point data obtained within a first time period including the first time point.

7 Claims, 84 Drawing Sheets

(51) Int. Cl.
  *G08G 1/00*    (2006.01)
  *G06V 20/56*   (2022.01)
  *H04W 4/38*   (2018.01)
  *G06F 21/62*   (2013.01)
  *H04L 9/40*   (2022.01)

(52) U.S. Cl.
  CPC ............. *G06V 20/56* (2022.01); *G08G 1/205* (2013.01); *H04L 63/0421* (2013.01); *H04W 4/38* (2018.02); *H04W 4/40* (2018.02)

(58) Field of Classification Search
  CPC ...... G06V 20/58; G06V 40/103; G08G 1/205; G08G 1/0112; G08G 1/0141; G08G 1/161; H04L 63/0421; H04L 63/0407; H04W 4/38; H04W 4/40
  See application file for complete search history.

(56) References Cited

U.S. PATENT DOCUMENTS

| | | | |
|---|---|---|---|
| 2010/0296705 A1 | 11/2010 | Miksa et al. | |
| 2011/0123068 A1 | 5/2011 | Miksa et al. | |
| 2013/0151135 A1 | 6/2013 | Aubrey et al. | |
| 2014/0043436 A1 | 2/2014 | Bell et al. | |
| 2014/0195138 A1 | 7/2014 | Stelzig et al. | |
| 2014/0299775 A1 | 10/2014 | Kimmel | |
| 2016/0097648 A1 | 4/2016 | Hannah | |
| 2017/0256167 A1* | 9/2017 | Kim .................. G08G 1/09675 |
| 2017/0264688 A1 | 9/2017 | Sell et al. | |
| 2017/0358204 A1 | 12/2017 | Modica et al. | |
| 2018/0252811 A1 | 9/2018 | Park et al. | |
| 2018/0261095 A1 | 9/2018 | Qiu et al. | |
| 2018/0299284 A1* | 10/2018 | Wang ................ G01C 21/3694 |
| 2018/0362031 A1 | 12/2018 | Chang et al. | |
| 2018/0362032 A1* | 12/2018 | Yang .................... G08G 1/167 |
| 2018/0365888 A1 | 12/2018 | Satzoda et al. | |
| 2019/0122543 A1* | 4/2019 | Matus ............ G08G 1/096741 |
| 2019/0138748 A1 | 5/2019 | Long et al. | |
| 2019/0206254 A1* | 7/2019 | Tao ...................... B60W 50/14 |
| 2019/0212419 A1 | 7/2019 | Jeong et al. | |
| 2019/0236955 A1* | 8/2019 | Hu ...................... G05D 1/0212 |
| 2019/0295003 A1 | 9/2019 | Dronen et al. | |
| 2019/0325230 A1 | 10/2019 | Nadler | |
| 2020/0013273 A1 | 1/2020 | Souloglou | |
| 2020/0017117 A1 | 1/2020 | Milton | |
| 2020/0125112 A1 | 4/2020 | Mao et al. | |
| 2020/0174493 A1* | 6/2020 | Lin ...................... G05D 1/0285 |
| 2021/0024094 A1 | 1/2021 | Maat et al. | |
| 2021/0124959 A1 | 4/2021 | Kuhnle et al. | |
| 2021/0264789 A1* | 8/2021 | Jo ......................... H04W 4/029 |
| 2021/0409379 A1 | 12/2021 | Hwang et al. | |
| 2022/0126864 A1 | 4/2022 | Moustafa et al. | |

OTHER PUBLICATIONS

United States Office Action, U.S. Appl. No. 17/118,358, filed Apr. 15, 2021, 14 pages.
U.S. Office Action, U.S. Appl. No. 17/118,358, dated Apr. 15, 2021, 14 pages.
Office Action dated May 26, 2022, in U.S. Appl. No. 17/118,358.
Final Office Action dated Feb. 1, 2022 in U.S. Appl. No. 17/118,358.
Final Office Action dated Nov. 18, 2022, in U.S. Appl. No. 17/118,358.
Office Action dated Mar. 30, 2023 in U.S. Appl. No. 17/118,358.

* cited by examiner

2000

FIG. 37
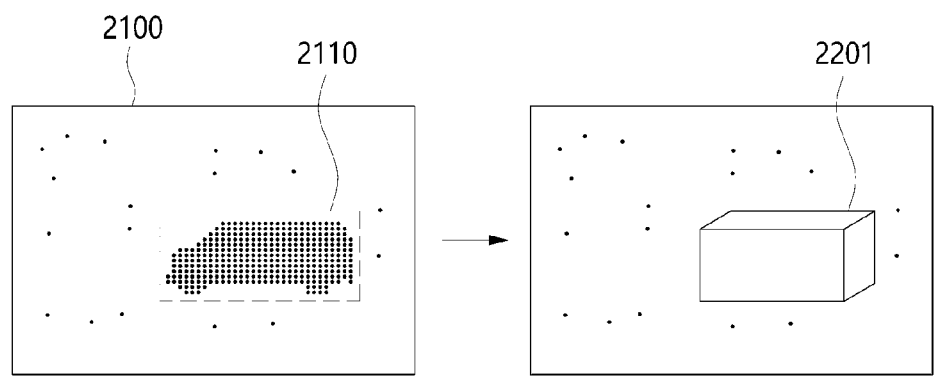
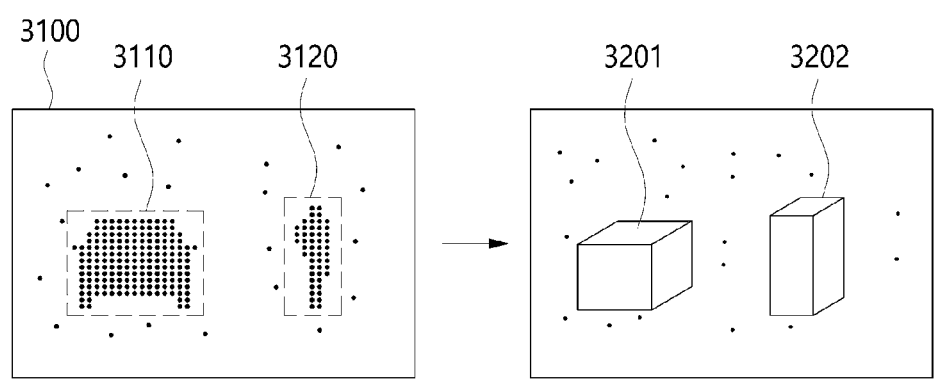

3300

FIG. 78
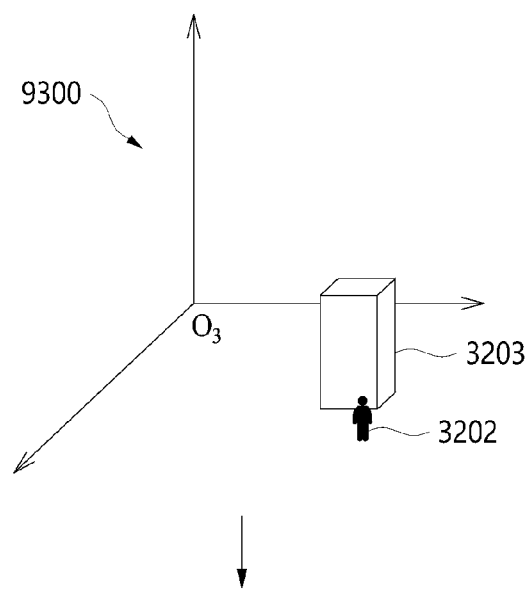
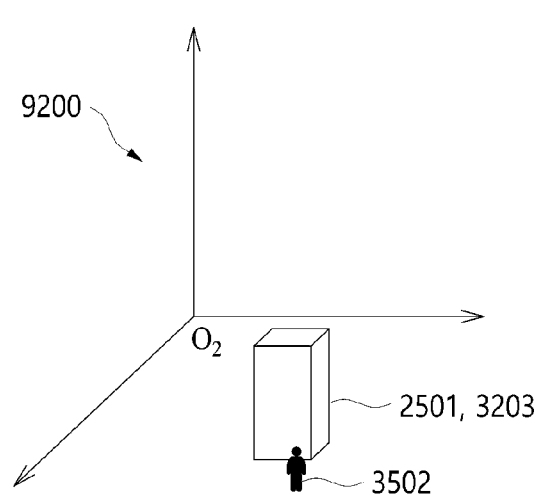

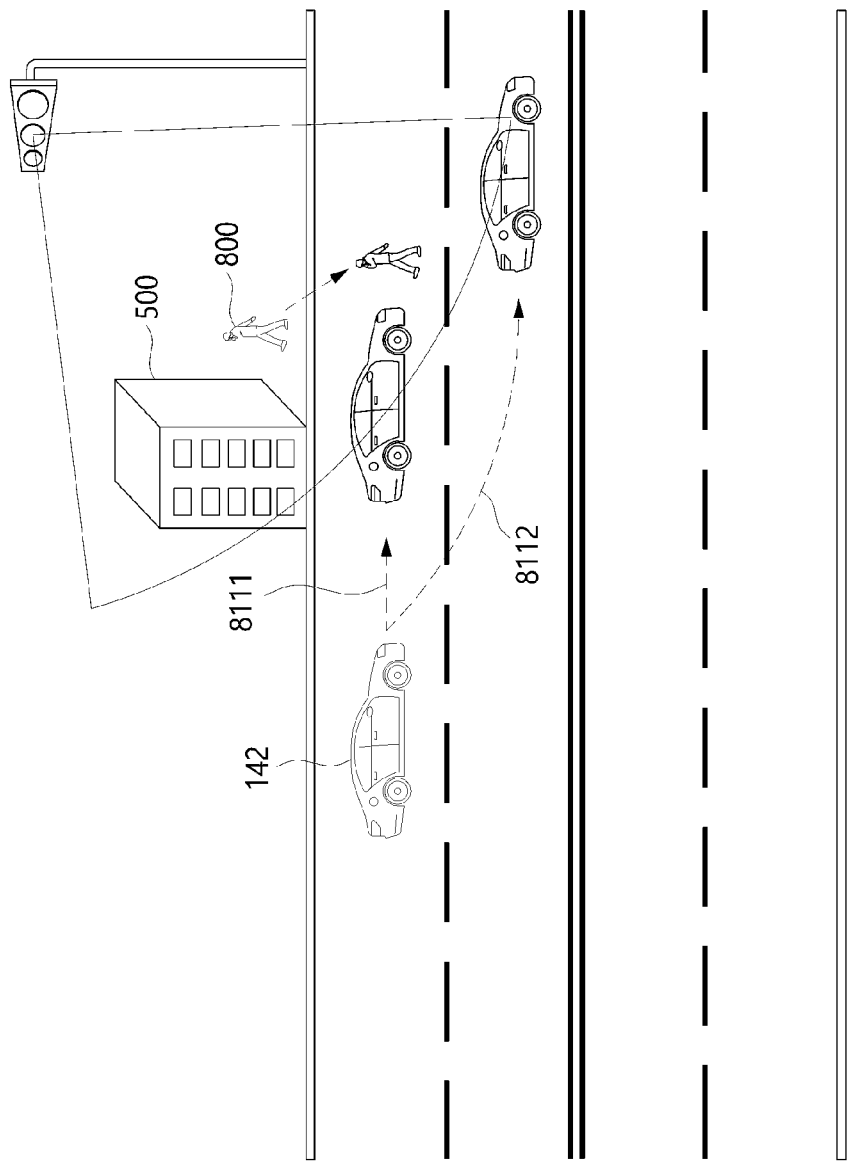

METHOD OF SHARING AND USING SENSOR DATA

CROSS-REFERENCE TO RELATED APPLICATIONS

This application claims priority to and the benefit of U.S. Patent Application No. 63/044,756, filed on Jun. 26, 2020, Korean Patent Application No. 10-2020-0112084, filed on Sep. 3, 2020, Korean Patent Application No. 10-2020-0112085, filed on Sep. 3, 2020, Korean Patent Application No. 10-2020-0112086, filed on Sep. 3, 2020 the disclosure of which is incorporated herein by reference in its entirety.

BACKGROUND

1. Field of the Invention

The present invention relates to a method of sharing and using sensor data acquired from a sensor, and more particularly, to a method of determining the content of sharing data, which is shared depending on the class of an object or depending on whether an event has occurred, and allowing a device that receives the sharing data through a communication system to align a coordinate system of data included in the sharing data to calculate a path of a vehicle using the sharing data.

2. Discussion of Related Art

A sensor that acquires information on surrounding objects is an essential component in an autonomous driving system. For example, a vehicle equipped with an autonomous driving system acquires information on the surrounding environment of the vehicle on the basis of sensor data acquired through at least one of a light detection and ranging (LiDAR), a radar, a camera, an ultrasonic sensor, or the like.

Also, research on a vehicle-to-Everything (V2X)-based autonomous driving system, which shares data with other vehicles, infrastructure devices, servers, and the like, is being actively conducted in order to improve the quality of information acquired through limited sensors in the autonomous driving system.

SUMMARY OF THE INVENTION

An object to be achieved according to an embodiment is directed to providing to a sensor data sharing method for the protection of personal information (private life).

An object to be achieved according to another embodiment is directed to providing an efficient sensor data sharing method for the generation of a high-definition map.

An object to be achieved according to still another embodiment is directed to providing a selective sensor data sharing method according to event occurrence in order to increase data sharing efficiency.

An object to be achieved according to yet still another embodiment is directed to providing a sensor data processing and vehicle control method that prepares for risks (e.g., blind spots) that may occur when a vehicle is being driven.

According to one embodiment, there is provided a method of sharing sensor data of a first device with a second device, the method including obtaining, by a controller of the first device, a set of point data from at least one of a sensors located in the first device, wherein the set of point data includes a first subset of point data representing at least a portion of a first object, generating, by the controller, a first property data of the first subset of point data based on the first subset of point data, wherein the first property data includes a class information of the first subset of point data, generating, by the controller, a sharing data including at least a portion of the first subset of point data and the first property data; and transmitting, by the controller, the sharing data to the second device; wherein if a class of a first object included in the class information a class in which personal information must be protected, a content of the sharing data includes a privacy protection data in which at least a portion of the first subset of point data is processed such that personal information of the first object does not identified by the second device.

According to another embodiment, there is provided a method of sharing sensor data of a first device with a second device, the method including obtaining, by a controller of the first device, a set of point data from at least one of a sensors located in the first device, wherein the set of point data includes a first subset of point data representing at least a portion of a first object, generating, by the controller, a first property data of the first subset of point data based on the first subset of point data, wherein the first property data includes a class information of the first subset of point data, generating a sharing data for sharing with the second device using at least one of the first subset of point data and the first property data; and wherein whether a content of the sharing data for sharing with the second device includes at least one of the first subset of point data or the first property data is determined based on at least one of a movability of a the first object's class and a type of the first object's class.

According to still another embodiment, there is provided a method of sharing sensor data between a first device and a second device, the method including obtaining, by a controller included in the first device, a set of point data from at least one of a sensors located in the first device, wherein the set of point data includes a plurality of subset of point data, determining, by the controller, a property data of the subset of point data based on the subset of point data, generating, by the controller, a first sharing data for sharing with the second device based on the property data, transmitting, by the controller, the sharing data to the second device, wherein a content of the sharing data includes at least one of a plurality of pieces of information included in the property data, identifying, by the controller, an occurrence of an event at a first time point and generating, by the controller, according to identifying the event, a second sharing data different from the first sharing data, wherein a content of the second sharing data includes at least a portion of the set of point data obtained within a first time period including the first time point.

According to still another embodiment, there is provided a method of sharing sensor data between a first device and a second device, the method including obtaining, by a controller included in the first device, a set of point data included in a sensor data from at least one of a sensors, wherein the set of point data includes subset of point data representing at least a portion of an object determining, by the controller, a property data of the subset of point data based on the subset of point data, generating, by the controller, a first sharing data for sharing with the second device based on the property data, transmitting, by the controller, the first sharing data to the second device, wherein a content of the first sharing data includes at least one of a plurality of pieces of information included in the property data to the second device, identifying, by the controller, occurrence of an event at a first time point and generating, by the controller, according to identifying the event, a second sharing data different from the first sharing data, wherein a content of the second sharing data includes at least a portion of the set of point data obtained within a first time period including the first time point.

According to still another embodiment, there is provided a method of working of a server, the method including identifying an event occurred in a first region at a first time, transmitting a first message to request a sensor data to a first device located within a first range from the first region, wherein the first message includes a time information of the event, wherein the time information is related to the first time in order to obtain the sensor data obtained within a time period related to the first time, transmitting a second message to notify the event to a second device located within a second range representing a predetermined region outside the first range, wherein the second message includes a location information of the event, wherein the location information is related to the first region such that the event is identified by the second device and receiving at least a portion of set of point data obtained within a first time period including the first time in response to the first message, wherein the set of point data is obtained from at least one of sensors located in the first device.

According to still another aspect, there is provided a method of processing sharing data to control a vehicle, the method including obtaining, by a controller included in the vehicle, a first set of point data included in sensor data acquired from a first sensor included in the vehicle, wherein the first set of point data includes a first subset of point data representing at least a portion of a first object, acquiring, by the controller, first property data of the first subset of point data corresponding to a position of the first object, wherein the first property data is shown by a first coordinate system based on a first origin, generating, by the controller, first standard property data on the basis of the first property data, wherein the first standard property data is shown in a second coordinate system based on a second origin, acquiring, by the controller, second standard property data corresponding to a position of a second object not represented by the first set of point data, wherein the second standard property data is shown in the second coordinate system, and controlling, by the controller, the vehicle on the basis of the first standard property data and the second standard property data, wherein the second standard property data is generated based on second property data of a second subset of point data included in a second set of point data, and wherein the second set of point data is acquired from a second sensor included in the first device.

According to still another aspect, there is provided a method of generating a path of a vehicle, the method including acquiring, by a controller included in the vehicle, a first set of point data included in sensor data acquired from a first sensor included in the vehicle, wherein the first set of point data includes a first subset of point data representing at least a portion of a first object, determining, by the controller, first property data of the first subset of point data, wherein the first property data corresponds to the first object, generating, by the controller, a local path of the vehicle on the basis of at least one of the first set of point data or the first property data, wherein the local path of the vehicle includes at least one of a speed of the vehicle, a direction of the vehicle, and a position of the vehicle, receiving, by the controller, second property data determined based on second set of point data included in sensor data acquired from a second sensor placed in a first device, wherein the second property data corresponds to a second object that is not recognized based on the first set of point data, and generating, by the controller, a modified path by changing at least some of the position of the vehicle, the speed of the vehicle, or the direction of the vehicle in the local path of the vehicle on the basis of the second property data and at least one of the first set of point data, the first property data, or the local path.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 37 is a diagram illustrating a method of processing, by a first vehicle, a shared first set of point data and a second set of point data according to an embodiment.

FIG. 78 is a diagram illustrating a method in which a controller of a vehicle generates second standard property data on the basis of second property data shown in a second local coordinate system according to an embodiment.

FIG. 84 is a diagram illustrating various examples of a modified path according to an embodiment.

DETAILED DESCRIPTION OF EXEMPLARY EMBODIMENTS

Figure 1:
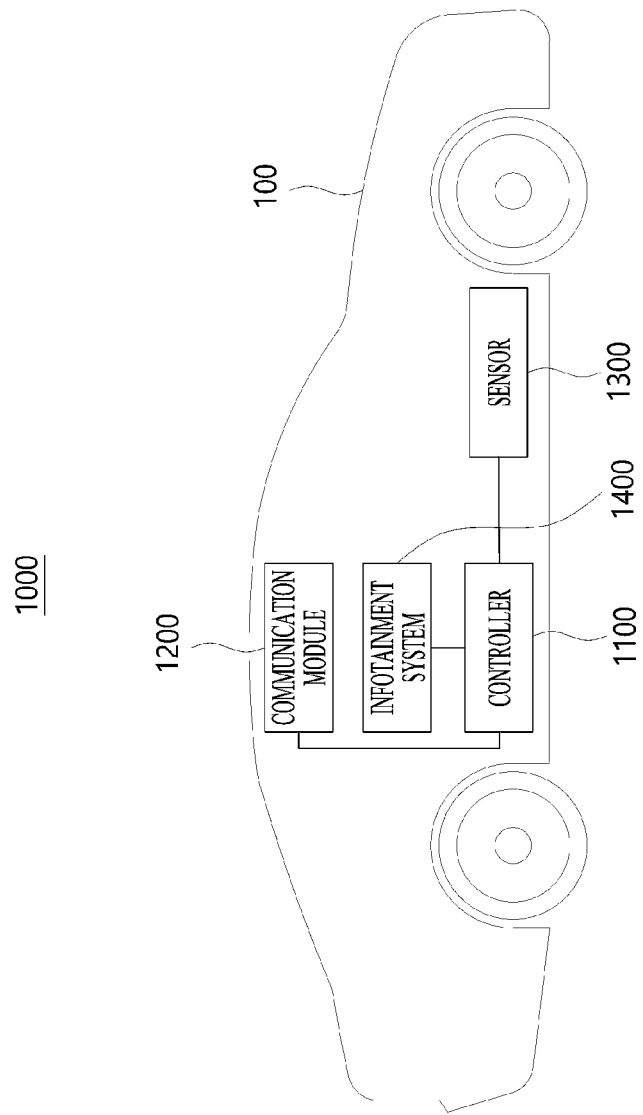
FIG. 1 is a diagram illustrating elements of an autonomous driving system according to an embodiment.

Embodiments described in this specification are intended to clearly explain the spirit of the invention to those skilled in the art. Therefore, the present invention is not limited by the embodiments, and the scope of the present invention should be interpreted as encompassing modifications and variations without departing from the spirit of the invention.

Terms used in this specification are selected from among general terms, which are currently widely used, in consideration of functions in the present invention and may have meanings varying depending on intentions of those skilled in the art, customs in the field of the art, the emergence of new technologies, or the like. If a specific term is used with a specific meaning, the meaning of the term will be described specifically. Accordingly, the terms used in this specification should not be defined as simple names of the components but should be defined on the basis of the actual meaning of the terms and the whole context throughout the present specification.

The accompanying drawings are to facilitate the explanation of the present invention, and the shape in the drawings may be exaggerated for the purpose of convenience of explanation, so the present invention should not be limited by the drawings.

When it is determined that detailed descriptions of well-known elements or functions related to the present invention may obscure the subject matter of the present invention, detailed descriptions thereof will be omitted herein as necessary.

According to one embodiment, there is provided a method of sharing sensor data of a first device with a second device, the method including obtaining, by a controller of the first device, a set of point data from at least one of a sensors located in the first device, wherein the set of point data includes a first subset of point data representing at least a portion of a first object, generating, by the controller, a first property data of the first subset of point data based on the first subset of point data, wherein the first property data includes a class information of the first subset of point data, generating, by the controller, a sharing data including at least a portion of the first subset of point data and the first property data; and transmitting, by the controller, the sharing data to the second device; wherein if a class of a first object included in the class information a class in which personal information must be protected, a content of the sharing data includes a privacy protection data in which at least a portion of the first subset of point data is processed such that personal information of the first object does not identified by the second device.

In some embodiments, the class in which personal information must be protected includes one of a class related to human, a class related to identification number of a vehicle or a building, or a class related to ID.

In some embodiments, the class information of the first subset of point data includes at least one of a information about a type of the first object, a information about a type of a portion of the first object, or a information about a situation of a region related to the first object.

In some embodiments, the first property data of the first subset of point data includes at least one of a class information of the first object, a center position information representing a center position of the first subset of point data, a size information representing a size of the first subset of point data, a movement information including at least one of a velocity or a direction of the first subset of point data, or a shape information represented by processing the shape of the first object.

In some embodiments, the content of the sharing data includes at least one of information included in the first property data regardless of a type of class included in the class information of the first subset of point data.

In some embodiments, the shape information is determined based on the class information off the first subset of point data, and wherein the shape information includes at least one of a skeleton information indicated by points less than a predetermined number or at least one of line, and template information in which the first object is represented in a predetermined shape.

In some embodiments, the privacy protection data includes at least portion of information included in the first property data, and wherein the first property data includes a shape information represented by processing the shape of the first object.

In some embodiments, the first subset of point data includes a multiple pieces of point data, and wherein the privacy protection data is generated based on at least one of the multiple pieces of point data corresponding to a region related to privacy of the first object.

In some embodiments, the set of point data includes a second subset of point data representing at least portion of a second object, and wherein if a class of the first object included in the class information of the first subset of point data is a class in which personal information must be protected and a class of the second object included in the class information of the second subset of point data is not a class in which personal information must be protected, the content of the sharing data includes a privacy protection data in which at least a portion of the first subset of point data is processed, and the content of the sharing data includes at least portion of a second property data of the second subset of point data.

In some embodiments, the set of point data includes a second subset of point data representing at least portion of a second object, wherein if obtaining a approval about sharing of at least one of the second subset of point data or a second property data, and wherein the second property data includes a class information of the second subset of point data, the content of the sharing data includes at least one of the second subset of point data or the second property data regardless of a type of the second object's class included in the class information of the second subset of point data.

In some embodiments, the set of point data includes a multiple pieces of point data, wherein the multiple pieces of point data generated based on at least one of a distance to an object measured by at least one of the sensors disposed to the first device or a reflectance of the object, wherein the controller generates the first subset of point data based on the multiple pieces of point data of the first object which located within a predetermined distance from the first device, wherein the controller generates a second subset of point data based on the multiple pieces of the second object which located farther than the predetermined distance from the first device, and wherein the content of the sharing data includes the second subset of point data regardless of a property data of the second subset of point data.

According to another embodiment, there is provided a method of sharing sensor data of a first device with a second device, the method including obtaining, by a controller of the first device, a set of point data from at least one of a sensors located in the first device, wherein the set of point data includes a first subset of point data representing at least a portion of a first object, generating, by the controller, a first property data of the first subset of point data based on the first subset of point data, wherein the first property data includes a class information of the first subset of point data, generating a sharing data for sharing with the second device using at least one of the first subset of point data and the first property data; and wherein whether a content of the sharing data for sharing with the second device includes at least one of the first subset of point data or the first property data is determined based on at least one of a movability of a the first object's class and a type of the first object's class.

In some embodiments, if the first object's class included in the class information of the first subset of point data is related to an immovable object, the content of the sharing data for sharing with the second device includes the first subset of point data, and the method includes transmitting the sharing data to the second device.

In some embodiments, the content of the sharing data includes at least one of a plurality of pieces of information included in the first property data of the first subset of point data.

In some embodiments, if the controller obtains an additional information related to whether the immovable object is movable after certain time, the content of the sharing data includes the additional information.

In some embodiments, if the first object's class included in the class information of the first subset of point data is related to a movable object, the content of the sharing data does not include the first subset of point data.

In some embodiments, the content of the sharing data includes at least one of a plurality of pieces of information included in the first property data of the first subset of point data, the method includes transmitting the sharing data to the second device.

In some embodiments, the class information of the first subset of point data includes at least one of an information about a type of the first object, an information about a type of a portion of the first object, or an information about a situation of a region related to the first object.

In some embodiments, the set of point data includes a second subset of point data representing at least portion of a second object, wherein the second object located in a region separated by a predetermined distance from the first object, wherein the situation of the region related to the first object is determined based on the first subset of point data and the second subset of point data, wherein if the class information of the first subset of point data and a class information of the second subset of point data include an information about the situation of the region related to the first object, the controller obtains an additional information related to an end time of the situation of the region related to the first object, and wherein the content of the sharing data includes the additional information.

In some embodiments, if the first object's class included in the class information of the first subset of point data is related to an immovable object, the content of the sharing data does not include the first subset of point data, and wherein if the first object's class included in the class information of the first subset of point data is related to a movable object, the content of the sharing data includes the first subset of point data.

In some embodiments, at least one of the sensors includes at least one of a LiDAR, a camera, a radar and an ultrasonic sensor.

In some embodiments, each of the first device and the second device includes at least one of a moving object, a server, a mobile device, or an infrastructure device.

In some embodiments, there is provided a computer-readable recording medium having a program recorded thereon to perform the above-described vehicle control method and path generation method.

According to still another embodiment, there is provided a method of sharing sensor data between a first device and a second device, the method including obtaining, by a controller included in the first device, a set of point data from at least one of a sensors located in the first device, wherein the set of point data includes a plurality of subset of point data, determining, by the controller, a property data of the subset of point data based on the subset of point data, generating, by the controller, a first sharing data for sharing with the second device based on the property data, transmitting, by the controller, the sharing data to the second device, wherein a content of the sharing data includes at least one of a plurality of pieces of information included in the property data, identifying, by the controller, an occurrence of an event at a first time point and generating, by the controller, according to identifying the event, a second sharing data different from the first sharing data, and wherein a content of the second sharing data includes at least a portion of the set of point data obtained within a first time period including the first time point.

In some embodiments, the method is configured to transmit the second sharing data to the second device.

In some embodiments, if receiving a request information requesting to share the second sharing data from at least one of the second device or a third device, in response to receiving the request information, the method being configured to transmit the second sharing data to a device transmitting the request information.

In some embodiments, if receiving a request information from at least one of the second device or a third device requesting to share the second sharing data to a fourth device, in response to receiving the request information, the method being configured to transmit the second sharing data to the fourth device.

In some embodiments, identifying the event comprise obtaining an information indicating the occurrence of the event from at least one of the second device or a third device.

In some embodiments, identifying the event comprise identifying the occurrence of the event based on at least a portion of the set of point data, the plurality of subset of point data or the property data of the subset of point data.

In some embodiments, the request information includes an information indicating the occurrence of the event, and wherein identifying the event comprise identifying the occurrence of the event based on the information indicating the occurrence of the event.

In some embodiments, one of the plurality of subset of point data represents at least a portion of an object related to the event.

In some embodiments, the event includes at least one of a traffic-event related to at least one of accident related to the first device or accident related to another device around the first device, an environment event related to environment around the first device, and a regulatory event related to regulatory about the first device or another device around the first device.

In some embodiments, the first time point includes at least one of a time point at which the event identified or a time point at which the event occurred.

In some embodiments, a content of the second sharing data includes at least a portion of the content of the first sharing data.

In some embodiments, the second sharing data is generated based on a plurality of set of point data obtained during the first time period, when the second sharing data is generated at regular intervals, transmitting the second sharing data to the second device whenever the second sharing data is generated, or when the second sharing data is generated after the end of the first time period, transmitting the second sharing data to the second device after the second sharing data is generated.

In some embodiments, the first time period includes a time point at which the event occurred.

In some embodiments, the first time period includes a second time point at which the event ends.

According to still another embodiment, there is provided a method of sharing sensor data between a first device and a second device, the method including obtaining, by a controller included in the first device, a set of point data included in a sensor data from at least one of a sensors, wherein the set of point data includes subset of point data representing at least a portion of an object determining, by the controller, a property data of the subset of point data based on the subset of point data, generating, by the controller, a first sharing data for sharing with the second device based on the property data, transmitting, by the controller, the first sharing data to the second device, wherein a content of the first sharing data includes at least one of a plurality of pieces of information included in the property data to the second device, identifying, by the controller, occurrence of an event at a first time point and generating, by the controller, according to identifying the event, a second sharing data different from the first sharing data, and wherein a content of the second sharing data includes at least a portion of the set of point data obtained within a first time period including the first time point.

According to still another embodiment, there is provided a method of working of a server, the method including identifying an event occurred in a first region at a first time, transmitting a first message to request a sensor data to a first device located within a first range from the first region, wherein the first message includes a time information of the event, wherein the time information is related to the first time in order to obtain the sensor data obtained within a time period related to the first time, transmitting a second message to notify the event to a second device located within a second range representing a predetermined region outside the first range, wherein the second message includes a location information of the event, wherein the location information is related to the first region such that the event is identified by the second device and receiving at least a portion of set of point data obtained within a first time period including the first time in response to the first message, and wherein the set of point data is obtained from at least one of sensors located in the first device.

In some embodiments, the event includes at least one of a traffic-event related to at least one of accident related to the first device or accident related to another device around the first device, an environment event related to environment around the first device, and a regulatory event related to regulatory about the first device or another device around the first device.

In some embodiments, when the first device is located in a first sub range, the set of point data obtained from at least one of sensors located in the first device includes a subset of point data representing at least a portion of an object related to the event, and wherein the first sub range represents an area in which information related to the event can be obtained within the first range.

In some embodiments, the first region includes a region including all of objects related to the event.

In some embodiments, identifying the event comprise obtaining a first information representing that the event occurs at the first time and a second information representing that the event occurs in the first region.

In some embodiments, the second device is included in a vehicle, and wherein when a path of the vehicle located in the second range is related to the first region, transmitting the second message to the vehicle.

In some embodiments, each of the first device and the second device includes at least one of a moving object, a server, a mobile device, or an infrastructure device.

In some embodiments, at least one of the sensors includes at least one of a LiDAR, a camera, a radar and an ultrasonic sensor.

In some embodiments, there is provided a computer-readable recording medium having a program recorded thereon to perform the above-described vehicle control method and path generation method.

According to still another embodiment, there is provided a method of processing sensor data obtained from a first device to control a vehicle, the method including obtaining, by a controller included in the vehicle, a first set of point data included in sensor data obtained from a first sensor included in the vehicle, wherein the first set of point data includes a first subset of point data representing at least a portion of a first object; obtaining, by the controller, a first property data of the first subset of point data corresponding to a position of the first object, wherein the first property data is represented by a first coordinate system based on a first origin; generating a first standard property data on the basis of the first property data, wherein the first standard property data is represented by a second coordinate system based on a second origin; obtaining, by the controller, a second standard property data corresponding to a position of a second object not represented by the first set of point data, wherein the second standard property data is represented by the second coordinate system; and controlling, by the controller, the vehicle on the basis of the first standard property data and the second standard property data, wherein the second standard property data is generated based on a second property data of a second subset of point data included in a second set of point data, and wherein the second set of point data is obtained from a second sensor included in the first device.

In some embodiments, the generating of the first standard property data may include setting the first coordinate system in which the first property data is represented as the second coordinate system.

In some embodiments, the obtaining of second standard property data may include receiving the second property data represented by a third coordinate system based on a third origin from the first device and generating the second standard property data on the basis of the second property data by aligning the third coordinate system with the second coordinate system.

In some embodiments, the generating of the first standard property data may include aligning the first coordinate system in which the first property data is represented with the second coordinate system, and the generating the second standard property data may include aligning the third coordinate system in which the second property data is represented with the second coordinate system.

In some embodiments, the third origin may correspond to a position of an optical origin of the second sensor included in the first device.

In some embodiments, the first origin may correspond to a position of an optical origin of the first sensor included in the vehicle, and the second origin may correspond to at least one of the first origin or a predetermined static position.

In some embodiments, the first property data may include at least one of a class information of the first object, a center position information indicating a center position of the first subset of point data, a size information indicating a size information of the first subset of point data, a movement information including at least one of a movement speed or a movement direction of the first subset of point data, an identification information for distinguishing the first subset of point data from other subsets of point data, and a shape information obtained by processing a shape of the first object, and the second property data may include at least one of a class information of the second object, a center position information indicating a center position of the second subset of point data, a size information indicating a size information of the second subset of point data, a movement information including at least one of a movement speed or a movement direction of the second subset of point data, an identification information for distinguishing the second subset of point data from other subsets of point data, and a shape information obtained by processing a shape of the second object.

In some embodiments, the first property data may include a first center position information of the first subset of point data represented by the first coordinate system, a first standard center position information included in the first standard property data and generated based on the first center position information is represented by the second coordinate system, the second property data includes second center position information of the second subset of point data represented by a third coordinate system, and the second standard center position information included in the second standard property data and generated based on the second center position information may be represented by the second coordinate system.

In some embodiments, the controlling of the vehicle may include controlling the vehicle to travel along a preset global path on the basis of a position of the vehicle and a position of a destination and generating a local path on the basis of the first standard property data and the second standard property data.

According to still another embodiment, there is provided a method of processing sensor data obtained from a first device to generate a path of a vehicle, the method including, by a controller included in the vehicle, obtaining a first set of point data included in sensor data acquired from a first sensor included in the vehicle, wherein the first set of point data includes a first subset of point data representing at least a portion of a first object; determining, by the controller, a first property data of the first subset of point data, wherein the first property data corresponds to the first object; generating, by the controller, a local path of the vehicle on the basis of at least one of the first set of point data or the first property data, wherein the local path of the vehicle includes at least one of a speed of the vehicle, a direction of the vehicle, and a position of the vehicle; receiving, by the controller, a second property data determined based on a second set of point data included in sensor data acquired from a second sensor placed in the first device, and wherein the second property data corresponds to a second object that is not recognized based on the first set of point data; and generating, by the controller, a modified path by changing at least some of the position of the vehicle, the speed of the vehicle, or the direction of the vehicle in the local path of the vehicle on the basis of the second property data and at least one of the first set of point data, the first property data, or the local path.

In some embodiments, the local path may at least partially overlap a certain region where the second object is positioned, and the modified path may not overlap the certain region where the second object is positioned.

In some embodiments, the vehicle may be controlled to travel along a preset global path on the basis of a position of the vehicle and a position of a destination, and the generating of the local path may include generating a local path including at least a portion of a region corresponding to the field of view of the first sensor; and controlling the vehicle to travel along the local path.

In some embodiments, the generating of the modified path may include determining whether to modify the path of the vehicle on the basis of the probability of movement of the vehicle predicted based on the local path of the vehicle and the probability of movement of the second object predicted based on the second property data.

In some embodiments, the method may further include receiving a third property data determined based on the second set of point data acquired from the second sensor placed in the first device, wherein the third property data corresponds to a third object; comparing the third property data and the first property data and determining whether the third object and the first object are the same object, and generating a modified path for considering the third object by changing at least some of a position of the vehicle, a speed of the vehicle, or a direction of the vehicle on the basis of the third property data, the second property data, and at least one of the first set of point data, the first property data, or the local path.

In some embodiments, the method may further include receiving a third property data determined based on the second set of point data acquired from the second sensor placed in the first device, wherein the third property data corresponds to a third object; and comparing the third property data and the first property data and determining whether the third object and the first object are the same object, and wherein when it is determined that the first object and the third object are the same object, the controller does not generate the modified path for reflecting the third object.

In some embodiments, the modified path may include at least one of a first modified path and a second modified path, the first modified path may include a path obtained by changing at least a portion of the local path of the vehicle, and the second modified path may include a path for stopping the vehicle in the local path of the vehicle.

In some embodiments, the first device may include at least one of a moving object, an infrastructure, a mobile device, or a server.

In some embodiments, each of the first sensor and the second sensor may include at least one of a LiDAR, a camera, a radar, and an ultrasonic sensor.

In some embodiments, there is provided a computer-readable recording medium having a program recorded thereon to perform the above-described vehicle control method and path generation method.

1. Overview of Autonomous Driving System

1.1. Advanced Driver Assistance Systems (ADAS)

Advanced driver-assistance systems, which are abbreviated as "ADAS," are systems that assist drivers in driving and may refer to systems that can reduce drivers' fatigue and help drivers to drive safely.

Advanced driver-assistance systems may include various devices and systems.

For example, the advanced driver-assistance systems may include an automatic vehicle navigation device, an adaptive cruise control device, a lane keeping assistance system, a lane departure prevention assistance system, a blind spot warning device, an intelligent speed adaptation system, an intelligent headlight control system, a pedestrian protection system, an automatic parking system, a traffic sign recognition system, a driver drowsiness prevention system, a vehicle communication system, a hill descent control system, an electric vehicle driving warning system, a low-beam assistance system, a high-beam assistance system, a front collision warning system, smart cruise control (SCC), navigation-based smart cruise control (NSCC), a highway driving assistance system, a rear view monitor with e-Mirror (RVM), etc., but the present invention is not limited thereto.

Also, a device equipped with the driver assistance system may share data with other devices through communication. This will be described in detail below.

1.2. Autonomous Driving System (AD)

Also, an autonomous driving system (e.g., autonomous driving (AD), autonomous car, driverless car, self-driving car, robotic car) may be mounted in a vehicle to enable the vehicle to automatically travel without human intervention.

Also, the autonomous driving system may share data with other devices through communication. This will be described in detail below Hereinafter, for convenience of description, the above-described driver assistance system and autonomous driving system are expressed as an autonomous driving system 1000.

1.3. Elements of Autonomous Driving System (AD/ADAS)

The autonomous driving system 1000 may be mounted inside a vehicle 100. Also, the autonomous driving system 1000 may be mounted inside an aircraft, a ship, or an unmanned aerial vehicle as well as the vehicle 100, but the present invention is not limited thereto.

FIG. 1 is a diagram illustrating elements of an autonomous driving system according to an embodiment.

Referring to FIG. 1, an autonomous driving system 1000 according to an embodiment may include various elements.

For example, the autonomous driving system 1000 may include at least one controller 1100, at least one communication module 1200, at least one sensor 1300, at least one infotainment system 1400, etc., but the present invention is not limited thereto.

Hereinafter, various examples of the elements of the autonomous driving system 1000 will be described in detail.

1.3.1. Controller

Referring to FIG. 1 again, the autonomous driving system 1000 according to an embodiment may include at least one controller 1100.

Also, the controller 1100 may control elements of an apparatus including the controller 1100. For example, the controller 1100 may control at least one sensor 1300 or at least one communication module 1200 included in the autonomous driving system 1000, but the present invention is not limited thereto.

Also, the controller 1100 may acquire data from the at least one sensor 1300 or the at least one communication module 1200. For example, the controller 1100 may acquire data from a light detection and ranging (LiDAR) device located in a vehicle, but the present invention is not limited thereto. The controller may acquire data from various sensors and a communication module.

Also, the controller 1100 may be used to control a vehicle. For example, the controller 1100 may control the speed, direction, path, or the like of the vehicle, but the present invention is not limited thereto. The controller 1100 may control the various operations of the vehicle.

Also, the controller 1100 may be expressed as an ECU, a processor, or the like depending on the embodiment, but the present invention is not limited thereto.

Also, in this specification, the controller 1100 may refer to a controller of a device where the autonomous driving system 1000 is placed and may also refer to a controller placed in at least one sensor. However, the present invention is not limited thereto, and the controller 1100 may collectively refer to at least one controller placed in the autonomous driving system 1000.

1.3.2. Communication Module

Referring to FIG. 1 again, the autonomous driving system 1000 according to an embodiment may include at least one communication module 1200.

In this case, the at least one communication module 1200 may be used to share at least one piece of data with other devices. As an example, the controller 1100 may transmit or receive data to or from the outside through the at least one communication module 1200.

Also, the at least one communication module 1200 may be used to implement at least one vehicle-to-everything (V2X) system. In detail, the communication module 1200 may be used to implement at least one V2X system such as a vehicle-to-vehicle (V2V) system, a vehicle-to-infra (V2I) system, a vehicle-to-network (V2N) system, a vehicle-to-pedestrian (V2P) system, and a vehicle-to-cloud (V2C) system.

Also, the autonomous driving system 1000 may share data acquired from the at least one sensor 1300 and relevant property data through the at least one communication module 1200, but the present invention is not limited thereto.

Also, the at least one communication module 1200 may include at least one antenna. For example, the at least one communication module may include at least one of Global Positioning System (GPS), Global Navigation Satellite System (GNSS), Amplitude Modulation (AM), Frequency Modulation (FM), Fourth Generation (4G), and Fifth Generation (5G) antennas, but the present invention is not limited thereto.

1.3.3. Sensor

Referring to FIG. 1 again, the autonomous driving system 1000 according to an embodiment may include at least one sensor 1300.

Also, the at least one sensor 1300 according to an embodiment may be used to acquire vehicle surrounding information.

For example, the at least one sensor may be used to acquire distance information of an object near a vehicle, but the present invention is not limited thereto. The sensor may be used to acquire various pieces of information about an object near a vehicle.

Figure 2:
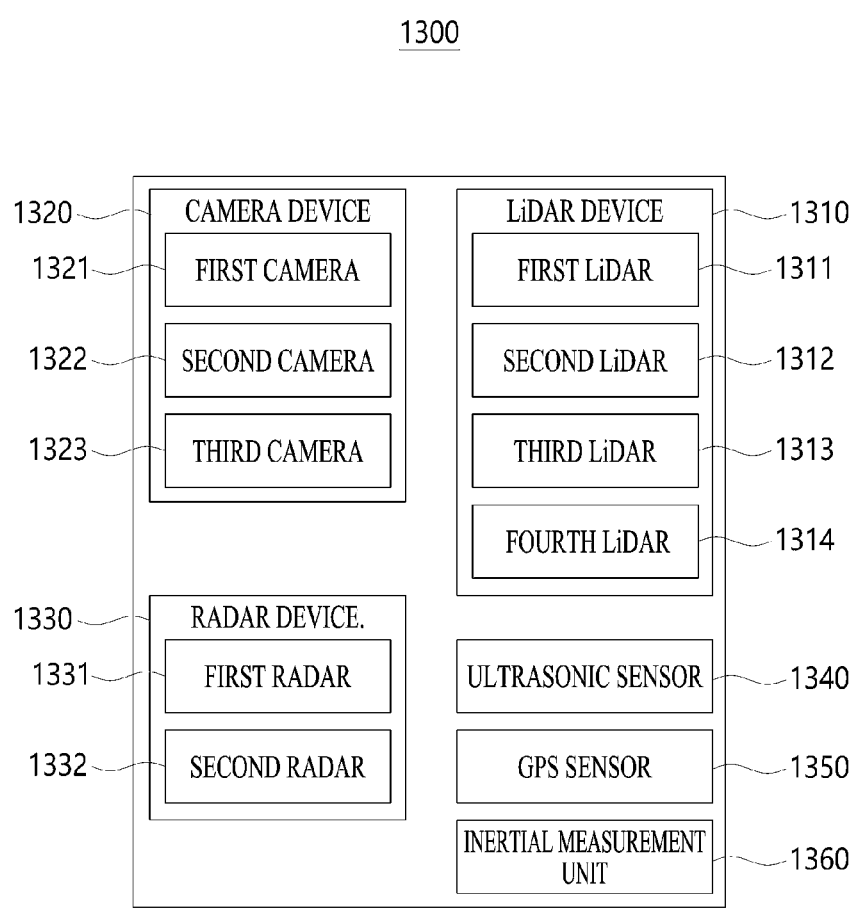
FIG. 2 is a diagram specifically illustrating at least one sensor according to an embodiment.

FIG. 2 is a diagram specifically illustrating at least one sensor according to an embodiment.

Referring to FIG. 2, the at least one sensor 1300 may include at least one LiDAR device 1310, at least one camera device 1320, at least one radar device 1330, at least one ultrasonic sensor 1340, at least one GPS sensor 1350, at least one inertial measurement unit 1360, and the like. It will be appreciated that the type of the sensor is not limited thereto, and the at least one sensor 1300 may include all or only some of the above-described sensors 1310, 1320, 1330, 1340, 1350, and 1360.

Referring to FIG. 2 again, the at least one sensor 1300 may include at least one LiDAR device 1310.

In this case, the LiDAR device 1310 may be defined as a device that measures a distance to an object using laser beams.

More specifically, the at least one LiDAR device 1310 may output a laser beam. When the output laser beam is reflected by an object, the LiDAR device 1310 may receive the reflected laser beam and measure the distance between the object and the LiDAR device 1310. Here, the LiDAR device 1310 may measure the distance to the object by using various schemes such as a triangulation scheme and a Time-of-Flight (TOF) scheme.

Also, the LiDAR device 1310 may include a laser beam output unit.

In this case, the laser beam output unit may emit a laser beam. Also, the laser beam output unit may include one or more laser beam output elements. Also, the laser beam output units may include a laser diode (LD), a solid-state laser, a high power laser, a light-emitting diode (LED), a vertical-cavity surface-emitting laser (VCSEL), an external cavity diode laser (ECDL), etc., but the present invention is not limited thereto.

Also, the LiDAR device 1310 may include a light-receiving unit.

In this case, the light-receiving unit may detect a laser beam. For example, the light-receiving unit may detect a laser beam reflected by an object located in a scanning region. Also, the light-receiving unit may receive a laser beam and generate an electric signal on the basis of the received laser beam. For example, the sensor 1300 may include a PN photodiode, a phototransistor, a PIN photodiode, an avalanche photodiode (APD), a single-photon avalanche diode (SPAD), silicon photomultipliers (SiPM), a comparator, a complementary metal-oxide-semiconductor (CMOS), a charge-coupled device (CCD), or the like, but the present invention is not limited thereto.

Also, the LiDAR device 1310 may include an optical system.

In this case, the optical system may change a flight path of a laser beam. For example, the optical system may change a flight path of a laser beam emitted from the laser beam output unit such that the laser beam is directed to a scanning region.

Also, the optical system may change a flight path of a laser beam by reflecting the laser beam. In this case, the optical system may include a first scanner for performing a scan in a first direction and a second scanner for performing a scan in a second direction. Also, the optical system may include a rotational optic for performing a scan while rotating both of the laser beam output unit and the light-receiving unit.

For example, the optic system may include a mirror, a resonance scanner, a micro-electromechanical system (MEMS) mirror, a voice coil motor (VCM), a polygonal mirror, a rotating mirror, a Galvano mirror, or the like, but the present invention is not limited thereto.

Also, the optical system may change a flight path of a laser beam by refracting the laser beam. For example, the optical system may include lenses, prisms, microlenses, microfluidic lenses, or the like, but the present invention is not limited thereto.

Also, the optical system may change a flight path of a laser beam by changing the phase of the laser beam. For example, the optical system may include an optical phased array (OPA), a metalens, a metasurface, or the like, but the present invention is not limited thereto.

Also, the at least one LiDAR device 1310 may be placed in various positions of a vehicle so as to secure a field of view of the surroundings of the vehicle. For example, the LiDAR device 1310 may include a plurality of LiDARs 1311 to 1314. The plurality of LiDARs 1311 to 1314 may include one or multiple LiDARs placed in each of various positions, e.g., the front, the rear, the side, and the roof of the vehicle.

In detail, when the first LiDAR 1311 is placed on the front of the vehicle, the first LiDAR 1311 may detect distance information regarding an object located in front of the vehicle, and the first LiDAR 1311 may be placed on a headlamp, a front bumper, a grille, or the like of the vehicle, but the present invention is not limited thereto.

Also, when the second LiDAR 1312 is placed on the side of the vehicle, the second LiDAR 1312 may detect distance information of an object located to the side of the vehicle, and the second LiDAR 1312 may be placed on a side mirror, a side garnish, or the like of the vehicle, but the present invention is not limited thereto.

Also, when the third LiDAR 1313 is placed on the rear of the vehicle, the third LiDAR 1313 may detect distance information of an object located behind the vehicle, and the third LiDAR 1313 may be placed on a rear bumper, a brake light, or the like of the vehicle, but the present invention is not limited thereto.

Also, when the fourth LiDAR 1314 is placed on the roof of the vehicle, the fourth LiDAR 1314 may detect distance information of an object located in front of, behind, and to the side of the vehicle, and the fourth LiDAR 1314 may be placed on a sunroof, roof, or the like of the vehicle, but the present invention is not limited thereto.

Referring to FIG. 2 again, the at least one sensor 1300 according to an embodiment may include at least one camera device 1320.

In this case, the at least one camera device 1320 may acquire shape and/or color information regarding an object located near a vehicle equipped with the autonomous driving system 1000.

Also, the at least one camera device 1320 may be placed in various positions of a vehicle so as to secure shape and/or color information regarding the surroundings of the vehicle and the interior of the vehicle. For example, the camera device 1320 may include a plurality of cameras 1321 to 1323. The plurality of cameras 1321 to 1323 may include one or multiple cameras placed in each of various positions, e.g., the front, the side, the rear, and the inside of the vehicle.

In detail, when the first camera 1321 is placed on the front of the vehicle, the first camera 1321 may detect shape and/or color information regarding an environment in front of the vehicle, and the first camera 1321 may be placed on a black box, a headlight, a grille, or the like of the vehicle, but the present invention is not limited thereto.

Also, when the second camera 1322 is placed on the rear of the vehicle, the second camera 1322 may detect shape and/or color information regarding an environment behind the vehicle, and the second camera 1322 may be placed on a rear bumper, a brake light, or the like of the vehicle, but the present invention is not limited thereto.

Also, when the third camera 1323 is placed inside the vehicle, the third camera 1323 may detect shape and/or color information regarding an environment inside the vehicle, and the third camera 1323 may be placed on a black box, a room mirror, or the like of the vehicle, but the present invention is not limited thereto.

Also, the camera device 1320 may include a stereo camera. Here, the stereo camera may refer to a camera for determining a distance to an object as well as the shape of the object using a plurality of cameras.

Also, the camera device 1320 may include a time-of-flight (ToF) camera. Here, a ToF camera may refer to a camera capable of determining a distance to an object by employing time-of-flight techniques.

Referring to FIG. 2 again, the at least one sensor 1300 according to an embodiment may include at least one radar device 1330.

In this case, the at least one radar device 1330 may be a device for detecting a distance to an object and a position of an object using electromagnetic waves.

Also, the at least one radar device 1330 may include various types of radar devices in order to acquire accurate distance information of objects located at long distances from the vehicle, objects located at medium distances, and objects located at short distances. For example, the at least one radar device 1330 may include a first radar 1331 for acquiring distance information of objects located at long distances, a second radar 1332 for acquiring distance information of objects located at medium or short distances, etc., but the present invention is not limited thereto.

Also, the at least one radar device 1330 may be placed in various positions of a vehicle so as to secure a field of view of the surroundings of the vehicle. For example, the at least one radar device 1330 may be placed on the front, the rear, or the side of the vehicle, but the present invention is not limited thereto.

Referring to FIG. 2 again, the at least one sensor 1300 according to an embodiment may include at least one ultrasonic sensor 1340.

In this case, the at least one ultrasonic sensor 1340 may be a device for detecting whether an object is present near a vehicle.

Also, the at least one ultrasonic sensor 1340 may be placed in various positions of a vehicle so as to detect whether an object is present near the vehicle. For example, the at least one ultrasonic sensor 1340 may be placed on the front, the rear, or the side of the vehicle, but the present invention is not limited thereto.

Referring to FIG. 2 again, the at least one sensor 1300 according to an embodiment may include at least one GPS sensor 1350.

In this case, the at least one GPS sensor 1350 may be a device for finding the global position of a vehicle. In detail, the at least one GPS sensor 1350 may forward global position information of the GPS sensor 1350 to the controller 1100 through the Global Positioning System.

Referring to FIG. 2 again, the at least one sensor 1300 according to an embodiment may include at least one inertial measurement unit (IMU) 1360.

In this case, the at least one IMU 1360 is an electronic device that measures and reports a specific force and an angular ratio of a vehicle and a magnetic field surrounding a vehicle by using a combination of an accelerometer, a tachometer, and a magnetometer. In detail, the at least one IMU 1360 may be activated by detecting a linear acceleration using at least one accelerometer and by detecting a rotational speed using at least one gyroscope.

1.3.4. Infotainment System

Referring to FIG. 1 again, the autonomous driving system 1000 according to an embodiment may include at least one infotainment system 1400.

In this case, the at least one infotainment system 1400 according to an embodiment may display at least one piece of information to an occupant.

Figure 3:
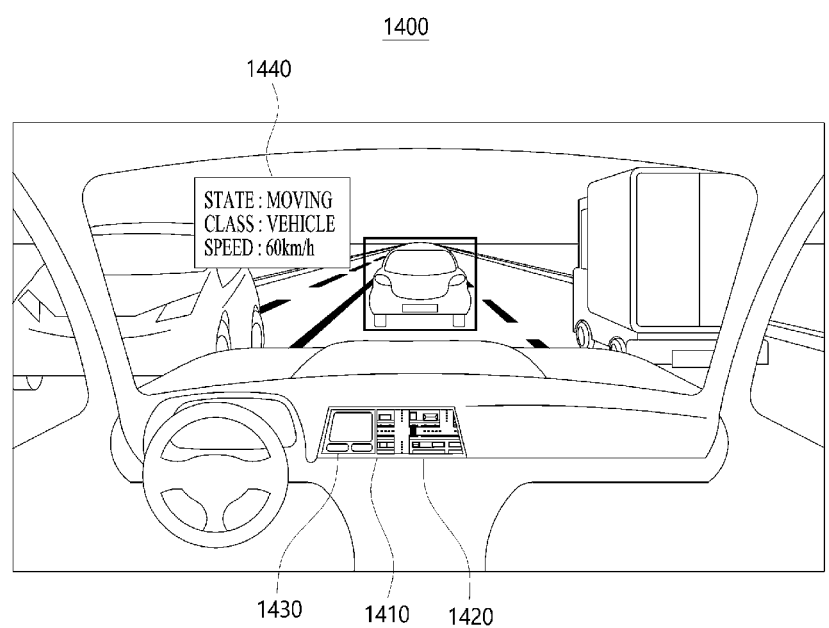
FIG. 3 is a diagram showing a display scheme through an infotainment system according to an embodiment.

FIG. 3 is a diagram showing a display scheme through an infotainment system according to an embodiment.

Referring to FIG. 3, the infotainment system 1400 according to an embodiment may include a high-definition map 1420, a message window 1430, a screen 1410 for showing the high-definition map 1420 and the message window 1430 to an occupant, an information field 1440 for providing object information acquired from a sensor, etc., but the present invention is not limited thereto.

Referring to FIG. 3 again, the infotainment system 1400 according to an embodiment may include a high-definition map that shows position information of a host vehicle and position information of a nearby object.

In this case, the high-definition map 1420 may be downloaded by the controller 1100. In detail, the high-definition map 1420 may be generated by and stored in an external server, and the controller 1100 may download the high-definition map 1420 and display the high-definition map 1420 to an occupant through the infotainment system 1400.

Also, the high-definition map 1420 may be generated based on sensor data acquired from the at least one sensor 1300 included in the autonomous driving system 1000. In detail, the LiDAR device 1310 included in the at least one sensor 1300 may acquire distance information of an object outside the vehicle. In this case, the controller 1100 may generate a high-definition map 1420 including the position information of the object outside the vehicle on the basis of the distance information and may display the high-definition map 1420 to an occupant through the infotainment system 1400.

Also, the controller 1100 may generate the high-definition map using the sensor data on the basis of a downloaded map. In detail, the controller 1100 may implement the high-definition map 1420 by generating position information of the object using the sensor data and by showing the position information of the object in the downloaded map and then may display the high-definition map 1420 to an occupant through the infotainment system 1400.

Referring to FIG. 3 again, the infotainment system 1400 according to an embodiment may include a message window 1430 for displaying, to a user, a message transmitted from the outside.

For example, the message window 1430 may include a message received from the outside, information to be forwarded to an occupant, an interface for receiving an input from an occupant, information indicating whether data transmission is approved by an external server, etc., but the present invention is not limited thereto.

More specifically, when a request message for sensor data is received from an external server, the controller 1100 may display the request message through the message window 1430. In this case, an occupant may enter an input for transmitting the sensor data in response to the request message.

Also, when a notification message indicating that a traffic event has occurred is received from an external server, the controller 1100 may display the notification message through the message window 1430.

Also, the message window 1430 may be displayed on a separate screen different from that of the high-definition map 1420.

Also, the message window 1430 may be displayed on the same screen as the high-definition map 1420. In detail, the message window 1430 may be displayed so as not to overlap the high-definition map 1420, but the present invention is not limited thereto.

Referring to FIG. 3 again, the infotainment system 1400 according to an embodiment may include a screen 1410 for showing the high-definition map 1420 and the message window 1430.

Also, the screen 1410 may include a touch sensor, an input button, etc., but the present invention is not limited thereto.

In this case, when a touch input is received from an occupant, the screen 1410 may transmit the content of the touch input of the occupant to the controller 1100. For example, when the controller 1100 forwards, to the occupant through the message window 1430, a request message for sensor data received from an external server, the occupant may enter a response to the request message by touching the screen 1410.

Also, when the controller 1100 displays, through the message window 1430, a notification message for a traffic event received from an external server, the occupant may enter an input indicating whether the notification message is confirmed.

Referring to FIG. 3 again, the infotainment system 1400 according to an embodiment may include an information field 1440 for showing information acquired from the at least one sensor 1300 in the windshield of a vehicle. In this case, the windshield may include an electronic screen to show the information field 1440.

More specifically, in order to forward information acquired through the at least one sensor 1300 to an occupant, the controller 1100 may show the information field 1440 in the windshield of the vehicle through the infotainment system 1400.

Also, the information field 1440 may show class information, speed, movement direction, etc. that are acquired when a LiDAR device included in the at least one sensor 1300 scans an object, but the present invention is not limited thereto. The information field 1440 may further include a plurality of pieces of information acquired by various sensors.

Also, the information field 1440 may be displayed on the screen 1410 or the windshield in an augmented reality (AR) scheme or a virtual reality (VR) scheme.

1.4. Autonomous Driving System

1.4.1. Autonomous Driving System Using Sensor

1.4.1.1. Overview

An autonomous driving system 1000 may drive a vehicle with no or minimum driver intervention on the basis of sensor data acquired using at least one sensor 1300. For example, the autonomous driving system 1000 may autonomously drive a vehicle on the basis of data acquired using at least one of at least one LiDAR device 1310, at least one camera device 1320, at least one radar device 1330, and at least one ultrasonic sensor 1340 which are placed inside the vehicle.

Also, the autonomous driving system 1000 may perform simultaneous localization and mapping (SLAM)-based autonomous driving and high-definition-map-based autonomous driving on the basis of the sensor data, but the present invention is not limited thereto.

In detail, a vehicle that performs the SLAM-based autonomous driving may travel autonomously by recognizing a surrounding environment through the at least one sensor 1300, creating a map of a corresponding space, and accurately determining its own position.

In addition, a vehicle that performs high-definition-map-based autonomous driving may travel autonomously by recognizing an object near the vehicle on the basis of a high-precision map acquired from the controller 1100.

Also, the autonomous driving system 1000 may perform pedestrian detection, collision avoidance, traffic information recognition, parking assistance, surround view, proximity collision risk detection, etc. through the at least one sensor 1300, but the present invention is not limited thereto.

Hereinafter, specific examples of the autonomous driving system using at least one sensor will be described in detail.

1.4.1.2. Autonomous Driving System for Safety

The autonomous driving system 1000 may include a system for the safety of pedestrians and occupants of a vehicle equipped with the autonomous driving system 1000. Also, the safety system may operate based on sensor data acquired from at least one sensor 1300 included in the autonomous driving system 1000.

The description of the autonomous driving system for safety is about various examples controlled by an autonomous vehicle and may be implemented with the following descriptions in Sections 2 to 5.

The autonomous driving system 1000 may detect a driving pattern of a nearby moving object and then detect an abnormal driving pattern of the moving object.

Figure 4:
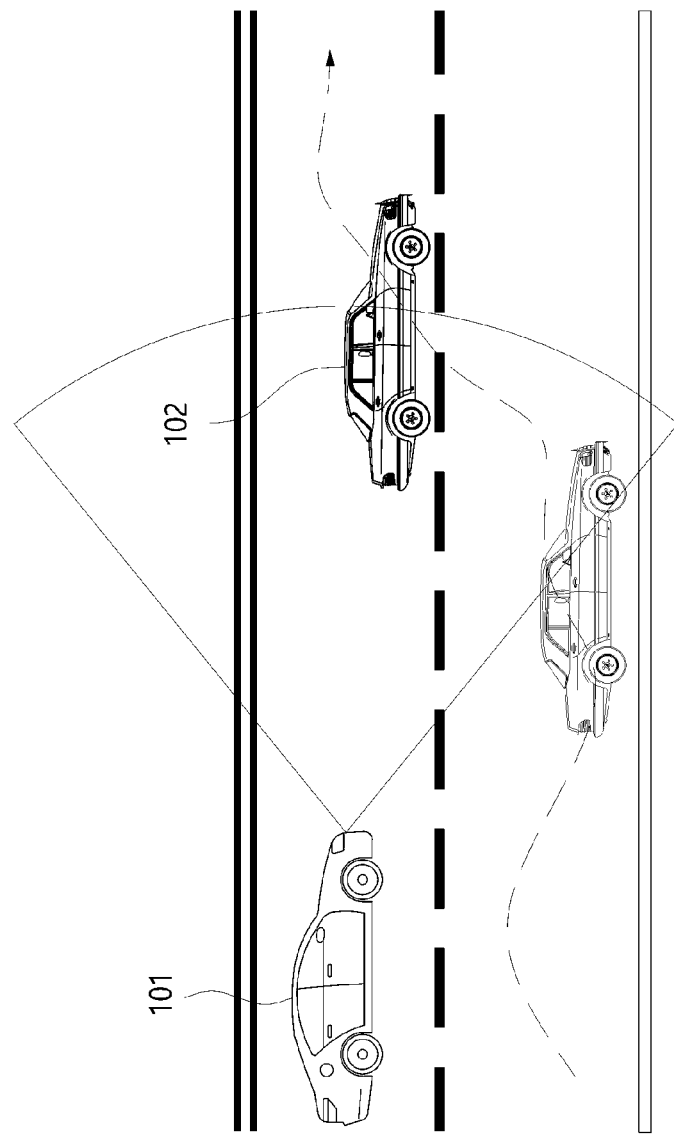
FIG. 4 is a diagram showing a situation in which an autonomous driving system detects a moving object showing an abnormal driving pattern according to an embodiment.

FIG. 4 is a diagram showing a situation in which an autonomous driving system detects a moving object showing an abnormal driving pattern according to an embodiment.

Referring to FIG. 4, a first vehicle 101 equipped with the autonomous driving system 1000 may detect a driving pattern of a nearby object through at least one sensor 1300 included in the autonomous driving system 1000.

More specifically, the controller 1100 included in the autonomous driving system 1000 may detect a driving pattern of a second vehicle 102 located near the first vehicle 101 on the basis of sensor data acquired from the at least one sensor 1300.

Also, the controller 1100 may track the movement of the second vehicle 102 in order to detect an abnormal driving pattern of the second vehicle 102. In detail, when the speed and direction of the second vehicle 102 irregularly change, the controller 1100 may control the at least one sensor 1300 to track the movement of the second vehicle 102.

Also, the controller 1100 may determine whether the driving pattern of the second vehicle 102 is abnormal on the basis of the sensor data. In detail, the controller 1100 may acquire movement information including the speed and direction of the second vehicle 102 through the at least one sensor 1300. In this case, the controller 1100 may determine that the change in the speed and direction of the second vehicle 102 is abnormal on the basis of the movement information.

Also, the controller 1100 may set a driving-related threshold to detect an abnormal driving pattern of the second vehicle 102. In detail, the controller 1100 may quantify the movement of the second vehicle 102 acquired through the at least one sensor 1300 and compare the quantified movement to the threshold. In this case, when the movement of the second vehicle 102 exceeds the threshold, the controller 1100 may determine that the second vehicle 102 has an abnormal driving pattern.

Also, when the abnormal driving pattern of the second vehicle 102 is detected, the controller 1100 may control the first vehicle 101 to avoid a collision with the second vehicle 102. For example, the controller 1100 may decelerate the first vehicle 101, accelerate the first vehicle 101, or re-route the first vehicle 101, but the present invention is not limited thereto.

Also, when the at least one sensor 1300 is the LiDAR device 1310, the controller 1100 may detect a moving object having an abnormal driving pattern by utilizing distance information acquired through the LiDAR device 1310. In this case, the controller 1100 may generate information regarding the position and speed of an object present in the field of view of the LiDAR device 1310 on the basis of distance information of the object.

In detail, the autonomous driving system 1000 may generate a vector map of a nearby object using data acquired from the LiDAR device 1310. In more detail, the controller 1100 may acquire a vector map including the speed and the like of the second vehicle 102 on the basis of distance information of the second vehicle 102 acquired by the LiDAR device 1310.

Also, the autonomous driving system 1000 may determine whether the second vehicle 102 has an abnormal driving pattern using the vector map. Also, the controller 1100 may control the first vehicle on the basis of the vector map.

Also, the autonomous driving system 1000 may compute a space where a vehicle can move in case an emergency occurs in the vicinity.

Figure 5:
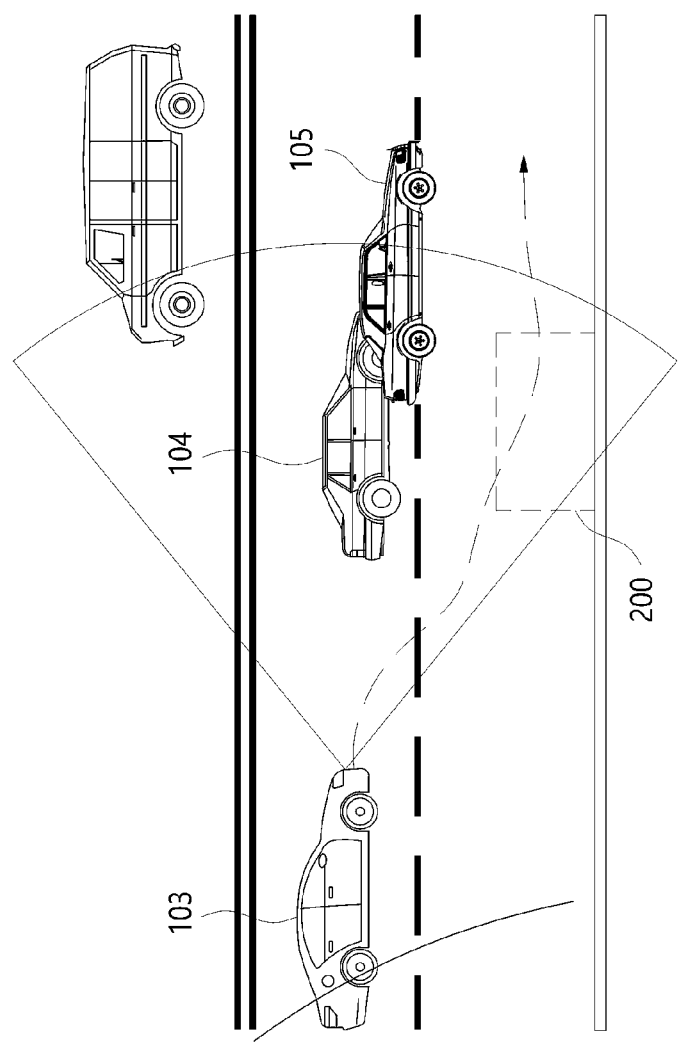
FIG. 5 is a diagram showing a situation in which an autonomous driving system recognizes an accident of a vehicle in front while driving according to an embodiment.

FIG. 5 is a diagram showing a situation in which an autonomous driving system recognizes an accident of a vehicle in front while driving according to an embodiment.

Referring to FIG. 5, a first vehicle 103 equipped with the autonomous driving system 1000 may detect a space where the first vehicle 103 can move through at least one sensor 1300 included in the autonomous driving system 1000.

In detail, a controller 1100 included in the autonomous driving system 1000 may pre-compute a space 200 where the first vehicle 103 can move on the basis of sensor data acquired from the outside or the at least one sensor 1300. In detail, the controller 1100 may compute spaces where no object is detected and which has a predetermined volume in a space indicated by the sensor data.

Also, the controller 1100 may select a space in which the first vehicle 103 can travel from among the computed spaces and store the selected space. For example, when the available space 200 is in a diagonal direction of the first vehicle 103, the controller 1100 may store information related to the available space 200. However, the present invention is not limited thereto, and the controller 1100 may store information related to the space 200 where the first vehicle 103 can move without risk of collision with a nearby object among spaces which are not set as the driving path of the first vehicle 103.

Also, when an emergency accident occurs in front of the first vehicle 103, the controller 1100 may move the first vehicle 103 to the available space 200 using previously stored space information.

Also, when the controller 1100 recognizes the occurrence of the emergency near the first vehicle 103, the controller 1100 may compute the space 200 where the first vehicle 103 can move.

In detail, when the controller recognizes an accident between a second vehicle 104 and a third vehicle 105 on the basis of the sensor data, the controller 1100 may compute the space 200 where the first vehicle 103 can move. In this case, the controller 1100 may recognize the accident through a relative position between a set of data corresponding to the second vehicle 104 and a set of data corresponding to the third vehicle 105, which are included in the sensor data, but the present invention is not limited thereto.

Also, when the controller 1100 computes the space 200 where the first vehicle 103 can move, the controller 1100 may control the first vehicle 103 to move the first vehicle 103 to the available space 200. For example, the controller 1100 may control the steering of the first vehicle 103 to move the first vehicle 103 to the available space 200, but the present invention is not limited thereto.

Also, when the at least one sensor 1300 is the LiDAR device 1310, the controller 1100 may acquire empty-space data using data acquired from the LiDAR device 1310. In this case, the controller 1100 may generate information regarding the position and speed of an object placed in the field of view of the LiDAR device 1310 on the basis of distance information of the object.

In detail, the controller 1100 may generate a three-dimensional (3D) map using position information of an object near the first vehicle 103 which is acquired by the LiDAR device 1310. In this case, the controller 1100 may store a space of the 3D map where there is no object data as data regarding the available space 200. Also, when an emergency occurs near the first vehicle 103, the controller 1100 may move the first vehicle 103 to the available space 200 using the stored space data.

Also, when the autonomous driving system 1000 recognizes that a second vehicle 107 located in front of a first vehicle 106 is suddenly moving backward, the autonomous driving system 1000 may control the first vehicle 106 to avoid a collision with the second vehicle 107.

Figure 6:
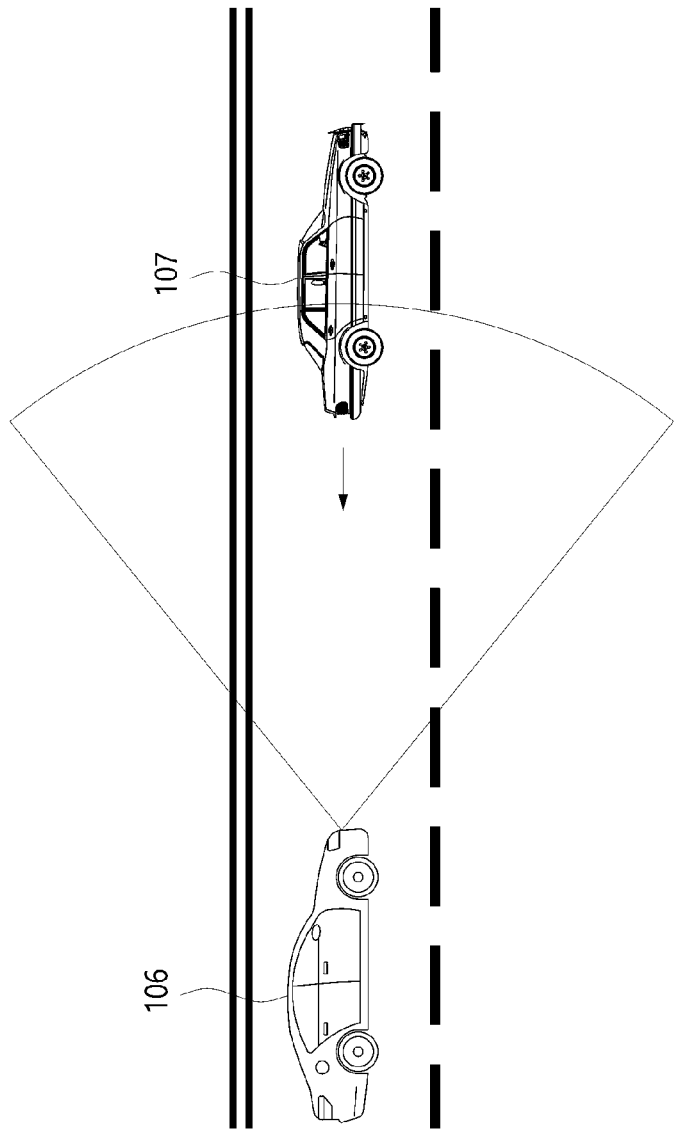
FIG. 6 is a diagram showing a situation in which an autonomous driving system recognizes a sudden backward movement of a vehicle in front according to an embodiment.

FIG. 6 is a diagram showing a situation in which an autonomous driving system recognizes a sudden backward movement of a vehicle in front according to an embodiment.

Referring to FIG. 6, the first vehicle 106 equipped with the autonomous driving system 1000 may detect the movement of the second vehicle 107 through the at least one sensor 1300 included in the autonomous driving system 1000.

For example, the controller 1100 included in the autonomous driving system 1000 may detect a movement direction of the second vehicle 107 located in front of the first vehicle 106 on the basis of the sensor data acquired from the at least one sensor 1300.

More specifically, the controller 1100 may acquire movement information including the movement speed and movement direction of the second vehicle 107 through the at least one sensor 1300. In this case, when the controller 1100 determines that the second vehicle 107 moves backward on the basis of the movement information, the controller 1100 may transmit a notification for warning the second vehicle 107 to the second vehicle 107.

Also, the controller 1100 may sound a horn to warn the second vehicle 107.

Also, when the controller 1100 determines that there is a space where the first vehicle 106 can move behind the first vehicle 106, the controller 1100 may move the first vehicle 106 to the space to which movement is possible.

Also, when the at least one sensor 1300 is the LiDAR device 1310, the controller 1100 may detect whether the second vehicle 107 moves backward using data acquired from the LiDAR device 1310. In this case, the controller 1100 may generate movement information indicating the movement direction and movement speed of the second vehicle 107 on the basis of position information of the second vehicle 107 located in the field of view of the LiDAR device 1310.

More specifically, the controller 1100 may determine whether the second vehicle 107 moves backward on the basis of the movement information of the second vehicle 107. For example, when the second vehicle 107 approaches the first vehicle 106, the controller 1100 may determine that the second vehicle 107 is moving backward. Also, when the distance between the first vehicle 106, which is stopped, and the second vehicle 107 decreases, the controller 1100 may determine that the second vehicle 170 is moving backward.

Also, the autonomous driving system 1000 may detect a change in the direction of a second vehicle 109 located near a first vehicle 108.

Figure 7:
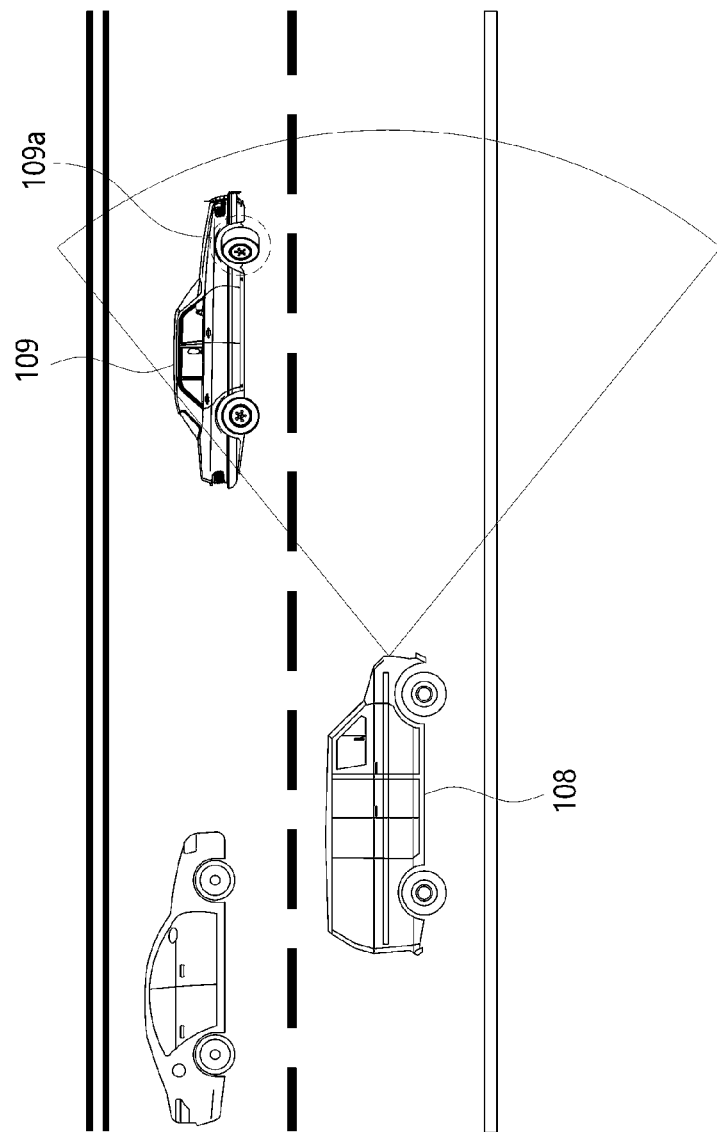
FIG. 7 is a diagram showing a situation in which an autonomous driving system tracks the movement of a vehicle's wheel according to an embodiment.

FIG. 7 is a diagram showing a situation in which an autonomous driving system tracks the movement of a vehicle's wheel according to an embodiment.

Referring to FIG. 7, the first vehicle 108 equipped with the autonomous driving system 1000 may detect a change in the direction of the second vehicle 109 through at least one sensor 1300 included in the autonomous driving system 1000.

For example, the controller 1100 included in the autonomous driving system 1000 may detect a change in the direction of the second vehicle 109 by detecting a wheel 109a of the second vehicle 109 located near the first vehicle 108 using sensor data acquired through the at least one sensor 1300

In this case, when an object included in the sensor data is determined as the wheel 109a of the second vehicle, the controller 1100 may track the wheel 109a of the second vehicle. Also, the controller 1100 may control a scan pattern of the at least one sensor 1300 to continuously acquire sensor data regarding the wheel 109a of the second vehicle.

Also, when the wheel 109a of the second vehicle is directed to the front of the first vehicle 108, the controller 1100 may control the first vehicle 108 to prevent the first vehicle 108 from colliding with the second vehicle 109. For example, the controller 1100 may decelerate the first vehicle 108 or re-route the first vehicle 108, but the present invention is not limited thereto.

Also, when the direction of the wheel 109a of the second vehicle changes suddenly, the controller 1100 may decelerate the first vehicle 108 or re-route the first vehicle 108 regardless of the current direction of the wheel 109a of the second vehicle.

Also, when the at least one sensor 1300 is the LiDAR device 1310, the controller 1100 may detect a change in the direction of the wheel 109a of the second device using data acquired from the LiDAR device 1310. In this case, the controller 1100 may detect the movement of the wheel 109a of the second vehicle using temporal position information of the wheel 109a of the second wheel located in the field of view of the LiDAR device 1310.

More specifically, the controller 1100 may generate a 3D map including data on the wheel 109a of the second vehicle or predicted movement information of the second vehicle 109 which is predicted through the data on the wheel 109a of the second vehicle by using the LiDAR device 1310. In this case, the 3D map may include position information of the wheel 109*a* of the second vehicle that changes over time. Also, the controller 1100 may detect the change in the direction of the wheel 109*a* of the second vehicle using the 3D map to control the first vehicle 108.

Also, the autonomous driving system 1000 may detect a risk factor of a road on which a first vehicle 110 is traveling (e.g., a crack in the road or black ice present on the road).

Figure 8:
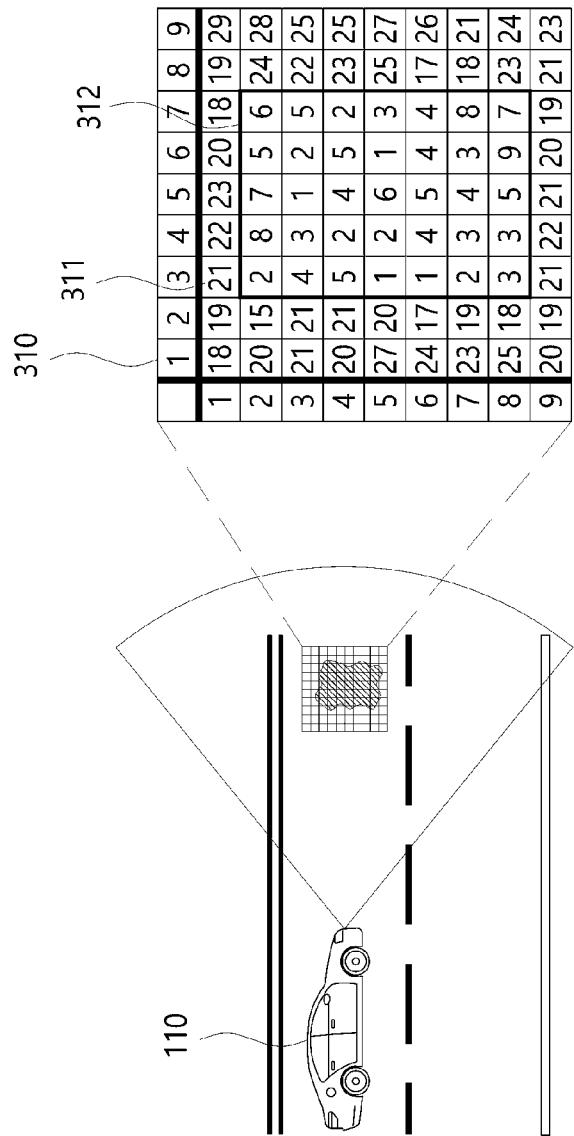
FIG. 8 is a diagram illustrating a method of detecting, by an autonomous driving system, black ice present on a road according to an embodiment.

FIG. 8 is a diagram illustrating a method of detecting, by an autonomous driving system, black ice present on a road according to an embodiment.

Referring to FIG. 8, the first vehicle 110 equipped with the autonomous driving system 1000 may detect a surface condition of the road on which the first vehicle 110 is traveling through the at least one sensor 1300 included in the autonomous driving system 1000.

For example, the controller 1100 included in the autonomous driving system 1000 may detect a crack in the road on which the first vehicle is traveling on the basis of the sensor data acquired from the at least one sensor 1300. Also, the controller 1100 may detect black ice present on the road on the basis of the sensor data, but the present invention is not limited thereto.

Also, the LiDAR device 1310 included in the at least one sensor 1300 may acquire sensor data including intensity information associated with the reflectance of an object. In detail, the sensor data may include intensity information of a first region 300 included in the field of view of the at least one sensor 1300. In this case, the intensity information may include an intensity value 311, which is a value corresponding to the reflectance of the object. Also, a mean, a deviation, and a standard deviation may be used as the intensity value included in the intensity information, and at least one piece of data may be amplified, but the present invention is not limited thereto.

Also, the controller 1100 may determine the risk of the road on the basis of an intensity distribution chart 310 representing a space-specific intensity distribution chart 310 of intensity values included in the intensity information. In this case, the intensity distribution chart 310 may include an intensity value 311 for each point of the first region 300.

Also, when the intensity value 311 changes rapidly with respect to a predetermined boundary 312 in the intensity distribution chart 310 of the first region 300, the controller 1100 may determine that a region within the predetermined boundary 312 is a dangerous region.

Also, the controller 1100 may set an intensity threshold using the average of intensity values for each region of the road. In detail, the controller 1100 may compute the average of intensity values of each point on the road on which the vehicle is traveling and may set an intensity threshold on the basis of the average. In this case, the controller 1100 may compare the intensity threshold to the average of the intensity values of each point of the first region 300. Also, when the comparison result is that the average of the intensity values of the first region 300 is greater than or equal to the intensity threshold, the controller 1100 may determine that the first region 300 is a dangerous region.

Also, the controller 1100 may adjust sensor activation energy in order to detect a road risk using the sensor data acquired through the at least one sensor 1300. For example, the controller 1100 may adjust the sensor activation energy, detect a corresponding pattern, and detect a road risk, but the present invention is not limited thereto.

Also, the dangerous region may include a region that may become dangerous to the driving of the first vehicle 110. For example, the dangerous region may include a region having black ice and a region having a road crack, but the present invention is not limited thereto.

Also, the autonomous driving system 1000 may detect an illegally parked vehicle through sensor data.

More specifically, when a vehicle is stopped on a road, the autonomous driving system 1000 may determine whether a space associated with the stopped vehicle is an available parking space and may determine that the vehicle is an illegally parked vehicle when the vehicle is stopped for a predetermined time or more even though the space is not an available parking space.

In this case, the autonomous driving system 1000 may detect a parking line through at least one sensor 1300 and determine whether parking is available on the basis of the detected parking line. Also, the autonomous driving system 1000 may determine an available parking region using a prestored map.

Also, the autonomous driving system 1000 may compare the width of a road to the width of a first vehicle 111 equipped with the autonomous driving system 1000 and may determine whether the first vehicle 111 can travel on the road.

Figure 9:
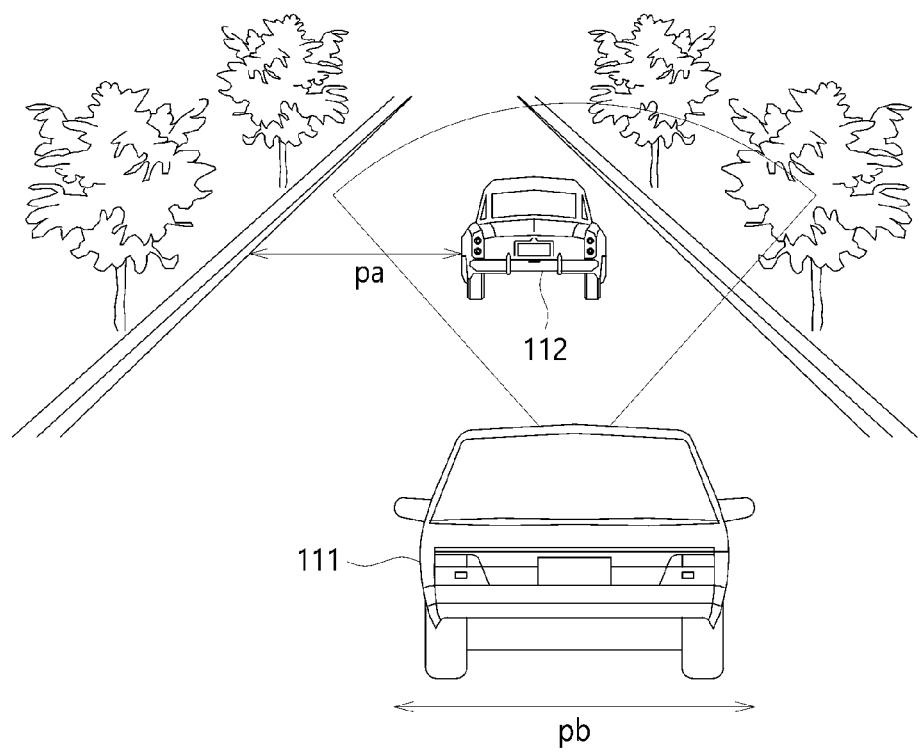
FIG. 9 is a diagram showing a situation in which a vehicle equipped with an autonomous driving system detects an illegally parked vehicle while driving according to an embodiment.

FIG. 9 is a diagram showing a situation in which a vehicle equipped with an autonomous driving system detects an illegally parked vehicle according to an embodiment.

Referring to FIG. 9, the controller 1100 included in the autonomous driving system 1000 may determine whether the first vehicle 111 can move while avoiding a second vehicle 112 which is illegally parked on a road.

In detail, the controller 1100 included in the autonomous driving system 1000 may compute a space in which the first vehicle 111 can travel on the basis of sensor data acquired from the at least one sensor 1300. For example, when the second vehicle 112 is stopped on a road on which the first vehicle 111 is traveling, the controller 1100 may compare the width pa of the travelable road to the width pb of the first vehicle. In this case, the width pb of the first vehicle may be prestored in the controller 1100.

Also, when the width pa of the road is greater than the width pb of the first vehicle by a predetermined length or more, the controller 1100 may control the first vehicle 111 such that the first vehicle 111 can travel on the traveling road while avoiding the second vehicle 112.

Also, the controller 1100 may determine a space between a center line and the second vehicle 112 on the basis of the sensor data. In this case, the controller 1100 may determine whether the space is a space through which the first vehicle 111 can pass and then may control the first vehicle.

Also, when the at least one sensor 1300 is the LiDAR device 1310, the controller 1100 may detect a space in which the first vehicle 111 can travel on the basis of distance information acquired from the LiDAR device 1310. In this case, the controller 1100 may generate position information of the center line and the second vehicle 112 on the basis of distance information of the centerline and the second vehicle 112.

More specifically, the controller 1100 may generate a 3D map on the basis of the sensor data acquired from the LiDAR device 1310. In this case, the controller 1100 may determine a space in which the first vehicle 111 can travel on the basis of the 3D map.

Also, the autonomous driving system 1000 may detect an object approaching a vehicle equipped with the autonomous driving system 1000 within a dangerous radius. In detail, the autonomous driving system 1000 may determine the speed, direction, and the like of a two-wheeled vehicle approaching in the vicinity on the basis of the sensor data acquired from the at least one sensor 1300. In this case, the controller 1100 may display the speed and direction of the two-wheeled vehicle to an occupant through the infotainment system.

Also, when the controller 1100 determines that the two-wheeled vehicle is located within a dangerous radius on the basis of the speed and direction, the controller may inform an occupant of the presence of the two-wheeled vehicle. For example, the controller 1100 may perform an operation of locking the doors of the vehicle, an operation of notifying of danger through the infotainment system 1400, an operation of displaying the presence of the two-wheeled vehicle to the side mirror of the vehicle, and the like, but the present invention is not limited thereto.

Also, the autonomous driving system 1000 may further include a short-range LiDAR device in order to clearly determine the presence of the two-wheeled vehicle. In this case, the short-range LiDAR device may acquire distance information of an object close to the vehicle and provide the distance information to the controller 1100. However, the present invention is not limited thereto, and the autonomous driving system 1000 may further include at least one sensor for detecting a nearby object.

Also, a first vehicle equipped with the autonomous driving system 1000 may detect a situation in which an oncoming vehicle makes a sudden U-turn through the sensor data. In detail, the controller 1100 included in the autonomous driving system 1000 may form a vector map including the speed and direction of a second vehicle, which is oncoming, through sensor data acquired from a LiDAR device included in the at least one sensor 1300. Also, the autonomous driving system 1000 may detect whether the second vehicle is making a U-turn using the vector map. Also, when the second vehicle makes a sudden U-turn, the controller 1100 may control the speed of the first vehicle.

Also, before the first vehicle equipped with the autonomous driving system 1000 departs, the autonomous driving system 1000 may detect whether there is an object near the first vehicle.

More specifically, the controller 1100 included in the autonomous driving system 1000 may control at least one sensor 1300 to determine whether there is an object near the first vehicle before moving the first vehicle. For example, when a cat is present under the first vehicle, the at least one sensor 1300 may detect the presence of the cat and transmit the presence of the cat to the controller 1100. In this case, the controller 1100 may stop the first vehicle until the cat leaves.

Also, the autonomous driving system 1000 may track a pedestrian near the first vehicle equipped with the autonomous driving system 1000 and prepare for a dangerous situation. Here, the pedestrian may include various people such as men, women, children, and the elderly. According to an embodiment, the autonomous driving system 1000 may identify the type of the pedestrian.

In detail, the controller 1100 included in the autonomous driving system 1000 may detect the movement of a pedestrian within a predetermined distance from the vehicle through at least one sensor 1300. Also, when the pedestrian disappears from the field of view of the at least one sensor, the controller 1100 may generate tracking data for predicting the movement direction of the pedestrian by using already acquired position information of the pedestrian.

Also, the controller 1100 may prestore a control method to prepare for a situation in which the pedestrian suddenly enters a road on the basis of the tracking data. For example, the control method may include stopping the vehicle or changing a path of the vehicle, but the present invention is not limited thereto.

Also, the autonomous driving system 1000 may determine a region related to legal regulations such as a child protection zone and control the vehicle. In detail, the autonomous driving system 1000 may determine a child protection zone by scanning a sign indicating the child protection zone through at least one sensor 1300. Also, the autonomous driving system 1000 may determine a child protection zone using prestored information related to the child protection zone. In this case, when the vehicle equipped with the autonomous driving system 1000 enters a child protection zone, the controller 1100 may control the vehicle to travel at a predetermined speed or less.

1.4.1.3. Autonomous Driving System for Convenience

The autonomous driving system 1000 may include a system for the convenience of occupants of a vehicle equipped with the autonomous driving system 1000. Also, the system for the convenience may operate based on sensor data acquired from at least one sensor 1300 included in the autonomous driving system 1000.

The description of the autonomous driving system for the convenience is about various examples controlled by an autonomous vehicle and may be implemented with the following descriptions in Sections 2 to 6.

The autonomous driving system 1000 may detect an available parking space to assist an occupant in parking the vehicle.

Figure 10:
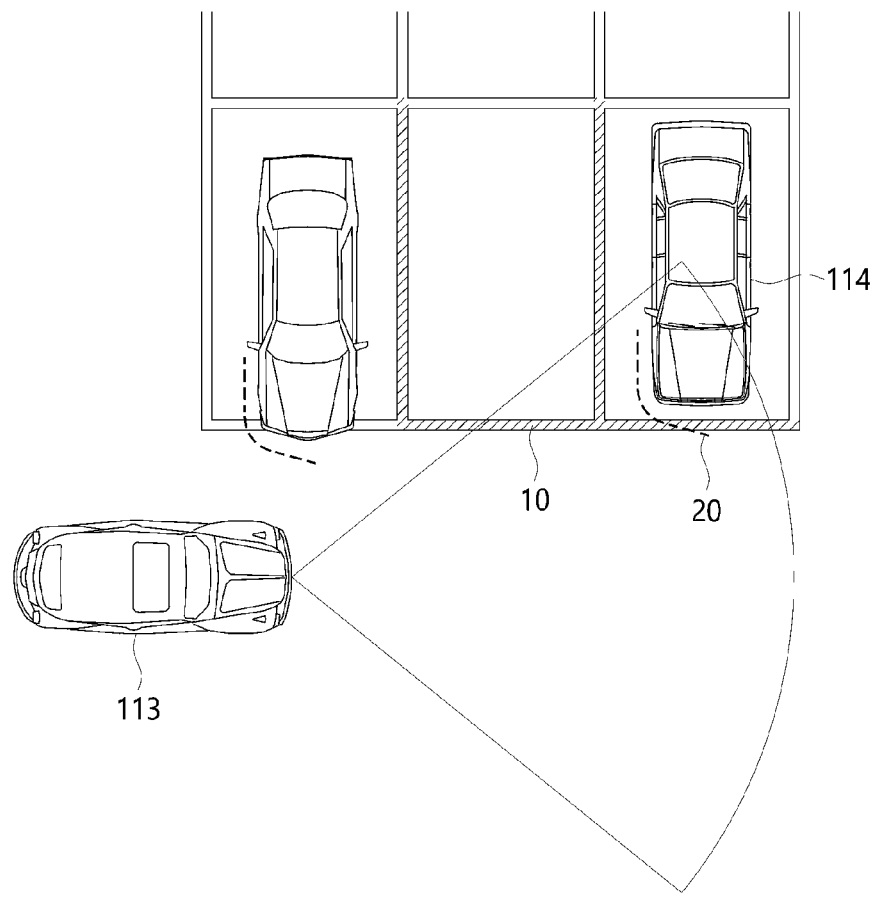
FIG. 10 is a diagram showing a situation in which an autonomous driving system detects an available parking space according to an embodiment.

FIG. 10 is a diagram showing a situation in which an autonomous driving system detects an available parking space according to an embodiment.

Referring to FIG. 10, a first vehicle 113 equipped with the autonomous driving system 1000 may detect an available parking space through the at least one sensor 1300.

Also, the controller 1100 included in the autonomous driving system 1000 may detect a parking line 10 on the basis of sensor data acquired from the at least one sensor 1300. For example, the controller 1100 may acquire intensity information associated with the reflectance of an object through the LiDAR device 1310 included in the at least one sensor 1300. In this case, the controller 1100 may determine that the object is the parking line 10 on the basis of the intensity information.

Also, the controller 1100 may detect whether an obstacle is present in a space formed in the detected parking line 10. In this case, when no obstacle is present in the space formed in the parking line 10, the controller 1100 may determine that the space is an available parking space.

Also, the controller 1100 may detect an available parking space by detecting a second vehicle 114, which has been parked, on the basis of the sensor data. In detail, when data 20 corresponding to an exterior of the parked second vehicle is included in the sensor data, the controller 1100 may not determine whether the second vehicle 114 is present in an available parking position.

Also, the controller 1100 may detect an available parking space on the basis of parked vehicles. In detail, when the space between the parked vehicles is larger than or equal to a certain area, the controller 1100 may recognize that the space is an available parking space on the basis of the sensor data. Also, when the space between the parked vehicles is larger than or equal to a certain area even though the parking line 10 is not detected, the controller 1100 may recognize that the space is an available parking space.

Also, the autonomous driving system 1000 is not limited to the above-described method and may detect an available parking space on the basis of the parking line 10 and the parked vehicle.

Also, the autonomous driving system 1000 may generate a map each time the first vehicle 115 is parked and pulled out.

Figure 11:
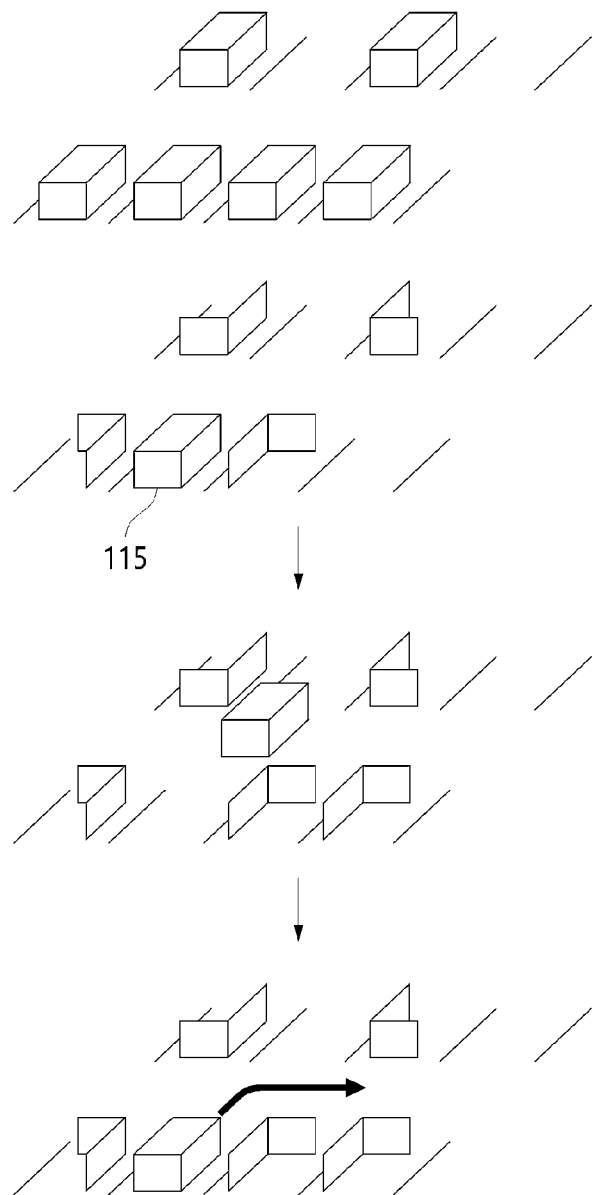
FIG. 11 is a diagram showing a process of generating, by an autonomous driving system, a map for pulling out a vehicle according to an embodiment.

FIG. 11 is a diagram showing a process of generating, by an autonomous driving system, a map for pulling out a vehicle according to an embodiment.

Referring to FIG. 11, the autonomous driving system 1000 may form a map each time the first vehicle 115 is parked and pulled out on the basis of sensor data acquired through at least one sensor placed in the first vehicle 115.

In this case, the autonomous driving system 1000 may acquire sensor data regarding surroundings during a first drive and may generate a path for a second drive on the basis of the sensor data acquired during the first driving. In detail, the controller 1100 included in the autonomous driving system 1000 may generate a map of the surroundings of the first vehicle 115 on the basis of the sensor data acquired during the first driving. Also, the controller 1100 may generate a path for the second driving on the basis of the map.

Also, when the at least one sensor 1300 is the LiDAR device 1310, the controller 1100 may generate a 3D map on the basis of data acquired through the LiDAR device 1310. In detail, the controller 1100 may generate the 3D map on the basis of surrounding position information acquired from the LiDAR device 1310 during the first driving of the first vehicle 115. Also, the controller 1100 may generate a path for the second driving on the basis of the 3D map.

Also, the autonomous driving system 1000 may include an autonomous parking system. The autonomous parking system may utilize the sensor data. Also, the autonomous parking system may be activated by an input from an occupant. Also, the autonomous parking system may be activated when a parking situation is recognized.

In an embodiment, the autonomous driving system 1000 may implement an autonomous parking system when a vehicle is located in a specific space. For example, when a vehicle is located in a specific space and an occupant gets out of the vehicle, the autonomous driving system 1000 may recognize a situation in which the vehicle is being parked and thus implement an autonomous parking system.

1.4.2. Autonomous Driving System Using Sensor and Communication

1.4.2.1. Overview

The autonomous driving system 1000 may be implemented using sensor data acquired from the at least one sensor 1300 and sharing data received from other devices. The autonomous driving system 1000 may communicate with other devices through the at least one communication module 1200 to share data. Also, the autonomous driving system 1000 may use a communication system to predetermine a risk factor associated with the driving of the vehicle equipped with the autonomous driving system 1000.

Figure 12:
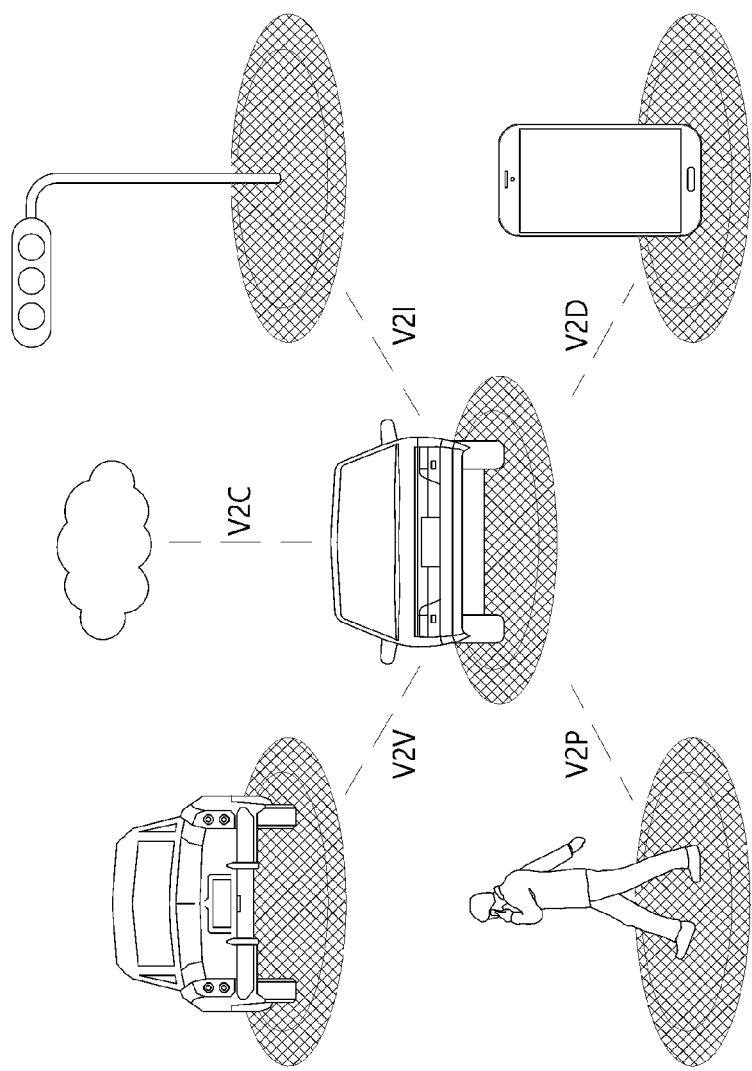
FIG. 12 is a diagram illustrating types of a communication system according to an embodiment.

FIG. 12 is a diagram illustrating the type of a communication system according to an embodiment.

Referring to FIG. 12, an autonomous driving system 1000 may be implemented through various communication systems. For example, the communication system may implement at least one V2X system such as a vehicle-to-vehicle (V2V) system, a vehicle-to-infra (V2I) system, a vehicle-to-network (V2N) system, a vehicle-to-pedestrian (V2P) system, a vehicle-to-cloud (V2C) system, and a vehicle-to-device (V2D) system.

Also, the autonomous driving system 1000 may use at least one standardized communication system to communicate with other devices. For example, the autonomous driving system 1000 may use cellular vehicle-to-everything (C-V2X) and dedicated short-range communication (DSRC) to communicate with other devices, but the present invention is not limited thereto. In this case, the C-V2X may refer to a 3rd Generation Partnership Project (3GPP) standard indicating a technology for performing V2X communication. Also, the DSRC may refer to a one-way or two-way short-range wireless communication channel designed for a set of protocols and standards corresponding to vehicles.

1.4.2.1.1. V2V

A first vehicle equipped with the autonomous driving system 1000 may communicate with other devices using at least one communication module 1200.

Referring to FIG. 12 again, the first vehicle may communicate with other vehicles through a V2V system to share data.

Also, the V2V system may be implemented to transmit or receive sensor data acquired from at least one sensor 1300 included in the first vehicle to or from other vehicles.

Also, the V2V system may be implemented to transmit or receive information other than the sensor data. For example, the V2V system may be implemented to transmit a destination of the first vehicle, the number of passengers in the first vehicle, the speed of the first vehicle, and the like, but the present invention is not limited thereto.

Also, for the safety of occupants and passengers, the first vehicle may use the V2V system. For example, the first vehicle may receive information regarding a dangerous object present on the path of the first vehicle from other vehicles through the V2V system.

1.4.2.1.2. V2I

A first vehicle equipped with the autonomous driving system 1000 may communicate with an infrastructure device through at least one communication module 1200. In this case, the infrastructure device may refer to basic facilities and systems that form an industrial or transportation base. For example, the infrastructure device may include traffic lights, speed cameras, road signs, etc., but the present invention is not limited thereto.

Also, the infrastructure device may include at least one sensor. In detail, the infrastructure device may include the at least one sensor in order to detect a dangerous situation that may happen to vehicles and pedestrians on roads. For example, the at least one sensor may include a LiDAR device, a camera device, etc., but the present invention is not limited thereto.

Referring to FIG. 12 again, the first vehicle may communicate with the infrastructure device through a V2I system to share data. Here, the infrastructure device may be controlled by an external server or may perform communication to share data without the control of an external server.

Also, the V2I system may be implemented to transmit sensor data acquired from at least one sensor included in the first vehicle to the infrastructure device. Also, the V2I system may be implemented to transmit sensor data acquired from at least one sensor included in the infrastructure device to the first vehicle.

Also, the V2I system may be implemented to transmit information other than the sensor data. In detail, the infrastructure device may transmit regulation information for a space where the infrastructure device is placed to the first vehicle. For example, the infrastructure device may transmit information indicating that the space where the infrastructure device is placed is a child protection zone to the first vehicle.

Also, when the first vehicle enters a specific zone, the first vehicle may receive sensor data from the infrastructure device. For example, when the first vehicle enters a child protection zone, the first vehicle may receive sensor data acquired from an infrastructure device installed in the child protection zone through the V2I system.

1.4.2.1.3. V2C

The first vehicle equipped with the autonomous driving system 1000 may communicate with a server through the communication module 1200. In this case, the server may be included in a computer of an institution for controlling road conditions. For example, the server may include a cloud of a road control system, but the present invention is not limited thereto. Also, the server may include a local server associated with a predetermined region, a global server for controlling a plurality of local servers, etc., but the present invention is not limited thereto.

Referring to FIG. 12 again, the first vehicle may communicate with the server through the V2C system to share data.

Also, the V2C system may be implemented to transmit sensor data acquired from at least one sensor included in the first vehicle to the server.

Also, the V2C system may be implemented to transmit information other than the sensor data.

Also, the first vehicle may receive information regarding an accident from the server. For example, the server may transmit information indicating that a traffic accident occurred on a path of the first vehicle to the first vehicle through the V2C system, but the present invention is not limited thereto.

Hereinafter, specific embodiments of the autonomous driving system using sensors and communication will be described in detail.

1.4.2.2. Autonomous Driving System for Safety—Based on Sensors and Communication The autonomous driving system 1000 may use sensor data and communication-based sharing data in order to protect the safety of pedestrians and occupants of a vehicle equipped with the autonomous driving system 1000.

In this case, it will be appreciated that various embodiments described in Section 1.4.1.2 in which sensor data is used may be applied to an autonomous driving system using sensor data and communication-based sharing data.

The autonomous driving system 1000 may detect the occurrence of a traffic event through sensors and communication.

Figure 13:
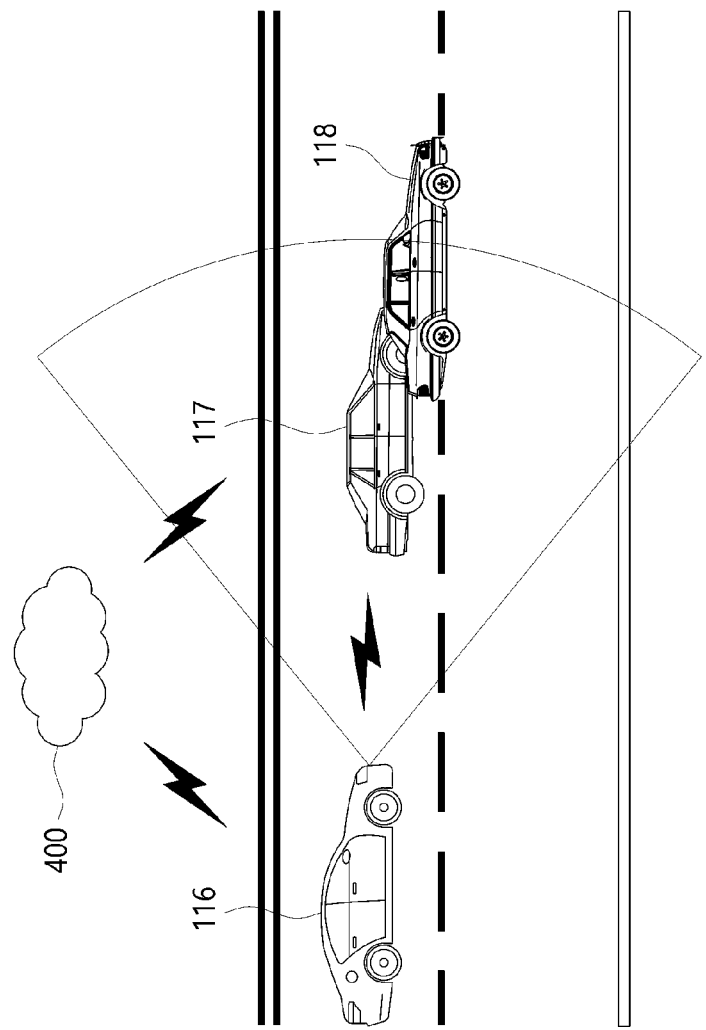
FIG. 13 is a diagram showing a situation in which a traffic event has occurred in front of a vehicle equipped with an autonomous driving system according to an embodiment.

FIG. 13 is a diagram showing a situation in which a traffic event has occurred in front of a vehicle equipped with an autonomous driving system according to an embodiment.

Referring to FIG. 13, when a first vehicle 116 acquires sensor data regarding a traffic event having occurred during driving, the first vehicle 116 may transmit the sensor data to a server 400 or vehicles 117 and 118 associated with the traffic event.

Also, when a traffic event has occurred due to a collision between the second vehicle 117 and the third vehicle 118, the vehicles 117 and 118 associated with the traffic event may transmit information indicating that the traffic event has occurred to the server 400. In this case, the server 400 may transmit the information indicating that the traffic event has occurred to the first vehicle 116 located near where the traffic event has occurred.

Also, the autonomous driving system 1000 may recognize that a vehicle stopped in front of a vehicle equipped with the autonomous driving system is a shared vehicle through communication and may acquire information regarding the shared vehicle through communication with the shared vehicle.

For example, a taxi may interfere with the passage of the vehicle while a passenger gets out of the taxi, and thus the taxi may transmit information related to the current situation to the vehicle. For example, the taxi may transmit a message indicating that a passenger is getting out of the vehicle. In this case, the vehicle may determine that the taxi is not an illegally parked vehicle through sensor data acquired from at least one sensor and sharing data transmitted from the taxi.

Also, the communication entity is not limited to taxis and may include various types of shared vehicles such as buses.

1.4.2.3. Autonomous Driving System for Convenience—Based on Sensors and Communication The autonomous driving system 1000 may use sensor data and communication-based sharing data in order to provide convenience to pedestrians and occupants of a vehicle equipped with the autonomous driving system 1000.

In this case, it will be appreciated that various embodiments described in Section 1.4.1.3 in which sensor data is used may be applied to an autonomous driving system using sensor data and communication-based sharing data.

Also, the autonomous driving system may acquire information regarding an available parking space in a parking lot through sensors and communication.

Figure 14:
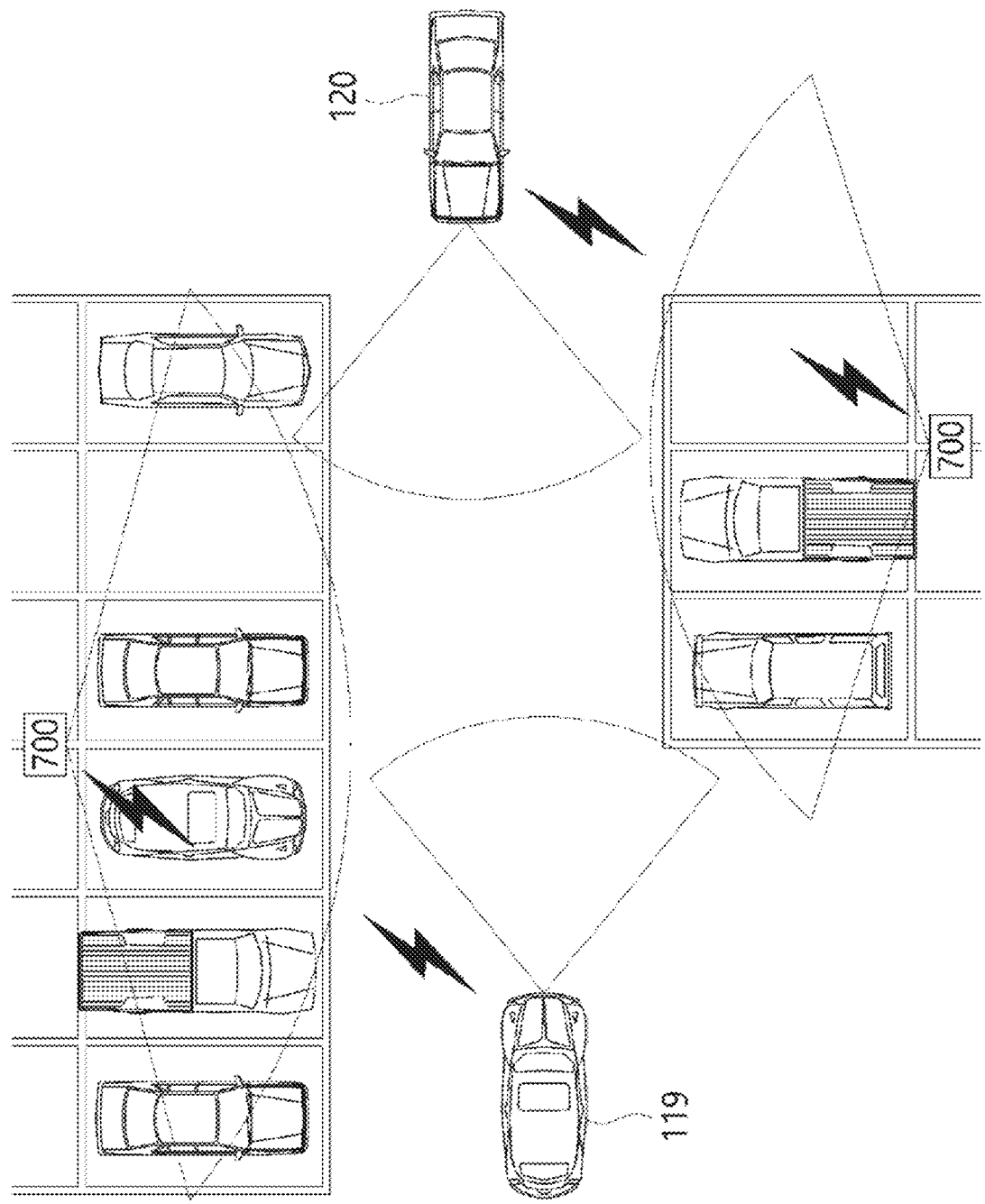
FIG. 14 is a diagram showing a situation in which a vehicle equipped with an autonomous driving system recognizes an available parking space through communication with an infrastructure device in a parking lot according to an embodiment.

FIG. 14 is a diagram showing a situation in which a vehicle equipped with an autonomous driving system recognizes an available parking space through communication with an infrastructure device in a parking lot according to an embodiment.

Referring to FIG. 14, at least one infrastructure device 700 may be placed in a parking lot. The at least one infrastructure device 700 may include at least one sensor in order to acquire information regarding an available parking space in the parking lot. Also, the infrastructure device 700 may store information regarding an available parking space included in sensor data acquired through a sensor.

Also, when a first vehicle 119 enters the parking lot, the infrastructure device 700 may transmit the stored information regarding the available parking space to the first vehicle 119. In this case, a controller of the first vehicle 119 may move the first vehicle to the available parking space on the basis of the information regarding the available parking space. In this process, the controller may additionally detect a parking space using sensor data obtained through a sensor placed in the first vehicle 119. Also, in order to determine whether the first vehicle 119 can actually park in the available parking space at which the first vehicle 119 has arrived according to the information regarding the available parking space, the autonomous driving system 1000 may acquire sensor data regarding the available parking space using at least one sensor placed in the first vehicle 119.

Also, when a second vehicle 120, which has been parked, exits the parking lot, the second vehicle 120 may transmit information regarding the space where the second vehicle 120 was parked to the infrastructure device 700. In this case, the infrastructure device 700 may recognize the available parking space by receiving the information regarding the space where the second vehicle 120 had been parked and storing the received information.

Hereinafter, the sensor data and the sharing data will be described.

2. Sensor Data Used by Autonomous Driving System

2.1. Type of Sensor

The autonomous driving system 1000 may include at least one sensor 1300.

Referring to FIG. 2 again, the at least one sensor 1300 may include various types of sensors. For example, the at least one sensor 1300 may include at least one LiDAR device 1310, at least one camera device 1320, at least one camera device 1320, at least one radar device 1330, at least one ultrasonic sensor 1340, etc., but the present invention is not limited thereto.

2.2. Sensor Data

The autonomous driving system 1000 may acquire sensor data through the at least one sensor 1300. In this case, the sensor data may include raw data acquirable from the at least one sensor 1300 or data obtained by processing the raw data.

Also, the sensor data may include information related to an object detected by the at least one sensor 1300. For example, the sensor data may include position information of the object, distance information of the object, shape and/or color information of the object, property information of the object, etc., but the present invention is not limited thereto.

Also, the sensor data may include data regarding a single point or data regarding a plurality of points, which is acquired from the at least one sensor 1300, or processed data which is obtained by processing the data regarding the single point or the data regarding the plurality of points.

Hereinafter, as a specific example, the sensor data may include a set of point data, point data, a subset of point data, property data, etc. However, the present invention is not limited thereto, and this will be described in detail.

Figure 15:
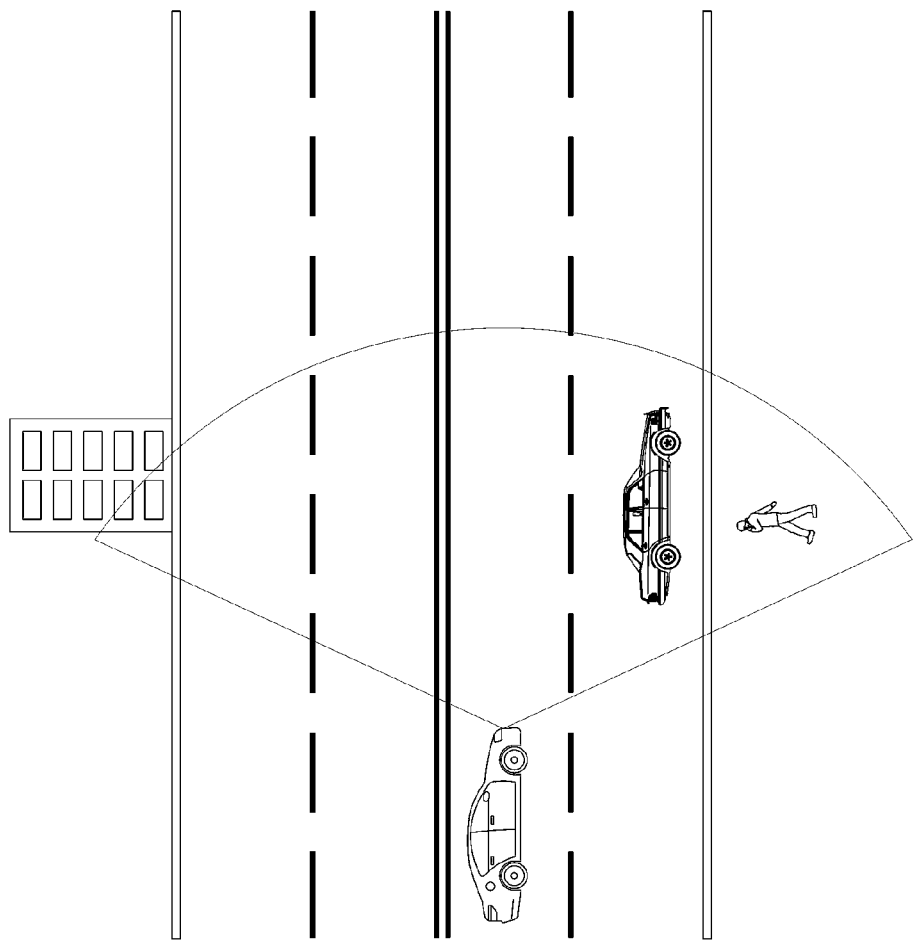
FIG. 15 is a diagram showing a situation in which a vehicle equipped with an autonomous driving system acquires sensor data regarding an environment around the vehicle through at least one sensor according to an embodiment.

FIG. 15 is a diagram showing a situation in which a vehicle equipped with an autonomous driving system acquires sensor data regarding an environment around the vehicle through at least one sensor according to an embodiment.

For example, when the sensor is the LiDAR device, the sensor data may include point data of each point scanned by the LiDAR device, a set of point data, a subset of point data, property data obtained by processing the subset of point data, or the like, but the present invention is not limited thereto.

In this case, the vehicle may detect buildings, vehicles, pedestrians, and the like around the vehicle by using at least one of the point data, the set of point data, the subset of point data, or the property data.

For convenience of description, the following description with reference to FIGS. 15 to 84 will focus on sensor data of the LiDAR device, but the present invention is not limited thereto. It will be appreciated that sensor data of sensors other than the LiDAR device is applicable to FIGS. 15 to 84.

Figure 16:
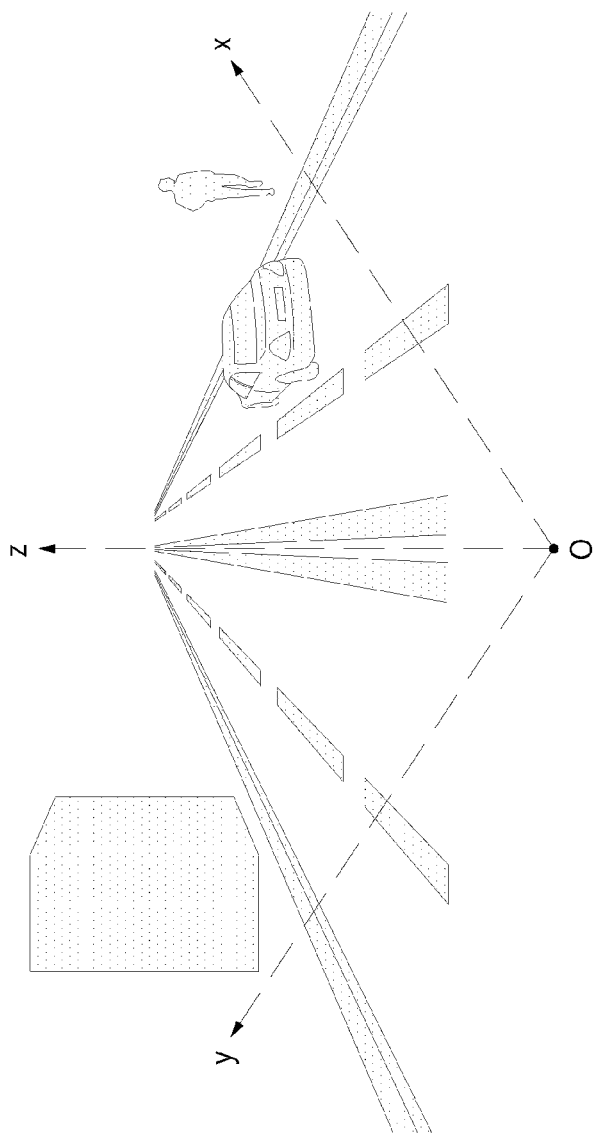
FIG. 16 is a diagram showing, on a three-dimensional (3D) map, sensor data acquired by a light detection and ranging (LiDAR) device placed in the vehicle of FIG. 15.

FIG. 16 is a diagram showing, on a 3D map, sensor data acquired by the LiDAR device placed in the vehicle of FIG. 15.

Referring to FIGS. 15 and 16, the controller included in the autonomous driving system may form a 3D point data map on the basis of data acquired from the LiDAR device. In this case, the 3D point data map may refer to a 3D point cloud. Also, the sensor data may include data included in the 2D point data map. Also, the position of the origin of the 3D point data map may correspond to the optical origin of the LiDAR device, but the present invention is not limited thereto. The position of the origin of the 3D point data map may correspond to the position of the center of gravity of the LiDAR device or the position or the position of the center of gravity of the vehicle where the LiDAR device is placed.

Figure 17:
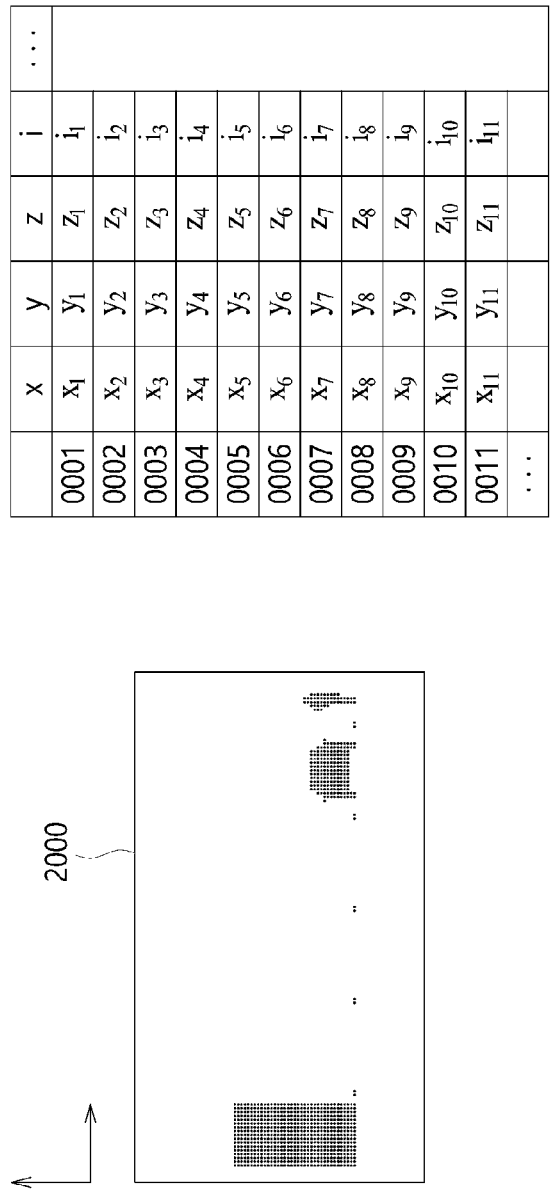
FIG. 17 is a diagram schematically showing sensor data included in the 3D map of FIG. 16 in a two-dimensional (2D) plane.

FIG. 17 is a diagram schematically showing sensor data included in the 3D map of FIG. 16 in a 2D plane.

Referring to FIG. 17, sensor data 2000 may be expressed in a 2D plane. For example, the sensor data may be expressed in the x-z plane, but the present invention is not limited thereto.

Also, in the specification, the sensor data may be expressed in the 2D plane, but this is for schematically representing data on a 3D map.

Also, the sensor data 2000 may be expressed in the form of a data sheet. A plurality of pieces of information included in the sensor data 2000 may be expressed as values in the data sheet.

Hereinafter, the sensor data and the meanings of various forms of data included in the sensor data will be described.

2.2.1. Point Data

The sensor data 2000 may include point data. In this case, the point data may refer to data that can be primarily acquired when the at least one sensor 1300 detects an object. Also, the point data may refer to raw data which is original information acquired from the at least one sensor and which is not processed.

For example, when the sensor is a LiDAR device, the point data may correspond to one point included in a point cloud acquired from the LiDAR device.

Figure 18:
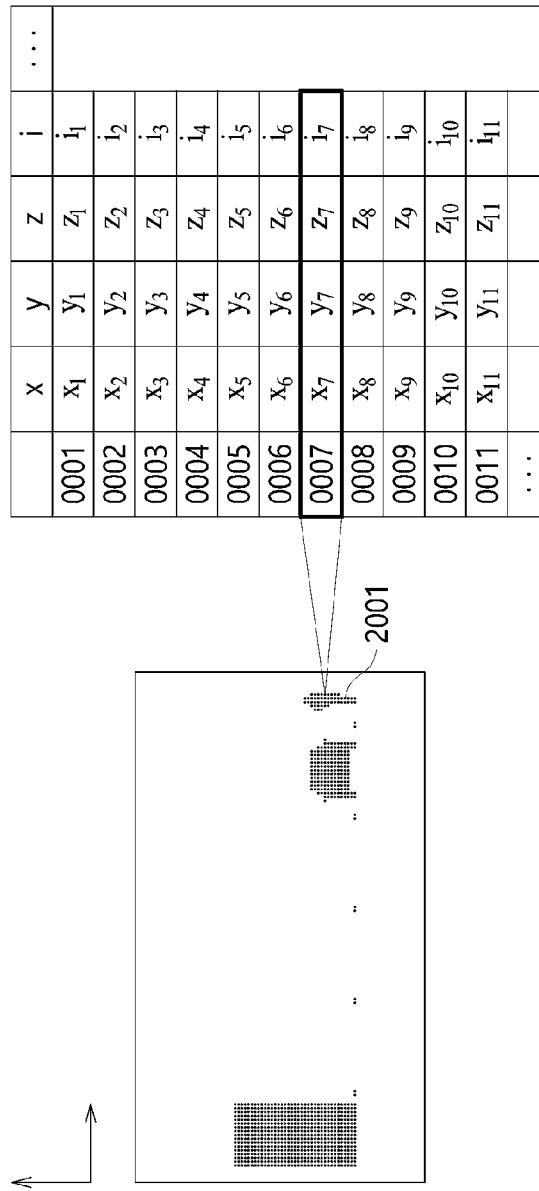
FIG. 18 is a diagram illustrating point data acquired from at least one LiDAR device included in an autonomous driving system according to an embodiment.

FIG. 18 is a diagram illustrating point data acquired from at least one LiDAR device included in an autonomous driving system according to an embodiment.

Referring to FIG. 18, the LiDAR device may acquire point data 2001 by scanning at least a portion of an object, and the point data 2001 may include position coordinates (x, y, z). Also, in some embodiments, the point data 2001 may further include an intensity value I.

In this case, the position coordinates (x, y, z) may be generated based on information regarding a distance to at least a portion of the object, and the information is acquired by the LiDAR device. In detail, the LiDAR device may compute a distance to at least a portion of the object on the basis of a time point at which a laser beam is emitted and a time point at which a reflected laser beam is received. Also, based on the distance, the LiDAR device may generate position coordinates of at least a portion of the object in a Cartesian coordinate system based on the optical origin of the LiDAR device.

Also, the intensity value I may be generated on the basis of the reflectance of at least a portion of the object acquired by the LiDAR device. In detail, the magnitude (or strength) of a signal received from the LiDAR device varies depending on the reflectance even if the object is at the same distance. Thus, the LiDAR device may generate an intensity value of at least a portion of the object on the basis of the magnitude (or strength) of the received signal.

Also, the number of pieces of point data 2001 may correspond to the number of laser beams emitted from the LiDAR device, scattered by an object, and then received by the LiDAR device.

More specifically, it is assumed that a laser beam emitted from the LiDAR device is scattered by at least a portion of the object and is received by the LiDAR device. Each time the laser beam is received, the LiDAR device may process a signal corresponding to the received laser beam to generate the point data 2001.

However, the present invention is not limited thereto, and when the sensor is a camera device, the sensor data 2000 may include the point data 2001.

In this case, the point data 2001 may correspond to one pixel acquired from the camera device. In detail, the point data 2001 may correspond to one pixel acquired through an RGB sensor included in the camera device. For example, when a plurality of pixels are present in a light-receiving unit of a camera, the point data 2001 may be generated for each pixel, and the point data 2001 may include pixel values (e.g., RGB color values in the case of an RGB sensor) of the pixels and position information of an object corresponding to the position of the pixels.

Also, the point data 2001 may include shape and/or color information acquired from the camera device.

However, the present invention is not limited thereto, and when the sensor is a radar device, the point data 2001 may correspond to one point acquired from the radar device. In detail, the point data 2001 may include position coordinates acquired from the radar device.

For example, in the case of a radar, a plurality of Tx antennas transmit a plurality of radio waves, and a plurality of Rx antennas receive a plurality of radio waves which are scattered by an object and then returned. In this case, the radar may acquire position information of the object with respect to the plurality of received radio waves, and the point data 2001 may indicate the position information of the object with respect to one of the plurality of radio waves.

2.2.2. Set of Point Data

The sensor data may include a set of point data 2100. In this case, the set of point data 2100 may include multiple pieces of point data 2001. Also, the set of point data 2100 may be included in one frame. In some embodiments, the set of point data 2100 may be included in multiple frames.

For example, when the sensor is a LiDAR device, the sensor data may include the set of point data 2100, and the set of point data 2100 may correspond to a point cloud of one frame acquired from the LiDAR device.

Figure 19:
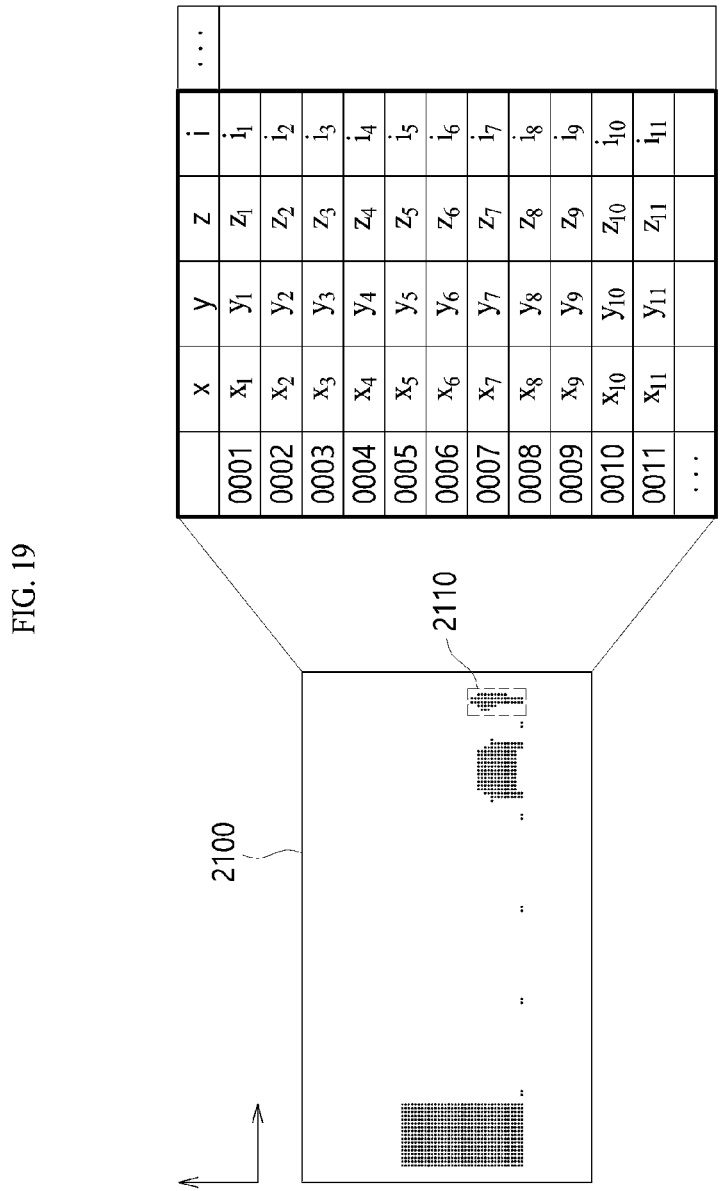
FIG. 19 is a diagram illustrating a set of point data acquired from a LiDAR device included in the vehicle of FIG. 16.

FIG. 19 is a diagram illustrating a set of point data acquired from the LiDAR device included in the vehicle of FIG. 16.

Referring to FIG. 19, the set of point data 2100 shown in FIG. 19 may be acquired from the LiDAR device.

Also, the set of point data 2100 may refer to a plurality of pieces of point data that are generated when the LiDAR device scans the field of view of the LiDAR device once. For example, when the horizontal field of view of the LiDAR device is 180 degrees, the set of point data 2100 may refer to all point data acquired when the LiDAR device scans 180 degrees once.

Also, the set of point data 2100 may include the position coordinates (x, y, z) and intensity value I of an object present in the field of view of the LiDAR device. Also, the position coordinates (x, y, z) and intensity value I of the point data 2001 included in the set of point data 2100 may be expressed in a data sheet.

Also, the set of point data 2100 may include noise data. The noise data may be generated by an external environment regardless of the object located in the field of view of the LiDAR device. For example, the noise data may include noise due to interference between LiDARs, noise due to ambient light such as sunlight, noise due to an object outside a measurable range, etc., but the present invention is not limited thereto.

Also, the set of point data 2100 may include background information. The background information may refer to at least one piece of point data not related to an object among a plurality of pieces of point data included in the set of point data 2100. Also, the background information may be pre-stored in the autonomous driving system including the LiDAR device. For example, the background information may include information on a immovable object such as a building (or an stationary object located at a fixed position) and may be prestored in the autonomous driving system including the LiDAR device in the form of a map.

However, the present invention is not limited thereto, and even when the sensor is a camera device, the sensor data 2000 may include the set of point data 2100. In this case, the set of point data 2100 may correspond to one frame acquired from the camera device. Also, the set of point data 2100 may correspond to all pixels which are acquired from the camera device and which are in the field of view of the camera device. In detail, the camera device may generate a set of point data 210 of one frame representing shape and/or color information of objects present in the field of view of the camera device by photographing the surroundings.

For example, when a plurality of pixels are present in a light-receiving unit of a camera, the set of point data 2100 may include a plurality of pieces of point data 2001 generated for each of the plurality of pixels.

However, the present invention is not limited thereto, and even when the sensor is a radar device, the sensor data 2000 may include the set of point data 2100. In this case, the set of point data 2100 may include the position coordinates of all the objects which are acquired from the radar device and which are in the field of view of the radar device.

For example, the set of point data 2100 may include a plurality of pieces of point data corresponding to a plurality of received radio waves.

2.2.3. Sub Set of Point Data

Referring to FIG. 19 again, the sensor data 2000 may include a subset of point data 2110. In this case, the subset of point data 2110 may refer to a plurality of pieces of point data that represent the same object. For example, when the set of point data 2100 includes a plurality of pieces of point data that represent a vehicle, the plurality of pieces of point data may constitute one subset of point data 2110.

Also, the subset of point data 2110 may be included in the set of point data 2100. Also, the subset of point data 2100 may refer to at least one object included in the set of point data 2100 or at least a portion of the object. In detail, the subset of point data 2110 may refer to a plurality of pieces of point data that represents a first object among the plurality of pieces of point data included in the set of point data 2100.

Also, the subset of point data 2110 may be acquired by clustering at least one piece of point data related to a dynamic object among the plurality of pieces of point data included in the set of point data 2100. In detail, the subset of point data 2110 may be acquired by detecting a immovable object and a dynamic object (or a movable object) included in the set of point data 2100 using the background information and then by grouping data related to one object into a certain cluster.

Also, the subset of point data 2110 may be generated using machine learning. For example, the controller 1100 may determine that at least some of the plurality of pieces of data included in the sensor data 2000 represent the same object on the basis of machine learning performed on various objects.

Also, the subset of point data 2110 may be generated by segmenting the set of point data 2100. In this case, the controller 1100 may segment the set of point data 2100 in units of a predetermined segment. Also, at least one segment unit of the segmented set of point data may refer to at least a portion of the first object included in the set of point data 2100. Also, a plurality of segment units representing the first object may correspond to the subset of point data 2110.

For example, when the sensor is a LiDAR device, the subset of point data 2110 may correspond to a plurality of pieces of point data related to the first object included in the set of point data 2100 acquired from the LiDAR device.

Figure 20:
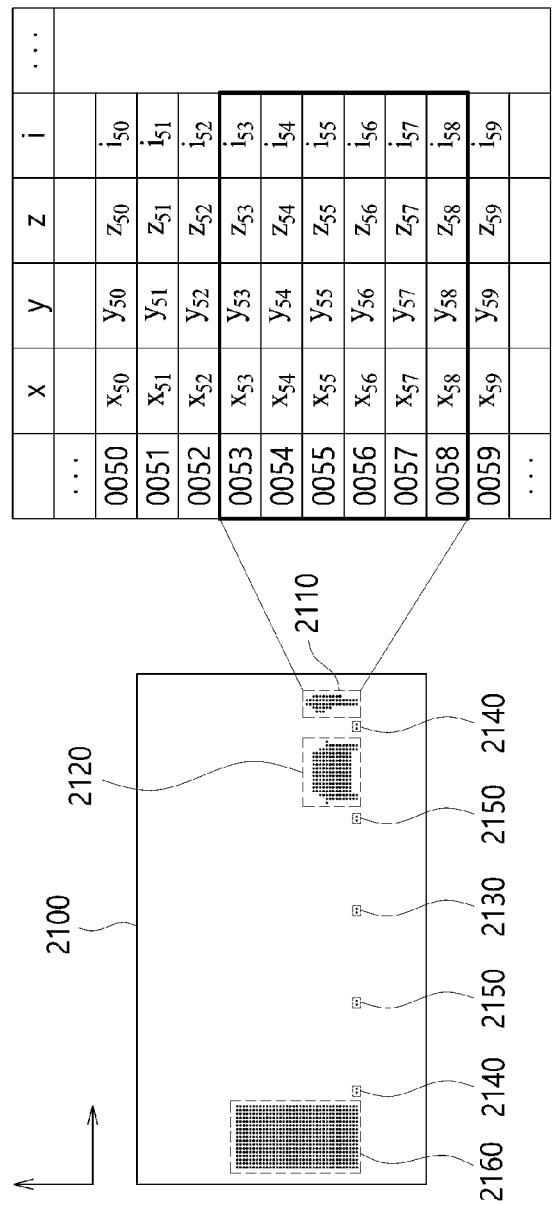
FIG. 20 is a diagram illustrating a subset of point data acquired from at least one LiDAR device included in an autonomous driving system according to an embodiment.

FIG. 20 is a diagram illustrating a subset of point data acquired from at least one LiDAR device included in an autonomous driving system according to an embodiment.

Referring to FIG. 20, the set of point data 2020 may include a plurality of subsets of point data 2110, 2120, 2130, 2140, and 2150.

The plurality of subsets of point data 2110, 2120, 2130, 2140, and 2150 may include a plurality of pieces of point data representing at least a portion of an object. Here, the controller 1100 may determine that the plurality of pieces of point data 2001 represent at least a portion of the same object on the basis of the position coordinates (x, y, z) and the intensity value I of the plurality of pieces of point data 2001. Accordingly, the controller 1100 may define the plurality of pieces of point data 2001 as a subset of point data and generate property data of the object on the basis of the subset of point data.

For example, a first subset of point data 2110 may represent at least a portion of "human," a second subset of point data 2120 may represent at least a portion of "vehicle," a third subset of point data 2130 may represent at least a portion of "center line," a fourth subset of point data 2140 may represent at least a portion of "road shoulder line," a fifth subset of point data 2150 may represent at least a portion of "lane line," and a sixth subset of point data 2160 may represent at least a portion of "building," but the present invention is not limited thereto.

In this case, the first subset of point data 2110 may refer to at least a portion of the same "human." In detail, the first subset of point data 2110 may include the position coordinates (x, y, z) and the intensity values I of the plurality of pieces of point data included in the first subset of point data 2110. In this case, the plurality of pieces of point data may constitute one subset of point data representing at least a portion of "human."

2.2.4. Property Data

The sensor data 2000 may include property data 2200. In this case, the property data 2200 may be determined based on at least one subset of point data 2110. In detail, the property data 2200 may include information regarding various properties, such as type, size, speed, and direction, of an object which are represented by the at least one subset of point data 2110. Also, the property data 2200 may be data obtained by processing at least a portion of the at least one subset of point data 2110.

For example, when the sensor is a LiDAR device, the sensor data 2000 may include property data (see reference number 2200 of FIG. 21), and the property data may be generated based on the subset of point data 2110 included in the set of point data 2100 acquired from the LiDAR device.

Also, a process of generating the property data 2200 on the basis of the subset of point data 2110 included in the set of point data 2100 may use a point cloud library (PCL) algorithm.

As an example, a first process related to the generation of the property data 2200 using the PCL algorithm may include operations of preprocessing a set of point data, removing background information, detecting feature (key) points, defining a descriptor, matching the feature points, and estimating the property of an object, but the present invention is not limited thereto.

In this case, the operation of preprocessing a set of point data may refer to the processing of the set of point data into a form suitable for the PCL algorithm. In the first process, point data that is included in the set of point data 2100 and that is not related to the extraction of property data may be removed. For example, the operation of preprocessing data may include operations of removing noise data included in the set of point data 2100 and re-sampling a plurality of pieces of point data included in the set of point data 2100, but the present invention is not limited thereto.

Also, through the operation of removing background information, in the first process, the subset of point data 2110 related to the object may be extracted by removing the background information included in the set of point data 2100.

Also, through the operation of detecting feature points, in the first process, a feature point suitably representing the shape characteristics of the object may be detected among a plurality of pieces of point data included in the subset of point data 2110 related to the object, which remains after the background information is removed.

Also, through the operation of defining the descriptor, in the first process, a descriptor for describing a characteristic unique to each of the detected feature points may be defined.

Also, through the operation of matching the feature points, in the first process, corresponding feature points may be chosen by comparing a descriptor of feature points included in prestored template data related to the object and a descriptor of feature points of the subset of point data 2110.

Also, through the operation of estimating the property of an object, in the first process, the property data 2200 may be generated by detecting an object represented by the subset of point data 2110 using a geometric relationship of the chosen feature points.

As another example, a second process related to the generation of the property data 2200 may include operations of preprocessing data, detecting data regarding an object, clustering the data regarding the object, classifying the clustered data, tracking the object, etc., but the present invention is not limited thereto.

In this case, through the operation of detecting data regarding an object, in the second process, a plurality of pieces of point data representing an object among a plurality of pieces of point data included in the set of point data 2100 may be extracted using prestored background data.

Also, through the operation of clustering the data regarding the object, in the second process, a subset of point data 2110 may be extracted by clustering at least one piece of point data representing one object among the plurality of pieces of point data.

Also, through the process of classifying the clustered data, in the second process, the class information of the subset of point data 2110 may be classified or determined using a machine learning model or a deep learning module which is pre-learned.

Also, through the operation of tracking the object, in the second process, the property data 2200 may be generated based on the subset of point data 2110. For example, a controller that performs the second process may display the position of the object using the center position coordinates and volume of the plurality of subsets of point data 2110. Accordingly, the controller may estimate the movement direction and speed of the object by defining a correspondence relationship based on information on the similarity in distance and shape between a plurality of subsets of point data acquired from successive frames and then by tracking the object.

Figure 21:
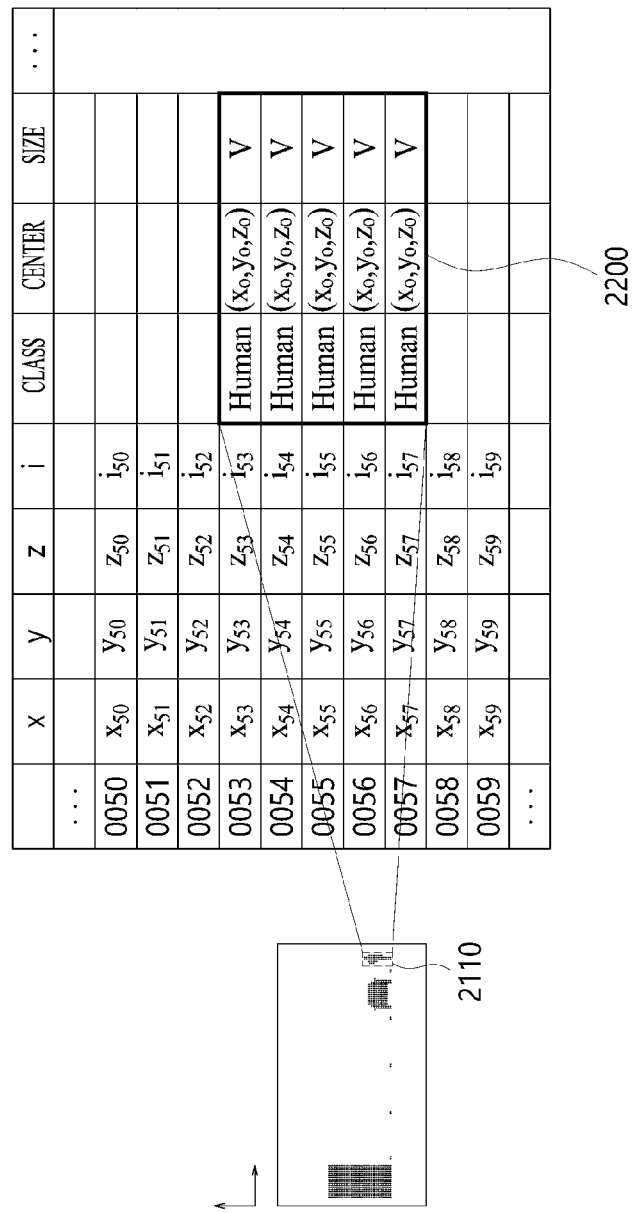
FIG. 21 is a diagram illustrating property data generated from a subset of point data acquired from a LiDAR device included in an autonomous driving system according to an embodiment.

FIG. 21 is a diagram illustrating property data generated from a subset of point data acquired from a LiDAR device included in an autonomous driving system according to an embodiment.

Referring to FIG. 21, the property data 2200 may be generated for each point data 2001 included in the subset of point data 2110. In detail, the property data 2200 may be assigned to each piece of point data 2001 included in the subset of point data representing at least a portion of one object.

For example, the property data 2200 of the subset of point data may be generated for each piece of point data 2001 included in the subset of point data 2110 representing at least a portion of a human. In this case, the property data 2200 may include a class information, a center position information, a size information of the like of the human, but the present invention is not limited thereto. A plurality of pieces of information included in the property data will be described in detail below.

Figure 22:
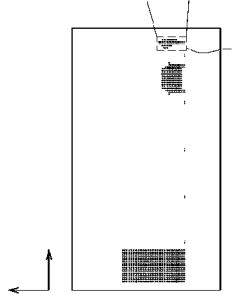
FIG. 22 is a diagram showing another example of the property data of FIG. 21.

FIG. 22 is a diagram showing another example of property data of FIG. 21.

Referring to FIG. 22, the property data 2200 may be generated in common for a plurality of pieces of point data included in the subset of point data 2110. That is, one piece of property data 2200 may be generated for one subset of point data 2110 representing at least a portion of one object.

For example, when the object is a human, one piece of property data may be generated for a plurality of pieces of point data included in a subset of point data representing at least a portion of the human.

Figure 23:
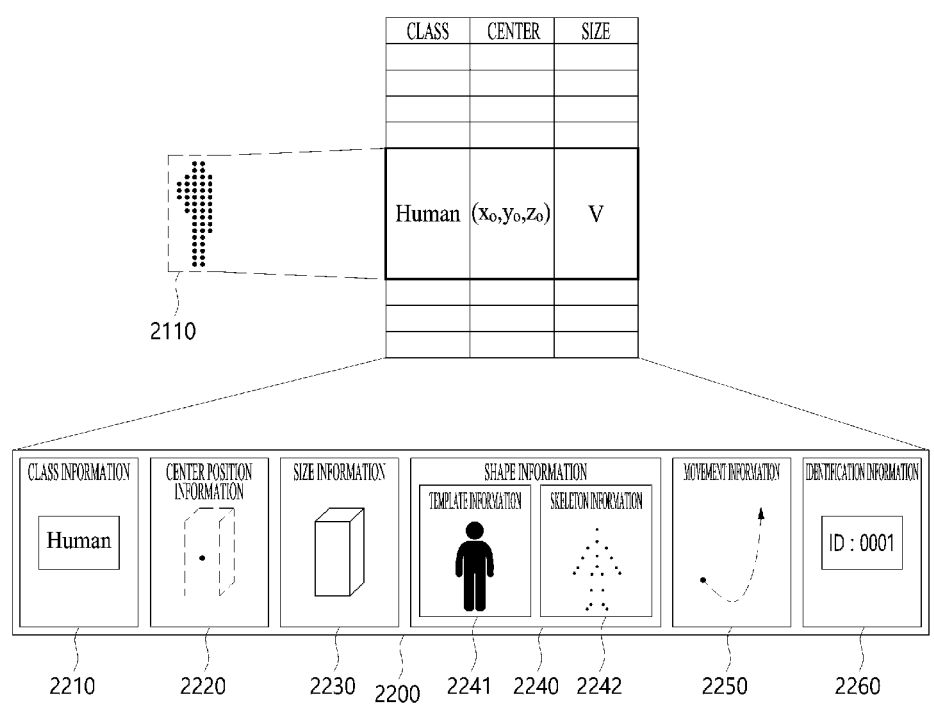
FIG. 23 is a diagram illustrating a plurality of pieces of information included in property data according to an embodiment.

FIG. 23 is a diagram illustrating a plurality of pieces of information included in property data according to an embodiment.

Referring to FIG. 23, the property data 2200 may include a class information 2210, a center position information 2220, a size information 2230, a shape information 2240, a movement information 2250, an identification information 2260 of the like of the object which are represented by the subset of point data 2110, but the present invention is not limited thereto.

Hereinafter, a plurality of pieces of information included in the property data 2200 will be described in detail.

The property data 2200 may include a class information 2210 indicating the class of the object represented by the subset of point data 2110.

Figure 24:
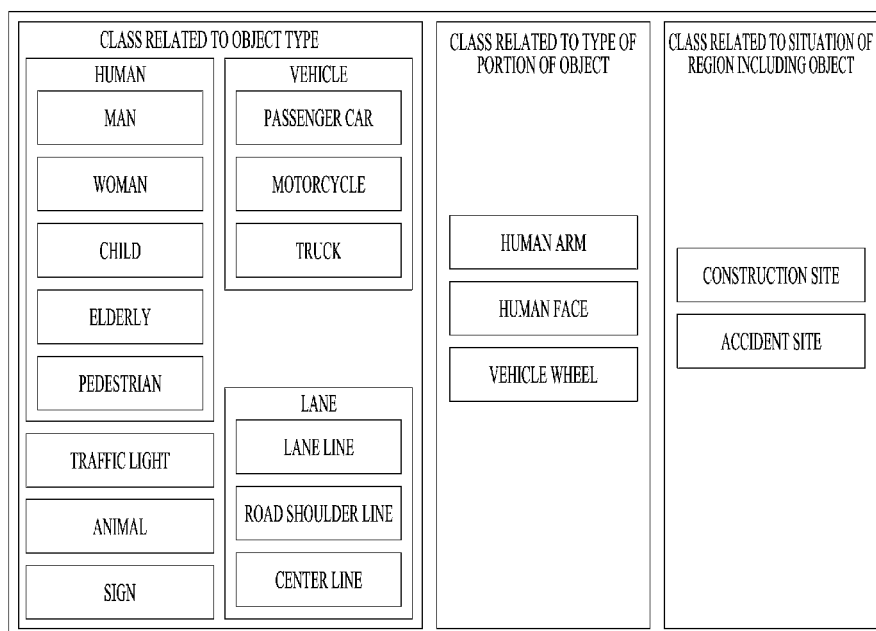
FIG. 24 is a diagram illustrating class information included in property data according to an embodiment.

FIG. 24 is a diagram illustrating a class information included in property data according to an embodiment.

Referring to FIG. 24, the class information 2210 may include a class related to the type of the object, a class related to the type of a portion of the object, a class related to a situation of a region including the object, etc., but the present invention is not limited thereto.

In this case, the class information 2210 may be associated with the type of the object represented by the subset of point data 2110.

In this case, the class information related to the type of the object may be determined depending on the kind of the object. For example, when the object is a human, the class information of the subset of point data may be determined as "human," but the present invention is not limited thereto. The class information 2210 may be determined as a lower class of the human. As a specific example, when the object is a male, the class information 2210 of the subset of point data may be determined as "male." Also, the lower class of the human may include "female," "child," "the elderly," "pedestrian," etc., but the present invention is not limited thereto.

Also, the class information 2210 may be associated with the type of a portion of the object. In detail, fora class related to the type of a portion of the object, when the set of point data 2100 includes the subset of point data 2110 representing a portion of the object, the controller 1100 may determine that the subset of point data 2110 represents a portion of the object. For example, when the subset of point data 2110 represents a human arm, the class information 2210 of the subset of point data may be determined as "human" or may be determined as "human arm."

Also, the class information 2210 may be associated with the situation of the region including the object. In this case, the class related to the situation of the region including the object may be determined based on a plurality of subsets of point data. In detail, the controller 1100 may determine the class information 2210 of the object on the basis of the subset of point data representing at least a portion of the object, and the controller 1100 may determine class information related to the situation of the region including the object in consideration of both of the subset of point data 2110 and another plurality of subsets of point data.

As a specific example, when a LiDAR device acquires a plurality of subsets of point data representing at least a portion of a worker and an excavator that are working at a construction site, the controller 1100 may determine that the class information of the worker and the excavator is "construction site" on the basis of the plurality of subsets of point data.

Also, the class information 2210 may be determined based on a lookup table prestored in the autonomous driving system 1000.

More specifically, the autonomous driving system 1000 may generate and store a lookup table that matches objects to the class information 2210 of the objects. In this case, the controller 1100 may determine the class information 2210 of the subset of point data on the basis of the lookup table.

In this case, the lookup table may be used to determine a class related to the situation of the region including the object. For example, the lookup table may match the class information of a plurality of objects to a class related to a situation of a region including the plurality of objects. As a specific example, when the class information of the plurality of objects includes at least a portion some of "worker," "excavator," and "construction sign," the lookup table may match the plurality of pieces of class information to "construction site," which is a class related to the situation of the region including the plurality of objects. In this case, the controller may determine that the class of the plurality of objects is "construction site" using the lookup table.

Also, the class information 2210 may be determined using machine learning. In detail, the autonomous driving system 1000 may pre-learn a correspondence relationship by repeatedly matching the subset of point data 2110 to an object represented by the subset of point data and may determine the class information 2210 of the object on the basis of the correspondence relationship.

Also, the class information 2210 may include at least one class. As an example, the controller may determine the class information 2210 of the subset of point data as one class (e.g., "human"). Also, as another example, a plurality of classes (e.g., "human" and "construction site") instead of one class may be included in the class information 2210.

Also, the class information 2210 may include a class group including at least one class. Here, the class group may refer to a collection of classes having similar or common characteristics. In this case, the class group may be preset and stored by a controller or a user, but the present invention is not limited thereto.

As an example, classes such as "human," "vehicle registration plate," and "identity document" have a common characteristic in that the classes are related to personal information and thus may constitute a class group related to the personal information. As another example, classes such as "human" and "vehicle" have a common characteristic in that the classes are related to a movable object and thus may constitute a class group related to the movable object.

Also, referring to FIG. 23, the property data 2200 may include a center position information 2220 of the subset of point data.

Figure 25:
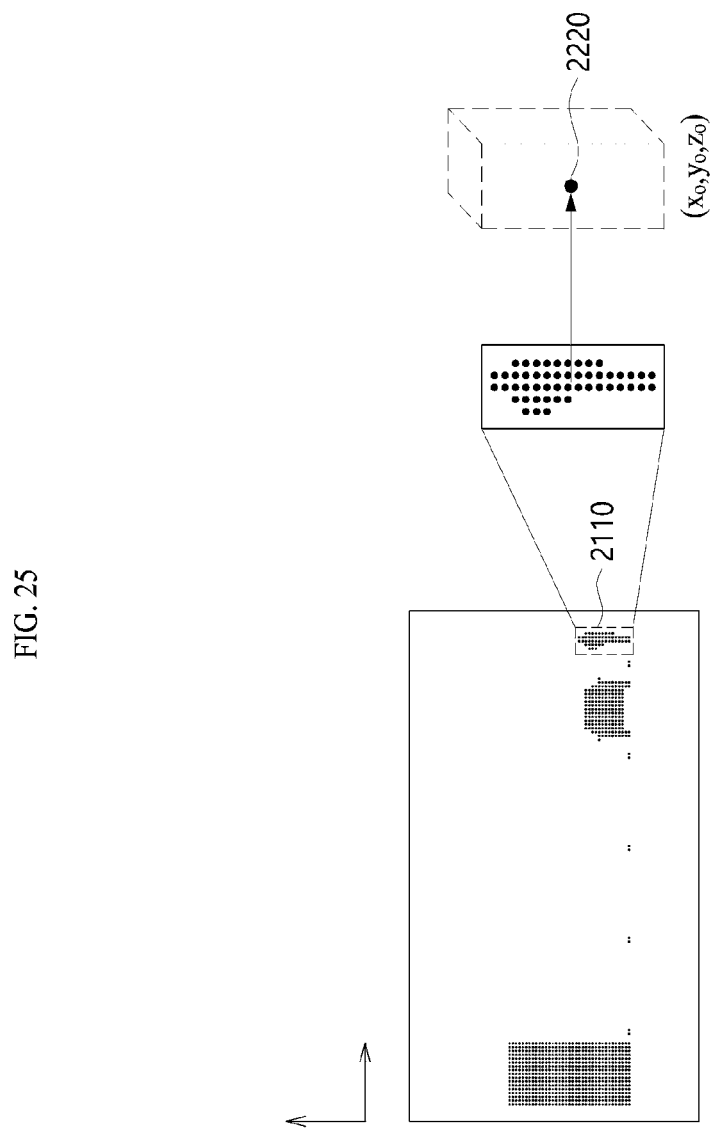
FIG. 25 is a diagram illustrating center position information included in property data according to an embodiment.

FIG. 25 is a diagram illustrating a center position information included in property data according to an embodiment.

Referring to FIG. 25, the center position information 2220 may be computed based on a subset of point data 2110 representing at least a portion of an object included in the set of point data 2100. For example, the center position information 2220 may refer to the position coordinates (x, y, z) and center position coordinates $(x_o, y_o, z_o)$ of each of a plurality of pieces of the point data included in the subset of point data 2110. In this case, the center position coordinates $(x_o, y_o, z_o)$ may be coordinates indicating the average of the position coordinates (x, y, z) of the plurality of pieces of point data, but a method of computing the center position coordinates $(x_o, y_o, z_o)$ is not limited thereto and may be used in various ways.

Also, the center position information 2220 may be expressed in a coordinate system with at least one reference position as the origin. For example, the reference position may include the position of a LiDAR device configured to acquire point data, the position of an apparatus including the LiDAR device, and the like, and the center position information 2220 may be expressed in a coordinate system with the reference position as the origin, but the present invention is not limited thereto. The coordinate system and the origin, which serves as a reference, will be described in detail below.

Also, referring to FIG. 23, the property data 2200 may include a size information 2230 of the sub set of point data.

Figure 26:
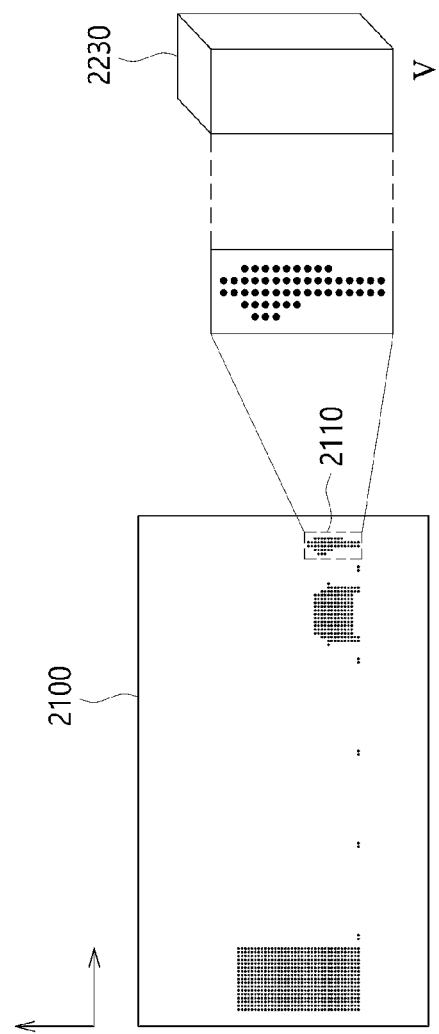
FIG. 26 is a diagram illustrating size information included in property data according to an embodiment.

FIG. 26 is a diagram illustrating a size information included in property data according to an embodiment.

Referring to FIG. 26, the size information 2230 may correspond to the size of an object represented by the subset of point data 2110.

In this case, the size information 2230 may be computed based on the subset of point data 2110 indicating at least a portion of an object included in the set of point data 2100. For example, the size information 2230 may be computed based on a volume that the subset of point data 2110 occupies in the set of point data 2100. In detail, the controller 1100 may extract a space that the subset of point data 2110 occupies in the set of point data 2100 and may compute size information 2230 of the object by computing the volume of the extracted space.

Also, the size information 2230 may be computed based on position information of the plurality of pieces of point data included in the subset of point data 2110. In detail, since the plurality of pieces of point data represent the surface of the object, the size information 2230 may be acquired by computing the volume of the object using the position information of the point data representing the surface of the object.

Also, the size information 2230 may be computed based on the center position information 2220 and the subset of point data 2110. For example, the size information 2230 may be generated by computing the volume of a rectangular parallelepiped shape having a center at the center position coordinates $(x_o, y_o, z_o)$ included in the center position information 2220 and having a width, a length, and a height corresponding to the width, length and height of the subset of point data 2110. It will be appreciated that the size information 2230 may be computed by computing the volume of various shapes such as not only a rectangular parallelepiped but also a cube, a polyhedron, a sphere, and an ellipse.

Also, referring to FIG. 23, the property data 2200 may include a shape information 2240 of the subset of point data.

In this case, the shape information 2240 may indicate the shape of the object represented by the subset of point data 2110. Here, the shape of the object may include the actual shape of the object and may also include a processed shape that is expressed by processing the shape of the object. Here, the processed shape may include a similar shape that is expressed as being similar to the actual shape of the object and an arbitrary shape that is different from the actual shape of the object but indicates the presence of the object.

For example, the shape information 2240 may include a template information 2241 in which the object is represented using a predetermined shape when representing the arbitrary shape and may include a skeleton information 2242 in which the object is represented using a predetermined number of points or less when representing the similar shape, but the present invention is not limited thereto.

Figure 27:
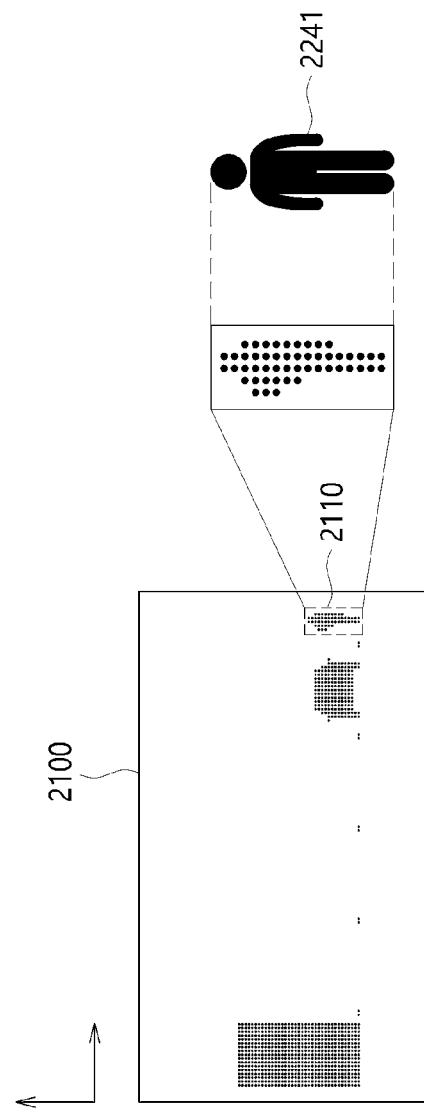
FIG. 27 is a diagram illustrating template information of shape information included in property data according to an embodiment.

FIG. 27 is a diagram illustrating a template information of shape information included in property data according to an embodiment.

Referring to FIG. 27, the template information 2241 may represent an object represented by the subset of point data 2110 using a predetermined shape. In detail, the template information 2241 may indicate a predetermined shape corresponding to the class information 2210 on the basis of the class information of the subset of point data. For example, when the class information 2210 of the subset of point data is related to a human, the template information 2241 may correspond to a predetermined shape having a human shape, but the present invention is not limited thereto.

Also, the template information 2241 may be prestored in the autonomous driving system 1000. In detail, the autonomous driving system 1000 may prestore the template information 2241 corresponding to the class information 2210 of the object or acquire from an external server.

Figure 28:
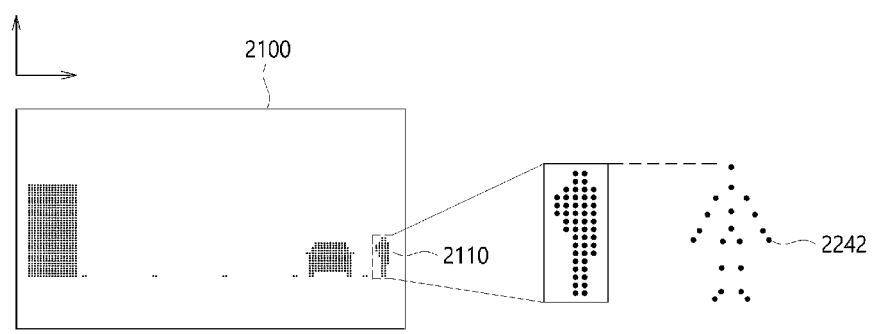
FIG. 28 is a diagram illustrating skeleton information of shape information included in property data according to an embodiment.

FIG. 28 is a diagram illustrating a skeleton information of shape information included in property data according to an embodiment.

Referring to FIG. 28, the skeleton information 2242 may represent an object represented by the subset of point data 2110 using a predetermined number or less of points. In detail, the skeleton information 2242 may represent the shape of the object using the minimum number of points capable of expressing the shape of the object on the basis of the class information 2210 of the subset of point data. For example, when the class information of the subset of point data is related to a human, the skeleton information may correspond to a plurality of points corresponding to a human joint, but the present invention is not limited thereto.

Also, referring to FIG. 23, the property data 2200 may include a movement information 2250 of the subset of point data. In this case, the movement information 2250 may include the movement direction, speed, tracking information, and the like of the object represented by the subset of point data 2110, but the present invention is not limited thereto.

Also, the movement information 2250 may be generated by defining a correspondence relationship between the positions of the same object in successive frames. Here, defining the correspondence relationship between the positions of the same object in successive frames means specifying the same object in each of the successive frames, acquiring position information of the specified object, and associating the acquired position information with a position of the specified object with time.

For example, the movement information 2250 may be generated by the controller 1100 through a predetermined algorithm. The algorithm may include acquiring a first set of point data corresponding to a first frame of at least one sensor, acquiring a second set of point data corresponding to a second frame following the first frame, extracting a first subset of point data representing a first object included in the first set of point data, extracting a second subset of point data representing the first object included in the second set of point data, defining a correspondence relationship between the subsets of point data on the basis of similarity in distance or shape between the first subset of point data and the second subset of point data, and generating a movement direction, speed, and the like of the first object on the basis of position information of the subsets of point data, but the present invention is not limited thereto.

Also, by accumulating the movement directions and speeds of the first object which are generated for a plurality of frames, the controller 1100 may generate tracking information of the first object.

Also, referring to FIG. 23, the property data 2200 may include an identification information 2260 of the subset of point data. In this case, the identification information 2260 may be generated to distinguish the subset of point data 2110 from other sets of point data.

Also, the identification information 2260 may be generated to express that a plurality of pieces of point data included in the subset of point data 2110 represent the same object. In detail, the identification information 2260 may include a common ID of the subset of point data 2110. Also, the ID may be generated for each of a plurality of pieces of point data included in the subset of point data 2110. In this case, the ID may be expressed with at least one serial number, but the present invention is not limited thereto.

Hereinafter, a method of the autonomous driving system 1000 controlling a vehicle using the sensor data 2000 will be described.

2.3. Vehicle Control Using Sensor Data

The controller 1100 included in the vehicle equipped with the autonomous driving system 1000 may control the vehicle using sensor data acquired from the at least one sensor 1300. For example, the controller 1100 may match the sensor data to a high-precision map (or a high-definition (HD) map), control the direction and speed of the vehicle, or control the path of the vehicle, but the present invention is not limited thereto. Here, the high-definition map refers to a map in which a immovable object or a dynamic object is shown with high precision (e.g., precision at the level of a centimeter) for driving a vehicle and may be expressed in 2D or 3D.

Hereinafter, a specific embodiment of vehicle control using the sensor data will be described.

2.3.1. Matching of Sensor Data to High-Definition Map

The controller 1100 included in the autonomous driving system 1000 may update a high-definition map by matching sensor data 2000 to the map. In detail, the controller 1100 may match position information of at least one object acquired from the at least one sensor 1300 to a high-definition map 1420 downloaded from the outside. Here, details on how to generate the high-definition map 1420 have been described in Section 1.3.5, and thus will be omitted here.

Figure 29:
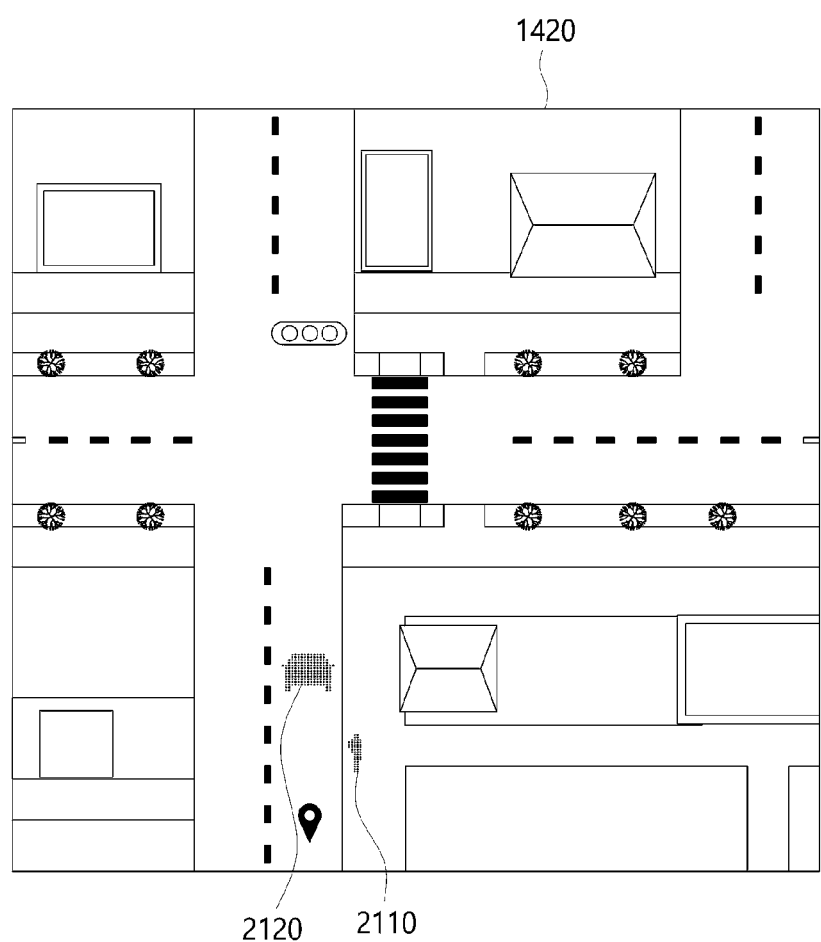
FIG. 29 is a diagram showing that an autonomous driving system matches a subset of point data acquired from a sensor to a high-definition map according to an embodiment.

FIG. 29 is a diagram showing that an autonomous driving system matches a subset of point data acquired from a sensor to a high-definition map according to an embodiment.

Referring to FIG. 29, the controller 1100 may match a plurality of subsets of point data 2110 and 2120 acquired from the at least one sensor 1300 to the high-definition map 1420 and then display the matching result. In detail, the controller 1100 may compare position information included in the plurality of subsets of point data 2110 and 2120 to position information of environments surrounding the plurality of subsets of point data in the high-definition map 1420, match the plurality of subsets of point data 2110 and 2120 to the high-definition map 1420, and display the matching result.

For example, the controller 1100 may match a first subset of point data representing at least a portion of a human and a second subset of point data representing at least a portion of a vehicle to the high-definition map 1420.

Figure 30:
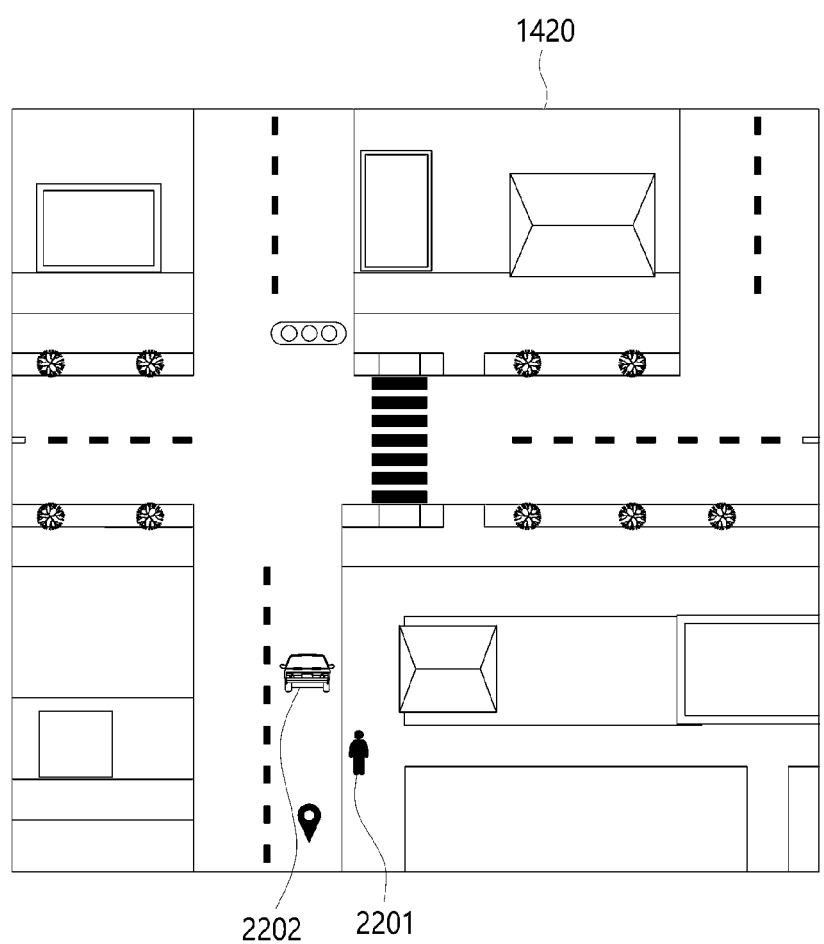
FIG. 30 is a diagram showing that an autonomous driving system matches property data of an object to a high-definition map according to an embodiment.

FIG. 30 is a diagram showing that an autonomous driving system matches property data of an object to a high-definition map according to an embodiment.

Referring to FIG. 30, the controller 1100 may match a plurality of pieces of property data 2201 and 2202 generated based on the plurality of subsets of point data 2110 and 2120 to the high-definition map 1420 and display the matching result.

More specifically, the controller 1100 may generate the plurality of pieces of property data 2201 and 2202 without matching the plurality of subsets of point data 2110 and 2120 acquired from the at least one sensor 1300 to the high-definition map 1420. In this case, the controller 1100 may match the plurality of pieces of property data 2201 and 2202 to the high-definition map 1420 and display the matching result.

For example, the controller 1100 may generate first property data 2201 on the basis of the first subset of point data 2110 representing at least a portion of a human and generate second property data 2202 on the basis of the second subset of point data 2120 representing at least a portion of a vehicle. Here, the first property data 2201 includes shape information of the human, and the second property data 2202 includes shape information of the vehicle. Thus, the controller 1100 may match the plurality of pieces of shape information to the high-definition map 1420 and display the matching result.

Also, the plurality of pieces of property data 2201 and 2202 are not limited to the shape information and may refer to various pieces of information included in the property data such as center position information and size information.

Also, the controller may control a vehicle using the high-definition map 1420 to which the plurality of subsets of point data 2110 and 2120 or the plurality of pieces of property data 2201 and 2202 are matched. For example, the controller may determine whether an obstacle is present on the path of the vehicle on the basis of the high-definition map 1420 and may control the speed, direction, or path of the vehicle according to the determination.

2.3.2. Control of Direction and Speed of Vehicle

Also, the controller 1100 included in the autonomous driving system 1000 may control the direction and speed of the vehicle equipped with the autonomous driving system 1000 using the sensor data 2000. In detail, when an obstacle is found on the path of the vehicle through the at least one sensor, the controller 1100 may control the direction and speed of the vehicle in order to avoid the corresponding obstacle. For example, when a pedestrian is detected on the path of the vehicle, the controller 1100 may stop the vehicle or control a steering device to change the direction of the vehicle in order to avoid the pedestrian.

2.3.3. Path Control for Vehicle

Also, the controller 1100 included in the autonomous driving system 1000 may control the path of the vehicle using the sensor data 2000.

Figure 31:
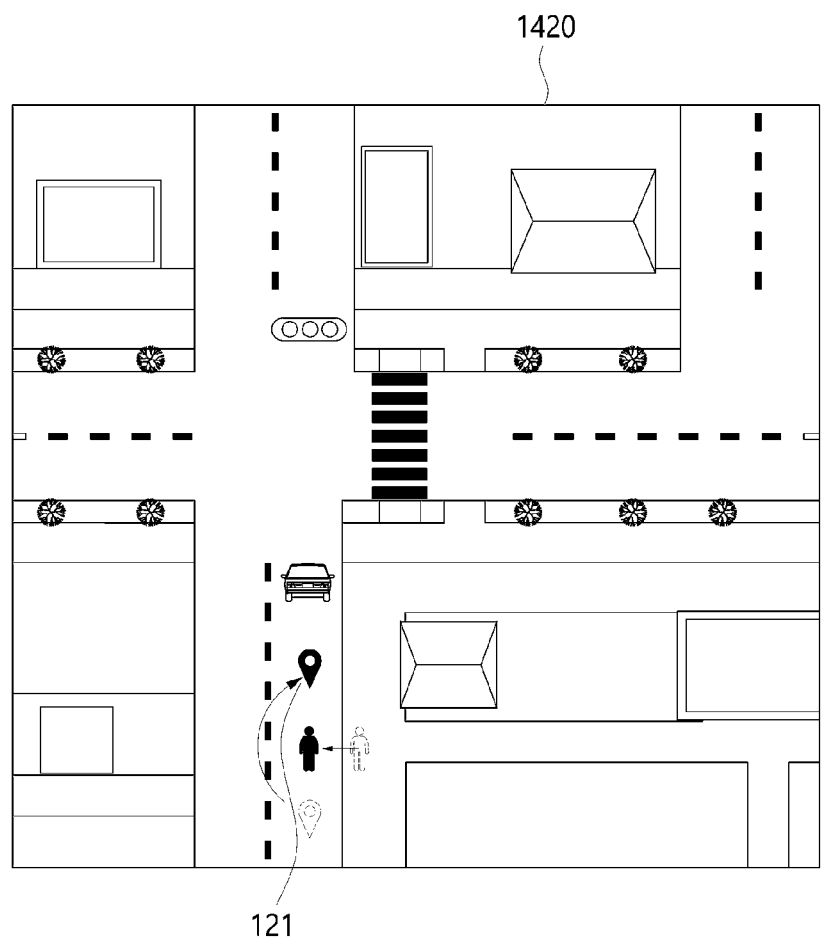
FIG. 31 is a diagram showing a situation in which an autonomous driving system changes a path to avoid an obstacle obstructing the driving of a vehicle according to an embodiment.

FIG. 31 is a diagram showing a situation in which an autonomous driving system changes a path to avoid an obstacle obstructing the driving of a vehicle according to an embodiment.

Referring to FIG. 31, when the movement of a pedestrian is detected on the driving path of a vehicle 121 equipped with the autonomous driving system 1000, the controller 1100 may change the path of the vehicle 121 in order to avoid the pedestrian.

In detail, the controller 1100 may stop the vehicle in order to avoid a collision between the vehicle 121 and the pedestrian. However, the present invention is not limited thereto, and the controller 1100 may modify the path of the vehicle so that the vehicle can travel away from the pedestrian. Vehicle path planning will be described in detail below (in Section 5.2.2.2.).

3. Data Sharing System

A data sharing system according to an embodiment may include a first device and a second device, each of which includes a communication module. Also, the first device may share data with the second device. In this case, the type of sharing data is not limited and may include sensor data.

For example, a vehicle equipped with an autonomous driving system may share data with other devices using the data sharing system in order to avoid a risk that may occur during the driving of the vehicle.

3.1. Data Sharing Entity

A device including at least one communication module may be a data sharing entity. In detail, the data sharing entity may be a transmission entity that transmits data or a reception entity that receives data. Also, the data sharing entity may include a vehicle, an infrastructure device, a server, etc., but the present invention is not limited thereto. Also, the data sharing entity may include a plurality of sensors included in one device or a plurality of sensors included in different devices.

Figure 32:
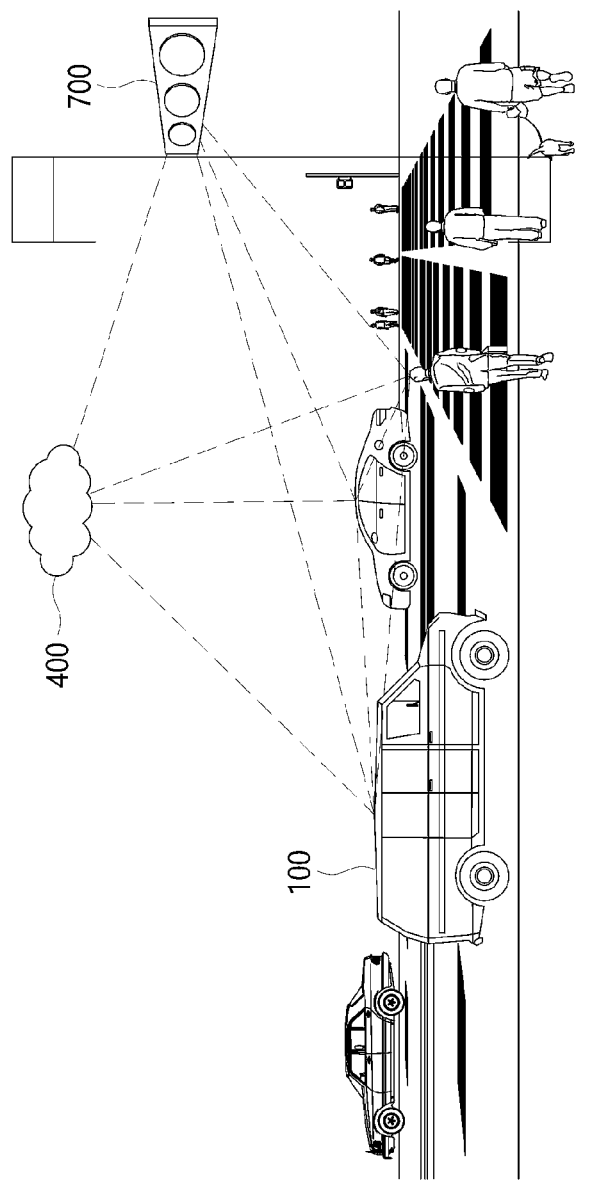
FIG. 32 is a diagram showing a situation in which data is shared between a plurality of devices according to an embodiment.

FIG. 32 is a diagram showing a situation in which data is shared between a plurality of devices according to an embodiment.

Referring to FIG. 32, a plurality of devices 100, 400, and 700 may share data with each other. In this case, the plurality of devices 100, 400, and 700 may include at least one communication module 1200 to perform communication. In this case, the plurality of devices may include a vehicle 100, an infrastructure device 700, a server (cloud) 400, a mobile device, etc., but the present invention is not limited thereto.

For example, the vehicle 100 may share data with other devices through a V2V system. Also, the vehicle 100 may share data with the infrastructure device 700 through a V2I system. Also, the vehicle 100 may share data with the server 400 through a V2C system.

In this case, the vehicle 100 may transmit sensor data 2000 acquired from at least one sensor 1300 included in the vehicle 100 to another vehicle, the infrastructure device 700, or the server 400. Also, the vehicle 100 may receive sensor data from the other vehicle, the infrastructure device 700, or the server 400.

3.2. Data Sharing Time

Also, data sharing between a plurality of devices each including at least one communication module may be performed at different times depending on the situation. For example, the time of data sharing between the plurality of devices may include a communication start time point, a specific-event occurrence time point, or the like, but the present invention is not limited thereto.

As a specific example, the time of data sharing between a first device and a second device may correspond to a start time point of communication between the first device and the second device. In this case, when the distance between the first device and the second device reaches an available communication distance, the first device and the second device may start communication and may share data when the communication is started.

As another example, the data sharing between the first device and the second device may be performed when the first device is located within a certain range from the second device. In this case, the certain range may be different from the available communication distance and may be preset by controllers of the first device and the second device or an external server.

As still another example, the data sharing between the first device and the second device may be performed when an event related to the first device occurs. In detail, it is assumed that an accident occurs in relation to the first device, upon the occurrence of the accident, the second device may transmit data related to the accident to the first device.

As yet another example, the data sharing between the first device and the second device may be performed when the first device receives a data request message from the second device. In detail, the second device may transmit a data request message to the first device, and the first device may transmit data to the second device in response to the request message.

As yet another example, the data sharing between the first device and the second device may be performed when the first device gains approval for data transmission from an external server. In detail, the first device may obtain permission for transmission of data related to personal information from an external server before transmitting the data related to the personal information, and the first device may transmit the data to the second device when the external server approves data transmission.

As yet another example, the data sharing between the first device and the second device may be performed when the first device enters a specific region. In detail, when the first device enters a specific regulation region such as a child protection zone, the second device may transmit data related to the specific region to the first device.

As yet another example, the data sharing between the first device and the second device may be performed when a user of the first device enters an input related to data sharing. In detail, when the first device receives an input for sharing data with the second device from a user who is in the first device, the first device and the second device may transmit or receive data.

Hereinafter, sharing data transmitted or received when data is shared will be described in detail.

3.3. Sharing Data

3.3.1. Definition of Sharing Data

In the specification, sharing data 3000 may be defined as a concept including all sharing data when the data is shared between two or more devices. In this case, a first device may transmit the sharing data 3000 to a second device. Also, the first device may receive the sharing data 3000 from the second device.

For example, the sharing data 3000 may include sensor data acquired through a sensor placed in the first device, but the present invention is not limited thereto.

3.3.2. Content of Sharing Data

The content of the sharing data may be understood as a concept including the content or type of data included in the sharing data 3000. In other words, the content of the sharing data forms the sharing data 3000, and the sharing data 3000 is determined according to the type of the data included in the content of the sharing data.

Figure 33:
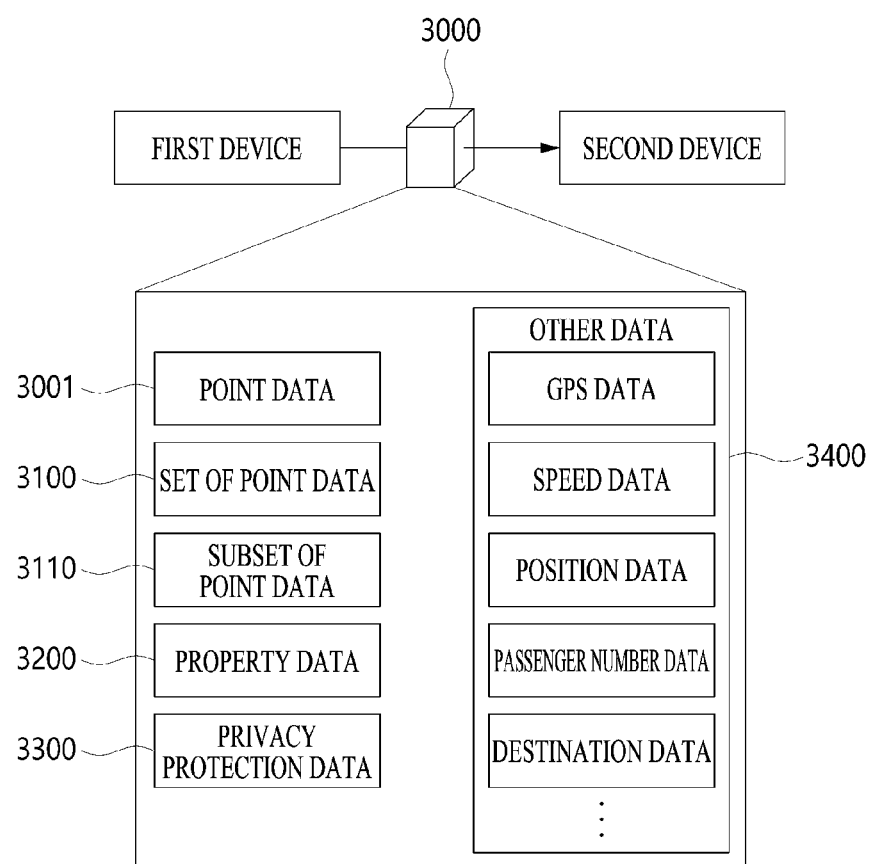
FIG. 33 is a diagram showing the types of content of sharing data that may be included in sharing data according to an embodiment.

FIG. 33 is a diagram showing the content types of sharing data which may be included in the sharing data according to an embodiment.

Figure 34:
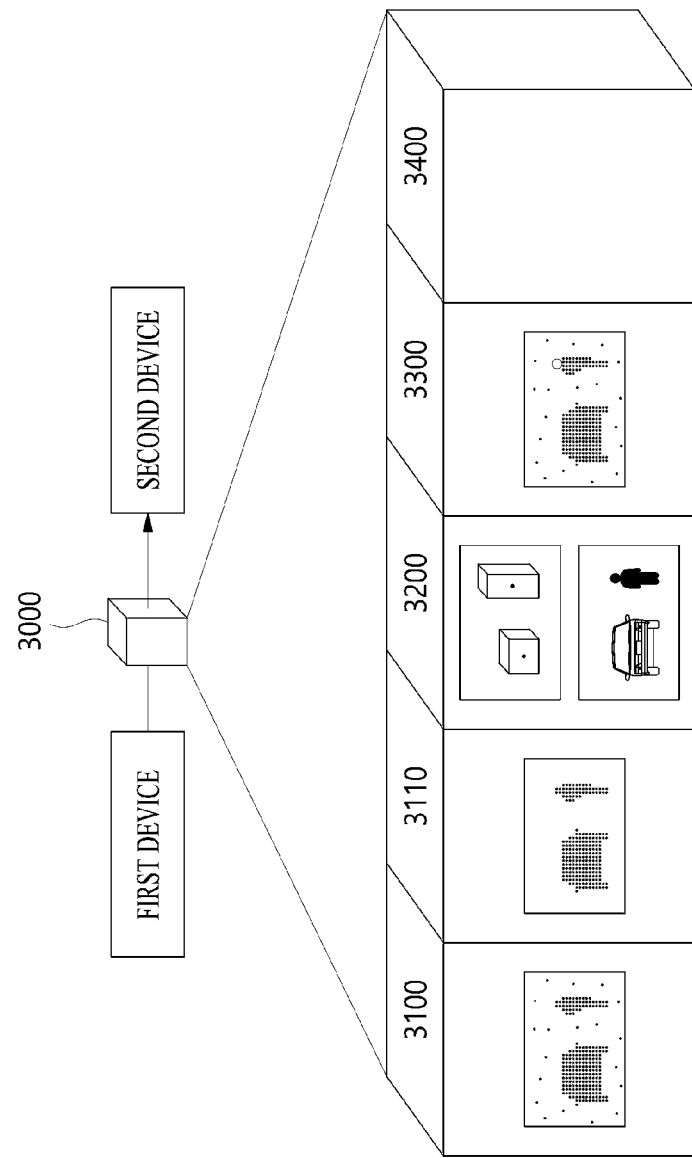
FIG. 34 is a diagram specifically showing the content of sharing data of FIG. 33.

FIG. 34 is a diagram specifically showing the content of the sharing data of FIG. 33.

Referring to FIGS. 33 and 34, the sharing data 3000 may include various types of data as content.

For example, the content of the sharing data may include sensor data 2000 acquired from at least one sensor. In other words, a controller included in the first device may generate sharing data 3000 on the basis of the sensor data 2000. In this case, the content of the sharing data may include a set of point data 3100, point data 3101, a subset of point data 3110, property data 3200, privacy protection data 3300, or the like, but the present invention is not limited thereto. In this case, the privacy protection data 3300 will be described in detail below.

Also, the content of the sharing data may include other data including information regarding a data sharing entity. For example, a vehicle including the at least one communication module 1200 may share the sharing data 3000 including information regarding the vehicle with other devices. For example, the content of the sharing data may include the other data 3400 in addition to the sensor data 2000, and the other data 3400 may include the destination, speed, and size of the vehicle, the number of occupants in the vehicle, etc., but the present invention is not limited thereto.

3.4. Processing of Received Sharing Data

A device which has received the sharing data 3000 may generate various pieces of information using the sensor data 2000 and the sharing data 3000. For example, a device which has received the sharing data 3000 may recognize an object represented by the sensor data 2000 and the sharing data 3000 using the sensor data 2000 and the sharing data 3000.

Figure 35:
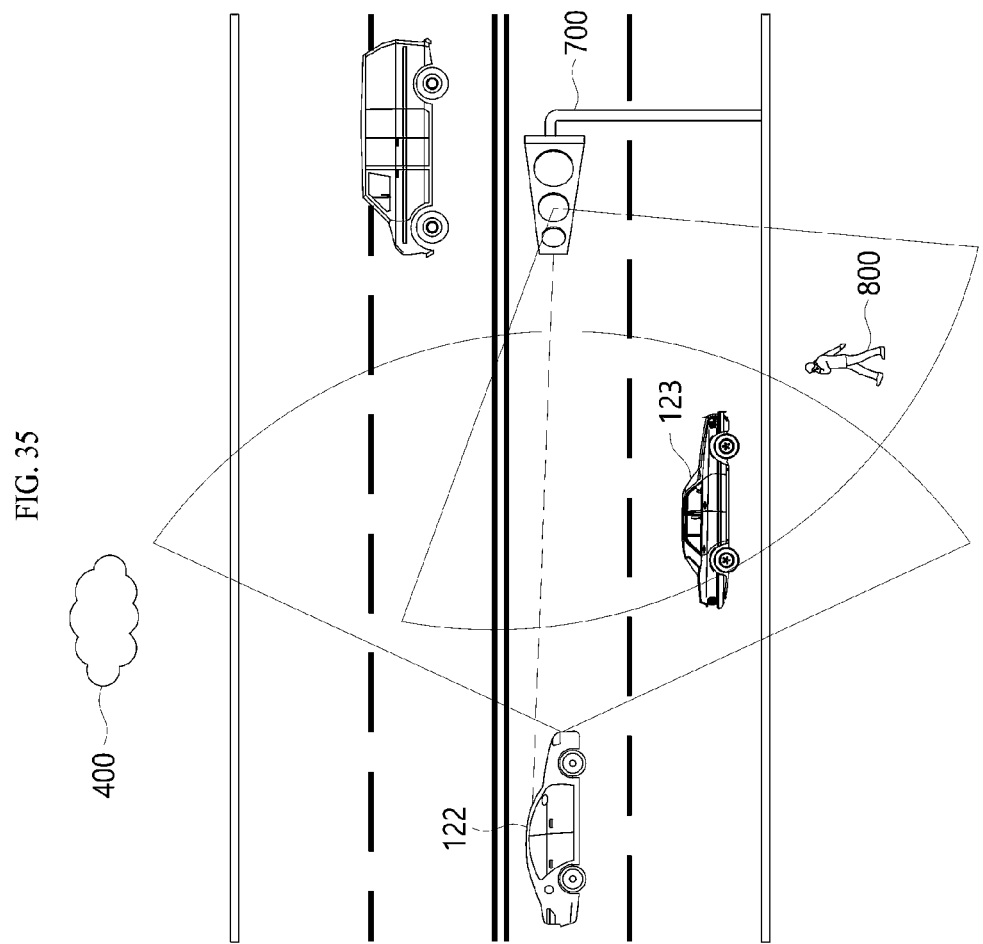
FIG. 35 is a diagram showing a situation in which sensor data is shared between a vehicle and an infrastructure device.

FIG. 35 is a diagram showing a situation in which sensor data is shared between a vehicle and an infrastructure device.

Referring to FIG. 35, a first vehicle 122 and an infrastructure device 700 may share sensor data acquired through at least one sensor (e.g., a LiDAR device) each included in the first vehicle 122 and the infrastructure device 700.

3.4.1. Method of Processing Received Sharing Data According to Type

Referring to FIG. 35 again, the infrastructure device 700 may transmit sharing data 3000 including sensor data acquired through at least one sensor to the first vehicle 122.

For example, the infrastructure device 700 may transmit sharing data including a set of point data or transmit sharing data 3000 including property data. However, the present invention is not limited thereto, and the content of the sharing data may or may not include both of the set of point data and the property data. In this case, the first vehicle 122 may process the sharing data 3000 in different manners depending on the type of content of the sharing data.

Hereinafter, embodiments in which the first vehicle 122 processes the sharing data 3000 when the infrastructure device 700 transmits a set of point data and when the infrastructure device 700 transmits property data will be described.

3.4.1.1. Case of Transmitting Set of Point Data

Figure 36:
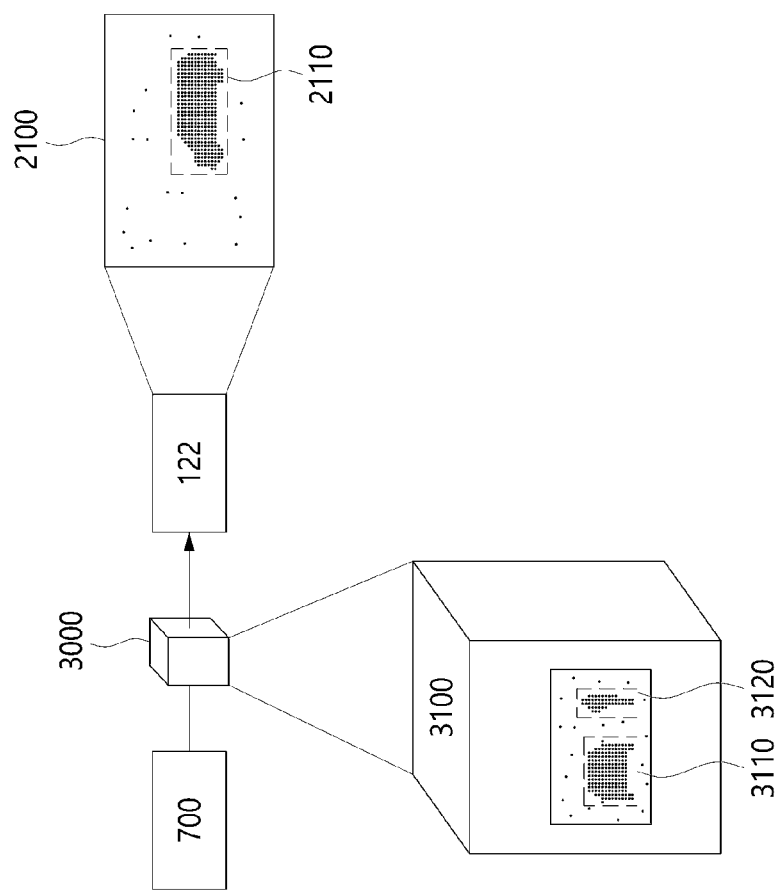
FIG. 36 is a diagram illustrating a situation in which a set of point data is included in the content of sharing data according to an embodiment.

FIG. 36 is a diagram illustrating a situation in which a set of point data is included in the content of sharing data according to an embodiment.

Referring to FIG. 36, the infrastructure device 700 may transmit sharing data 3000 including a first set of point data 3100 acquired from a sensor to the first vehicle 122. In this case, the first set of point data 3100 may include a first subset of point data 3110 representing at least a portion of a second vehicle 123 and a second subset of point data 3120 representing at least a portion of a pedestrian 800.

Also, the first vehicle 122 may acquire a second set of point data 2100 through at least one sensor. In this case, the second set of point data 2100 may include a third subset of point data 2110 representing at least a portion of the second vehicle 123. Also, the pedestrian 800 who is located in the field of view of the sensor of the first vehicle 122 is covered by the second vehicle 123, and thus the second set of point data 2100 may not include a subset of point data representing at least a portion of the pedestrian 800.

Also, through the data sharing system according to an embodiment, the first vehicle 122 may acquire information regarding an object that is not included in the sensor data. For example, when the first vehicle 122 cannot acquire sensor data regarding the pedestrian 800 through at least one sensor, the first vehicle 122 cannot recognize the pedestrian 800, which may cause an unexpected accident related to the first vehicle 122. In order to prevent the above situation, the infrastructure device 700 may share sensor data related to the pedestrian 800, which cannot be acquired by the first vehicle 122, with the first vehicle 122.

FIG. 37 is a diagram illustrating a method of processing, by a first vehicle, a shared first set of point data and a second set of point data according to an embodiment.

Referring to FIG. 37, a controller of the first vehicle 122 may recognize at least one object included in the field of view of a sensor of the first vehicle 122 using a second set of point data 2100 and a shared first set of point data 3100.

In detail, a controller 1100 included in the first vehicle 122 may generate third property data 2201 on the basis of a third subset of point data 2110 included in the second set of point data 2100.

Here, the property data 2201 may include a class information, a center position information, a size information, etc. of the second vehicle 123 which are represented by the third subset of point data 2110, but the present invention is not limited thereto.

Also, the controller 1100 may generate a first property data 3201 and a second property data 3202 on the basis of the first subset of point data 3110 and the second subset of point data 3120 included in the first set of point data received from the infrastructure device 700. In this case, the first property data 3201 may include class information, center position information, size information, etc. of the second vehicle 123 which are represented by the first subset of point data 3110, but the present invention is not limited thereto. Also, the second property data 3202 may include class information, center position information, size information, etc. of the pedestrian 800 which are represented by the second subset of point data 3120, but the present invention is not limited thereto.

Figure 38:
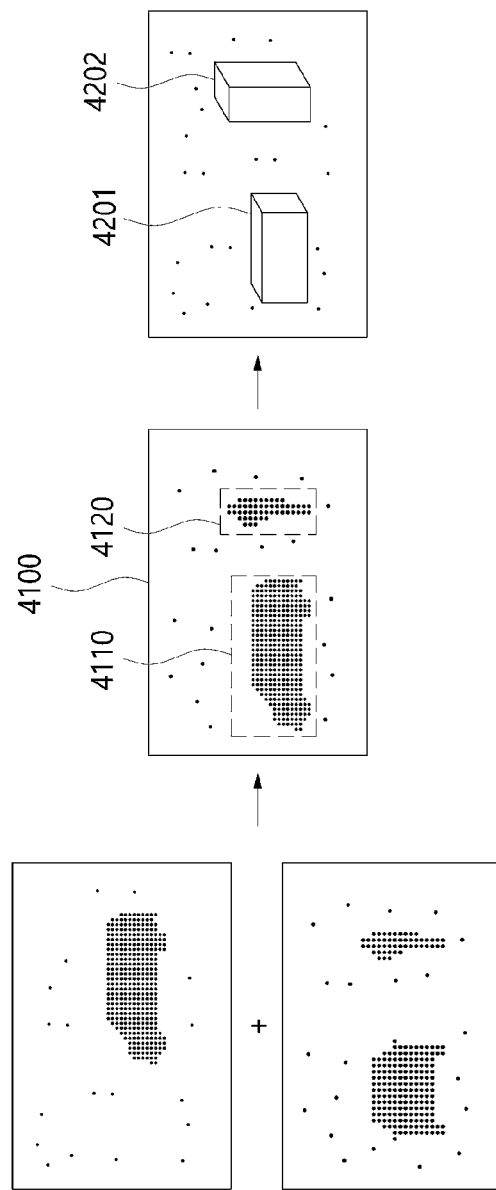
FIG. 38 is a diagram illustrating a method of processing, by a first vehicle, a shared first set of point data and a second set of point data according to another embodiment.

FIG. 38 is a diagram illustrating a method of processing, by a first vehicle, a shared set of point data and a second set of point data according to another embodiment.

Referring to FIG. 38, the controller of the first vehicle 122 may generate a third set of point data 4100 using the second set of point data 2100 and the shared first set of point data 3100 to recognize at least one object included in the field of view of the sensor.

In this case, the third set of point data 4100 may be generated by aligning the coordinate system of the shared first set of point data 3100 with the coordinate system of the second set of point data 2100. The coordinate system alignment will be described in detail below (in Section 3.4.2.).

Also, the third set of point data 4100 may include a fourth subset of point data 4110 representing the second vehicle 123 and a fifth subset of point data 4120 representing the pedestrian 800.

Also, the controller 1100 may generate fourth property data 4201 on the basis of the fourth subset of point data 4110 and may generate fifth property data 4202 on the basis of the first subset of point data 4120. In this case, the fourth property data 4201 may include class information, center position information, size information, etc. of the second vehicle 123 which are represented by the fourth subset of point data 4110, but the present invention is not limited thereto. Also, the fifth property data 4202 may include class information, center position information, size information, etc. of the pedestrian 800 which are represented by the fifth subset of point data 4120, but the present invention is not limited thereto.

3.4.1.2. Case of Receiving Property Data

Figure 39:
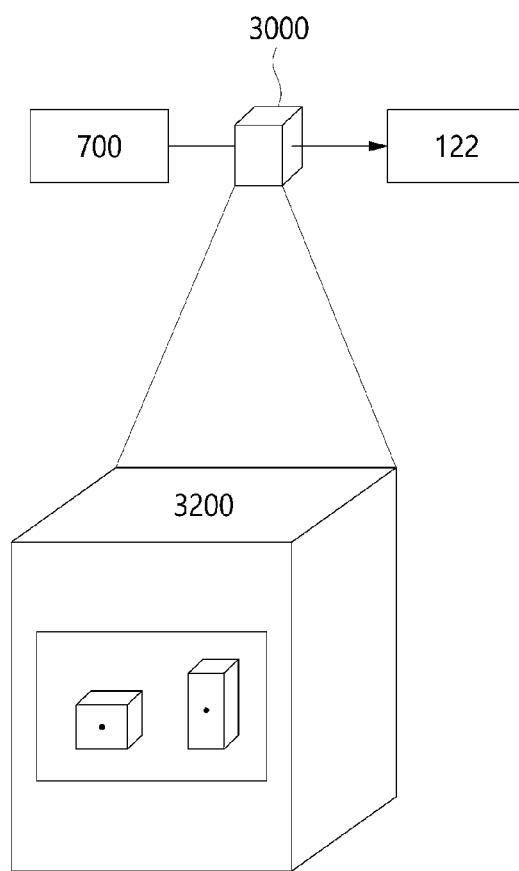
FIG. 39 is a diagram illustrating a situation in which property data is included in the content of sharing data according to an embodiment.

FIG. 39 is a diagram illustrating a situation in which property data is included in the content of sharing data according to an embodiment.

Referring to FIG. 39, the infrastructure device 700 may transmit, to the first vehicle 122, sharing data 3000 including a plurality of pieces of property data 3200 generated based on a plurality of subsets of point data included in a set of point data acquired from a sensor.

When the sharing data 3000 is received, the controller 1100 of the first vehicle 122 may control the first vehicle 122 using the sharing data 3000.

A method in which the first vehicle 122 that has received the sharing data 3000 including the plurality of property data 3200 processes the sharing data 3000 will be described in detail below (in Section 5.).

3.4.1.3. Case of Receiving Event Occurrence-Related Information

Referring to FIG. 35 again, the server 400, the vehicles 122 and 123, and the infrastructure device 700, each of which includes a communication module, may share sharing data 3000 including event occurrence-related information.

For example, the server 400 may transmit event-related information including information indicating that a traffic event has occurred on the path of the first vehicle 122 to the first vehicle 122.

A method in which the first vehicle 122 that has received the sharing data 3000 including the event occurrence-related information processes the sharing data 3000 will be described in detail below (in Section 4.2.).

3.4.2. Coordinate System Alignment for Shared-Data Matching

When a first device receives sharing data from a second device, a controller 1100 of the first device may match the coordinate system of sensor data acquired from a sensor placed in the first device to the coordinate system of the sharing data in order to match the sensor data to the sharing data (data registration).

In this case, the coordinate system may include a Cartesian coordinate system, a polar coordinate system, a cylindrical coordinate system, a homogeneous coordinate system, a curved coordinate system, an inclined coordinate system, a log-polar coordinate system, or the like, but the present invention is not limited thereto.

For example, a first device including a first LiDAR device may acquire first sensor data through the first LiDAR device. Also, a second device including a second LiDAR device may acquire second sensor data through the second LiDAR device. In this case, the first LiDAR device may include a first local coordinate system having a first LiDAR-optical origin as the origin. Also, the second LiDAR device may include a second local coordinate system having a second LiDAR-optical origin as the origin.

Here, when a controller of the second device transmits sharing data including the second sensor data to the first device, the controller of the first device may set the first local coordinate system as a global coordinate system. Also, after receiving the shared second sensor data shown in the second local coordinate system, the controller may align the second local coordinate system with the global coordinate system in order to perform matching on the second sensor data. Also, in some embodiments, the controller may align the second local coordinate system with the first local coordinate system or align the first local coordinate system with the second local coordinate system. It will be appreciated that the first local coordinate system is the same as the second local coordinate system.

Also, in order to align the second local coordinate system with the global coordinate system in a 3D space, the controller may compute a 4×4 transformation matrix with a total of six degrees of freedom (6DOF) by summing a 3D vector for translation and a 3D vector for rotation. Also, the controller may transform the second sensor data shown in the second local coordinate system to the global coordinate system using the transformation matrix.

As an example, when the first device is fixed, the alignment between the second local coordinate system and the local coordinate system may be performed by computing a transformation relationship between the coordinate systems. That is, the controller may transform the sensor data shown in the second coordinate system into the global coordinate system using the transformation matrix to show the sensor data in a unified communication system.

As another example, in order to align the second local coordinate system with the local coordinate system in a 3D space, the controller may use a first object having a unique shape as a criterion for the alignment. For example, the unique shape may include a shape in which three planes meet in the first object, but the present invention is not limited thereto. In detail, the controller may align the second local coordinate system with the local coordinate system on the basis of the position of a first object included in second sensor data shown in the second local coordinate system and the position of the unique shape of a first object included in first sensor data shown in the global coordinate system.

Specifically, the controller may generate an initial position by matching the position of the first object shown in the global coordinate system and the position of the first object shown in the second local coordinate system. In this case, the initial position may be acquired by initially aligning the positions of the unique shape of the first object included in different pieces of sensor data with the global coordinate system. That is, the initial position alignment process may be understood as the initial coordinate system alignment. Also, when position information (e.g., an initial portion) of the first object acquired from different devices shown in the local coordinate system is incorrect, the controller can improve the position information of the first object through optimization. In this case, the controller may use an iterative closest point (ICP) algorithm to optimize the initial position, but the present invention is not limited thereto.

3.5. Vehicle Control Using Sharing Data

A controller included in a vehicle that has received sharing data may control the vehicle using the sharing data and sensor data acquired from a sensor of the vehicle. In this case, it will be appreciated that the embodiment of vehicle control using sensor data, which has been described in Sections 2.3.1 to 2.3.3, can also be implemented using sharing data.

In detail, the controller may match the sharing data, which is received from another device, to a high-definition map included in the vehicle and display the matching result.

Also, the controller may control the direction and speed of the vehicle using the sharing data received from another device.

Also, the controller may control the path of the vehicle using the sharing data received from another device.

4. Selective Sharing of Sensor Data

4.1. Selective Sharing of Sensor Data According to Property Data

A data sharing system according to an embodiment may include a first device and a second device. Also, the first device may transmit sharing data to the second device.

In this case, the content of the sharing data transmitted by the first device may differ depending on an object recognition result included in sensor data acquired by the first device. Here, the object recognition result may refer to a class information of the object.

For example, when the class of the object included in the class information is related to a building, the content of the sharing data may include a subset of point data representing the building. Also, when the class of the object included in the class information is a class in which personal information needs to be protected, the content of the sharing data may include property data of a subset of point data representing the object.

Here, the class in which personal information needs to be protected refers to a class in which personal information may be exposed, such as a human, a vehicle number plate, and an identity document and the class in which personal information needs to be protected may be predetermined by the controller.

That is, the controller of the first device may selectively generate sharing data according to the class information of the object included in the sensor data.

4.1.1. Necessity of Selective Sharing of Sensor Data According to Property Data In the data sharing system according to an embodiment, privacy may be unjustly invaded when data related personal information is randomly shared between a plurality of devices. For example, when a photo including a person's face is transmitted to another device without any processing, his or her privacy may be invaded when shape and color information related to his or her face is shared.

Also, even when the sensor is a LiDAR device, privacy invasion can be an issue. In detail, sensor data acquired from the LiDAR device may include intensity information of an object. Here, since the intensity information includes an intensity value that is different depending on the reflectance of the object, a controller connected to the LiDAR device may determine a human face using the intensity information. Thus, even when sensor data acquired from the LiDAR device is shared between a plurality of devices without being processed, privacy invasion can be an issue. Thus, a method of selectively sharing sensor data according to an object class may be required when the sensor data is shared.

In a data sharing system according to another embodiment, a device including at least one sensor may selectively share sensor data in order for a device for generating a high-definition map to efficiently update the high-definition map. In an embodiment, a high-definition map that is initially generated may require sensor data for movable objects such as people rather than sensor data for immovable objects such as buildings. Accordingly, a device for transmitting the sensor data may select only data related to immovable objects from the sensor data and transmit the data to the device for generating the high-definition map.

In the data sharing system according to still another embodiment, information on immovable objects may be prestored in a high-definition map. In this case, the device for transmitting the sensor data may select only data related to movable objects from the sensor data and transmit the data to the device for generating the high-definition map. In this case, the device for generating the high-definition map may generate a high-definition map including both of an immovable object and a movable object by additionally acquiring data related to the mobile object in addition to the prestored information on the immovable objects.

4.1.2. Various Embodiments of Selective Sharing Method of Sharing Data Including Privacy Protection Data In order to solve the above-described privacy invasion issue, the sharing data may include privacy protection data. Here, the privacy protection data may be data obtained by processing a personal information identification-related part in a plurality of subsets of point data included in a set of point data. The privacy protection data will be described in detail below (in Section 4.1.2.1.3.).

4.1.2.1. Selective Sharing Method According to Embodiment

A data sharing system according to an embodiment may include a first device and a second device, each of which includes at least one communication module for performing communication. In this case, the first device and the second device may include a vehicle, a server, an infrastructure device, a mobile device, or the like, but the present invention is not limited thereto.

Figure 40:
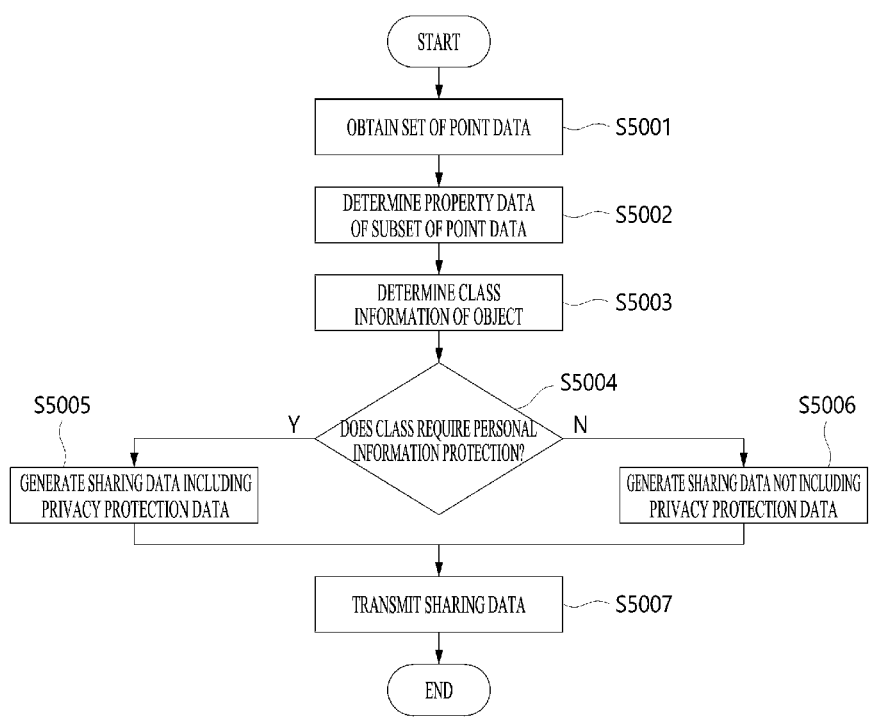
FIG. 40 is a flowchart illustrating a selective sharing method of sensor data according to an embodiment.

FIG. 40 is a flowchart illustrating a selective sharing method of sensor data according to an embodiment.

Referring to FIG. 40, a controller of a first device may obtain a set of point data 2100 through at least one sensor (S5001). In this case, the set of point data 2100 may correspond to a point cloud acquired through a LiDAR device. Also, the first device may include a vehicle, an infrastructure device, a server, a mobile device, etc., but the present invention is not limited thereto.

Also, the controller may determine property data of a plurality of subsets of point data included in the set of point data (S5002).

Also, the controller may determine class information of an each object represented by each of the plurality of subsets of point data (S5003).

Also, the controller may change the content of the sharing data according to whether the class of the object included in the class information is a class in which personal information needs to be protected (S5004).

Also, the controller may generate sharing data including privacy protection data when the class of the object included in the class information is a class in which personal information needs to be protected (S5005) and may generate sharing data not including privacy protection data when the class of the object included in the class information is not a class in which personal information needs to be protected (S5006).

Also, the controller may transmit the generated sharing data to a second device (S5007).

The operations described in FIG. 40 will be described in detail below on the assumption that the first device is a first vehicle 124.

4.1.2.1.1. Acquisition of Sensor Data

Referring to FIG. 40 again, a controller of the first vehicle 124 may obtain a set of point data through at least one sensor (S5001). In this case, the set of point data may include a plurality of pieces of point data. Also, the set of point data may include a plurality of subsets of point data representing at least a portion of an object. Also, the at least one sensor may include a LiDAR device, a camera device, a radar device, an ultrasonic sensor, or the like, but the present invention is not limited thereto.

Figure 41:
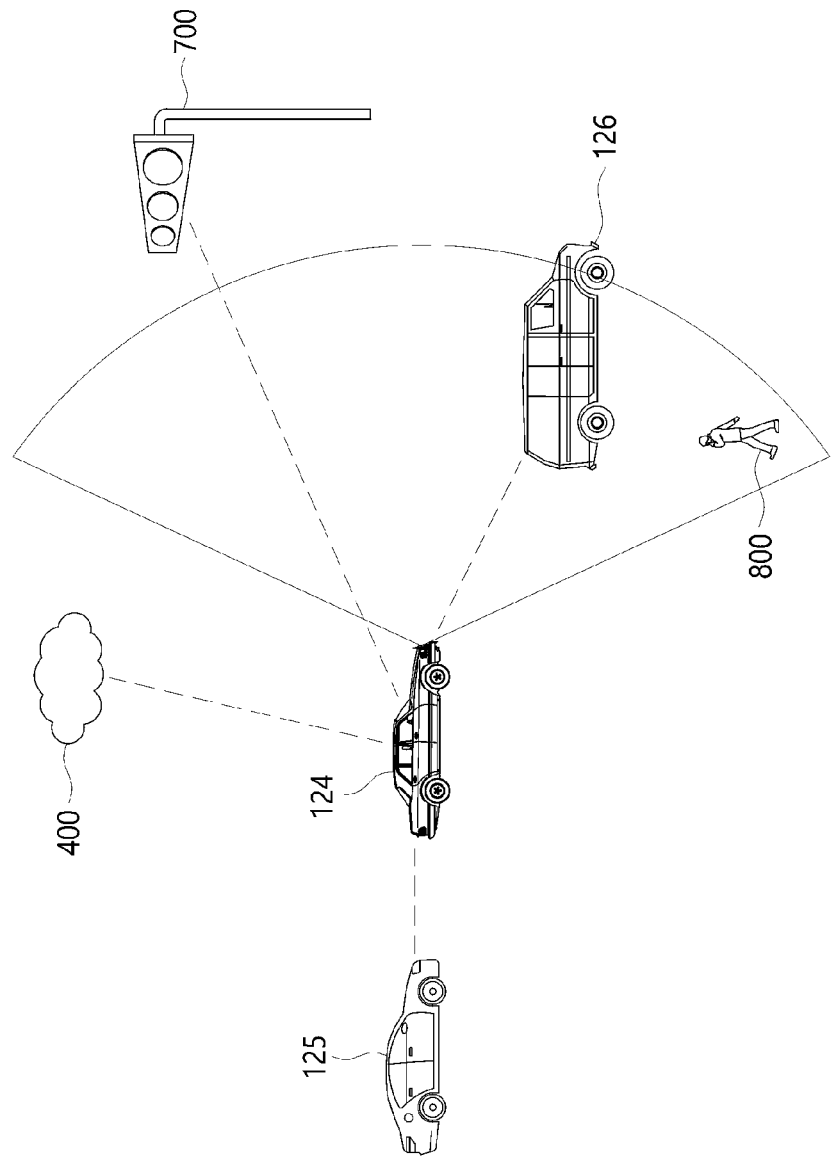
FIG. 41 is a diagram showing a situation in which a first vehicle acquires sensor data to selectively share the sensor data according to an embodiment.

FIG. 41 is a diagram showing a situation in which a first vehicle acquires sensor data to selectively share the sensor data according to an embodiment.

Figure 42:
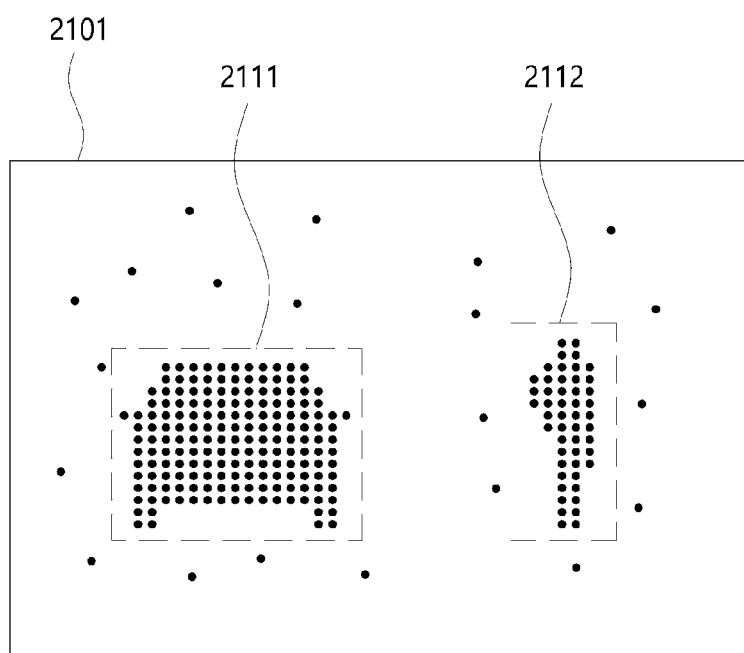
FIG. 42 is a diagram schematically representing, in a 2D plane, the sensor data acquired by the first vehicle through a LiDAR device according to FIG. 41.

FIG. 42 is a diagram schematically representing the sensor data acquired by a first vehicle through a LiDAR device in FIG. 41 in a 2D plane.

Referring to FIGS. 41 and 42, the controller of the first vehicle 124 may acquire a set of point data 2101 including a plurality of subsets of point data 2111 and 2112 through at least one sensor.

In this case, the controller of the first vehicle 124 may extract the plurality of subsets of point data 2111 and 2112 included in the set of point data 2101 and may determine property data including class information of the plurality of subsets of point data 2111 and 2112 (S5002, S5003).

In detail, the controller may extract a first subset of point data 2111 representing at least a portion of a third vehicle 126 and a second subset of point data 2112 representing at least a portion of a pedestrian 800 from the set of point data 2101.

Also, the controller may acquire the first subset of point data 2111 and the second subset of point data 2112 in the scheme described in Section 2.2.3.

Figure 43:
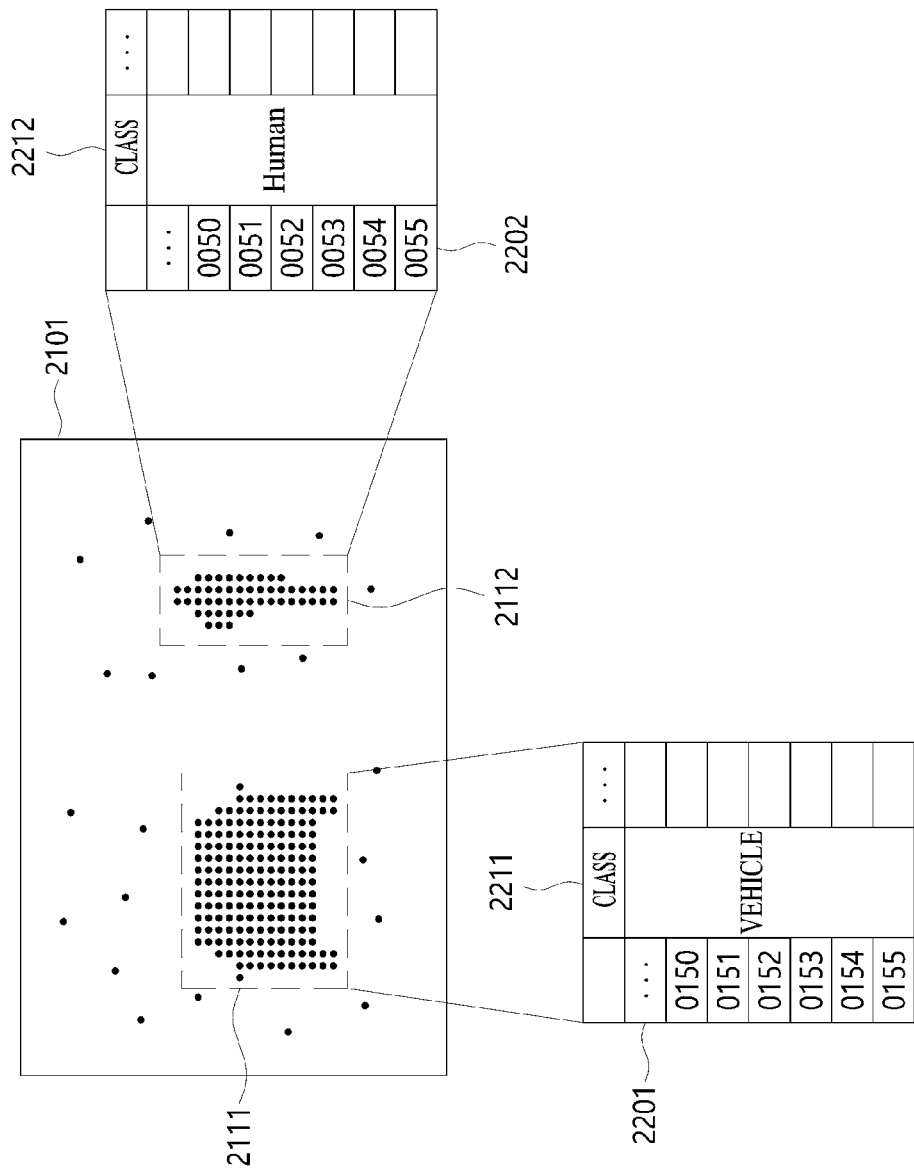
FIG. 43 is a diagram showing class information and property data of a plurality of subsets of point data included in sensor data according to an embodiment.

FIG. 43 is a diagram showing class information and property data of a plurality of subsets of point data included in sensor data according to an embodiment.

Referring to FIG. 43, the controller may determine a plurality of pieces of property data 2201 and 2202 corresponding to the plurality of subsets of point data 2111 and 2112 on the basis of the plurality of subsets of point data 2111 and 2112, respectively.

More specifically, the controller may determine first property data 2201 including first class information 2211 on the basis of the first subset of point data 2111. In this case, the first class information 2211 may represent "vehicle." However, the present invention is not limited thereto, and the first class information 2211 may be determined as "passenger car," which is a subclass of "vehicle."

Also, the controller may determine second property data 2202 including second class information 2212 on the basis of the second subset of point data 2120. In this case, the second class information 2212 may represent "human." However, the present invention is not limited thereto, and the second class information 2212 may be determined as "pedestrian," which is a subclass of "human."

Also, the controller may acquire a plurality of pieces of property data 2201 and 2202 including a plurality of pieces of class information 2211 and 2212 in the scheme described in Section 2.2.4.

4.1.2.1.2. Selective Generation and Sharing of Sharing Data

Also, the controller may generate sharing data 3000 in order to transmit the sensor data 2000 to a second device.

In this case, in order not to share data related to privacy, a criterion for determining the content of the sharing data may be required. For example, the sharing data 3000 may be generated differently depending on class information of a plurality of subsets of point data 2111 and 2112 included in the sensor data 2000. Here, the controller may determine the content of the sharing data according to whether the class information is related to personal information identification. However, the present invention is not limited thereto, and the controller may determine the content of the sharing data on the basis of the plurality of pieces of property data 2201 and 2202.

Figure 44:
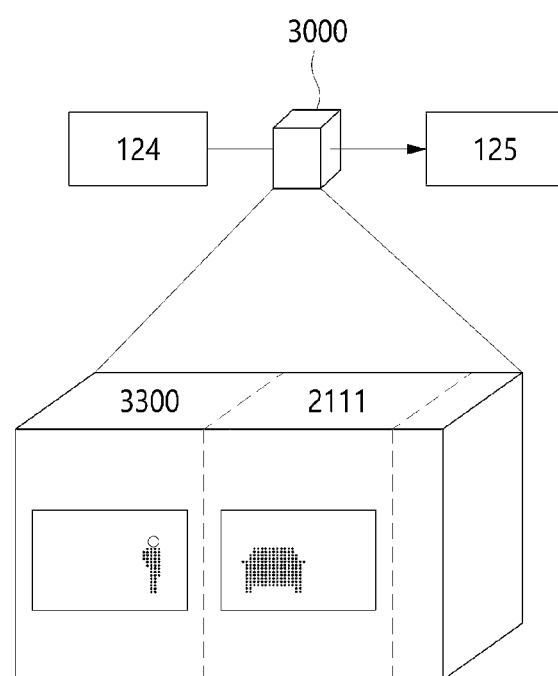
FIG. 44 is a diagram showing the content of sharing data transmitted by a first vehicle according to an embodiment.

FIG. 44 is a diagram showing the content of sharing data transmitted by a first vehicle according to an embodiment.

Referring to FIG. 44, the controller of the first vehicle 124 may determine the content of sharing data on the basis of class information of a plurality of objects included in the set of point data 2101.

Also, the controller may determine the content of the sharing data according to whether the property data is related to personal information identification. In detail, the controller may determine the content of the sharing data according to whether the class of an object included in the class information is a class in which personal information needs to be protected.

As an example, the controller may determine the content of sharing data according to whether the class information is related to a human. In this case, the controller may generate sharing data that does not include at least one piece of point data representing a human face. Also, the controller may generate sharing data including data obtained by processing the at least one piece of point data representing the human face.

As another example, the controller may not add data related to a vehicle number plate among sensor data related to a vehicle to the content of the sharing data. Also, the controller may generate sharing data including data obtained by processing at least one piece of point data representing the number plate of the vehicle.

Also, the controller may determine the content of the sharing data according to whether the class information of the object matches at least one class included in a class group related to personal information. In this case, the class group may be a collection of classes including at least one class that satisfies a preset criterion. For example, the class group related to personal information may include a class related to a human, a class related to a number plate, a class related to an identity document, or the like, but the present invention is not limited thereto.

For example, when class information of an object acquired through at least one sensor is determined as "human," the controller may not add a subset of point data representing at least a portion of the object to the content of the sharing data for sharing information on the object. However, the present invention is not limited thereto, and the controller may generate shard data including data obtained by processing a part related to a human face in the subset of point data.

Also, the first vehicle 124 may transmit sharing data to the second device (S5007). In this case, the second device may include vehicles 125 and 126, a server 400, an infrastructure device 700, a mobile device, etc., but the present invention is not limited thereto.

For example, referring to FIG. 44 again, when the second device is a second vehicle 125, the first vehicle 124 may transmit the sharing data 3000 to the second vehicle 125. In this case, the content of the sharing data may include the privacy protection data 3300, the first subset of point data 2111, etc., but the present invention is not limited thereto.

In this case, the content of the sharing data may be determined based on class information of the plurality of subsets of point data 2111 and 2112. In detail, since the class information 2211 of the first subset of point data representing at least a portion of the third vehicle 126 is related to a vehicle, the content of the sharing data may include the first subset of point data 2111. However, the present invention is not limited thereto. Since the number plate of the vehicle may be related to personal information identification, the content of the sharing data may include privacy protection data obtained by processing at least one piece of point data representing the number plate of the vehicle.

Also, since class information of the second subset of point data representing at least a portion of the pedestrian 800 is related to a human, which is a class in which personal information needs to be protected, the content of the sharing data may include the privacy protection data 3300.

4.1.2.1.3. Privacy Protection Data

Also, when a class included in class information of at least one subset of point data included in the set of point data 2101 is a class in which personal information needs to be protected, the controller may generate sharing data 3000 including privacy protection data 3300 (S5005).

In this case, the controller may generate the privacy protection data 3300 in order not to share data related to personal information identification. In other words, the privacy protection data 3300 may be generated to protect privacy.

Also, the privacy protection data 3300 may not include data related to personal information identification. In detail, since the subset of point data includes intensity information of an object, the subset of point data may be data related to personal information identification. Thus, the privacy protection data 3300 may not include a personal information identification-related part of the subset of point data. Also, the privacy protection data 3300 may include property data of the subset of point data. Also, the privacy protection data 3300 may include data obtained by processing the personal information identification-related part of the subset of point data.

Figure 45:
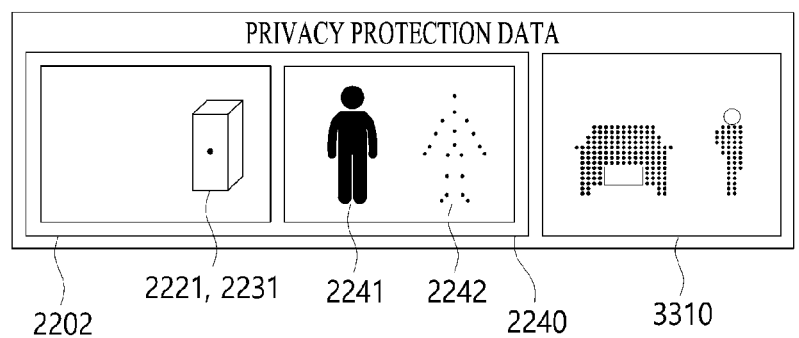
FIG. 45 is a diagram illustrating privacy protection data included in the content of sharing data according to an embodiment.

FIG. 45 is a diagram illustrating privacy protection data included in the content of sharing data according to an embodiment.

Referring to FIG. 45, the privacy protection data 3300 may include the second property data 2202 generated based on the second subset of point data 2112.

For example, the privacy protection data 3300 may include center position information 2221 representing the center position of the pedestrian 800. In detail, the controller may generate privacy protection data 3300 including the center position information representing the center coordinates of a plurality of pieces of point data included in the second subset of point data 2112.

Also, the privacy protection data 3300 may include size information 2231 representing the size of the pedestrian 800. In detail, the controller may generate privacy protection data 3300 including the size information 2231 representing a volume value of the pedestrian 800 represented by the second subset of point data 2112.

Also, the privacy protection data 3300 may include shape information 2240 represented by processing the shape of the pedestrian 800. In detail, the controller may generate privacy protection data 3300 in which the second subset of point data 2112 is replaced with predetermined template information 2241 according to the class information of the second subset of point data 2112. Also, the controller may generate privacy protection data 3300 including skeleton information 2242 representing the second subset of point data 2112 as at least one point.

However, the present invention is not limited thereto, and the privacy protection data 3300 may include at least some of a plurality of pieces of information included in the second property data. For example, the privacy protection data 3300 may include at least some of center position information, size information, movement information, shape information, identification information, and class information of the second subset of point data, but the present invention is not limited thereto.

Referring to FIG. 45 again, the privacy protection data 3300 may include data 3310 obtained by processing at least a portion of the second subset of point data 2112.

For example, the privacy protection data 3300 may include data obtained by pixelating at least some of the plurality of pieces of point data included in the second subset of point data 2112. In detail, the controller may generate privacy protection data 3300 obtained by pixelating at least one piece of point data related to the face of the pedestrian in the second subset of point data 2112 representing at least a portion of the pedestrian 800.

Also, the privacy protection data 3300 may include data obtained by blurring out at least a portion of the second subset of point data 2120. In detail, the controller may generate privacy protection data 3300 obtained by blurring out at least one piece of point data related to the face of the pedestrian 800 in the second subset of point data 2112 representing at least a portion of the pedestrian 800.

Also, the privacy protection data 3300 may include data obtained by adding noise data to at least a portion of the second subset of point data 2112. In detail, the controller may generate privacy protection data 3300 obtained by adding the noise data to a part related to the face of the pedestrian 800 in the second subset of point data 2112 representing at least a portion of the pedestrian 800.

Also, the privacy protection data 3300 may include data obtained by removing at least a portion of the second subset of point data 2112. In detail, the controller may generate privacy protection data 3300 obtained by removing at least some of the plurality of pieces of point data related to the face of the pedestrian 800 from the second subset of point data 2112 representing at least a portion of the pedestrian 800.

Also, the privacy protection data 3300 may include data obtained by removing a subset of point data representing an object with a class in which personal information needs to be protected. For example, the controller may generate privacy protection data 3300 obtained by removing the second subset of point data 2112 representing at least a portion of the pedestrian 800.

Also, the privacy protection data 3300 may include data obtained by deleting intensity information of at least a portion of the second subset of point data 2112. In detail, the controller may generate privacy protection data 3300 in which intensity values of a plurality of pieces of point data related to a human face in the second subset of point data 2112 are set to zero.

Also, when the sensor is a camera device, the privacy protection data 3300 may include data in which a pixel value of the camera device is set to any value. For example, the controller may generate privacy protection data 3300 in which a pixel value of a part representing the face of the pedestrian 800 in the second subset of point data 2112 is adjusted to any value.

However, the present invention is not limited thereto, and the privacy protection data 3300 may include data obtained by processing at least a portion of the second subset of point data 2112 using a predetermined data processing technique. The predetermined data processing technique can be used by those skilled in the art, and thus a detailed description thereof will be omitted.

4.1.2.2. Selective Sharing According to Other Embodiment

A data sharing system according to another embodiment may require approval from a server placed an external institution before transmitting sharing data. For example, the data sharing system may require approval for sharing sensor data itself from an external institution or may require approval for sharing data related to personal information identification included in sensor data from an external institution. In this case, the external institution may include a government institution, a data management institution, etc. However, the present invention is not limited thereto, and the external institution may perform communication through a server.

Figure 46:
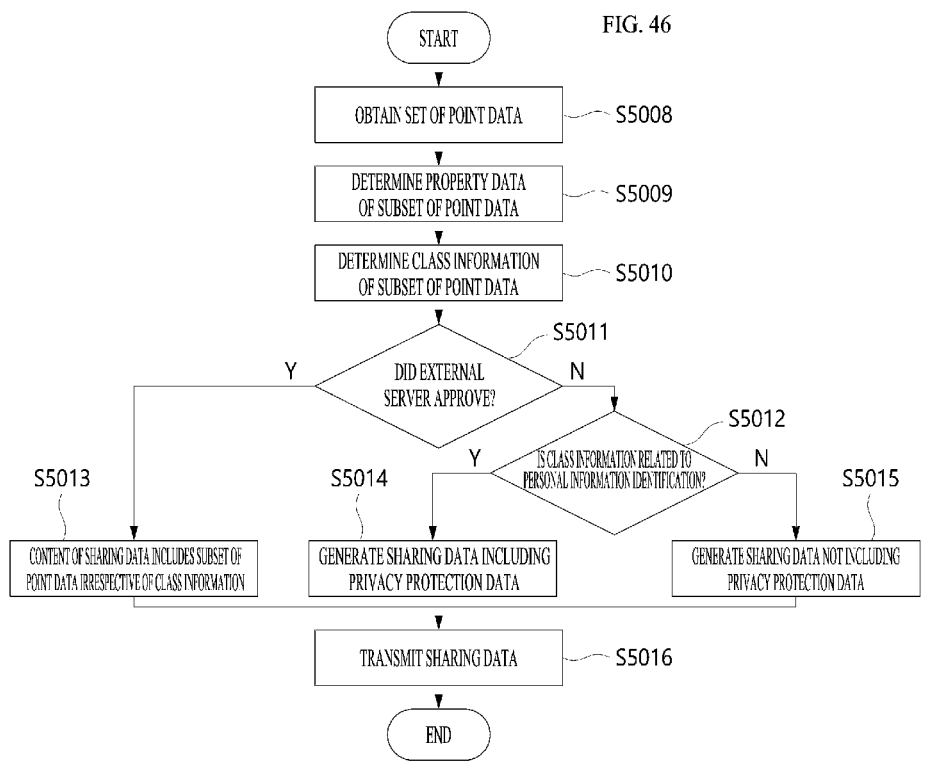
FIG. 46 is a flowchart illustrating a method of selectively sharing data depending on whether approval for data sharing is gained from an external server in a data sharing system according to an embodiment.

FIG. 46 is a flowchart illustrating a method of selectively sharing data depending on whether approval for data sharing is gained from an external server in a data sharing system according to an embodiment.

Referring to FIG. 46, a controller of a first device may acquire a set of point data 2100 through at least one sensor (S5008).

Also, the controller may determine property data of a plurality of subsets of point data included in the set of point data (S5009).

Also, the controller may determine class information of an object represented by each of the plurality of subsets of point data (S5010).

Also, the controller may determine whether approval for transmitting the plurality of subsets of point data to another device is gained from an external server (S5011). In this case, the external server may determine whether there is a need to share the plurality of subsets of point data despite a privacy invasion issue that may arise by transmitting the plurality of subsets of point data. For example, when at least one of the plurality of subsets of point data represents at least a portion of a criminal involved in at least one crime situation, the external server may approve the sharing of a subset of point data representing at least a portion of the criminal.

Also, the controller may request approval for transmitting the sharing data from the external server. In this case, the controller may request the approval while transmitting a subset of point data related to personal information identification to the external server. However, the present invention is not limited thereto, and the controller may request the approval while transmitting property data (e.g., class information) of the subset of point data to the external server. Also, when the approval request is received, the external server may determine whether to approve the transmission of the sharing data.

Also, even when there is no approval request from the controller, the external server may determine whether to approve of the controller transmitting the sharing data.

Also, once the external server approves the transmission of the sharing data, the approval from the external server is no longer needed to share data related to an object represented by a subset of point data included in the content of sharing data. However, the present invention is not limited thereto, and the controller may gain approval from the external server each time the sharing data is transmitted.

Also, when there is approval from the external server, the controller may generate sharing data including the plurality of subsets of point data regardless of the class information of the plurality of subsets of point data (S5013). For example, even when a subset of point data representing at least a portion of a human is included in the plurality of subsets of point data, the controller may generate sharing data including a subset of point data representing at least a portion of the human without generating privacy protection data.

Also, when there is no approval from the external server, the controller may determine whether the class of an object included in the class information is a class in which personal information needs to be protected (S5012).

Also, when the class information is related to personal information identification, the controller may generate sharing data including privacy protection data (S5013).

Also, when the class information is not related to personal information identification, the controller may generate sharing data including no privacy protection data (S5014). Here, the content of the sharing data may include a subset of point data.

Also, the controller may transmit the sharing data to a second device (S5015). In this case, the second device may include a vehicle, a server, an infrastructure device, a mobile device, etc., but the present invention is not limited thereto.

4.1.2.3. Whether to Generate Privacy Protection Data According to Position of Sensor Whether to generate privacy protection data according to an embodiment may be determined depending on the position of at least one sensor that acquires sensor data. For example, the at least one sensor may be placed in a vehicle, but the present invention is not limited thereto.

As a specific example, for a vehicle including an autonomous driving system according to an embodiment, at least one sensor 1300 included in the autonomous driving system 1000 may be placed in the vehicle. In this case, the at least one sensor 1300 may acquire sensor data including position information and shape and/or color information of an occupant of the vehicle.

In this case, a controller of the autonomous driving system may generate privacy protection data regardless of class information of an object included in the sensor data. In detail, when the vehicle is not an unmanned vehicle, it is essential that an occupant gets in the vehicle, and thus the controller may always generate privacy protection data on the basis of the sensor data.

Also, the controller may generate privacy protection data according to whether a subset of point data representing at least a portion of a human is included in the sensor data. In this case, the controller may determine whether a subset of point data with a class related to a human is included in the sensor data by determining class information of the subset of point data as described above. Also, the controller may acquire information regarding whether an occupant is in the vehicle from any device placed in the vehicle. For example, the controller may determine whether an occupant is in the vehicle by acquiring vehicle riding information through a weight detection sensor placed in the vehicle.

Also, the controller 1100 of the vehicle may generate sharing data 3000 for transmitting the sensor data 2000 to another device through at least one communication module 1200. In this case, the content of the sharing data may include privacy protection data 3300. In detail, the controller 1100 may generate privacy protection data 3300 for personal information protection regardless of the class information of an object included in the sensor data.

4.1.2.4. Whether to Generate Privacy Protection Data According to Distance and Intensity Information At least one sensor included in an autonomous driving system using a data sharing system according to an embodiment may include a LiDAR device. In this case, the LiDAR device may acquire intensity information according to the reflectance and distance information of an object located within a field of view. In this case, a controller included in the autonomous driving system may determine whether to generate privacy protection data according to the distance information and the intensity information.

As an example, when an object is spaced a certain distance from the LiDAR device, the controller cannot identify personal information of the object on the basis of sensor data acquired from the LiDAR device. In this case, when a distance between a first device including the controller and a first object included in the sensor data is greater than or equal to a predetermined distance, the controller may not generate privacy protection data regardless of the class of the first object. The predetermined distance may refer to a distance at the personal information of the first object is not identified through the subset of point data regardless of the reflectance of the first object. Also, the controller may preset and store the predetermined distance or set the predetermined distance on the basis of sensor data.

As another example, when the reflectance of an object is low, the controller cannot identify personal information of the object through the LiDAR device. In this case, when an intensity value of a second object is less than or equal to a threshold, the controller may not generate privacy protection data regardless of the class of the second object. In this case, the threshold may refer to an intensity value in which the personal information of the second object is not identified through the subset of point data regardless of distance information of the second object. Also, the controller may preset and store the threshold and set the threshold on the basis of sensor data.

Also, the controller may generate sharing data including at least one of a plurality of subsets of point data representing at least a portion of the first object or the second object and property data of the plurality of subsets of point data.

4.1.2.5. Selective Storing of Sensor Data for Privacy Protection

The embodiments of selectively storing sensor data to protect privacy may be applied to a case of selectively storing the sensor data.

For example, when the class of an object included in the class information of the subset of point data is a class in which personal information needs to be protected, a device that acquires the subset of point data may not store the subset of point data. In this case, the device may generate and store privacy protection data obtained by processing at least a portion of the sub set of point data.

However, the present invention is not limited thereto, and the device may always store the subset of point data regardless of the class information of the subset of point data.

4.1.3. Selective Sharing of Sharing Data to Generate High-Definition Map

4.1.3.1. Selective Sharing Method According to Embodiment

A data sharing system according to an embodiment may include a first device and a second device, each of which includes at least one communication module for performing communication. In this case, the first device and the second device may include a vehicle, a server, an infrastructure device, a mobile device, or the like, but the present invention is not limited thereto.

Figure 47:
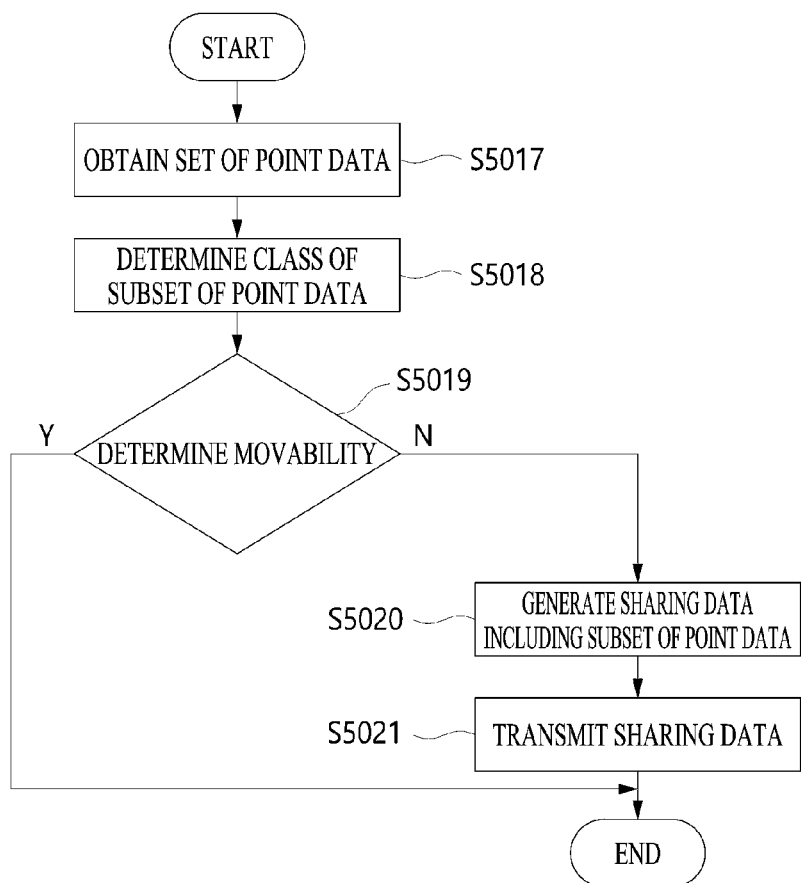
FIG. 47 is a flowchart illustrating a detailed method of selectively sharing sensor data according to another embodiment.

FIG. 47 is a flowchart illustrating a detailed method of selectively sharing sensor data according to another embodiment.

Referring to FIG. 47, a controller of a first device may obtain a set of point data through at least one sensor (S5017).

Also, the controller may determine class information of a subset of point data included in the set of point data (S5018).

Also, the controller may determine whether an object represented by the subset of point data is movable on the basis of the class information (S5019).

Also, when the object cannot move, the controller may generate sharing data including the subset of point data (S5020).

Also, the controller may transmit the sharing data to a second device (S5021).

Hereinafter, each operation will be described in detail.

4.1.3.1.1. Acquisition of Sensor Data

Referring to FIG. 47 again, a controller of a first device may obtain a set of point data through at least one sensor (S5017). Also, the controller may determine class information of a plurality of subsets of point data included in the set of point data (S5018). In this case, the first device may include a vehicle, an infrastructure device, etc., but the present invention is not limited thereto.

Figure 48:
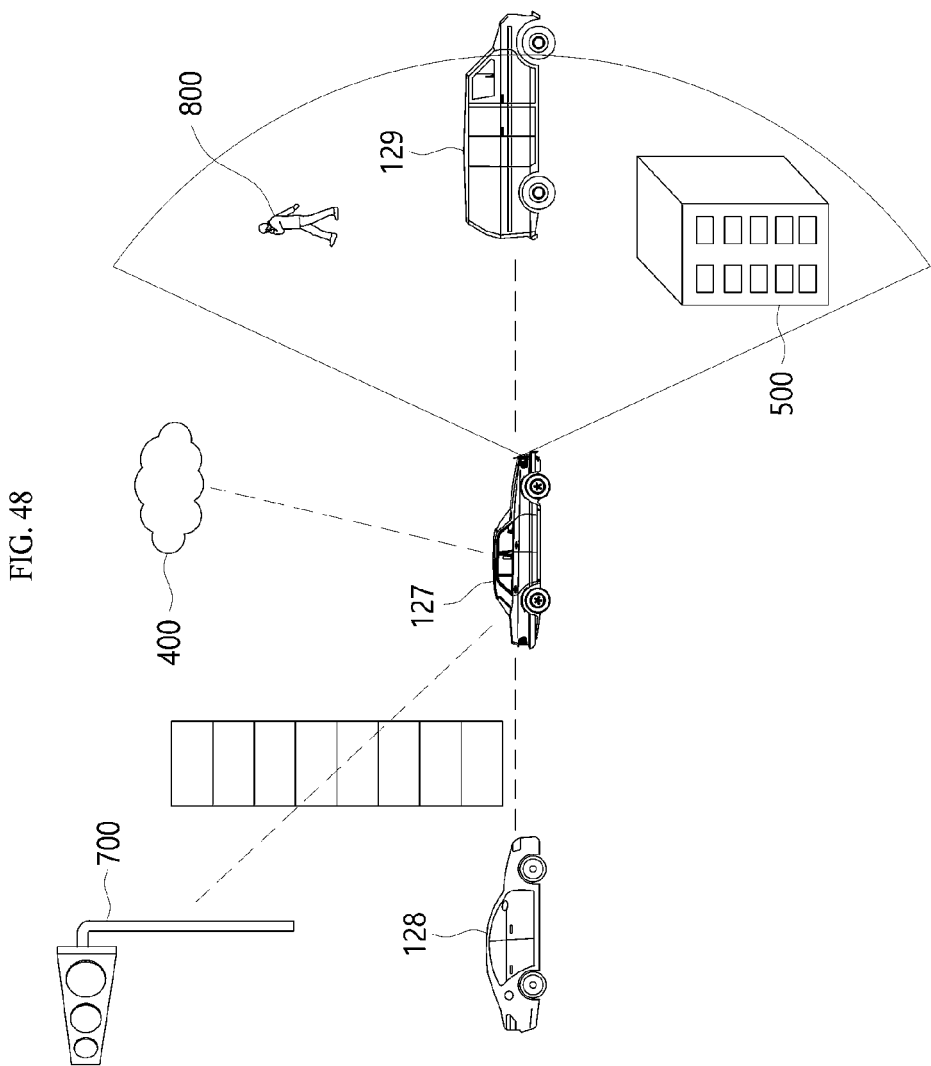
FIG. 48 is a diagram showing a situation in which a first vehicle acquires sensor data to selectively share the sensor data according to an embodiment.

FIG. 48 is a diagram showing a situation in which a first vehicle acquires sensor data to selectively share the sensor data according to an embodiment.

Figure 49:
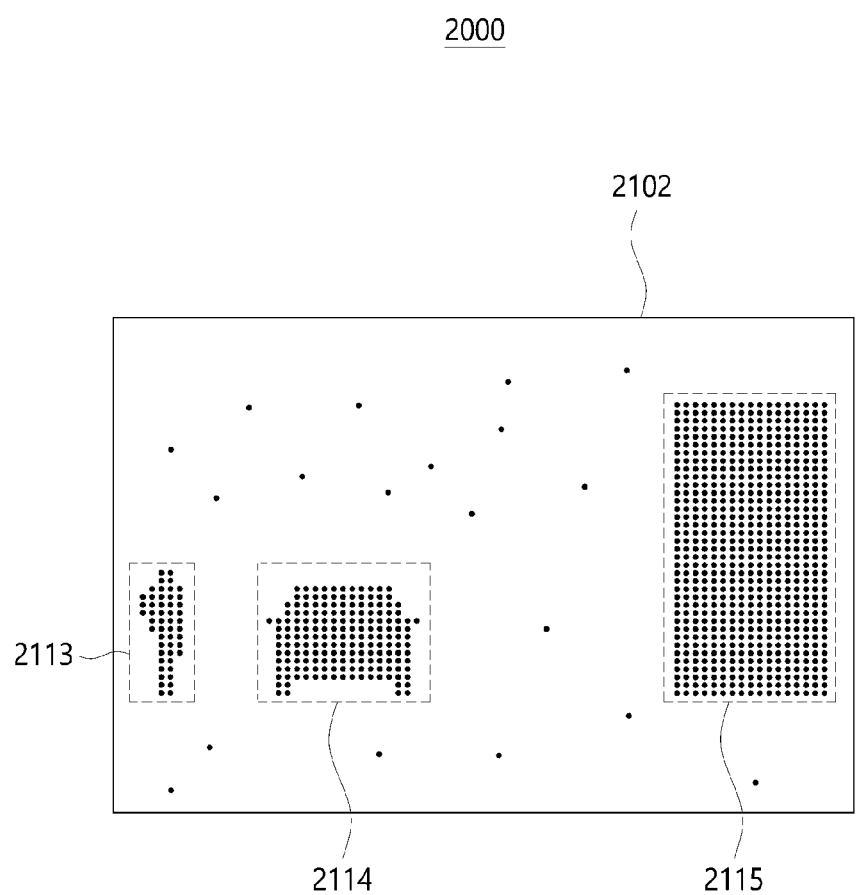
FIG. 49 is a diagram schematically representing sensor data acquired by the first vehicle through a LiDAR device according to FIG. 48 in a 2D plane.

FIG. 49 is a diagram schematically representing sensor data acquired by the first vehicle through a LiDAR device according to FIG. 48 in a 2D plane.

Referring to FIGS. 48 and 49, a controller of a first vehicle 127 may obtain a set of point data 2102 including a plurality of subsets of point data 2113, 2114, and 2115 through at least one sensor.

For example, the controller may extract a first subset of point data 2113 representing at least a portion of a pedestrian 800, a second subset of point data 2114 representing at least a portion of a third vehicle 129, and a third subset of point data 2115 representing at least a portion of a building 500 in the set of point data.

Also, the controller may determine class information of the plurality of subset of point data 2113, 2114, and 2115. For example, the controller may determine that the class information of the first subset of point data 2113 is "human." However, the present invention is not limited thereto, and the controller may determine that the class information is a sub class of "human." Also, the controller may determine that the class information of the second subset of point data 2114 is "vehicle." However, the present invention is not limited thereto, and the controller may determine that the class information is a sub class of "vehicle." Also, the controller may determine that the class information of the third subset of point data 2115 is "building." However, the present invention is not limited thereto, and the controller may determine the class information as a sub class of "building."

4.1.3.1.2. Criterion for Selecting Sharing Data

Also, the controller may determine whether an object represented by the subset of point data is movable on the basis of the class information (S5019).

In detail, in order to selectively share sensor data according to an embodiment, the controller may determine the movability of objects represented by the plurality of subsets of point data 2113, 2114, and 2115.

In this case, whether the objects are movable may be determined based on class information of the objects.

More specifically, referring to FIG. 49, the controller may determine that a pedestrian 800 and a third vehicle 129 are movable objects on the basis of class information of the first subset of point data 2113 representing at least a portion of the pedestrian 800 and the second subset of point data 2114 representing at least a portion of the vehicle 129. Also, the controller may determine that a building 500 is an immovable object on the basis of class information of the third subset of point data 2115 representing at least a portion of the building 500.

As an example, the controller may determine the movability of an object on the basis of whether class information of a subset of point data representing the object is related to an immovable object or is related to a movable object. For example, when the controller determines that the class information of the third subset of point data 2115 is "building," the class information is related to an immovable object. Thus, the controller may determine that the building 500 represented by the third subset of point data 2115 is immovable.

As another example, the controller may pre-classify class information into a movable object and an immovable object and may determine that class information of a subset of point data representing the object is a movable object or an immovable object. For example, the controller may determine that the class information of the third subset of point data 2115 is "immovable object." In this case, the controller may determine that the building 500 represented by the third subset of point data 2115 is immovable.

Also, the controller may determine the content of sharing data according to a class type of an object on the basis of class information of a subset of point data without determining the movability of the object on the basis of the class information of the subset of point data.

In detail, the controller may determine the content of the sharing data according to a predetermined criterion on the basis of the class type of the object included in the class information of the subset of point data. That is, a predetermined criterion for determining the content of the sharing data may be predetermined for each class type of the object.

As an example, the content of the sharing data may not include the first subset of point data when the class type of the object included in the class information of the first subset of point data is "human" or "vehicle" and may include the second subset of point data when the class type of the object included in the class information of the second subset of point data is a class other than "human" or "vehicle."

As another example, the content of the sharing data may include the first subset of point data when the class type of the object included in the class information of the first subset of point data is an immovable object such as "building" and may not include the second subset of point data when the class type of the object included in the class information of the second subset of point data is a class other than an immovable object such as "building."

It will be appreciated that the predetermined criterion for the class type may vary depending on the embodiment. For example, the content of the sharing data may be determined according to a criterion contrary to the above-described predetermined criterion, but the present invention is not limited thereto.

Also, a user may set the predetermined criterion while designing the data sharing system according to an embodiment and may also use the predetermined criterion while using the data sharing system.

4.1.3.1.3. Generation and Transmission of Sharing Data

Also, when the object is immovable, the controller may generate sharing data including the subset of point data (S5020).

In detail, in order to selectively share sensor data according to an embodiment, the controller may generate sharing data on the basis of the movability of a plurality of objects represented by the plurality of subsets of point data 2113, 2114, and 2115.

As an example, when class information of a subset of point data is related to an immovable object, the controller may generate sharing data including at least a portion of the subset of point data or the property data of the subset of point data.

Figure 50:
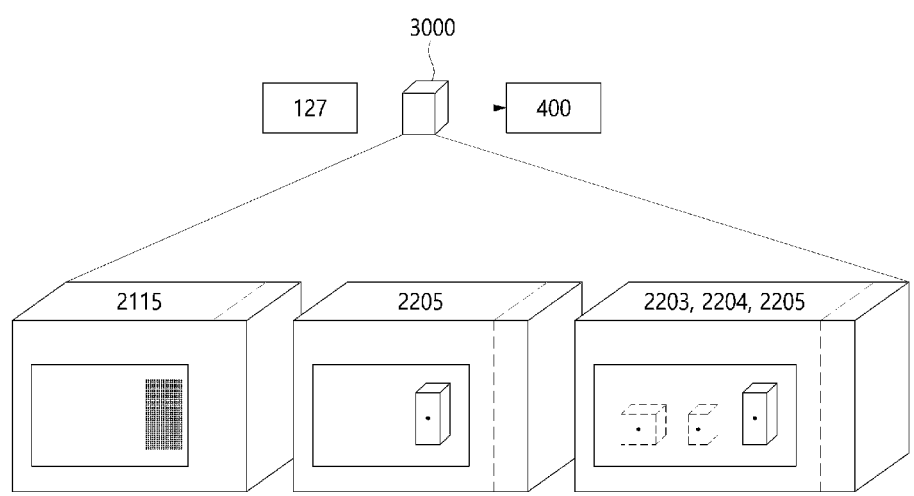
FIG. 50 is a diagram illustrating the content of sharing data according to an embodiment.

FIG. 50 is a diagram illustrating the content of sharing data according to an embodiment.

Referring to FIG. 50, the content of the sharing data 3000 may include a third subset of point data 2115 having class information related to an immovable object.

In this case, since the third subset of point data 2115 represents at least a portion of the building 500, which is an immovable object, the controller may generate the sharing data 3000 including the third subset of point data 2115.

However, the present invention is not limited thereto, and when the class information of the third subset of point data 2115 is related to an immovable object, the controller may generate sharing data 3000 including third property data 2205 of the third subset of point data.

In this case, the third property data 2205 may include at least some of class information, center position information, size information, shape information, movement information, or identification information which is acquired based on the third subset of point data 2115.

However, the present invention is not limited thereto, and even when class information of a subset of point data is related to a movable object, the controller may generate sharing data including property data of the subset of point data. In detail, when the class information of the subset of point data is related to a movable object, the controller may generate sharing data including center position information of the subset of point data.

For example, the content of the sharing data may further include first and second property data 2203 and 2204 of the first and second subsets of point data 2113 and 2114 having class information related to the movable object.

In this case, the first and second property data 2203 and 2204 may include center position information acquired based on the first and second subsets of point data 2113 and 2114, but the present invention is not limited thereto.

Also, the first vehicle 127 may transmit the sharing data to a second device.

In this case, the second device may include vehicles 128 and 129, an infrastructure device 700, a server 400, a mobile device, etc., but the present invention is not limited thereto.

For example, when the second device is a server 400, the first vehicle 127 may transmit the sharing data 3000 to the server 400. In this case, the server 400 may generate a high-definition map on the basis of the sharing data.

4.1.3.2. Sharing Data Including Additional Information

Also, the content of the sharing data may include additional information related to a stop time of a stationary object.

In detail, when class information of an object included in the sensor data is related to a stationary object and additional information related to a stop time of the object is included in the sensor data, the controller may generate sharing data including the additional information.

Figure 51:
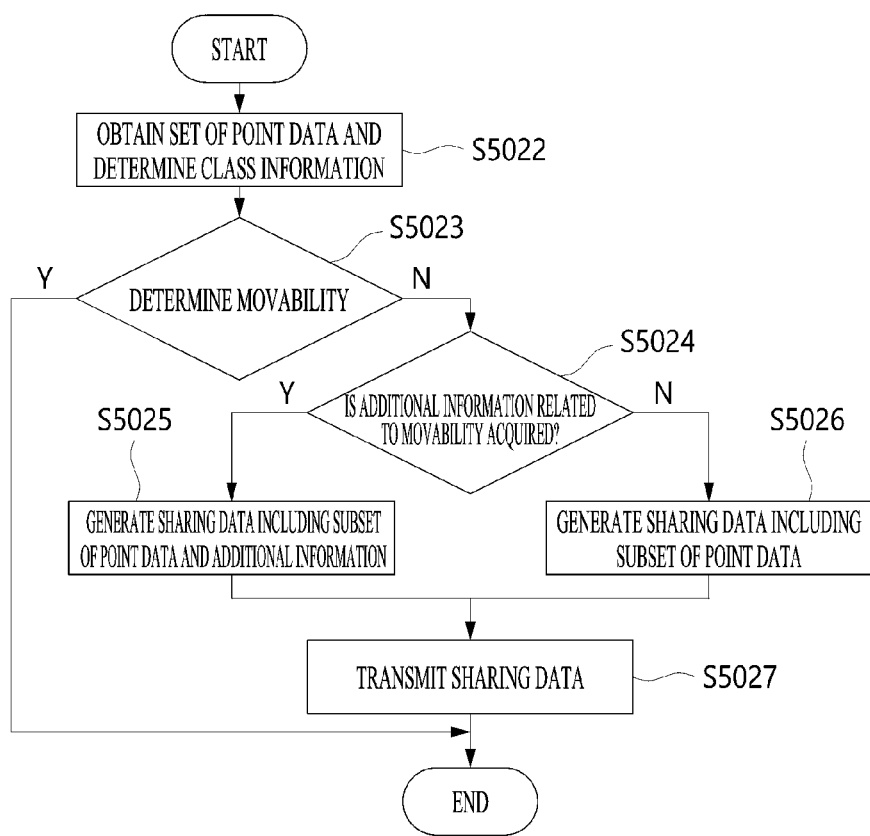
FIG. 51 is a flowchart illustrating a method of selectively sharing sensor data including additional information according to an embodiment.

FIG. 51 is a flowchart illustrating a method of selectively sharing sensor data including additional information according to an embodiment.

Referring to FIG. 51, a controller of a first device may obtain a set of point data through at least one sensor and determine class information of a plurality of subsets of point data included in the set of point data (S5022). In this case, the first device may include a vehicle, an infrastructure device, etc., but the present invention is not limited thereto. Also, the class information may be related to a stationary object or may be related to a movable object.

Also, the controller may determine the movability of a plurality of objects represented by the plurality of subsets of point data on the basis of the class information (S5023). For example, when an object is related to a stationary object, the controller may determine that the object is immovable.

Also, for an object determined to be immovable, the controller may obtain additional information related to movability (S5024). In this case, the additional information may include a stop time of the stationary object.

Also, when the additional information is acquired, the controller may generate sharing data including the additional information and the subset of point data (S5025).

Also, when the additional information is not acquired, the controller may generate sharing data including the subset of point data (S5026).

Also, the controller may transmit the sharing data to a second device (S5027). In this case, the second device may include a vehicle, an infrastructure device, a server, etc., but the present invention is not limited thereto.

Figure 52:
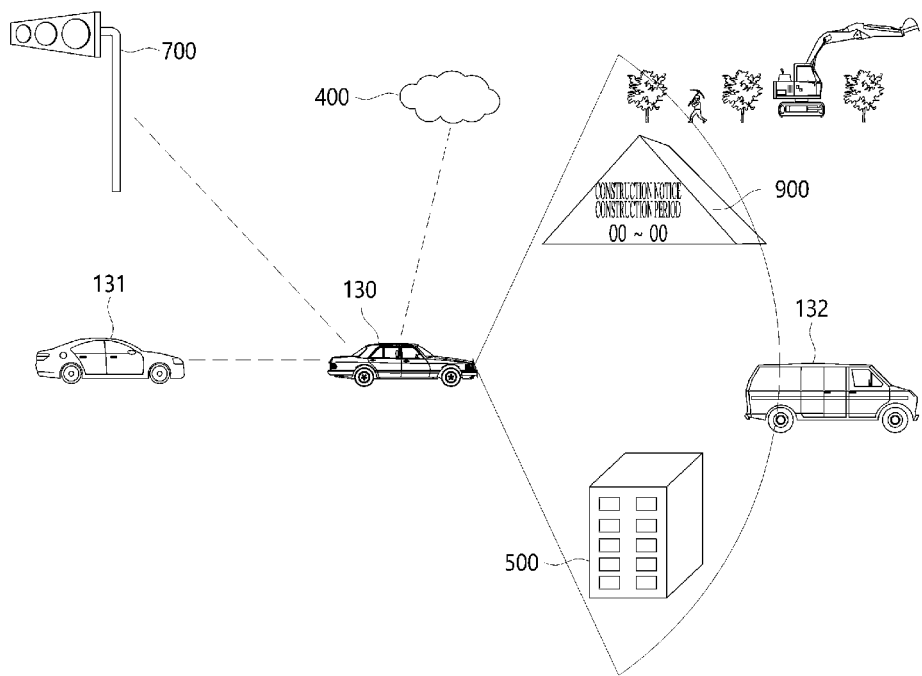
FIG. 52 is a diagram showing a situation in which a first vehicle acquires additional information through at least one sensor according to an embodiment.

FIG. 52 is a diagram showing a situation in which a first vehicle acquires additional information through at least one sensor according to an embodiment.

Figure 53:
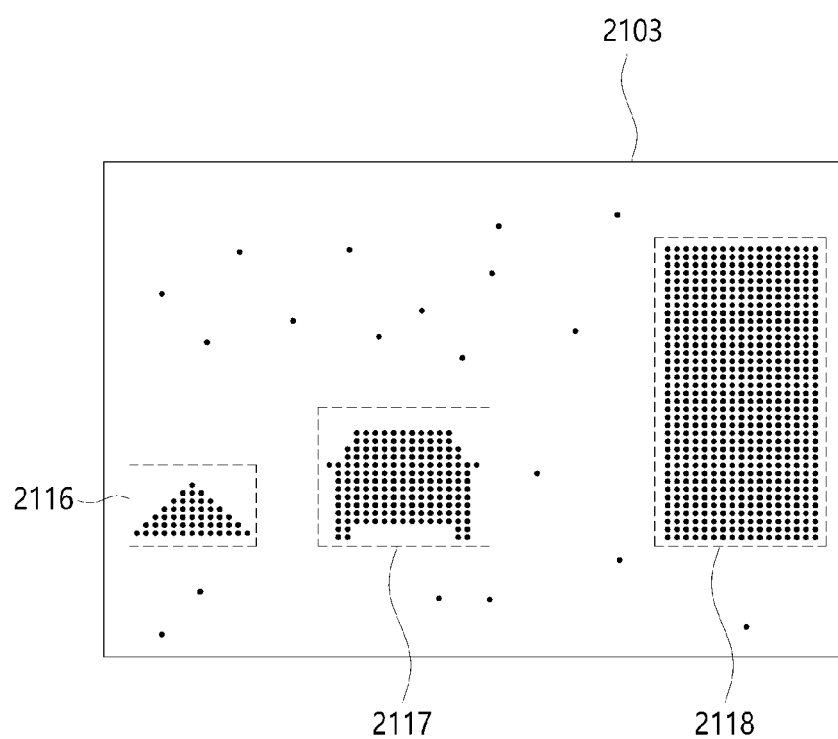
FIG. 53 is a diagram schematically showing, in a 2D plane, the sensor data acquired by the first vehicle according to FIG. 52.

FIG. 53 is a diagram schematically showing, in a 2D plane, the sensor data acquired by the first vehicle according to FIG. 52.

Referring to FIGS. 52 and 53, a first vehicle 130 may acquire a set of point data 2103 including a plurality of subsets of point data 2116, 2117, and 2118 through at least one sensor.

In this case, the plurality of subsets of point data 2116, 2117, and 2118 may include a first subset of point data 2116 representing at least a portion of a construction sign 900, a second subset of point data 2117 representing at least a portion of a third vehicle 132, and a third subset of point data 2118 representing at least a portion of a building 500, but the present invention is not limited thereto.

Also, a controller of the first vehicle may determine class information of the plurality of subsets of point data. For example, the controller may determine that the class information of the first subset of point data 2116 is "sign," determine that the class information of the second subset of point data 2117 is "vehicle," and determine that the class information of the third subset of point data 2118 is "building."

Also, the controller may determine whether class information of a plurality of objects is related to an immovable object to determine the movability of the plurality of objects. For example, since the class information of the first subset of point data 2116 and the third subset of point data 2118 is related to an immovable object, the controller may determine that the construction sign 900 and the building are immovable.

Also, the controller may generate sharing data including a subset of point data representing an object that cannot move. In detail, when additional information related to a stop time of an object is included in the subset of point data representing the immovable object, the controller may generate sharing data further including the additional information. For example, the controller may add additional information related to the stop time of the construction sign (e.g., information regarding a construction period) to the first subset of point data 2116. In this case, the additional information may be acquired based on intensity information of the construction sign 900 acquired from at least one LiDAR device. In detail, the controller may recognize additional information representing a construction completion time shown in the construction sign 900 on the basis of an intensity value included in the first subset of point data 2116 representing at least a portion of the construction sign 900 acquired from a LiDAR device. Also, when the controller recognizes the additional information, the controller may generate sharing data including the first subset of point data 2116 and the additional information.

Also, the additional information may be acquired from the outside. For example, the controller may acquire additional information related to the stop time of the construction sign 900 from an external server and may generate sharing data including the additional information.

Also, the controller may transmit the sharing data to a second device. In this case, the second device may include vehicles 131 and 132, a server 400, an infrastructure device 700, etc., but the present invention is not limited thereto.

Figure 54:
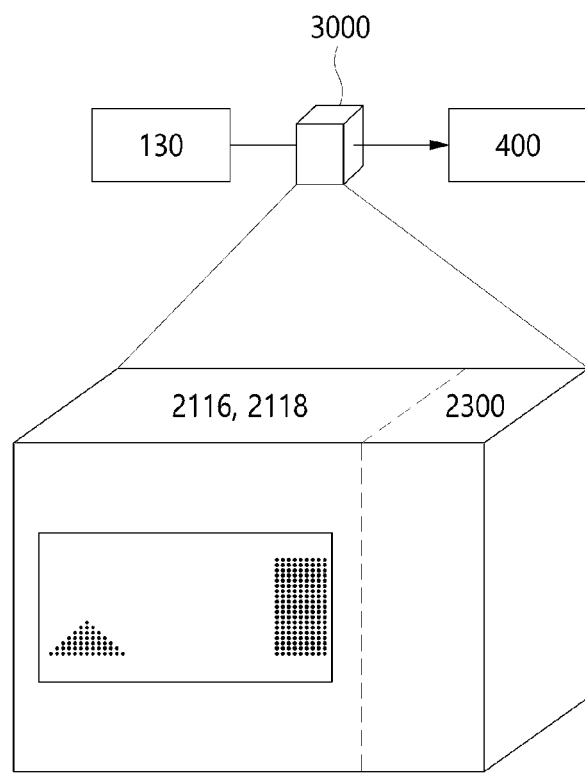
FIG. 54 is a diagram illustrating a subset of point data and additional information included in the content of sharing data according to an embodiment.

FIG. 54 is a diagram illustrating a subset of point data and additional information included in the content of sharing data according to an embodiment.

Referring to FIG. 54, the first vehicle 130 may transmit sharing data 3000 to the server 400. In this case, the content of the sharing data may include the first subset of point data 2116 and the third subset of point data 2118 which are related to stationary objects. Also, the content of the sharing data may include additional information 2300 representing a stop time of a construction sign 900 represented by the first subset of point data 2110.

Also, although a controller of the first vehicle 130 does not acquire additional information from the first subset of point data 2116, the controller may acquire additional information related to a stop time point of a construction site near the construction sign 900 when the controller acquires sensor data related to the construction site. In detail, when class information of a plurality of subsets of point data representing a worker and an excavator included in the construction site is determined as "construction site," the controller may acquire additional information including a construction completion time point of the construction site. In this case, the construction completion time point may refer to stop time points of a plurality of objects related to the construction site. Thus, the controller may generate sharing data including the additional information and transmit the generated sharing data to a second device.

4.1.3.3. Selective Sharing of Sensor Data According to Other Embodiment

Information regarding an immovable object may be pre-stored in a device for generating a high-definition map. In this case, the device for transmitting the sensor data may select only data related to movable objects from the sensor data and transmit the data to the device for generating the high-definition map.

Figure 55:
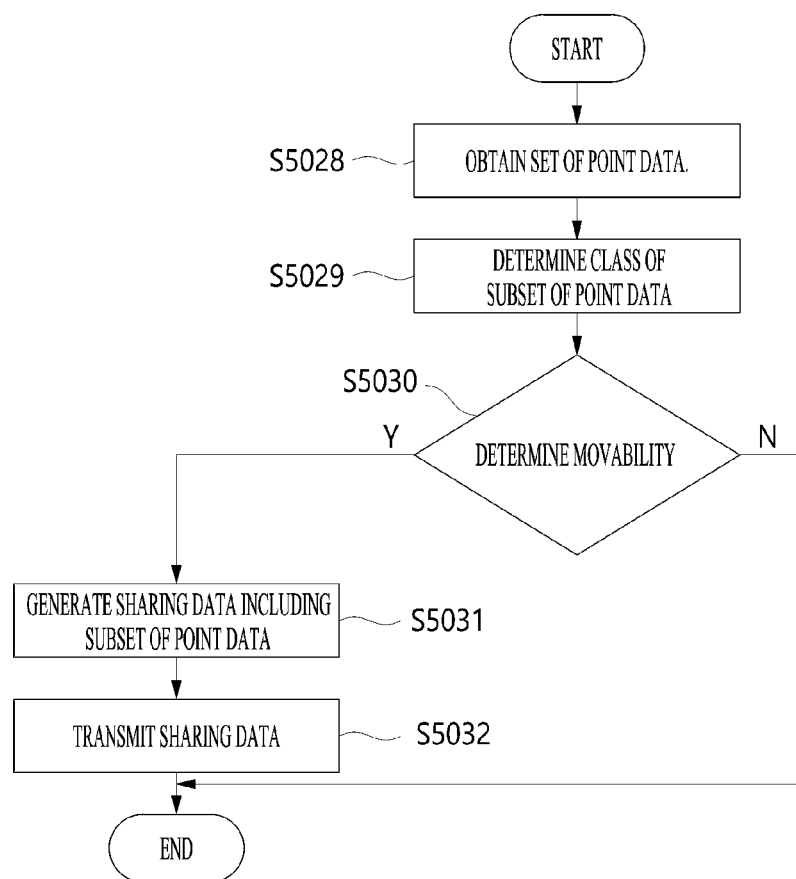
FIG. 55 is a flowchart illustrating a method of sharing sensor data related to a movable object according to an embodiment.

FIG. 55 is a flowchart illustrating a method of sharing sensor data related to a movable object according to an embodiment.

Referring to FIG. 55, a controller included in a first device may obtain a set of point data through at least one sensor (S5028). In this case, the first device may include a vehicle, a server, an infrastructure device, a mobile device, etc., but the present invention is not limited thereto.

Also, the controller may determine class information of a plurality of subsets of point data included in the set of point data (S5029).

Also, the controller may determine the movability of a plurality of objects represented by the plurality of subsets of point data on the basis of the class information (S5030).

Also, when the controller determines that a first object may move because class information of the first object is related to a movable object, the controller may generate sharing data including a subset of point data representing at least a portion of the first object (S5031). In this case, the content of the sharing data may include property data of the subset of point data and may further include property data of a subset of point data representing at least a portion of a second object related to an immovable object.

Also, the controller may transmit the sharing data to a second device (S5032). In this case, the second device may include a vehicle, a server, an infrastructure device, a mobile device, etc., but the present invention is not limited thereto.

4.1.3.4. Selective Sharing of Sensor Data According to Still Other Embodiment Also, a controller of a second device, which receives sharing data from a first device, may determine whether to store the sharing data according to class information of a subset of point data included in the sharing data.

Figure 56:
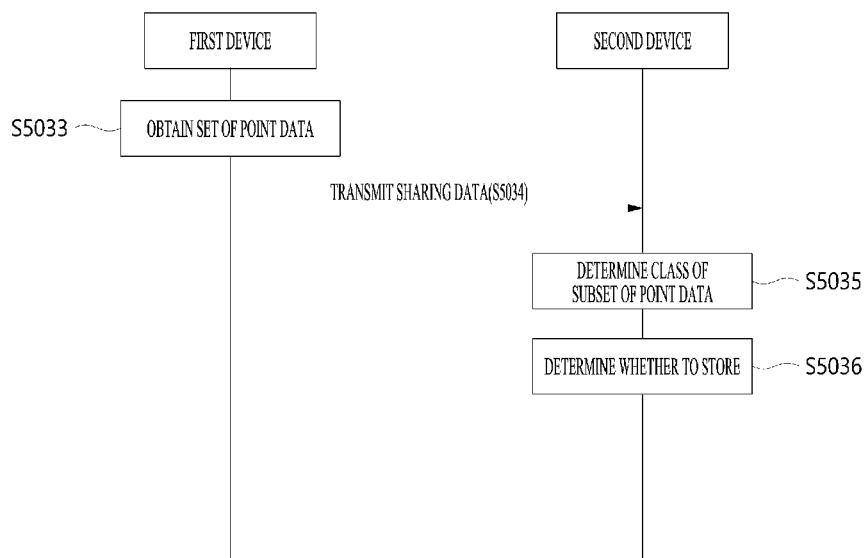
FIG. 56 is a diagram illustrating a method of selectively storing sharing data according to an embodiment.

FIG. 56 is a diagram illustrating a method of selectively storing sharing data according to an embodiment.

Referring to FIG. 56, a first device may acquire a set of point data through at least one sensor (S5033).

Also, a controller included in the first device may transmit sharing data including the set of point data to a second device through at least one communication module. In this case, the content of the sharing data may further include additional information for the second device to facilitate coordinate system alignment. For example, the additional information may include sampling rate-related information, resolution information, etc. of a sensor of the first device, but the present invention is not limited thereto.

Also, when the sharing data is received, a controller of the second device may determine class information of a plurality of subsets of point data included in the set of point data (S5035).

Also, the controller of the second device may determine whether to store data included in the sharing data on the basis of the class information (S5036).

As an example, when the class of an object included in the class information is a class in which personal information needs to be protected, the controller of the second device may generate and store privacy protection data obtained by processing at least a portion of the set of point data. In this case, the controller of the second device may delete rather than store a subset of point data representing the object having the class in which personal information needs to be protected.

As another example, the controller of the second device may determine the movability of an object on the basis of class information and may store sensor data representing an object that cannot move. In detail, the controller of the second device may store a subset of point data having class information related to an immovable object or property data of this subset of point data among the plurality of subsets of point data included in the set of point data.

As another example, the controller of the second device may determine the movability of an object on the basis of class information and may store sensor data representing an object that may move. In detail, the controller of the second device may store a subset of point data having class information related to a movable object or property data of this subset of point data among the plurality of subsets of point data included in the set of point data.

Also, the second device may determine whether to store data included in the sharing data according to whether information regarding an object represented by a subset of point data included in the content of the received sharing data is stored in the second device.

Also, the second device may receive the sharing data and generate a high-definition map. In this case, when information related to immovable objects is stored in the high-definition map of the second device, the second device may receive sensor data related to the movable object and update the high-definition map. However, the present invention is not limited thereto. In order to update the high-definition map with the information related to immovable objects, the second device may receive the sensor data related to immovable objects. In this case, the sensor data may include a set of point data, a plurality of subsets of point data, and property data of the plurality of subsets of point data, but the present invention is not limited thereto.

Also, the second device may receive sharing data including privacy protection data and match the privacy protection data to the high-definition map.

4.2. Selective Sharing of Sensor Data According to Occurrence of Event

4.2.1. Necessity of Selective Sharing According to Occurrence of Event

A data sharing system according to an embodiment may include a first device and a second device as data sharing entities. Here, the first device may transmit sharing data to the second device or a server, but the present invention is not limited thereto.

In this case, when the first device shares all acquired sensor data with the second device or the server, various problems such as poor data sharing efficiency may occur. For example, when a set of point data included in the sensor data is shared without any processing, a data storage capacity problem, a communication server overload problem, or the like may occur, but the present invention is not limited thereto.

In order to solve the above problems, a controller of the first device may generate the content of the sharing data at least partially differently depending on whether an event has occurred.

For example, the controller may generate and transmit first sharing data including property data before the event occurs. In this case, the event may include a traffic event related to vehicle driving, an environmental event such as rain and snow, and a regulatory event such as entry into a child protection zone, but the present invention is not limited thereto. The event will be described in detail below.

Also, the controller may generate and transmit second sharing data including a set of point data or a plurality of subsets of point data in order to transmit accurate information related to the event after the event occurs. In this case, the second sharing data may include a set of point data or a plurality of subsets of point data which have been acquired for a predetermined time before and after the event occurs.

4.2.2. Selective Sharing Method (1) of Sensor Data According to Embodiment

Figure 57:
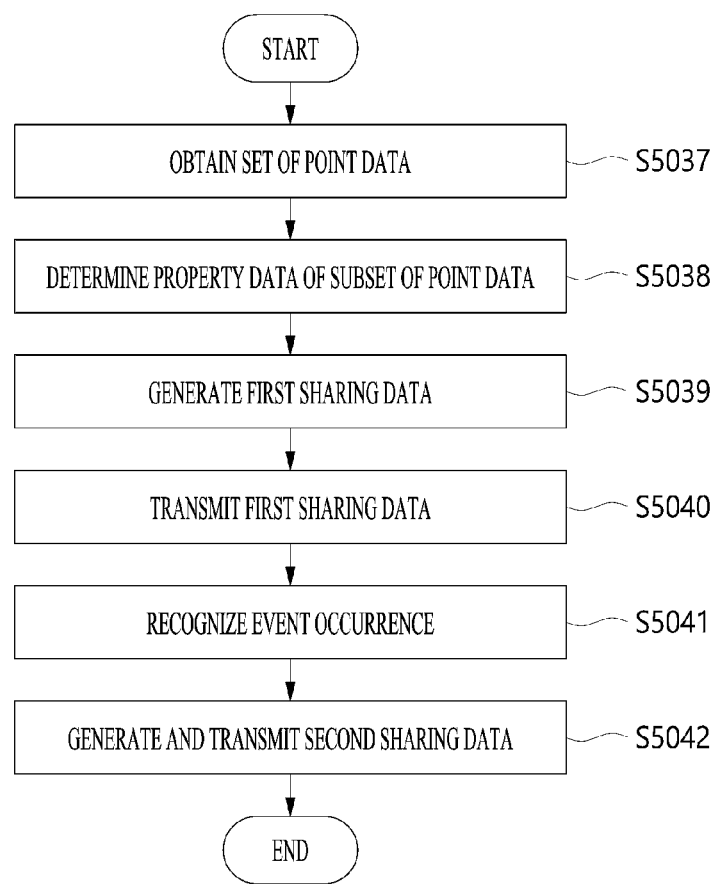
FIG. 57 is a flowchart illustrating a selective sharing method of sensor data according to another embodiment.

FIG. 57 is a flowchart illustrating a selective sharing method for sensor data according to another embodiment.

Referring to FIG. 57, a controller of a first device may acquire a set of point data through at least one sensor (S5037). In this case, the first device may include a vehicle, an infrastructure, etc., but the present invention is not limited thereto.

Also, the controller may determine property data of a plurality of subsets of point data included in the set of point data (S5038). In this case, the property data may include class information, center position information, size information, movement information, shape information, identification information, and the like of the subsets of point data, but the present invention is not limited thereto.

Also, the controller may generate first sharing data including the property data and transmit the first sharing data to a second device (S5039, S5040). In this case, the second device may include a vehicle, a server, an infrastructure device, a mobile device, etc., but the present invention is not limited thereto.

Also, the controller may determine the occurrence of an event (S5041). In this case, the event may include a traffic event related to driving and accident of vehicle, but the present invention is not limited thereto.

Also, the controller may generate and transmit second sharing data including a plurality of sets of point data acquired for a first time period before and after the event occurs (S5042).

Hereinafter, a method of determining the occurrence of an event according to an embodiment will be described in detail.

4.2.2.1. Method of Generating Sharing Data and Determining Occurrence of Event FIG. 58 is a diagram showing a situation in which a first vehicle acquires sensor data before an event occurs according to an embodiment.

Figure 58:
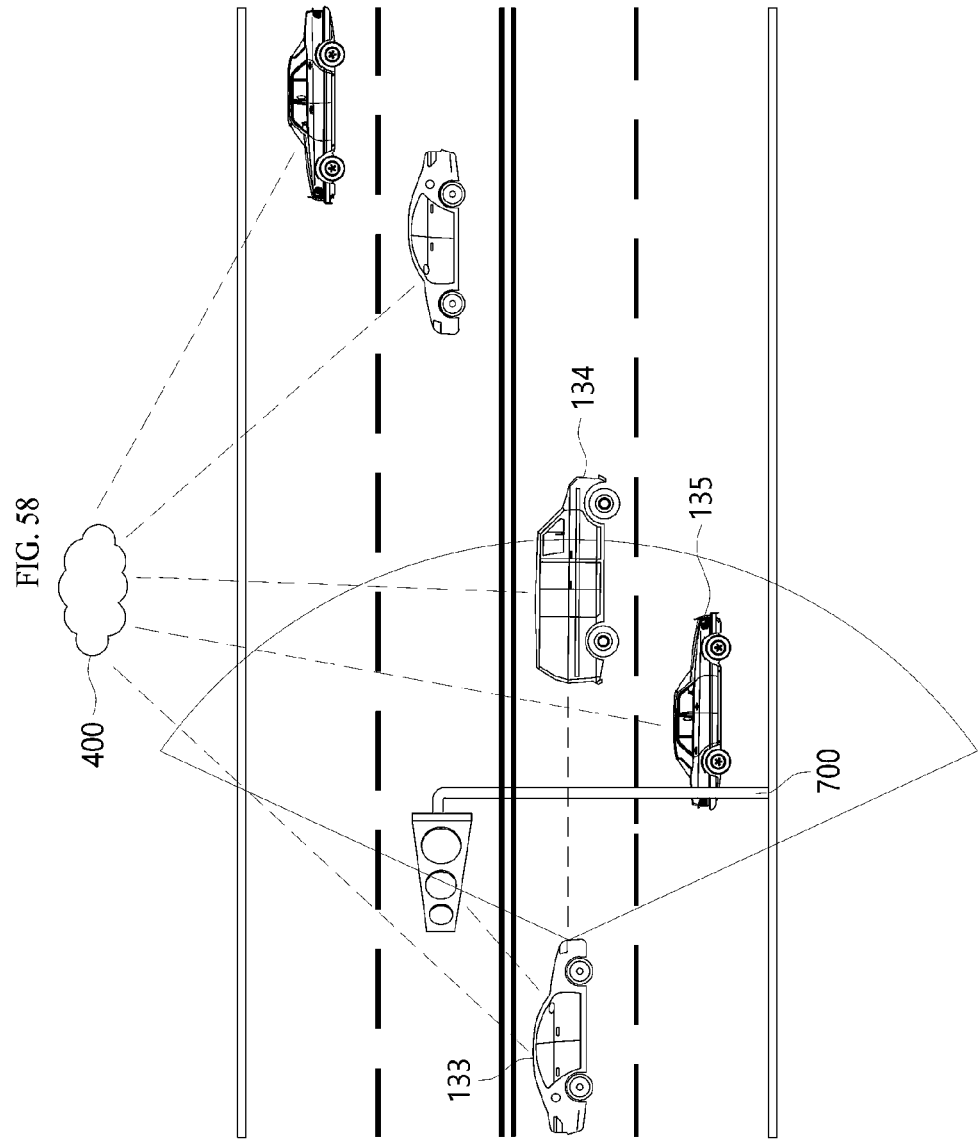
FIG. 58 is a diagram showing a situation in which a first vehicle acquires sensor data before an event occurs according to an embodiment.
Figure 59:
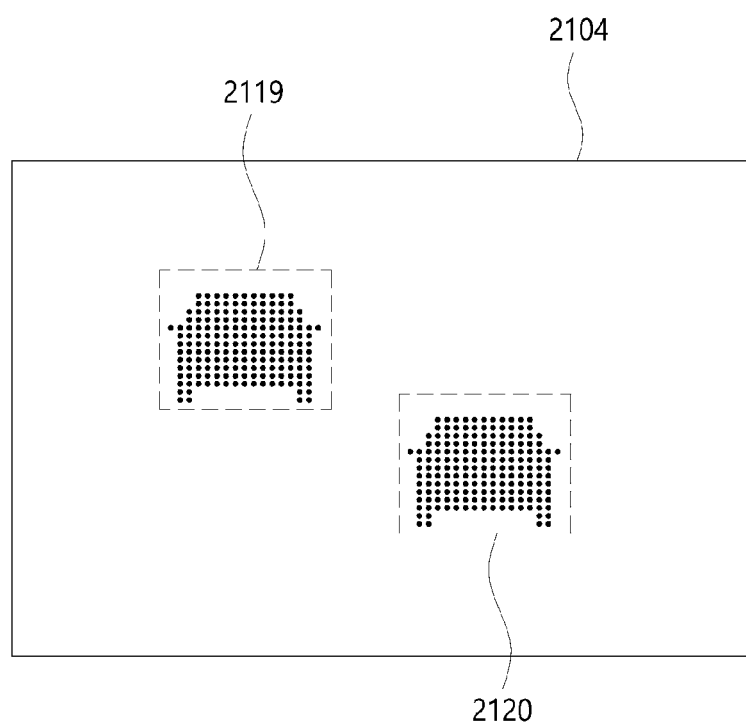
FIG. 59 is a diagram schematically showing a set of point data included in the sensor data acquired according to FIG. 58 in a 2D plane.

FIG. 59 is a diagram schematically showing a set of point data included in the sensor data acquired according to FIG. 58 in a 2D plane.

Referring to FIGS. 58 and 59, a first vehicle 133 may include a set of point data 2104 including a first subset of point data 2119 representing at least a portion of a second vehicle 134 and a second subset of point data 2120 representing at least a portion of a third vehicle 135.

Also, the controller may determine a plurality of pieces of property data of a plurality of subsets of point data included in the set of point data. In this case, the plurality of pieces of property data may include at least one of center position information, size information, class information, shape information, movement information, or identification information of the plurality of subsets of point data 2119 and 2120, but the present invention is not limited thereto.

Also, the first device may generate first sharing data and transmit the generated first sharing data to the second device (S5039, S5040).

Figure 60:
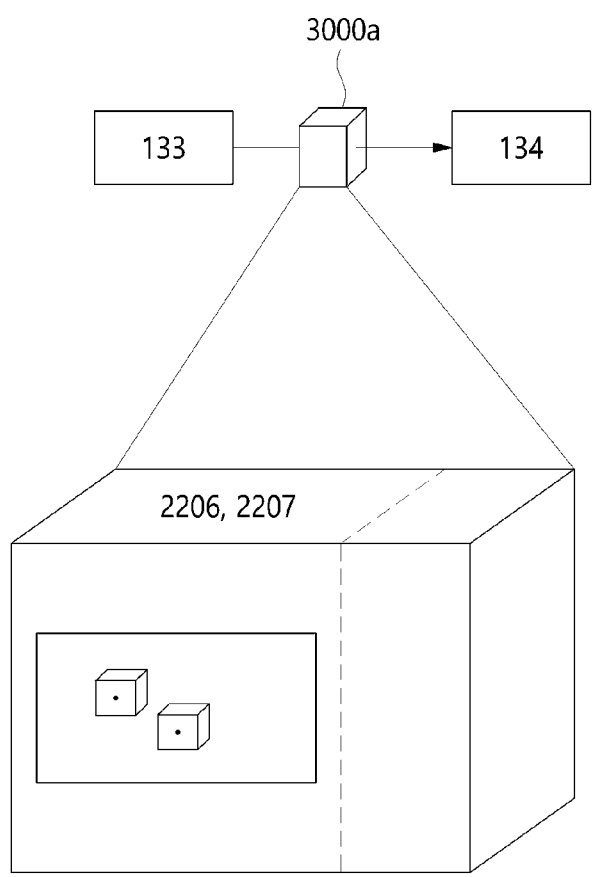
FIG. 60 is a diagram illustrating first sharing data transmitted by a first vehicle before an event occurs according to an embodiment.

FIG. 60 is a diagram illustrating first sharing data transmitted by a first vehicle before an event occurs according to an embodiment.

Referring to FIG. 60, a controller of the first vehicle may generate first sharing data 3000a including first property data 2206 of the first subset of point data and second property data 2207 of the second subset of point data and transmit the first sharing data 3000a to the second vehicle 134.

Also, the controller may determine the occurrence of an event. For example, the controller may determine a traffic event 6100 between the second vehicle 134 and the third vehicle 135. In this case, the traffic event 6100 may be related to at least one of an accident situation related to the first vehicle 133 or accident situation related to other vehicles 134 and 135 near the first vehicle.

Figure 61:
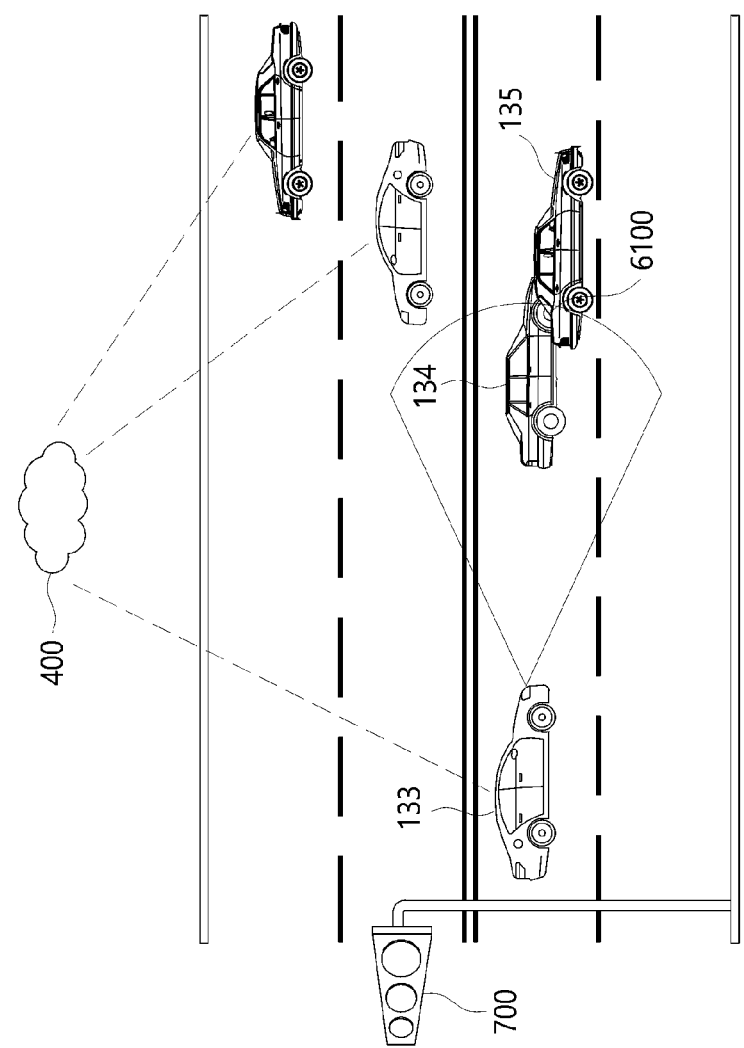
FIG. 61 is a diagram showing a situation in which a first vehicle acquires sensor data when an event occurs according to an embodiment.

FIG. 61 is a diagram showing a situation in which a first vehicle acquires sensor data when an event occurs according to an embodiment.

Figure 62:
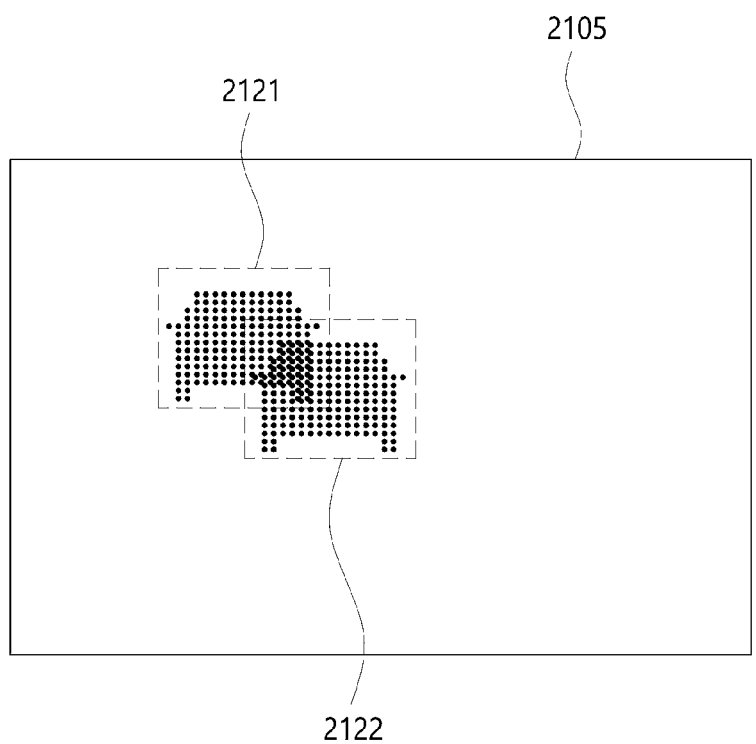
FIG. 62 is a diagram schematically showing a set of point data included in the sensor data acquired according to FIG. 61 in a 2D plane.

FIG. 62 is a diagram schematically showing a set of point data included in the sensor data acquired according to FIG. 61 in a 2D plane.

Referring to FIGS. 61 and 62, a controller of the first vehicle 133 may acquire a second set of point data 2105 including the vehicles 134 and 135 related to the traffic event 6100 through at least one sensor. In this case, the set of point data 2105 may include a third subset of point data 2121 representing at least a portion of the second vehicle 134 and a fourth subset of point data 2122 representing at least a portion of the third vehicle 135.

As an example, the controller may determine the occurrence of the event on the basis of at least a portion of a set of point data or property data of the subset of point data (S5041). In detail, the controller may determine the occurrence of the event on the basis of at least a portion of a plurality of pieces of information included in a plurality of pieces of property data or location information of objects included in a plurality of subsets of point data.

As a specific example, the controller of the first vehicle 133 may determine that the traffic event 6100 has occurred between the second vehicle 134 and the third vehicle 135 when point data included in the third subset of point data 2121 representing at least a portion of the second vehicle 134 at least partially overlaps point data included in the fourth subset of point data 2122 representing at least a portion of the third vehicle 13 and also when a distance between the third subset of point data 2121 and the fourth subset of point data 2122 is determined to be less than or equal to a predetermined distance on the basis of distance information determined through the controller. In this case, at least one of a plurality of subsets of point data 2121 and 2122 included in a set of point data the first vehicle acquires may represent at least a portion of the vehicles 134 and 135 related to the event.

Also, when the plurality of subsets of point data or a plurality of pieces of property data partially overlap each other in a 3D point data map generated based on the set of point data, the controller may determine that the traffic event 6100 has occurred between the second vehicle 134 and the third vehicle 135.

However, the present invention is not limited thereto, and the controller may determine the occurrence of an event even when a subset of point data representing an event related to the event is not included in the set of point data.

As an example, when information for determining the occurrence of the event is included in the set of point data, the controller may determine the occurrence of the event on the basis of the information for determining the occurrence of the event. As a specific example, when a subset of point data representing an object for indicating an accident site is included in the set of point data, the controller may determine the occurrence of an event on the basis of the subset of point data representing the object for indicating the accident site.

However, the present invention is not limited thereto, and the controller may determine the occurrence of an event by acquiring information including the occurrence of the event from the second device or the third device. In this case, the third device may include vehicles 134 and 135, a server 400, an infrastructure device 700, etc., but the present invention is not limited thereto.

For example, when the server 400 determines the occurrence of the event, the server 400 may transmit the information including the occurrence of the event to a device near where the event has occurred. As a specific example, when the server 400 determines that the traffic event 6100 has occurred, the server 400 may transmit information including the occurrence of the traffic event 6100 to the first vehicle 133 which is located near where the traffic event 6100 has occurred. In this case, when the information including the occurrence of the traffic event is received, the first vehicle 133 may determine that the traffic event 6100 has occurred.

However, the present invention is not limited thereto, and the controller may determine the occurrence of an event by acquiring data request information from at least one of the second device or the third device. In this case, the request information may include information indicating the occurrence of the event.

For example, when the server 400 transmits request information for requesting data related to the traffic event 6100 to the first vehicle 133, the request information includes the information indicating the occurrence of the traffic event 6100, and thus the first vehicle 133 may determine that the traffic event 6100 has occurred when the request information is received.

Also, the controller may generate second sharing data 3000b including the second set of point data 3100 (S5042).

Figure 63:
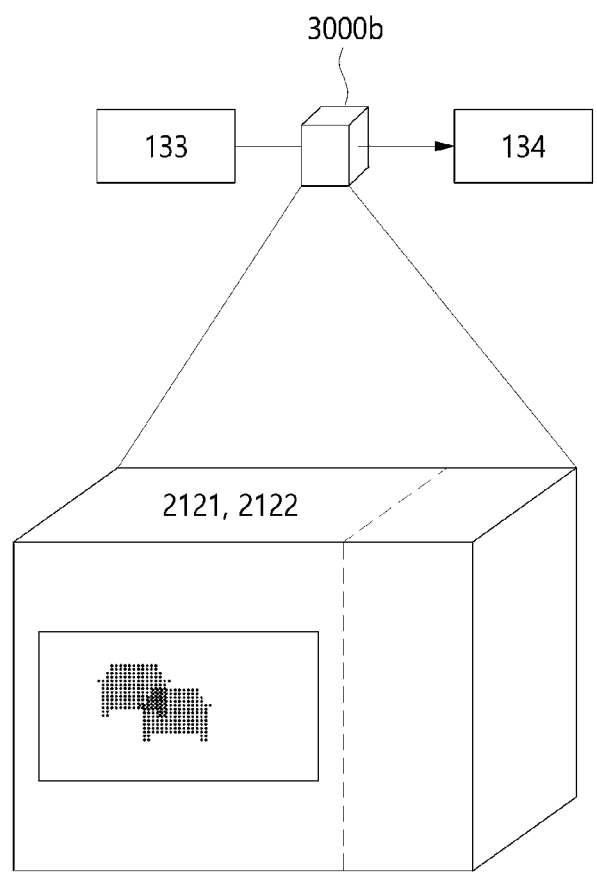
FIG. 63 is a diagram illustrating second sharing data transmitted by a first vehicle after an event occurs according to an embodiment.

FIG. 63 is a diagram illustrating second sharing data transmitted by a first vehicle after an event occurs according to an embodiment.

Referring to FIG. 63, a controller of the first vehicle may generate and transmit second sharing data 3000b including the second set of point data to the second vehicle 134. In this case, the second set of point data may include a third subset of point data 2121 representing at least a portion of the second vehicle 134 and a fourth subset of point data 2122 representing at least a portion of the third vehicle 134.

In this case, the content of the second sharing data may be at least partially different from the content of the first sharing data. As an example, when the sharing data 3000a and 300b are received, the second device needs more accurate data related to the traffic event 6100, and thus the second sharing data 3000b may include a plurality of subsets of point data 2121 and 2122 acquired after the traffic event 6100 occurs. As another example, the resolution of a sensor for acquiring sensor data included in the content of the second sharing data may be different from the resolution of a sensor for acquiring sensor data included in the content of the first sharing data. For example, the resolution of the sensor for acquiring sensor data included in the content of the second sharing data may be higher than the resolution of the sensor for acquiring sensor data included in the content of the first sharing data, but the present invention is not limited thereto.

Also, the content of the second sharing data may include a plurality of sets of point data acquired for a first time period before and after the traffic event 6100 occurs. In detail, the plurality of sets of point data may include a set of point data acquired before the traffic event 6100 occurs as well as a set of point data acquired from a sensor of the first vehicle 133 after the traffic event 6100 occurs. This may be to obtain accurate information related to the cause of the traffic event 6100 through the data acquired before and after the traffic event 6100 occurs.

However, the present invention is not limited thereto, and the content of the second sharing data may further include property data related to the event.

It will be appreciated that the selective sharing method for sensor data according to an embodiment is not limited to the operations shown in FIG. 57. For example, the first device may not generate sharing data before the first device determines that an event has occurred. Thus, the first device may not share data with a second device before the first device determines that an event has occurred.

4.2.2.2. Data Sharing Entity

Also, the first device may transmit the second sharing data (S5042).

In this case, an entity receiving the second sharing data may include a vehicle, an infrastructure device, a mobile device, etc., but the present invention is not limited thereto. Also, the first device may transmit the second sharing data to a second device which has transmitted the first sharing data.

Referring to FIG. 61 again, the controller of the first vehicle 133 may transmit the second sharing data to the second vehicle 134 related to the traffic event 6100.

However, the present invention is not limited thereto, and when request information for requesting data related to the traffic event 600 is acquired from the server 400, the controller may transmit the second sharing data 3000b to the server 400.

It will be appreciated that when information related to a sharing data receiving entity is included in the request information, the controller may transmit the second sharing data on the basis of the information related to the sharing data receiving entity. For example, when information regarding a sharing data receiving entity and instructing to transmit sharing data to the third vehicle 135 is included in the request information received from the server 400, the controller may transmit the second sharing data 3000b to the third vehicle 135.

4.2.2.3. Generation Time of Sharing Data

When the controller of the first device determines the occurrence of an event, the controller may generate sharing data at certain intervals after the event occurs. In this case, the content of the sharing data may include at least one set of point data acquired before the event occurs. However, the present invention is not limited thereto, and the content of the sharing data may include at least one set of point data acquired after the event occurs. In this case, the controller may transmit the sharing data to the second device each time the sharing data is generated.

Also, the controller may generate the sharing data after the completion of a first time period including a time point at which the event occurs. In this case, the content of the sharing data may include a plurality of sets of point data acquired for a first time period before and after the event occurs. In this case, the controller may transmit the sharing data to the second device after the sharing data is generated.

For example, referring to FIG. 63 again, the first vehicle 133 may transmit second sharing data 3000b to the second vehicle 134. In this case, the second sharing data 3000b may be generated at regular intervals after the traffic event 6100 occurs. In this case, the content of the second sharing data may include a set of point data or a plurality of subsets of point data 2121 and 2122 which are acquired when the traffic event occurs. Also, the content of the second sharing data may include a plurality of sets of point data acquired before the traffic event occurs and may include a plurality of sets of point data acquired after the traffic event occurs.

However, the present invention is not limited thereto, and the second sharing data 3000b may be generated after the completion of the first time period before and after the traffic event 6100 occurs. In this case, the content of the second sharing data may include a plurality of sets of point data acquired for a first time period including a predetermined time before and after the traffic event. However, the present invention is not limited thereto, and the content of the second sharing data may include a set of point data and a plurality of subsets of point data 2121 and 2122 which are acquired when the traffic event occurs.

However, the present invention is not limited thereto, and the sharing data may be generated at the same time as the sensor data is acquired. It will be appreciated that the sharing data may be generated at any time regardless of when the sensor data is acquired.

4.2.2.4. Various Examples of Event

The event 6000 may refer to all situational conditions related to the inside and outside of the first device. For example, the event may include a traffic event, an environmental event, a regulatory event, a blind spot discovery, a user input reception, etc., but the present invention is not limited thereto.

For example, the event may be a traffic event related to at least one of an accident situation related to the first device or an accident situation related to another device near the first device, an environmental event related to the surrounding environment of the first device, a regulatory event related to regulations on the first device or another device near the first device, etc., but the present invention is not limited thereto.

Also, it will be appreciated that the above-described embodiments of the selective sharing method for sensor data are applicable to various types of events.

In this case, the traffic event may be related to at least one of an accident situation related to the first vehicle or accident situations related to other vehicles near the first vehicle. For example, the traffic event may include a vehicle accident, an accident between a vehicle and a pedestrian, a traffic jam, etc., but the present invention is not limited thereto.

Figure 64:
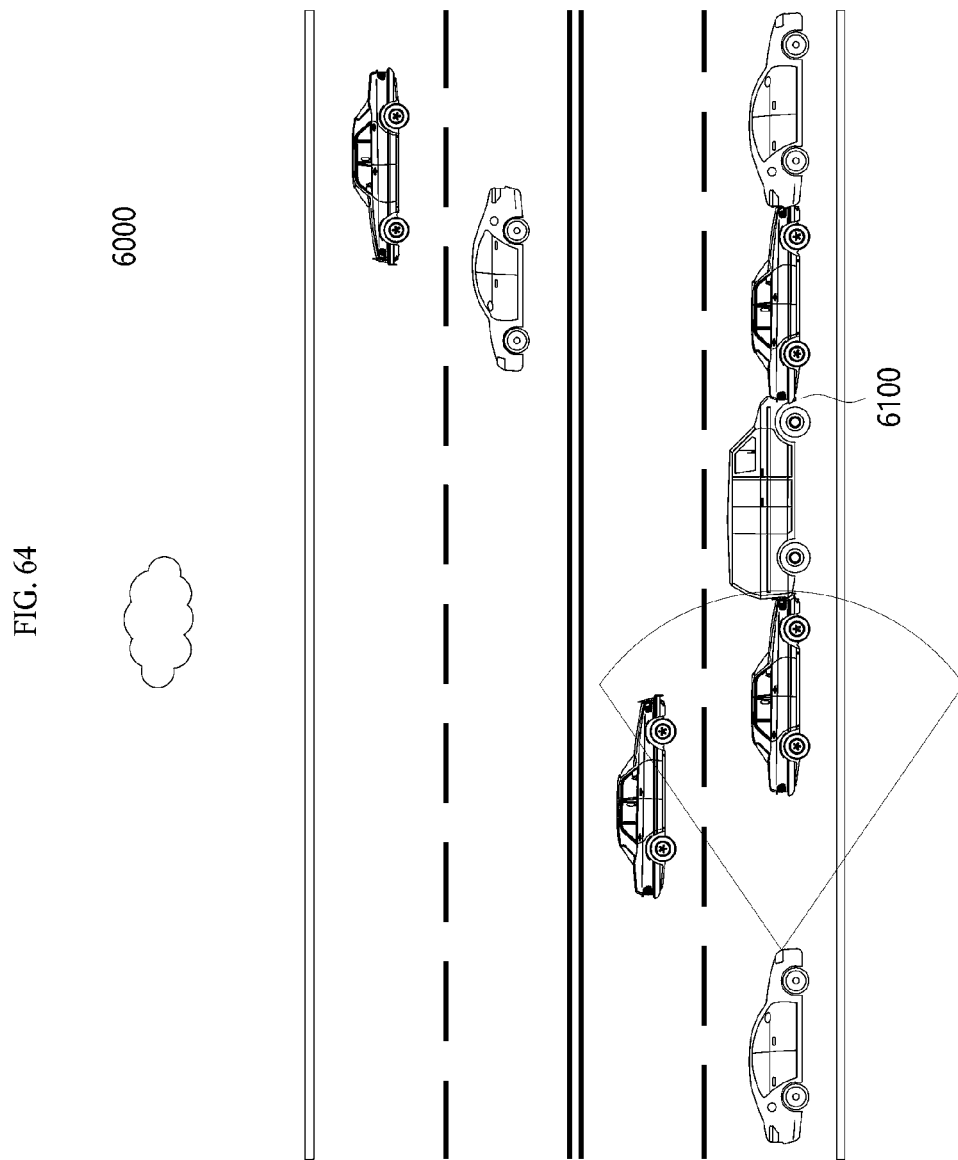
FIG. 64 is a diagram illustrating a situation in which a traffic event has occurred according to an embodiment.

FIG. 64 is a diagram illustrating a situation in which a traffic event has occurred according to an embodiment.

Referring to FIG. 64, a chain collision accident may be included in the traffic event 6100. In this case, the content of sharing data that is shared between data sharing entities may vary before and after the traffic event 6100 occurs. For example, before the traffic event 6100 occurs, sharing data including property data of a subset of point data may be shared, but after the traffic event 6100 occurs, sharing data including at least one of a set of point data or a subset of point data may be shared.

Also, the environmental event may be related to the surrounding environment of the first device. For example, the environmental event may include occurrence of bad weather, deterioration of road conditions, sudden rain or snow, occurrence of fog or sea fog, etc., but the present invention is not limited thereto.

Figure 65:
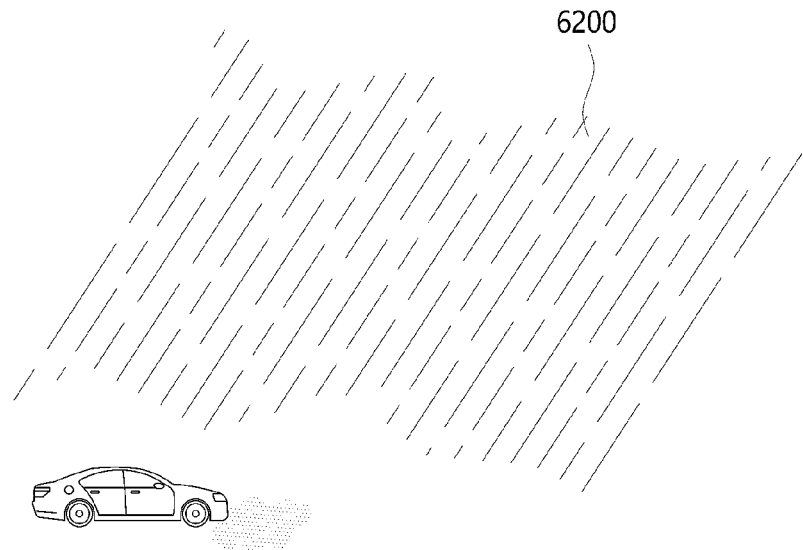
FIG. 65 is a diagram illustrating a situation in which an environmental event has occurred according to an embodiment.

FIG. 65 is a diagram illustrating a situation in which an environmental event has occurred according to an embodiment.

Referring to FIG. 65, rain that suddenly falls in an area where a vehicle is traveling may be included in an environmental event 6200. In this case, the content of sharing data that is shared between data sharing entities may vary before and after the environmental event 6200 occurs. For example, before the environmental event 6200 occurs, sharing data including property data of a subset of point data may be shared, but after the environmental event 6200 occurs, sharing data including at least one of a set of point data or a subset of point data may be shared.

For example, when it suddenly rains while a vehicle is traveling, it may be difficult for at least one sensor placed in the vehicle to acquire accurate sensor data for a plurality of objects located near the vehicle. Accordingly, in order to share more accurate sensor data, the vehicle and other devices may generate sharing data including at least a portion of the set of point data or the subset of point data and share the generated sharing data.

As another example, the regulatory event may be related to regulations on the first device or other devices near the first device. For example, the regulatory event may include entry into a child protection zone, entry into a speed enforcement zone, approval for data sharing by an external server, entry into an available communication zone, etc., but the present invention is not limited thereto.

Figure 66:
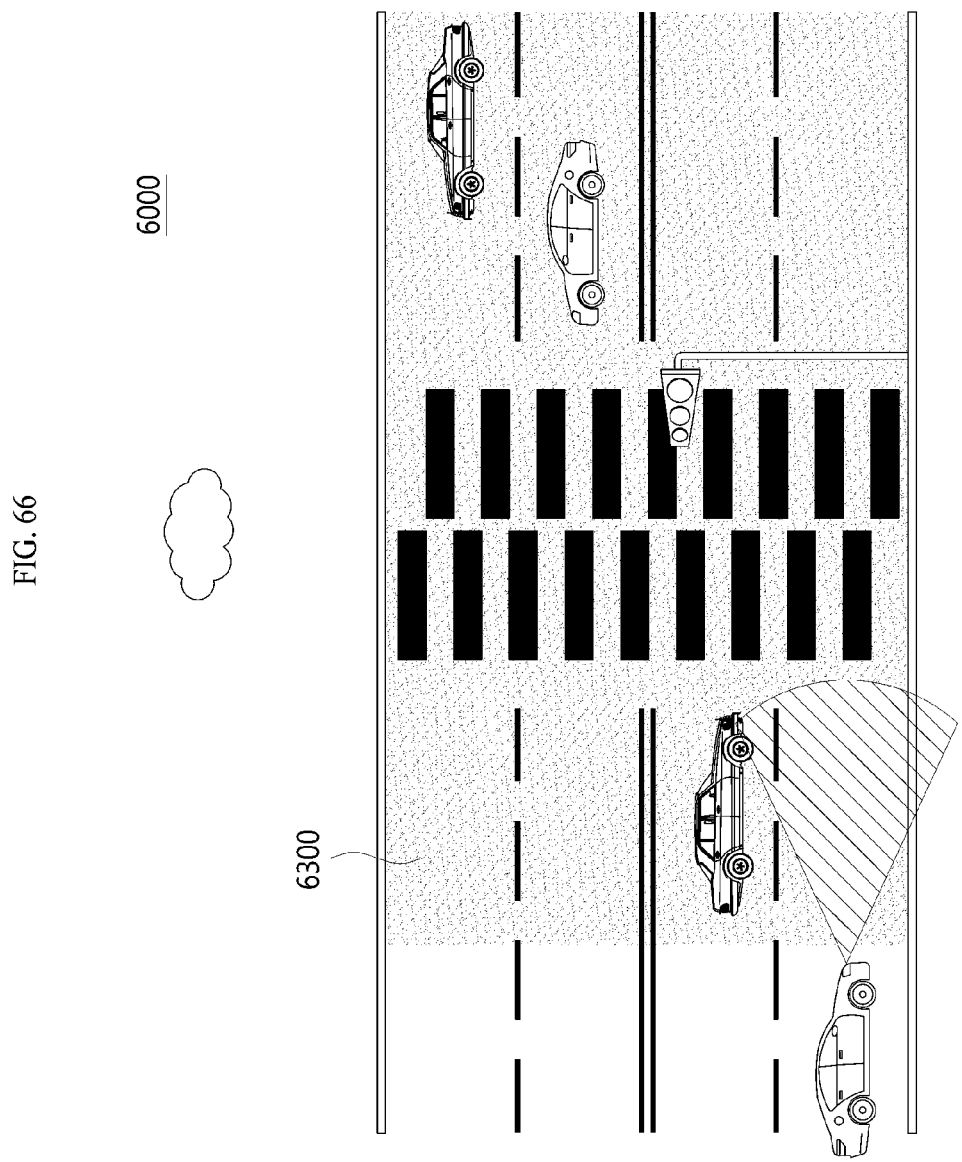
FIG. 66 is a diagram illustrating a situation in which a regulatory event has occurred according to an embodiment.

FIG. 66 is a diagram illustrating a situation in which a regulatory event has occurred according to an embodiment.

Referring to FIG. 66, a situation in which a traveling vehicle enters a child protection zone may be included in a regulatory event 6300. In this case, the content of sharing data shared between data sharing entities may vary before and after the regulatory event 6300 occurs. For example, before the regulatory event 6300 occurs, sharing data including property data of a subset of point data may be shared, but after the regulatory event 6300 occurs, sharing data including at least one of a set of point data or a subset of point data may be shared.

For example, when a vehicle enters a child protection zone, it may be difficult for the vehicle to avoid a collision with a pedestrian who suddenly runs onto a road. Accordingly, in order to share accurate information on at least one object included in sensor data acquired from the vehicle and other vehicles, the vehicle and the other devices may generate sharing data including a subset of point data or a set of point data representing the at least one object and then share the generated sharing data.

Also, in order to acquire information on an object not located in the field of view of at least one sensor placed in the vehicle or an object not included in sensor data acquired from the at least one sensor, the vehicle may receive sensor data from at least one infrastructure device located in a child protection zone after the vehicle enters the child protection zone.

As another example, the event may include a sensor failure event. In detail, when at least one sensor included in an autonomous driving vehicle fails while the vehicle is traveling, the content of sharing data which is shared between the autonomous driving vehicle and other devices may vary before and after the sensor fails.

4.2.3. Selective Sharing Method (2) of Sensor Data According to Embodiment

Figure 67:
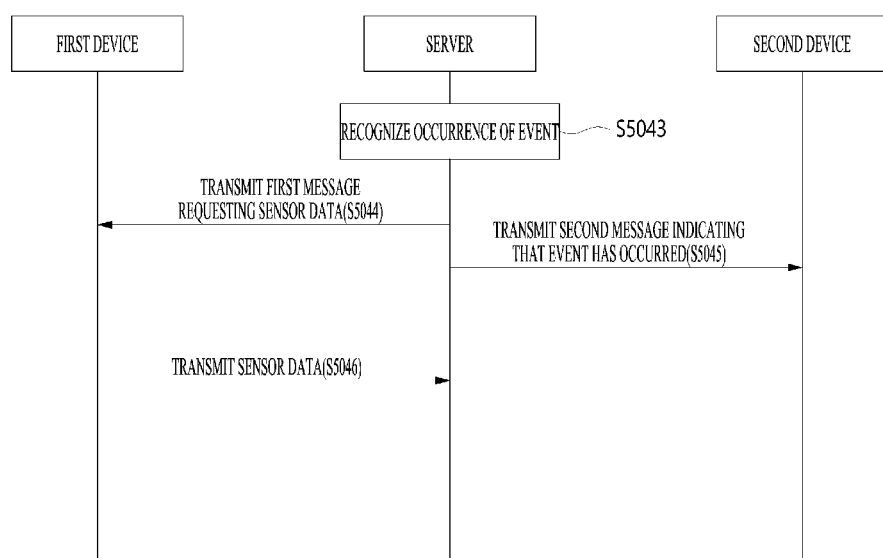
FIG. 67 is a diagram illustrating a method of requesting, by a server, data regarding a traffic event or indicating that a traffic event has occurred according to an embodiment.

FIG. 67 is a diagram illustrating a method of requesting, by a server, data regarding an event or indicating that an event has occurred according to an embodiment.

Referring to FIG. 67, the server may recognize an event that has occurred in a first region at a first time (S5043).

Details on how the server checks an event (it is noted that a traffic event is changed to an event) have been described in Section 4.2.2.1., and thus will be omitted here.

Also, the first time may refer to a representative time related to the occurrence of the event. For example, the first time may refer to a time at which the event actually occurs. However, the present invention is not limited thereto, and the first time may refer to a time at which the server recognizes the event.

Also, the first region may refer to a representative region related to the occurrence of the event. For example, the first region may refer to a region including all objects related to the event. However, the present invention is not limited thereto, and when the event is a fender-bender, the first region may refer to a point where a minor collision between occurs or a predetermined region including the point where the minor collision occurs.

Also, the server may transmit a first message for requesting sensor data related to the event to a first device (S5044).

Also, the server may transmit a second message indicating that the event has occurred to a second device (S5045).

Also, the server may receive sensor data related to the event from the first device (S5046).

The operation of transmitting a message and receiving sharing data among the above-described operations included in the server operation method will be described below.

4.2.3.1. Message Transmission Range

When an event is recognized, a server may request data from a first device located near a first area where the event has occurred. In this case, the server may request sensor data from the first device or may request various types of data other than the sensor data.

Figure 68:
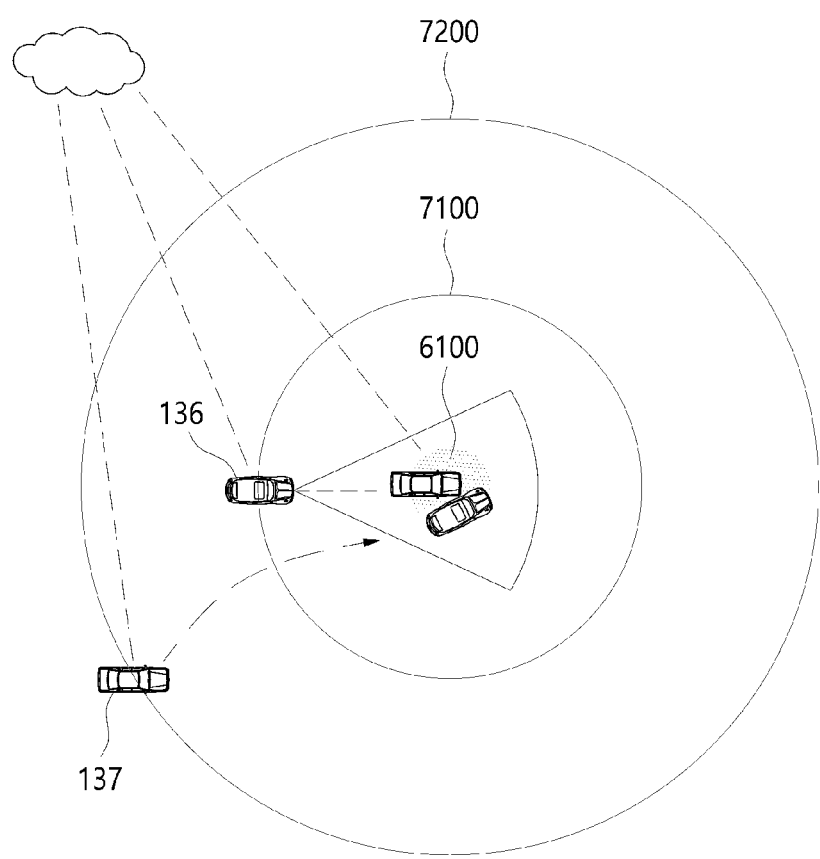
FIG. 68 is a diagram showing a situation in which a server and a vehicle communicate with each other to share data according to an embodiment.

FIG. 68 is a diagram showing a situation in which a server and a vehicle communicate with each other to share data according to an embodiment.

Referring to FIG. 68, a first vehicle 136 may be located in a first range from a region where the event 6100 has occurred and may acquire sensor data related to a traffic event 6100 through at least one sensor.

Also, when the first vehicle 136 is located in a first range 7100 from a first region where the traffic event 6100 has occurred, a server 400 which has recognized the traffic event 6100 may transmit a first message requesting sensor data to the first vehicle 136.

In this case, the first range 7100 may correspond to a region included in the inside of a predetermined shape based on the first region. For example, the first range may be a region included in the inside of an irregular shape, a circle, a polygonal shape, or the like, but the present invention is not limited thereto.

Also, the first range 7100 may be determined based on sensor data. In detail, when an object related to the traffic event is included in sensor data acquired by the first device located in the first range, the first range may be set such that the first device is located in the first range from the first region.

Also, the first range 7100 may include a first sub-range and a second sub-range.

Figure 69:
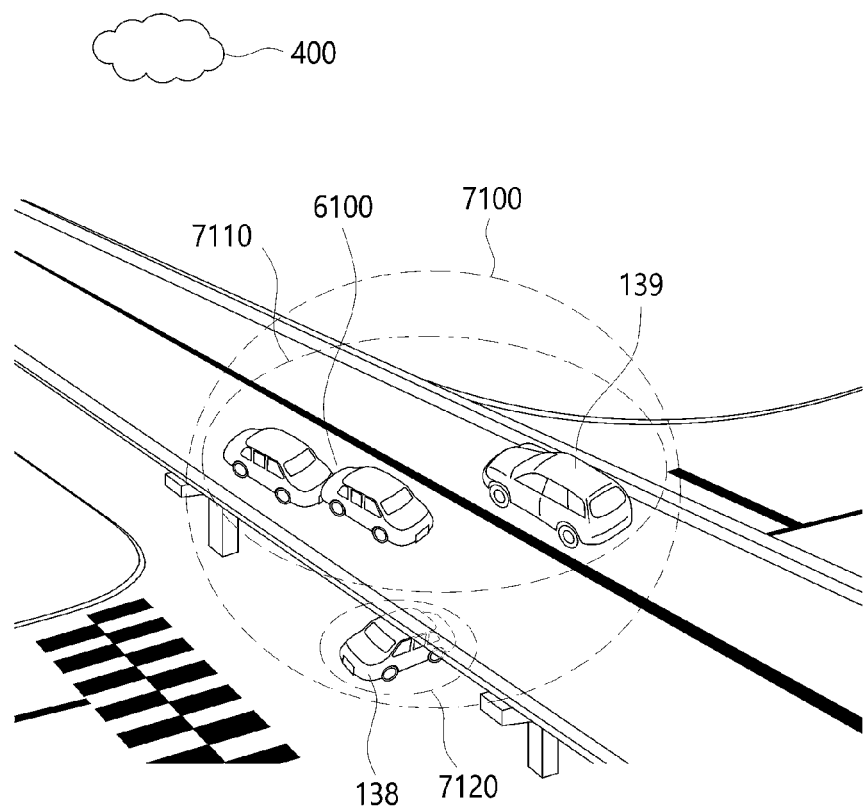
FIG. 69 is a diagram illustrating a first sub-range included in a first range according to an embodiment.

FIG. 69 is a diagram illustrating a first sub-range included in a first range according to an embodiment.

Referring to FIG. 69, the first range 7100 may include the inside of a sphere with respect to the region where the traffic event 6100 has occurred.

Also, a fourth vehicle 139 may be located in the first sub-range 7110 included in the first range 7100. In this case, the first sub-range 7110 may correspond to a region in which information related to the traffic event 6100 can be acquired in the first range 7100. In detail, when the fourth vehicle 139 is located in the first sub-range 7110, the fourth vehicle 139 may acquire data regarding the traffic event 6100 through at least one sensor.

Also, the first sub-range 7110 may be determined based on sensor data. In detail, when an object related to the traffic event is included in sensor data acquired by the fourth vehicle 139 located in the first range 7100, the first sub-range 7110 may be set such that the fourth vehicle 139 is located in the first sub-range 7110 from the first region. In this case, the sensor data acquired by the fourth vehicle 139 may include a subset of point data representing at least a portion of the object related to the traffic event 6100.

Also, the third vehicle 138 may be located in a second sub-range 7120 included in the first range 7100. In this case, the second sub-range 7120 may correspond to a region in which information related to the traffic event 6100 cannot be acquired in the first range 7100. In detail, when the third vehicle 138 is located in the second sub-range 7120, the third vehicle 138 may acquire data regarding the traffic event 6100 through at least one sensor.

Also, the second sub-range 7120 may be determined based on sensor data. In detail, when an object related to the traffic event is not included in sensor data acquired by the third vehicle 138 located in the first range 7100 or when the sensor data and the object related to the traffic event have a low correlation, the second sub-range 7120 may be set such that the third vehicle 183 is located in the second sub-range from the first region. In this case, the sensor data acquired by the third vehicle 138 may not include a subset of point data representing at least a portion of the object related to the traffic event 6100.

Also, the server may notify the second device located near the region where the traffic event has occurred of the occurrence of the event.

Referring to FIG. 68 again, the second vehicle 137 may be located in a second range 7200 from the first region where the traffic event 6100 has occurred.

Also, when the second vehicle 137 is located in the second range 7200, which represents a predetermined region outside the first range 7100, from the first region where the traffic event 6100 has occurred, the server may transmit a second message indicating that the traffic event has occurred to the second vehicle 137.

In this case, the second range 7200 may correspond to a region included in the inside of a predetermined shape with respect to the first region. For example, the second range may be a region included in the inside of an irregular shape, a circle, a polygonal shape, or the like in the region outside the first range 7100, but the present invention is not limited thereto.

Referring to FIG. 68 again, a path of the second vehicle 137 may be related to the first region where the traffic event 6100 has occurred. In detail, when the path of the second vehicle 137 located in the second range 7200 from the first region is related to the first region related to the traffic event 6100, the server 400 may transmit a second message indicating that the traffic event has occurred to the second vehicle 137.

Also, the second range 7200 may be determined based on the path of the second vehicle 137. In detail, when the path of the second vehicle 137 is related to the first region where the traffic event 6100 has occurred, the server 400 may determine the second range 7200 such that the second vehicle 137 is located in the second range 7200.

Also, the second range may include the first range. In this case, the server may transmit the first message and the second message to a vehicle located in the first range.

4.2.3.2 Reception of Sharing Data

Also, the server may receive sensor data from the first device in response to the first message. In this case, the sensor data may include a set of point data, a subset of point data, property data of the subset of point data, etc., but the present invention is not limited thereto.

Figure 70:
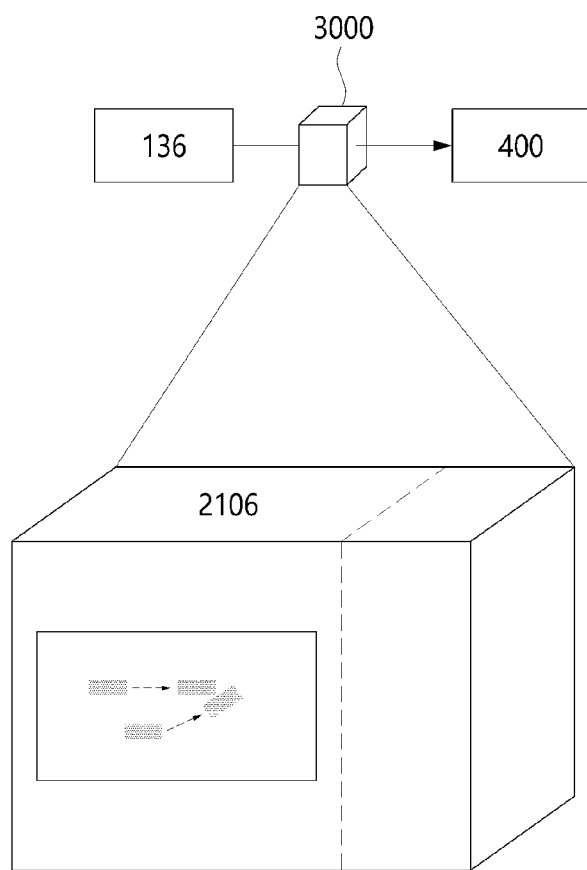
FIG. 70 is a diagram illustrating data included in the sharing data transmitted by a first vehicle to a server according to an embodiment.

FIG. 70 is a diagram illustrating data included in the sharing data transmitted by a first vehicle to a server according to an embodiment.

Referring to FIG. 70, the first vehicle 136 included in the first range may transmit sharing data 3000 to the server 400 in response to the first message. In this case, the content of the sharing data may include a first set of point data 2106 acquired at a first time point at which the traffic event 6100 occurs.

Also, the content of the sharing data may include a plurality of sets of point data acquired for a first time period including a first time at which the traffic event occurs in order to share information regarding before and after the occurrence of the traffic event 6100. In this case, the plurality of sets of point data may include the first set of point data 2106.

Also, details on when the sharing data is generated have been described in Section 4.2.2.3., and thus will be omitted here.

Also, a server 400 which has received the sharing data may reconfigure the traffic event on the basis of a plurality of sets of point data included in the content of the sharing data. In detail, the server 400 may reconfigure the traffic event by listing, in chronological order, a plurality of sets of point data related to the traffic event acquired for the first time period. Also, the server 400 may reconfigure the traffic event by re-sampling a plurality of sets of point data related to the traffic event acquired for the first time period.

The scheme of reconfiguring the traffic event can be used by those skilled in the art, and thus a detailed description thereof will be omitted here.

Also, the reconfigured traffic event may be transmitted to at least one vehicle and displayed to an occupant through an infotainment system of the at least one vehicle. However, the present invention is not limited thereto, and the reconfigured traffic event may be transmitted to an external institution.

4.2.3.3. Information Included in Message

Figure 71:
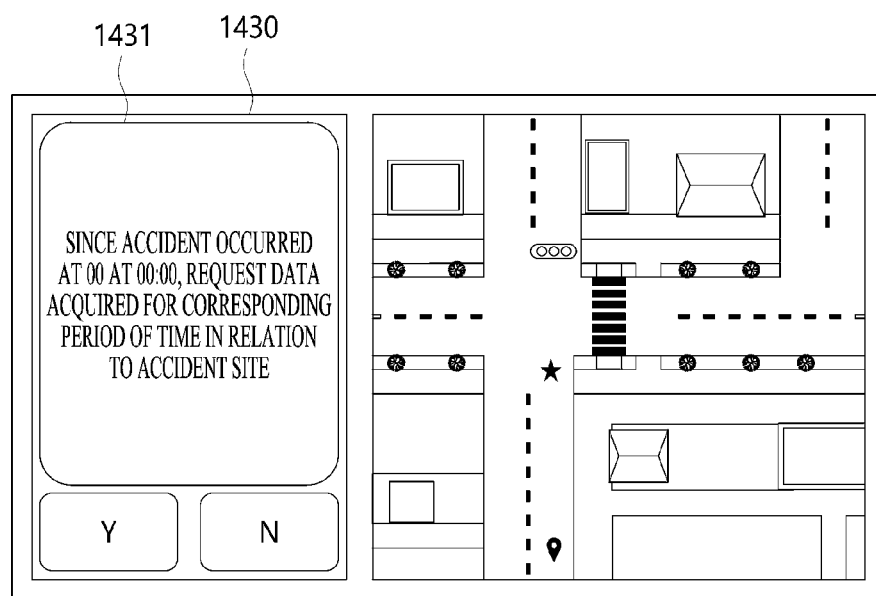
FIG. 71 is a diagram illustrating information included in a first message according to an embodiment.

FIG. 71 is a diagram illustrating information included in a first message according to an embodiment.

Referring to FIG. 71, a first message 1431 received from a server through a message window 1430 included in at least one infotainment system of a vehicle may be displayed.

Also, the first message 1431 may include time information related to the occurrence time of the event. In this case, the time information may include first information representing that the event has occurred at a first time. Also, a controller of the vehicle may recognize that the event has occurred at at least one of a time point at which the first message 1431 is received, a time point at which the time information is acquired, or a time point at which the first information is acquired.

Also, the first message 1431 may include request information for data related to the event.

Also, the controller of the vehicle may receive an input from an occupant in the vehicle in response to the first message 1431. In this case, the controller may receive an input for accepting the transmission of data related to the event from the occupant or may receive an input for rejecting the transmission of data related to the event.

When the controller receives the input for accepting the transmission of the data related to the event, the controller may generate sharing data including at least one subset of point data representing at least a portion of an object related to the event and may transmit the sharing data to the server or the object related to the event.

Figure 72:
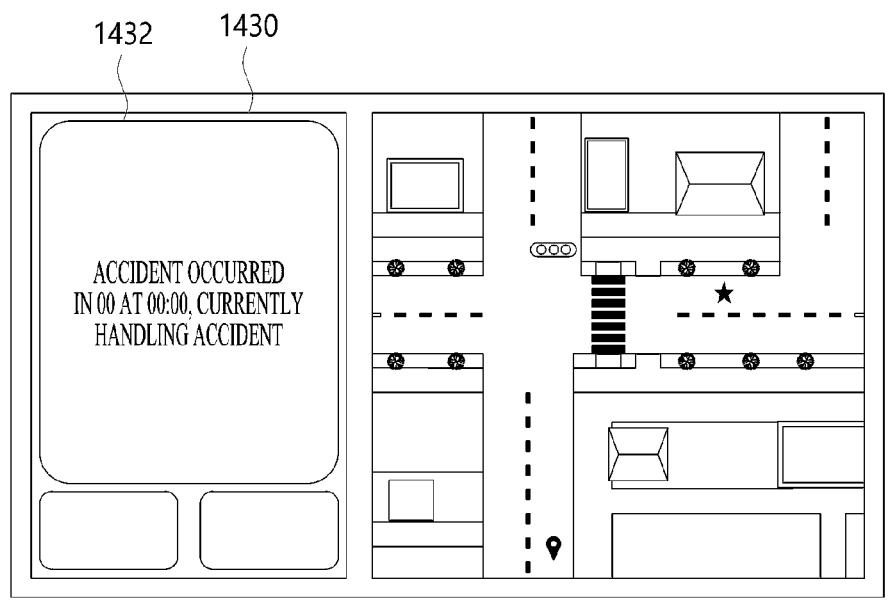
FIG. 72 is a diagram illustrating information included in a second message according to an embodiment.

FIG. 72 is a diagram illustrating information included in a second message according to an embodiment.

Referring to FIG. 72, a second message 1432 received from a server through a message window 1430 included in at least one infotainment system of a vehicle may be displayed.

Also, the second message 1432 may include position information related to the occurrence position of the event. In this case, the position information may include second information representing that the event has occurred in a first region. Also, a controller of the vehicle may recognize that the event has occurred at at least one of a time point at which the second message 1432 is received, a time point at which the position information is acquired, or a time point at which the second information is acquired.

Also, the second message 1432 may include at least a portion of information included in the first message. For example, the second message 1432 may include time information representing that the event has occurred at a first time, but the present invention is not limited thereto.

Also, in some embodiments, a server which has recognized the occurrence of an event may transmit a message requesting that data should be continuously shared between a device related to the event and a device located near the vehicle. For example, when a server recognizes that an environmental event, such as sudden rain, has occurred, the server may transmit a message requesting that data should be continuously shared between a plurality of vehicles in relation to the environmental event.

Also, in some embodiments, the server may recognize that a sensor failure event has occurred in an autonomous vehicle where at least one sensor is placed. In this case, in order to prevent the risk of an accident of the autonomous vehicle that may occur due to a sensor failure, the server may transmit a message requesting that data should be shared with the autonomous vehicle to a vehicle located near the autonomous device.

4.2.4. Selective Sharing Method (3) of Sensor Data According to Embodiment

Figure 73:
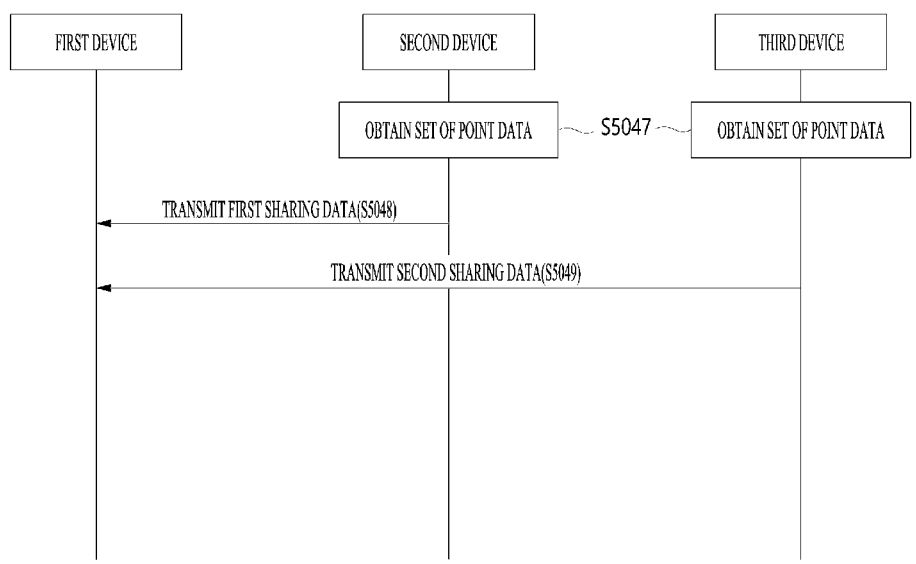
FIG. 73 is a diagram illustrating an example related to a selective sharing method of sensor data depending on the range.

FIG. 73 is a diagram illustrating an example related to a selective sharing method for sensor data depending on the range.

Referring to FIG. 73, a second device and a third device may acquire a set of point data using at least one sensor (S5047).

Also, the second device, which is located in a third range included in an available communication range from a region where the traffic event has occurred, may transmit first sharing data including a set of point data to a first device (S5048).

In this case, the third range may refer to a range in which data related to the traffic event can be acquired. Also, the third range may be determined in the same manner as the above-described first range determination scheme included in Section 4.2.3.1.

Also, the content of the first sharing data may include the set of point data, but the present invention is not limited thereto. The content of the first sharing data may include at least one of the set of point data, at least one subset of point data included in the set of point data, or property data of the at least one subset of point data, and information regarding the second device, but the present invention is not limited thereto.

Also, a third device, which is located in an available communication range from the region where the traffic event has occurred and is located outside the third range, may transmit second sharing data including position information of the third device to the first device (S5049).

In this case, the available communication range may refer to a predetermined region where it is possible to communicate with an object related to the traffic event to share data. For example, the available communication range may include a region where a vehicle related to the traffic event can communication with other devices through a V2X system.

Also, the content of the second sharing data may include position information of the third device, but the present invention is not limited thereto. The content of the second sharing data may include basic information regarding the third device. In this case, the position information of the third device may include GPS information of the third device. Also, the position information of the third device may include the position coordinates of the third device which are acquired from at least one sensor included in a fourth device located near the third device.

4.2.5. Selective Sharing Method (4) of Sensor Data According to Embodiment

Figure 74:
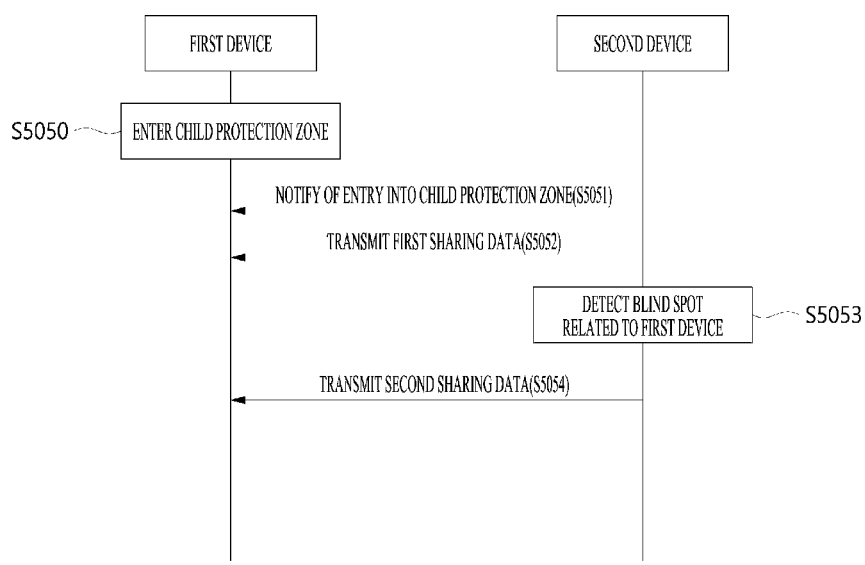
FIG. 74 is a diagram illustrating a selective data sharing method according to a blind spot during the driving of a vehicle in relation to a regulatory event according to an embodiment.

FIG. 74 is a diagram illustrating a selective data sharing method according to a blind spot during the driving of a vehicle in relation to a regulatory event according to an embodiment.

Referring to FIG. 74, a first device (e.g., a vehicle) may enter a specific regulation region such as a child protection zone (S5050). Here, the specific regulation region may refer to a region to which legal or customary regulations are applied in the first device compared to other regions. For example, the child protection zone may refer to a region where the driving speed of a vehicle is regulated to a predetermined speed or less and in which special attention is required for the safety of pedestrians including children in order to protect children from the vehicle. Thus, the first device may need to more accurately recognize the positions or movements of nearby pedestrians in the child protection zone than in other zones.

Also, the first device may request a second device located in the child protection zone to determine whether a blind spot where an object cannot be recognized is in the field of view of a sensor of the first device.

Also, the second device (e.g., an infrastructure device) located in the child protection zone may notify the first device that the first device has entered the child protection zone (S5051). In this case, the method of the second device notifying the first device that the first device has entered the child protection zone may include transmitting a notification message indicating that the above-described regulatory event has occurred, but the present invention is not limited thereto. However, the present invention is not limited thereto, and the first device may notify the second device that the first device has entered the child protection zone.

Also, when the first device enters the child protection zone, the second device may transmit first sharing data to the first device (S5052). In this case, the content of the first sharing data may include sensor data acquired from at least one sensor placed in the second device, data other than the sensor data, etc., but the present invention is not limited thereto. For example, the sensor data may include a set of point data, a subset of point data, property data of the subset of point data, etc., but the present invention is not limited thereto.

Also, the second device may detect a blind spot related to the first device (S5053). In this case, the method of the second device detecting a blind spot related to the first device may include various methods.

As an example, the first device may detect a blind spot related to the first device by itself and transmit blind spot-related information to the second device. As a specific example, when the first device is a vehicle, the vehicle may compare a high-definition map received from the outside to sensor data acquired from at least one sensor placed in the vehicle and may determine that a blind spot is present when an object that is not included in the sensor data is included in the high-definition map. In this case, the vehicle may transmit information related to the presence of a blind spot to the second device.

However, the present invention is not limited thereto, and the first device may detect a blind spot on the basis of a ratio of ground-related data to non-ground data in sensor data acquired through at least one sensor placed in the first device. In detail, when the proportion of the non-ground data covered by an object included in the sensor data acquired by the first device is greater than or equal to a predetermined proportion, the first device may determine that a blind spot is present and may transmit information related to the presence of the blind spot to the second device.

As another example, when the first device enters a specific regulation region such as a child protection zone, the second device may determine that a blind spot related to the first device is present regardless of whether the blind spot related to the first device is actually present. Specifically, since the risk of collision between the first device and a pedestrian is high in a specific regulation region such as a child protection zone, the second device may determine that a blind spot related to the first device is present when the first device enters the child protection zone.

However, the present invention is not limited thereto, and the second device may determine the presence of a blind spot related to the first device on the basis of sensor data acquired through at least one sensor placed in the second device. In other words, the second device may determine the presence of the blind spot related to the first device on the basis of a positional relationship between a plurality of objects including the first device included in the sensor data acquired by the second device. In detail, when the second device determines that the first device cannot recognize a specific object included in the sensor data on the basis of position information of the first device, the second device may determine the presence of the blind spot related to the first device.

Also, when the blind spot related to the first device is detected, the second device may transmit second sharing data to the first device. In this case, the content of the second sharing data may include a subset of point data representing at least a portion of an object located in the blind spot of the first device, but the present invention is not limited thereto. The content of the second sharing data may include property data of the subset of point data. Also, the content of the second sharing data may include all data included in the sensor data acquired by the second device as well as the data regarding the object located in the blind spot of the first device.

5. Processing and Use of Sharing Data

5.1. Overview

In a data sharing system according to an embodiment, a first device may transmit sharing data including sensor data to a second device. In this case, the first device and the second device may include a vehicle, a server, an infrastructure device, a mobile device, or the like, but the present invention is not limited thereto. In this case, the second device, which has received the sharing data, may process the sensor data included in the content of the sharing data, and the processed sensor data may be utilized to control the second device, an apparatus including the second device, or the like. For example, when the second device is a LiDAR device and an apparatus including the second device is a vehicle, a controller of the LiDAR device or a controller of the vehicle may process sensor data included in the content of the sharing data to control the LiDAR device or control the vehicle.

In the following description, for convenience of description, an entity that implements the description in Section 5 is expressed as the controller of the vehicle, but the present invention is not limited thereto. It will be appreciated that the controller of the second device or the controller of the apparatus including the second device may also be an entity that implements the description in Section 5.

Also, the content of the sharing data may include a set of point data, a subset of point data, property data, etc., but the present invention is not limited thereto.

Also, the content of the sharing data may include data other than the sensor data. For example, the content of the sharing data may include traffic event-related information, position information of the first device, or a destination of the first device, etc., but the present invention is not limited thereto.

Also, the controller of the second device may process sharing data differently as described in Section 3.4.1. according to the type of the content of the received sharing data.

Also, in order to match the sensor data acquired from the first device included in the content of the sharing data to sensor data acquired from the second device, the controller of the second device may align a coordinate system using the scheme described in Section 3.4.2.

Also, the second device may receive sharing data from the first device in order to acquire information regarding an object placed in a region where sensor data cannot be acquired (e.g., a blind spot) in the field of view of at least one sensor included in the second device. For example, when a running vehicle enters a child protection zone, the vehicle may receive, from an infrastructure device placed in the child protection zone, sharing data including sensor data acquired from a sensor of the infrastructure device in order to acquire information regarding an object not included in sensor data acquired from a sensor placed in the vehicle.

5.2. Various Embodiments of Processing and Using Sensor Data and Sharing Data

5.2.1. Case in which Set of Point Data is Included in Sharing Data

In a data sharing system according to an embodiment, a first device may transmit sharing data including a set of point data acquired from a sensor to a second device. In this case, the second device may process the received set of point data in the same scheme as described in Section 3.4.1.1.

For example, referring to FIGS. 36 to 38 again, an infrastructure device 700 may transmit sharing data 3000 including a first set of point data 3100 to a first vehicle 122. For convenience of description, when the elements shown in FIGS. 36 to 38 correspond to the elements described in Section 5.2.1, the infrastructure device 700 described with reference to FIGS. 36 to 38 may correspond to the first device described in Section 5.2.1., and the first vehicle 122 described with reference to FIGS. 36 to 38 may correspond to the second device described in Section 5.2.1. In this case, the controller of the first vehicle 122 may acquire information regarding an object included in a plurality of sets of point data using a second set of point data 2100 acquired from a sensor placed in the first vehicle 122 and a first set of point data 3100 included in the sharing data acquired from the infrastructure device 700.

5.2.2. Case in which Property Data is Included in Sharing Data

Referring to FIG. 39 again, the sharing data 3000 may include property data of a subset of point data representing at least a portion of an object. In this case, the property data may include center position information, size information, shape information, movement information, identification information, etc., but the present invention is not limited thereto.

5.2.2.1. Processing of Sharing Data and Aligning of Coordinate System According to Embodiment FIG. 75 is a flowchart illustrating a scheme of processing property data included in sharing data according to an embodiment.

Figure 75:
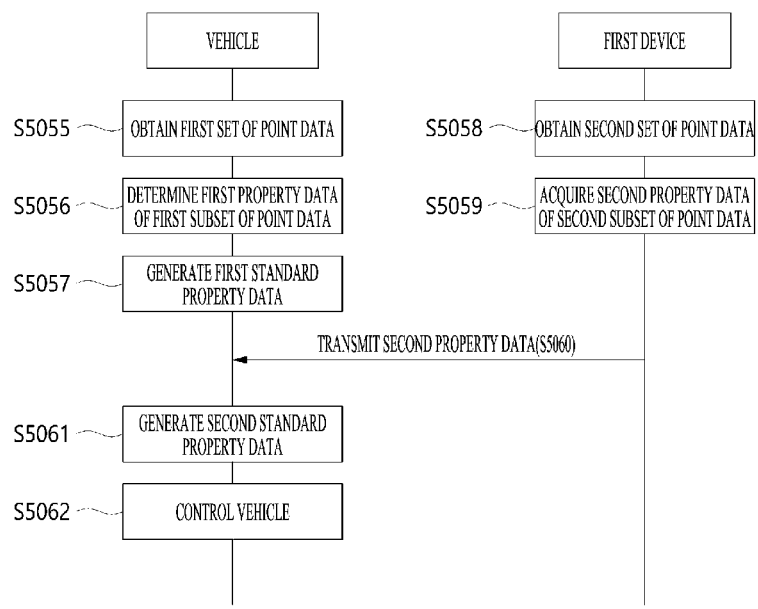
FIG. 75 is a flowchart illustrating a scheme of processing property data included in sharing data according to an embodiment.

Referring to FIG. 75, a controller of a vehicle may acquire a first set of point data through at least one sensor placed in the vehicle (S5055).

Also, the controller of the vehicle may determine first property data of a first subset of point data included in the first set of point data (S5056).

Also, the controller of the vehicle may generate first standard property data on the basis of the first property data (S5057).

Also, a first device may acquire a second set of point data through at least one sensor placed in the first device (S5058).

Also, a controller of the first device may determine second property data of a second subset of point data included in the second set of point data (S5059).

Also, the controller of the first device may transmit sharing data including the second property data to the vehicle (S5060).

Also, the controller of the vehicle may generate second standard property data using the second property data received from the first device (S5061).

Also, the controller of the vehicle may control the vehicle on the basis of the first standard property data and the second standard property data (S5062).

Hereinafter, the operations described with reference to FIG. 75 will be described in detail.

5.2.2.1.1. Acquisition of Set of Point Data and Property Data

Figure 76:
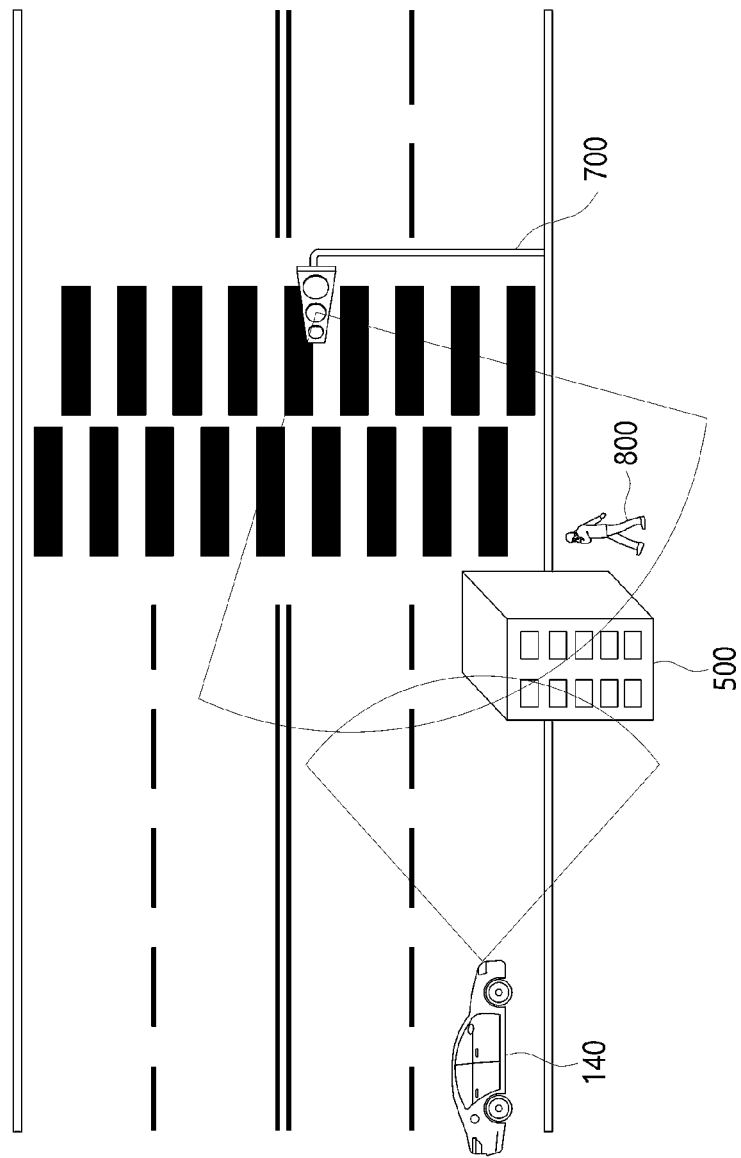
FIG. 76 is a diagram showing a situation in which a vehicle and an infrastructure device acquire sensor data to perform data sharing according to an embodiment.

FIG. 76 is a diagram showing a situation in which a vehicle and an infrastructure device acquire sensor data to perform data sharing according to an embodiment.

Referring to FIG. 76, a vehicle 140 and an infrastructure device 700 may acquire, through at least one sensor, sensor data including information regarding at least one object placed in the field of view of the sensor.

In detail, a controller of the vehicle 140 may acquire a first set of point data through at least one sensor placed in the vehicle and may determine first property data of the first subset of point data representing at least a portion of a building 500 included in the first set of point data (S5055, S5056). In this case, the first set of point data may not include information regarding a pedestrian 800 covered by the building 500.

Also, the first property data (see 2208 in FIG. 77) may include center position information, size information, shape information, and the like of the first subset of point data, but the present invention is not limited thereto.

Also, considering the location of the infrastructure device 700, the infrastructure device 700 may measure the pedestrian 800 and the building 500 using at least one sensor. In this case, the infrastructure device 700 may determine a second set of point data through at least one sensor placed in the infrastructure device 700, and a controller of the infrastructure device 700 may determine second property data of a second subset of point data representing at least a portion of the pedestrian 800 included in the second set of point data. Also, the second set of point data may include a third subset of point data representing at least a portion of the building 500.

In this case, since the second subset of point data represents at least a portion of the pedestrian 800 not included in the first set of point data, the infrastructure device 700 may transmit the second subset of point data or the second property data of the second subset of point data to the vehicle 140 in order to prevent the risk of collision with the pedestrian 800 that may occur while the vehicle is traveling.

5.2.2.1.2. Generation of Standard Property Data

Set of point data and property data included in sensor data acquired from at least one sensor may be shown in a coordinate system based on any origin. In this case, the origin may correspond to the position of the sensor that has acquired the set of point data and the property data. For example, the origin may correspond to the optical origin of a LiDAR device that has acquired the sensor data, but the present invention is not limited thereto.

Figure 77:
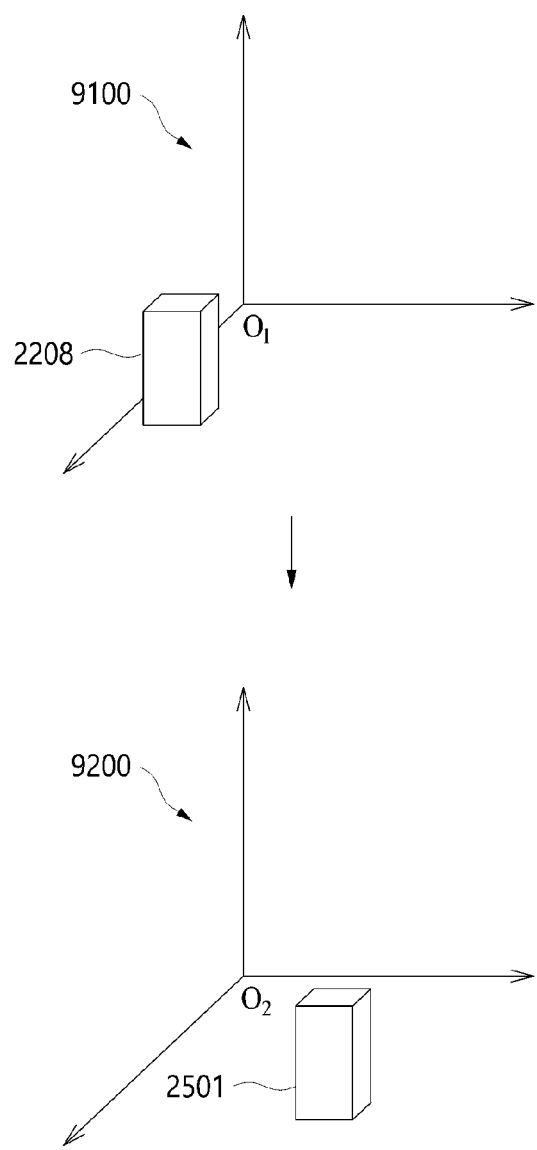
FIG. 77 is a diagram illustrating a method in which a controller of a vehicle shows first property data and first standard property data in a first local coordinate system and a global coordinate system, respectively, according to an embodiment.

FIG. 77 is a diagram illustrating a method in which a controller of a vehicle shows first property data and first standard property data in a first local coordinate system and a global coordinate system, respectively, according to an embodiment.

Referring to FIG. 77, first property data 2208 may be shown in a first local coordinate system 9100 based on a first origin $O_1$. However, the present invention is not limited thereto, and the first set of point data and the first subset of point data may also be shown in the first local coordinate system 9100.

As a specific example, when the first property data 2208 includes center position information of the first subset of point data, the center position coordinates of the first subset of point data included in the center position information may be shown in the first local coordinate system 9100.

In this case, the first origin $O_1$ may correspond to the position of the sensor that has acquired the first set of point data. For example, when the vehicle 140 acquires the first set of point data through a LiDAR device, the first origin $O_1$ may correspond to the optical origin of the LiDAR device.

Also, the first origin $O_1$ may correspond to the position of the vehicle 140. For example, a controller of the vehicle 140 may set the first origin $O_1$ on the basis of GPS position information of the first vehicle 140.

Also, the first origin $O_1$ may correspond to the position of the center of gravity of the vehicle 140, the position of the center of gravity of the sensor, or the like, but the present invention is not limited thereto.

Also, referring to FIG. 77 again, the controller of the vehicle 140 may generate first standard property data 2501 on the basis of the first property data 2208 (S5057).

Here, the standard property data represents data for matching the positions of various pieces of property data to a single coordinate system, and the first standard property data 2501 generated based on the first property data 2208 and the second standard property data (see 3502 in FIG. 78) generated based on second property data (see 3202 in FIG. 78) may have the same origin.

In an example of FIG. 77, the first standard property data 2501 may be shown in the global coordinate system 9200 based on a second origin $O_2$. In detail, the controller of the vehicle 140 may generate the first standard property data 2501 by aligning the first property data 2208 shown in the first local coordinate system 9100 with the global coordinate system 9200. In this case, the controller of the vehicle 140 may align the first local coordinate system 9100 with the global coordinate system 9200 on the basis of the scheme described in Section 3.4.2.

However, the present invention is not limited thereto, and the controller of the vehicle 140 may set the first local coordinate system 9100 as a global coordinate system. In this case, the origin of the first local coordinate system 9100 may be the same as the origin of the local coordinate system. In other words, when the first local coordinate system 9100 is set as a global coordinate system, the position of the second origin $O_2$ may match the position of the first origin $O_1$.

More specifically, the controller of the vehicle 140 may set the first local coordinate system 9100 as a global coordinate system based on the first origin $O_1$ without changing the position of the origin of the first local coordinate system 9100.

As a specific example, when the first property data 2208 includes center position information of the first subset of point data, the controller of the vehicle 140 may show, in the global coordinate system 9200, the coordinate position coordinates of the first subset of point data included in the center position information.

Also, the global coordinate system 9200 may include a predetermined origin. In this case, the predetermined origin may refer to the origin of the coordinate system based on GPS position information.

Also, the second origin $O_2$ may correspond to the optical origin of a LiDAR device included in the vehicle 140.

Also, when the first local coordinate system 9100 is set as a global coordinate system, the position of the second origin $O_2$ may match the position of the first origin $O_1$.

FIG. 78 is a diagram illustrating a method in which a controller of a vehicle generates second standard property data on the basis of second property data shown in a second local coordinate system according to an embodiment.

Referring to FIG. 78, a controller of the infrastructure device may show second property data 3202 and third property data 3203 in a second local coordinate system 9300 based on a third origin $O_3$.

Here, the second local coordinate system 9300 has a different origin from the first local coordinate system, and the second local coordinate system 9300 and the first local coordinate system 9100 may have the same coordinate system type (e.g., the second local coordinate system 9300 and the first local coordinate system 9100 are Cartesian coordinate systems) and may also have different coordinate system types (e.g., the second local coordinate system 9300 is a polar coordinate system, and the first local coordinate system 9100 is a Cartesian coordinate system).

Also, the second property data 3202 may be determined based on a second subset of point data representing at least a portion of the pedestrian 800 of FIG. 76, and the third property data 3203 may be determined based on a third subset of point data representing at least a portion of the building 500 of FIG. 76. However, the present invention is not limited thereto, and the second set of point data, the second subset of point data, and the third subset of point data may be shown in the second local coordinate system 9300.

In this case, the third origin $O_3$ may correspond to the position of the sensor that has acquired the second set of point data. For example, when the infrastructure device 700 acquires the second set of point data through a LiDAR device, the third origin $O_3$ may correspond to the optical origin of the LiDAR device.

Also, the third origin $O_3$ may correspond to the position of the infrastructure device 700. For example, the controller of the infrastructure device 700 may set the third origin $O_3$ on the basis of GPS position information of the infrastructure device 700.

Also, the third origin $O_3$ may correspond to the position of the center of gravity of the infrastructure device 700, the position of the center of gravity of the sensor, or the like, but the present invention is not limited thereto.

Also, the controller of the infrastructure device 700 may transmit sharing data including the second property data 3202 to the vehicle 140 (S5060).

In this case, the second property data 3202 may be included in the second set of point data and may be determined based on a second subset of point data representing at least a portion of a pedestrian which is not included in the first set of point data.

Also, the content of the sharing data may further include the third property data 3203. In this case, the third property data 3203 may be determined based on a third subset of point data representing at least a portion of a building included in the first set of point data and the second set of point data.

In some embodiments, it will be appreciated that the content of the sharing data may not include the third property data 3203.

However, the present invention is not limited thereto, and the content of the sharing data may further include basic information of the infrastructure device 700 or the like.

Also, referring to FIG. 78 again, the controller of the vehicle 140 may generate second standard property data 3502 on the basis of the second property data 3202 included in the sharing data received from the infrastructure device 700 (S5061).

In this case, the second standard property data 3502 may be shown in a global coordinate system 9200 based on the second origin $O_2$. In detail, the controller of the vehicle 140 may generate the second standard property data 3502 by aligning the second property data 3202 shown in the second local coordinate system 9300 with the global coordinate system 9200 in which the first standard property data 2501 is shown. In this case, the controller of the vehicle 140 may align the second local coordinate system 9300 with the global coordinate system 9200 on the basis of the scheme described in Section 3.4.2.

For example, when the first local coordinate system 9100 is set as the global coordinate system 9200, the controller of the vehicle may generate the second standard property data 3502 by aligning the received second property data 3202 with the first local coordinate system 9100.

Also, in the method of processing and using sharing data according to an embodiment, which is shown in FIG. 76, the controller of the vehicle may determine whether an object represented by at least one piece of property data included in the content of the sharing data is the same as an object represented by a first set of point data.

For example, an object represented by third property data 3203 included in the sharing data received from the infrastructure device 700 may be the same as the building 500 represented by the first property data. In this case, the controller of the vehicle 140 may generate third standard property data 3503 on the basis of the third property data 3203.

In this case, the third standard property data 3503 may be shown in the global coordinate system 9200 based on the second origin $O_2$. In detail, the controller of the vehicle 140 may generate the third standard property data 3503 by aligning the third property data 3203 shown in the second local coordinate system 9300 with the global coordinate system 9200 in which the first standard property data 2501 is shown. In this case, the controller of the vehicle 140 may align the second local coordinate system 9300 with the global coordinate system 9200 on the basis of the scheme described in Section 3.4.2.

Also, the controller of the vehicle 140 acquires the third property data 3203 or the third standard property data 3503 for the same building 500, and thus it is possible to implement a higher temporal resolution for the building 500. In detail, by acquiring the third property data 3203 or the third standard property data 3503 from the infrastructure device 700, it is possible to reinforce information regarding the building 500 that cannot be acquired in a certain time interval according to the frame rate of the LiDAR device placed in the vehicle 140.

However, the present invention is not limited thereto, and the controller of the vehicle 140 may not receive the third property data 3203 from the infrastructure device 700. In detail, since a first set of point data acquired by the vehicle 140 through a sensor includes a first subset of point data representing at least a portion of the building 500, the controller of the vehicle 140 may not receive a third subset of point data representing the same object and the third property data 3203 determined based on the third subset of point data from the infrastructure device 700.

Also, the controller of the vehicle 140 may not store the third property data 3203 received from the infrastructure device 700.

Also, when the third property data 3203 is received from the infrastructure device 700, the controller of the vehicle 140 may generate the third standard property data 3503 without generating the first standard property data 2501.

Also, the controller of the vehicle 140 may determine whether a sensor placed in the vehicle 140 is abnormal on the basis of the first standard property data 2501 and the third standard property data 3503. In detail, when the position information of the building 500 included in the third standard property data 3503 generated through the above-described coordinate system alignment method is different from the position information of the building 500 included in the first standard property data 2501, the controller of the vehicle 140 may determine that the sensor placed in the vehicle 140 is unfastened. Also, when it is determined that the sensor is unfastened, the controller of the vehicle 140 may transmit a notification indicating that the sensor is unfastened to an occupant. In this case, the notification may be displayed to the occupant through an infotainment system. However, the present invention is not limited thereto, and the notification may be transmitted to the occupant through a scheme known to those skilled in the art, such as sound.

Also, the sensor data processing method according to an embodiment is not limited to the operations shown in FIG. 75, and the controller of the infrastructure device may generate second standard property data on the basis of second property data and may transmit sharing data including the second standard property data to the vehicle.

However, the present invention is not limited thereto, and when the controller of the vehicle receives a high-definition map including the second property data, the controller of the vehicle may set the second local coordinate system as a global coordinate system. In this case, in order to match sensor data acquired from the sensor placed in the vehicle to the high-definition map, the controller of the vehicle may align a first local coordinate system in which the first property data is shown with the global coordinate system.

5.2.2.1.3. Vehicle Control Using Standard Property Data—Path Generation (Path Planning)

A controller of a vehicle may control the vehicle on the basis of a plurality of pieces of standard property data. However, the present invention is not limited thereto, and the controller of the vehicle may control the vehicle on the basis of at least one of a set of point data, a subset of point data, and property data.

For example, the controller of the vehicle may control the vehicle using sensor data or sharing data as described in Section 2.3. or Section 3.5. As a specific example, the controller of the vehicle may match the plurality of pieces of standard property data to a high-definition map, control the speed and direction of the vehicle, or control the path of the vehicle.

In this case, the path of the vehicle may include a global path and a local path. Here, the global path may refer to a path to a destination of the vehicle which is generated based on GPS position information, but the present invention is not limited thereto. Also, the local path may refer to a path that is generated based on sensor data acquired from a sensor placed in the vehicle or sharing data, but the present invention is not limited thereto. As an example, one global path may correspond to a plurality of local paths and also may be generated by adding a plurality of local paths. However, the present invention is not limited thereto, and a global path and a local path may be formed independently.

Also, the global path or the local path may include the direction of the vehicle, the speed of the vehicle, etc. In detail, the global path or the local path may include the position of the vehicle, a direction in which the vehicle is to travel, the traveling speed of the vehicle, etc., but the present invention is not limited thereto.

Figure 79:
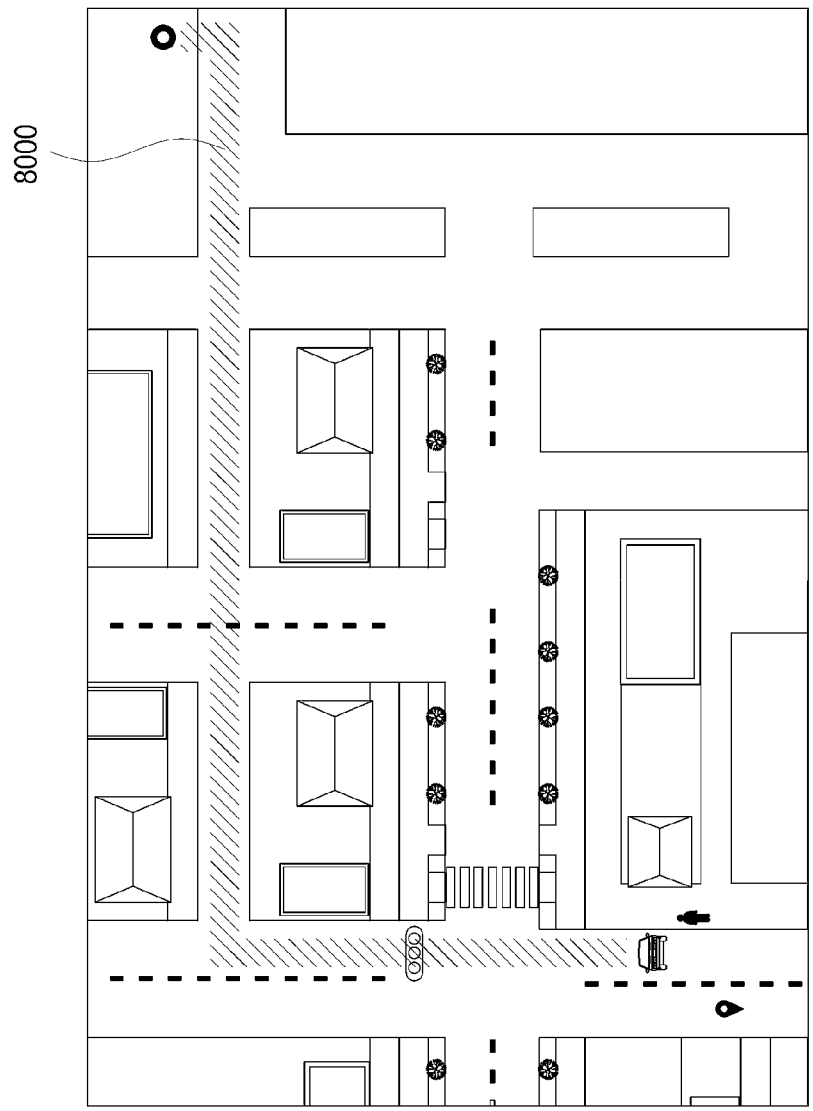
FIG. 79 is a diagram illustrating a global path according to an embodiment.

FIG. 79 is a diagram illustrating a global path according to an embodiment.

Referring to FIG. 79, the controller of the vehicle may generate and show a global path 8000 in a high-definition map. In this case, the controller of the vehicle may control the vehicle to travel along the global path 8000.

In this case, the controller of the vehicle may generate a global path 8000 along which the vehicle is to travel on the basis of the location and destination of the vehicle before the vehicle starts to travel.

Also, when an input for an origin and a destination of an occupant is received, the controller of the vehicle may generate a global path 8000 on the basis of GPS position information of the origin and the destination.

Also, the controller of the vehicle may reflect traffic information between the position of the vehicle and the destination of the vehicle while generating the global path 8000.

As an example, the controller of the vehicle may set a path that allows the vehicle to travel from the position of the vehicle to the destination of the vehicle in the shortest time as the global path 8000.

As another example, the controller of the vehicle may set a path that allows the vehicle to travel from the current position of the vehicle to the destination in the shortest distance as the global path 8000.

Also, the global path 8000 may not include a detailed path in units of lanes. In detail, the global path 8000 may not include detailed paths that allow the controller of the vehicle to control the vehicle to change lanes.

In some embodiments, it will be appreciated that the global path 8000 may include detailed paths in units of lanes.

Figure 80:
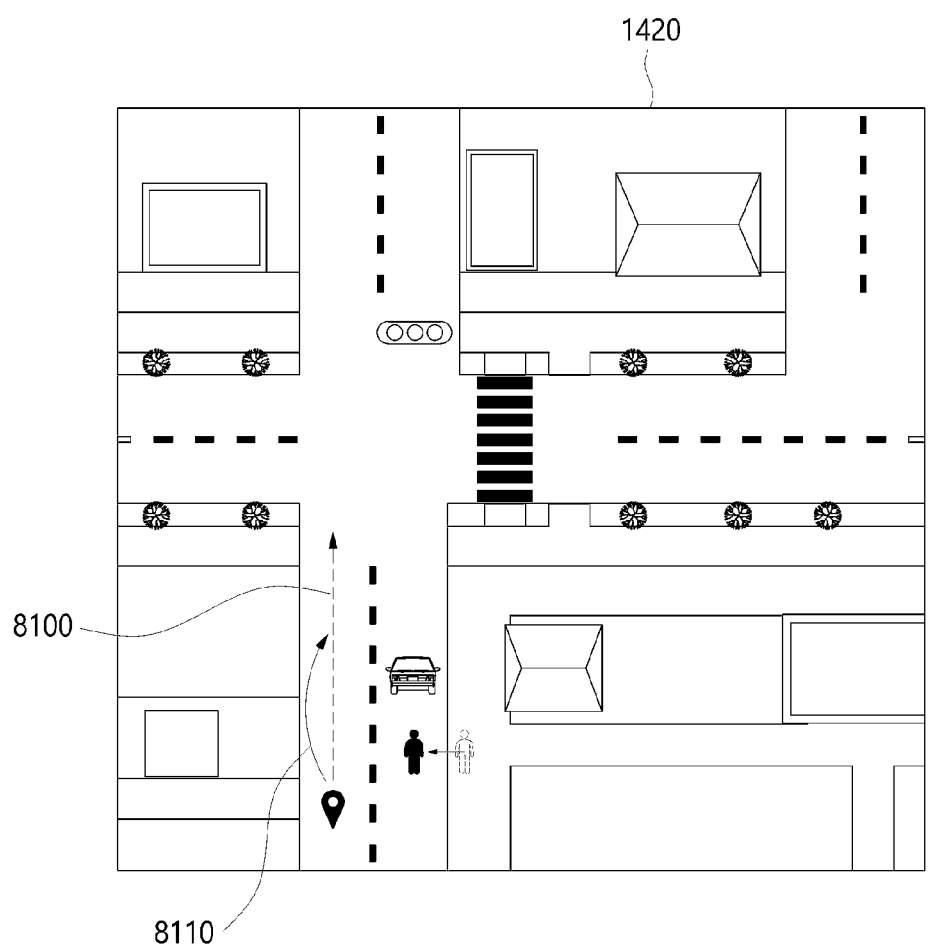
FIG. 80 is a diagram illustrating a local path and a modified path according to an embodiment.

FIG. 80 is a diagram illustrating a local path and a modified path according to an embodiment.

Referring to FIG. 80, the controller of the vehicle may generate a local path 8100 along which the vehicle is to travel and then may display the local path 8100 in a high-definition map 1420.

More specifically, the controller of the vehicle may generate a local path 8100 related to at least a portion of the global path on the basis of sensor data for at least one object present in the field of view of at least one sensor placed in the vehicle traveling along the global path.

However, the present invention is not limited thereto, and the controller of the vehicle may generate a local path 8100 on the basis of the sensor data and sharing data acquired from other devices.

More specifically, the controller of the vehicle may generate a local path 8100 on the basis of sensor data for at least one object present in the field of view of a sensor placed in the vehicle traveling along the global path and sensor data acquired from a sensor placed in other devices.

For example, when a vehicle located at a first point sets a second point as a destination, a controller of the vehicle may generate a global path that allows the vehicle to travel from the first point to the second point and may generate a local path 8100 on the basis of sensor data and sharing data which are acquired while the vehicle is traveling along the global path.

Also, the local path 8100 may include a detailed path in units of lanes. In detail, the local path 8100 may include a detailed path that allows the controller of the vehicle to change lanes to travel on the next lane.

Also, the local path 8100 may include an available movement region in a visible region of a driver.

Also, the local path 8100 may include a region including at least one object present in the field of view of a sensor placed in the vehicle.

Also, when the local path 8100 is generated based on sensor data acquired while the vehicle is traveling and sharing data received from other devices, the local path 8100 may include both of a region including at least one object in the field of view of the sensor placed in the vehicle and a region including at least one object out of the field of view of the sensor placed in the vehicle.

Also, the local path 8100 may include a modified path 8110.

In detail, when the controller of the vehicle detects an obstacle threatening the vehicle on the global path or the local path of the vehicle, the controller of the vehicle may generate the modified path 8110. In this case, the controller of the vehicle may set the modified path 8110 as a local path along which the vehicle is to travel.

The modified path 8110 will be described in detail below (in Section 5.2.2.2.2.).

5.2.2.2. Processing of Sharing Data and Generation of Path According to Embodiment According to an embodiment, a vehicle that has received sharing data may generate a path along which the vehicle is to travel on the basis of the sharing data and sensor data acquired from a sensor placed in the vehicle.

Figure 81:
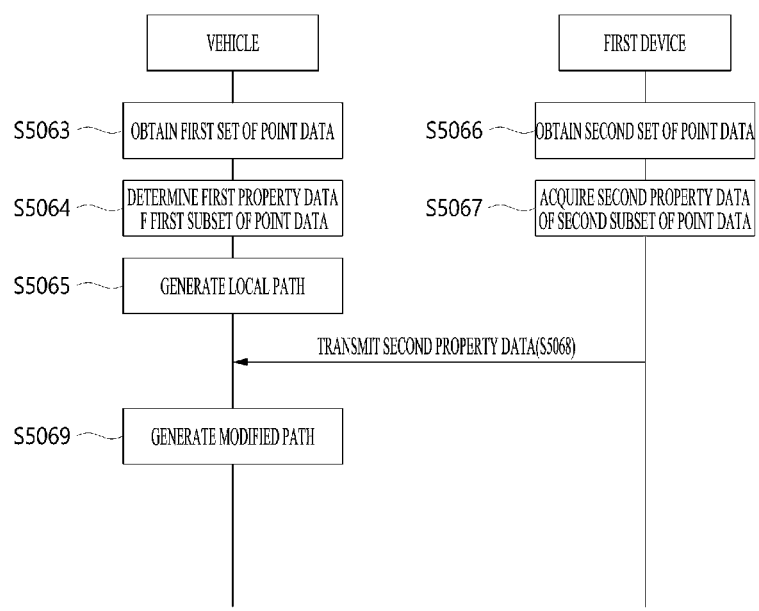
FIG. 81 is a flowchart illustrating a method of generating or modifying, by a vehicle, a path on the basis of sharing data according to an embodiment.

FIG. 81 is a flowchart illustrating a method of generating or modifying, by a vehicle, a path on the basis of sharing data according to an embodiment.

Referring to FIG. 81, a controller of a vehicle may acquire a first set of point data through at least one sensor placed in the vehicle (S5063).

Also, the controller of the vehicle may determine first property data on the basis of at least one subset of point data included in the first set of point data (S5064).

Also, the controller of the vehicle may generate a local path along which the vehicle is to travel on the basis of at least a portion of the first set of point data, at least one subset of point data or the first property data (S5065).

Also, a controller of a first device may acquire a second set of point data through at least one sensor placed in the first device (S5066).

Also, the controller of the first device may determine second property data on the basis of the second subset of point data included in the second set of point data (S5067).

Also, the controller of the first device may transmit sharing data including the second property data to the vehicle (S5068).

Also, the vehicle may generate a modified path on the basis of the second property data and at least one of the first set of point data, the first property data, or the local path (S5069).

Hereinafter, the operations of the method in which the vehicle generates or modifies the path on the basis of the sharing data according to an embodiment will be described in detail.

5.2.2.2.1. Generation and Sharing of Sensor Data and Sharing Data

Figure 82:
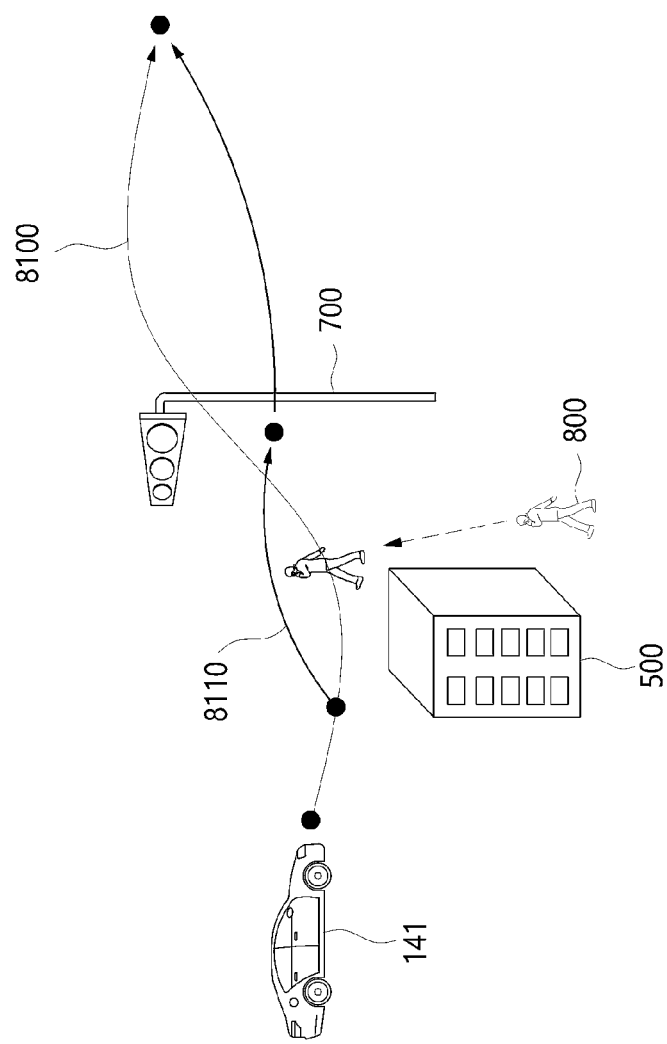
FIG. 82 is a diagram showing a situation in which a first vehicle travels along a path generated based on sensor data and sharing data according to an embodiment.

FIG. 82 is a diagram showing a situation in which a first vehicle travels along a path generated based on sensor data and sharing data according to an embodiment.

Referring to FIG. 82, a controller of a first vehicle 141 may acquire a first set of point data through a sensor placed in the first vehicle 141, and a controller of an infrastructure device 700 may acquire a second set of point data through a sensor placed in the infrastructure device 700 (S5063, S5066).

In this case, the first set of point data may include a first subset of point data representing at least a portion of a building 500, and the controller of the first vehicle 141 may determine first property data on the basis of the first subset of point data (S5064). In this case, the first set of point data may not include information regarding a pedestrian 800 that is covered by the building 500 and thus placed out of the field of view of the sensor. Also, the first property data may include center position information, size information, movement information, shape information, and the like of the building 500, but the present invention is not limited thereto.

Also, the second set of point data may include a second subset of point data representing at least a portion of the pedestrian 800, and the controller of the infrastructure device 700 may determine second property data on the basis of the second subset of point data (S5067). In this case, the second property data may include center position information, size information, movement information, shape information, and the like of the pedestrian 800, but the present invention is not limited thereto.

However, the present invention is not limited thereto, the second set of point data may include a third subset of point data representing at least a portion of the building 500, and the controller of the infrastructure device 700 may determine third property data on the basis of the third subset of point data.

Also, the controller of the infrastructure device 700 may generate sharing data on the basis of the second property data and transmit the sharing data to the first vehicle 141 (S5068). In detail, the infrastructure device 700 may transmit, to the first vehicle 141, second property data generated based on a second subset of point data representing the pedestrian 800 which is not included in the first set of point data. In this case, the second property data may include tracking information of the pedestrian 800 predicted according to the movement direction and movement speed of the pedestrian 800. In this case, the controller of the first vehicle 141 may compute the probability of collision between the first vehicle 141 and the pedestrian 800 on the basis of the tracking information.

Also, the content of the sharing data may include the third property data. In some embodiments, the content of the sharing data may not include the third property data.

5.2.2.2.2. Generation and Modification of Local Path

The controller of the first vehicle 141 may generate a local path 8100 on the basis of the sensor data acquired through the sensor placed in the first vehicle 141 (S5065). In this case, the first vehicle 141 may generate the local path 8100 before receiving the sharing data from the infrastructure device 700. In some embodiments, the first vehicle 141 may generate the local path 8100 after receiving the sharing data.

As an example, the controller of the first vehicle 141 may generate the local path 8100 on the basis of the first property data. In detail, the controller of the first vehicle 141 may control the vehicle along a global path and may generate a local path 8100 on the basis of sensor data for an object present in the field of view of the sensor placed in the vehicle. As a specific example, the controller of the first vehicle 141 may generate a local path 8100 for preventing collision between the vehicle and the building 500 on the basis of the sensor data (e.g., a first subset of point data or first property data) for the building 500.

It will be appreciated that in some embodiments, the controller of the first vehicle 141 may generate a local path on the basis of a first set of point data and a plurality of subsets of point data which are included in the sensor data.

Also, the controller of the first vehicle 141 may generate a modified path 8110 on the basis of the sensor data and the sharing data (S5069). In detail, in order to avoid collision with an object not included in the sensor data, the controller of the first vehicle 141 may generate a modified path 8110 on the basis of sensor data acquired from the sensor placed in the first vehicle 141 and sharing data received from the infrastructure device 700.

In this case, the content of the sharing data may include information regarding the object not included in the first set of point data. For example, the content of the sharing data may include a second subset of point data representing at least a portion of the pedestrian 800 not included in the first set of point data or second property data of the second subset of point data, but the present invention is not limited thereto.

Also, the controller of the first vehicle 141 may determine whether to generate the modified path 8110 on the basis of the second property data before generating the modified path 8110.

As an example, when the local path 8100 includes at least a portion of a predetermined region where the pedestrian 800 is located, the controller of the first vehicle 141 may generate the modified path 8110. In other words, when the local path 8100 and the predetermined region where the pedestrian 800 is located partially overlap each other, the controller of the first vehicle 141 may generate the modified path 8110. In this case, the predetermined region may be preset by the controller of the first vehicle 141. However, the present invention is not limited thereto, and the predetermined region may be set based on the speed of the first vehicle 141, the distance to the pedestrian, or the like. Also, the modified path 8110 may not overlap the predetermined region where the pedestrian 800 is located. It will be appreciated that in some embodiments, the modified path 8110 may partially overlap the predetermined region where the pedestrian 800 is located.

As another example, the controller of the first vehicle 141 may compute the probability of collision between the first vehicle 141 and the pedestrian 800 on the basis of second property data including movement information of the pedestrian 800 not included in the first set of point data and may determine whether to generate the modified path 8110 according to the computed probability.

More specifically, the controller of the first vehicle 141 may determine whether to modify the path of the vehicle on the basis of the probability of movement of the first vehicle 141 predicted based on the local path 8100 of the first vehicle and the probability of movement of the pedestrian 800 predicted based on the second property data.

As a specific example, the controller of the first vehicle 141 may determine whether to generate the modified path 8110 on the basis of a collision probability map, which is generated based on the local path 8100 and the second property data and along with the movement of the first vehicle 141 and the pedestrian 800.

Figure 83:
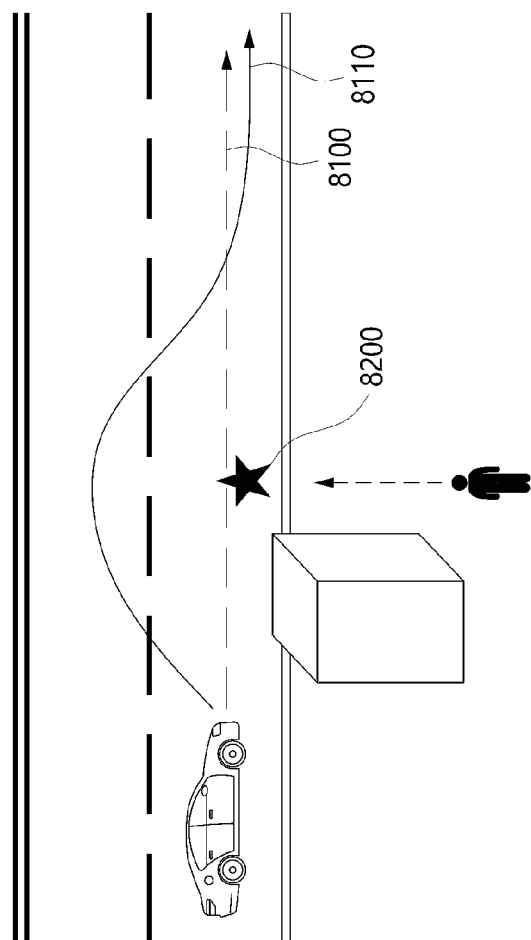
FIG. 83 is a diagram illustrating a method of generating a modified path on the basis of a collision probability map generated by a controller of a first vehicle according to an embodiment.

FIG. 83 is a diagram illustrating a method of generating a modified path on the basis of a collision probability map generated by a controller of a first vehicle according to an embodiment.

Referring to FIG. 83, a controller of a vehicle may generate a collision probability map that represents the probability of movement of a pedestrian and the probability of movement of the vehicle traveling along a local path 8100 over time. In this case, when a region 8200 having a high probability of collision between the vehicle and the pedestrian is shown in the collision probability map while the vehicle is traveling along the local path 8100, the controller of the vehicle may determine to generate the modified path 8110 so as to avoid collision and may generate the modified path 8110.

However, the present invention is not limited thereto, and the controller of the vehicle may determine whether to generate the modified path according to whether a blind spot is present in sensor data acquired from a sensor placed in the vehicle.

In detail, when a blind spot is detected in the scheme described in Section 4.2.5., a controller of a vehicle traveling along a local path may generate a modified path to avoid possible dangers due to the presence of the blind spot.

For example, when a blind spot is detected, the controller of the vehicle may generate a modified path to decelerate the vehicle or change lanes, but the present invention is not limited thereto.

5.2.2.2.3. Various Examples of Modified Path

Also, a controller of a vehicle may generate an optimal modified path to avoid collision between the vehicle and other objects.

FIG. 84 is a diagram illustrating various examples of a modified path according to an embodiment.

Referring to FIG. 84, a controller of a second vehicle 142 traveling along a global path and a local path may generate at least one modified path in order to avoid a pedestrian 800 on the basis of the movement speed, movement direction, position, and the like of the second vehicle 142.

For example, the at least one modified path may include a first modified path 8111 for stopping the second vehicle 142 and a second modified path 8112 for changing at least a portion of the local path, but the present invention is not limited thereto.

In detail, the controller of the second vehicle 142 may receive information (e.g., property data) regarding the pedestrian 800 which is not included in sensor data acquired from a sensor placed in the second vehicle 142 and which is included in sharing data received from other devices. In this case, the controller of the second vehicle 142 may generate a first modified path 8111 for stopping the second vehicle 142 in order to prevent collision between the second vehicle 142 and the pedestrian 800. In this case, the first modified path 8111 may be generated to stop the second vehicle 142 in a predetermined time or stop the second vehicle for a predetermined time.

Also, the controller of the second vehicle 142 may generate a second modified path 8112 which allows the second vehicle 142 to avoid the pedestrian 800 by changing at least a portion of the local path of the second vehicle 142 so as to prevent collision between the second vehicle 142 and the pedestrian 800.

However, the present invention is not limited thereto, and the controller of the second vehicle 142 may generate a modified path by changing at least some of the position, speed, and direction of the second vehicle 142 which are included in the local path.

When the controller of the vehicle generates a modified path including the position, speed, or direction of the vehicle, the controller of the vehicle may set the modified path as a local path and may control the vehicle on the basis of the local path.

Also, the modified path may include a path obtained by modifying at least a portion of the global path. In detail, when information indicating that a specific event has occurred on the global path of the vehicle, the controller of the vehicle may generate a modified path reflecting the information indicating that the event has occurred and may set the modified path as a new global path.

As an example, the controller of the vehicle may control the vehicle along a first global path which is generated based on the current position of the vehicle and the position of the destination of the vehicle. In this case, when the controller of the vehicle receives sharing data including information related to a traffic event that has occurred at a specific time related to the first global path from another device, the vehicle may generate a modified path such that the vehicle can avoid the region where the traffic event has occurred. In this case, the controller of the vehicle may set the modified path as a second global path and control the vehicle along the second global path.

As described above, the modified path may refer to a path obtained by modifying at least a portion of the global path or the local path. However, the present invention is not limited thereto, and the modified path may refer to a path for suddenly stopping the vehicle. Also, the controller of the vehicle may set the modified path as a new global path for the vehicle or a new local path for the vehicle.

5.2.3. Case in which Information Related to Traffic Event is Included in Sharing Data The content of the sharing data according to an embodiment may include information related to a traffic event such as a traffic accident. In this case, the traffic event-related information may refer to information indicating that at least one object is associated with a traffic event. However, the present invention is not limited thereto, and the traffic event-related information may refer to a message that requests information regarding the traffic event or the like.

In this case, a device which has received the traffic event-related information may display data (e.g., an event occurrence region) included in the traffic event-related information in a high-definition map. For example, in order to notify an occupant of information related to the traffic event, a controller of a vehicle that has received the traffic event-related information may display a region where the traffic event has occurred in a high-definition map.

Also, the device which has received the traffic event-related information may change property data (e.g., class information) of objects related to the event using the traffic event-related information.

As a specific example, a controller of a first vehicle may determine that class information of a second vehicle included in sensor data acquired through at least one sensor included in the first vehicle is "vehicle." In this case, when the second vehicle is an object related to a traffic event, the controller of the first vehicle may receive information indicating that the second vehicle is related to the traffic event from the second vehicle. In this case, the controller of the first vehicle may change class information of the second vehicle to "accident," "accident vehicle," "accident site," "accident point," or the like, but the present invention is not limited thereto.

Also, the controller of the first vehicle may control the first vehicle on the basis of the changed class information of the second vehicle. For example, the controller of the first vehicle may generate a local path not including a region related to the second vehicle related to the traffic event, but the present invention is not limited thereto.

6. Various Applications Using Sensor Data and Sharing Data

The method of selectively sharing and processing the sensor data and the sharing data according to the above embodiment may be used in various applications.

As an example, the method of selectively sharing and processing the sensor data and the sharing data may be used for a black box (a dash cam). In this case, a vehicle including a black box using a LiDAR may store a set of point data acquired using the LiDAR in a memory of the black box or a memory included in the vehicle. However, as described above, in order to solve a storage capacity issue of a memory and a privacy invasion issue caused by intensity information of an object acquired from a LiDAR, the controller of the vehicle may selectively store the set of point data. For example, the controller of the vehicle may store a set of point data other than the intensity information of the object, but the present invention is not limited thereto. The controller of the vehicle may generate and store privacy protection data obtained by partially processing a subset of point data representing at least a portion of the object.

Also, when a vehicle is related to a traffic event such as traffic accident, the vehicle may receive sharing data including privacy protection data according to class information of the object related to the traffic event from a nearby device or may selectively receive only data related to a movable object as described above. In this case, the controller of the vehicle may reconfigure the traffic event on the basis of the sharing data.

Also, as described above, a vehicle located near the region where the traffic event has occurred may receive a request for sensor data related to the traffic event from a server, and a controller of the vehicle may transmit sharing data related to the traffic event to the server in response to the request. In this case, the server may reconfigure the traffic event on the basis of the sharing data related to the traffic event.

Also, as described above, a device which has received the sharing data related to the traffic event may match a plurality of pieces of data by aligning the coordinate systems of the sharing data and the sensor data with a signal coordinate system. In this case, the device may reconfigure the traffic event by listing, in chronological order, sensor data and sharing data which are acquired for a predetermined time before and after the traffic event.

As another example, as described above, the method of selectively sharing and processing the sensor data and the sharing data may be used to detect a blind spot which refers to a region where information cannot be acquired from a sensor placed in the vehicle. In detail, in order to acquire information regarding an object that is placed in the field of view of a sensor placed in a vehicle and that is covered by another object and thus is not included in sensor data, a controller of the vehicle may receive sharing data including the information regarding the object not included in the sensor data from other devices.

In this case, the device which has transmitted the sharing data to the vehicle may selectively generate the content of the sharing data on the basis of class information of an object included in the sensor data. Also, the device may selectively generate the content of the sharing data according to whether an event related to the vehicle has occurred. Also, a vehicle that has received the sharing data may match data on an object located in the blind spot and sensor data acquired by the sensor placed in the vehicle through coordinate system alignment. In this case, the controller of the vehicle may control the vehicle on the basis of the matched sensor data and sharing data.

As still another example, the method of selectively sharing and processing the sensor data and the sharing data may be used to detect an available parking space of a vehicle as described above. As a specific example, when a vehicle enters a parking lot, the vehicle may receive information regarding the available parking space from an infrastructure device placed in the parking lot. In this case, the controller of the vehicle may autonomously park the vehicle in the available parking space using an autonomous parking system and a system for communication with the infrastructure device.

Section 6 illustrates that the above descriptions in Sections 1 to 5 are applicable to some applications, and it will be appreciated that the descriptions in Sections 1 to 5 except for the description in Section 6 are also applicable to the applications. Also, it will be appreciated that the above descriptions in Sections 1 to 5 are applicable to applications (e.g., a traffic control system and any mode of transportation (drone, ship, train, etc.) other than vehicles) other than the applications described in Section 6.

The method according to an embodiment may be implemented in the form of program instructions executable by a variety of computer means and may be recorded on a computer-readable medium. The computer-readable medium may include program instructions, data files, data structures, and the like alone or in combination. The program instructions recorded on the medium may be designed and configured specifically for an embodiment or may be publicly known and usable by those who are skilled in the field of computer software. Examples of the computer-readable medium include a magnetic medium, such as a hard disk, a floppy disk, and a magnetic tape, an optical medium, such as a compact disc read-only memory (CD-ROM), a digital versatile disc (DVD), etc., a magneto-optical medium such as a floptical disk, and a hardware device specially configured to store and perform program instructions, for example, a read-only memory (ROM), a random access memory (RAM), a flash memory, etc. Examples of the computer instructions include not only machine language code generated by a compiler, but also high-level language code executable by a computer using an interpreter or the like. The hardware device may be configured to operate as one or more software modules in order to perform the operations of an embodiment, and vice versa.

Although the present disclosure has been described with reference to specific embodiments and drawings, it will be appreciated that various modifications and changes can be made from the disclosure by those skilled in the art. For example, suitable results may be achieved if the described techniques are performed in a different order and/or if components in a described system, architecture, device, or circuit are combined in a different manner and/or replaced or supplemented by other components or their equivalents.

Therefore, other implementations, embodiments, and equivalents are within the scope of the following claims.

What is claimed is:

1. A method for sharing and using sensor data in a server, the method comprising:
    establishing a wireless communication link between the server and a plurality of devices via a communication network, wherein at least one of the plurality of devices comprises a sensor configured to obtain a set of point data corresponding to one or more objects, and wherein the plurality of devices are configured to obtain:
        object location information, indicating a location of the one or more objects, from the set of point data,
        sharing data from the set of point data, wherein the sharing data includes at least one of a plurality of sets of property data of the one or more objects, and
        event information comprising event occurrence information indicating that an event occurred, event time information indicating a time of the event, and event location information indicating a location of the event;
    receiving, via the communication network, device location information, indicating a location of at least one of the plurality of devices, and the object location information from at least one of the plurality of devices;
    receiving, via the communication network, the event information from at least one of the plurality of devices;
    determining an occurrence of the event relating to a first device of the plurality of the devices or at least one object of the one or more objects based on the event occurrence information;
    determining a time of the event relating to the first device based on the event time information;
    determining a location of the event relating to the first device based on the event location information;
    receiving, via the communication network, the sharing data from a second device of the plurality of devices, wherein the second device is configured to obtain a first set of property data of the at least one object relating to the event;
    generating a first determination result indicating whether or not the second device is within a first range from the location of the event based on the determined location of the event;
    generating a second determination result based on the sharing data received from the second device, the second determination result indicating whether or not the sharing data includes the first set of property data of the at least one object relating to the event;
    selectively transmitting, via the communication network, a first message or a second message to the second device at least partially based on at least one of the first determination result or the second determination result,
        wherein the first message comprises the determined time of the event, and is configured to request a first set of point data obtained from the second device,
        wherein the second message comprises the determined location of the event, and is configured to notify the second device of the event,
        wherein the first message is transmitted to the second device, in response to the first determination result indicating that the second device is within the first range and the second determination result indicating that the sharing data received from the second device includes the first set of property data, and
        wherein the second message is transmitted to the second device, in response to the first determination result indicating that the second device is not within the first range or the second determination result indicating that the sharing data received from the second device does not include the first set of property data; and
    in response to the first message being transmitted to the second device, receiving, via the communication network, from the second device, a second set of point data obtained within a first time period including the time of the event.

2. The method of claim 1,
wherein the event includes at least one of a traffic-event related to at least one of accident related to the first device or accident related to another device around the first device, an environment event related to environment around the first device, or a regulatory event related to regulatory about the first device or another device around the first device.

3. The method of claim 1,
wherein one or more of the plurality of devices comprise at least one of a moving object, a mobile device, or an infrastructure device.

4. The method of claim 1,
wherein the plurality of devices include at least one sensor, and
wherein the at least one sensor includes at least one of a LiDAR, a camera, a radar, or an ultrasonic sensor.

5. A non-transitory computer-readable recording medium storing instructions thereon, when executed by a processor, configured to perform the method of claim 1.

6. The method of claim 1, further comprising:
generating a third determination result indicating whether or not a third device of the plurality of devices is located within a second range,
wherein a third message is transmitted to the third device, in response to the third determination result indicating that the third device is located within the second range, and
wherein the third message comprises the determined location of the event, and is configured to notify the third device of the event.

7. The method of claim 1, wherein the property data for the object related to the event includes at least one of class information of the object, center position information of the object, size information of the object, movement information of the object, shape information of the object, or identification information of the object.

* * * * *